US012496338B2

(12) United States Patent
Zaia et al.

(10) Patent No.: US 12,496,338 B2
(45) Date of Patent: Dec. 16, 2025

(54) CAR FOR TREATMENT OF HIV INFECTION

(71) Applicant: City of Hope, Duarte, CA (US)

(72) Inventors: John Zaia, Duarte, CA (US); Kevin Morris, Duarte, CA (US); Xiuli Wang, Temple City, CA (US); Stephen J. Forman, Duarte, CA (US)

(73) Assignee: City of Hope, Duarte, CA (US)

( * ) Notice: Subject to any disclaimer, the term of this patent is extended or adjusted under 35 U.S.C. 154(b) by 739 days.

(21) Appl. No.: 16/758,516

(22) PCT Filed: Oct. 23, 2018

(86) PCT No.: PCT/US2018/057124

§ 371 (c)(1),
(2) Date: Apr. 23, 2020

(87) PCT Pub. No.: WO2019/084018

PCT Pub. Date: May 2, 2019

(65) Prior Publication Data

US 2023/0070158 A1 Mar. 9, 2023

Related U.S. Application Data

(60) Provisional application No. 62/576,063, filed on Oct. 23, 2017.

(51) Int. Cl.

| | |
|---|---|
| ***C07K 14/725*** | (2006.01) |
| ***A61K 39/245*** | (2006.01) |
| ***A61K 40/11*** | (2025.01) |
| ***A61K 40/31*** | (2025.01) |
| ***A61K 40/46*** | (2025.01) |
| ***A61P 31/18*** | (2006.01) |
| ***C07K 16/10*** | (2006.01) |
| ***C12N 5/0783*** | (2010.01) |

(52) U.S. Cl.

CPC ............ *A61K 39/245* (2013.01); *A61K 40/11* (2025.01); *A61K 40/31* (2025.01); *A61K 40/46* (2025.01); *A61P 31/18* (2018.01); *C07K 14/7051* (2013.01); *C07K 16/1063* (2013.01); *C12N 5/0638* (2013.01); *A61K 2239/38* (2023.05)

(58) Field of Classification Search

CPC ...... A61K 39/245; A61K 40/11; A61K 40/31; A61K 40/46; A61K 2239/38; A61K 39/21; A61P 31/18; C07K 14/7051; C07K 16/1063; C07K 2317/622; C07K 2319/03; C07K 2319/33; C12N 5/0638

See application file for complete search history.

(56) References Cited

U.S. PATENT DOCUMENTS 8,580,276 B2 11/2013 Diamond et al.
10,562,960 B2 * 2/2020 Connors .......... G01N 33/56988
11,230,577 B2 * 1/2022 Barish .................... A61K 40/31
2017/0334997 A1 * 11/2017 Dubridge ................ A61P 29/00
2018/0298083 A1 * 10/2018 Connors ............ C07K 16/2809
2020/0054736 A1 * 2/2020 Williams ............... A61K 40/31

FOREIGN PATENT DOCUMENTS

WO WO 2007/140222 12/2007
WO WO 2016/154628 9/2016
WO WO-2016154003 A1 * 9/2016 ............. A61P 31/18
WO WO 2017/053556 3/2017

OTHER PUBLICATIONS

Ali A, Kitchen SG, Chen ISY, Ng HL, Zack JA, Yang OO. HIV-1-Specific Chimeric Antigen Receptors Based on Broadly Neutralizing Antibodies. J Virol. Jul. 11, 2016;90(15):6999-7006. (Year: 2016).*

Huang et al 2016. Identification of a CD4-Binding-Site Antibody to HIV that Evolved Near-Pan Neutralization Breadth. Immunity. Nov. 15, 2016;45(5):1108-1121. (Year: 2016).*

Cooper LJ, Al-Kadhimi Z, Serrano LM, Pfeiffer T, Olivares S, Castro A, Chang WC, Gonzalez S, Smith D, Forman SJ, Jensen MC. Enhanced antilymphoma efficacy of CD19-redirected influenza MP1-specific CTLs by cotransfer of T cells modified to present influenza MP1. Blood. Feb. 15, 2005;105(4):1622-31 (Year: 2005).*

Sahu GK, Sango K, Selliah N, Ma Q, Skowron G, Junghans RP. Anti-HIV designer T cells progressively eradicate a latently infected cell line by sequentially inducing HIV reactivation then killing the newly gp120-positive cells. Virology. Nov. 2013;446(1-2):268-75. (Year: 2013).*

Savoldo B, Rooney CM, Di Stasi A, Abken H, Hombach A, Foster AE, Zhang L, Heslop HE, Brenner MK, Dotti G. Epstein Barr virus specific cytotoxic T lymphocytes expressing the anti-CD30zeta artificial chimeric T-cell receptor for immunotherapy of Hodgkin disease. Blood. Oct. 1, 2007;110(7):2620-30. (Year: 2007).*

Wang X, Wong CW, Urak R, Mardiros A, Budde LE, Chang WC, Thomas SH, Brown CE, La Rosa C, Diamond DJ, Jensen MC, Nakamura R, Zaia JA, Forman SJ. CMVpp65 Vaccine Enhances the Antitumor Efficacy of Adoptively Transferred CD19-Redirected CMV-Specific T Cells. Clin Cancer Res. Jul. 1, 2015;21(13):2993-3002. (Year: 2015).*

Hale et al., "Engineering HIV-Resistant, Anti-HIV Chimeric Antigen Receptor T Cells," Mol. Ther., Mar. 1, 2017, 25(3):570-579.

PCT International Search Report and Written Opinion in International Appln. No. PCT/US2018/057124, mailed on Apr. 16, 2019, 21 pages.

Wang et al., "CMVpp65 Vaccine Enhances the Antitumor Efficacy of Adoptively Transferred CD19-Redirected CMV-Specific T Cells," Clin Cancer Res., Apr. 2, 2015, 21(13):2993-3002.

Wu et al., "106: Stimulation, transduction, and expansion of CMV-specific T cells for adoptive immunotherapy in NHP," Journal of Medical Primatology, Jul. 31, 2017, 46(4), Sp. Iss. SI, p. 207.

Ali et al., "HIV-1-Specific Chimeric Antigen Receptors Based on Broadly Neutralizing Antibodies," J Virology., 2016, 90:6999-7006.

(Continued)

*Primary Examiner* — Janet L Andres
*Assistant Examiner* — Samadhan Jaising Jadhao
(74) *Attorney, Agent, or Firm* — Fish & Richardson P.C.

(57) ABSTRACT

Methods of treatment for HIV employing T cells expressing both a chimeric antigen receptors targeted to HIV and a CMV-specific T cell receptor.

7 Claims, 56 Drawing Sheets

Specification includes a Sequence Listing.

(56) References Cited

OTHER PUBLICATIONS

Bailus et al., "Protein Delivery of an Artificial Transcription Factor Restores Widespread Ube3a Expression in an Angelman Syndrome Mouse Brain," Mol Ther., 2016, 24(3):548-555.
Bitton et al., "Gene therapy approaches to HIV-infection: immunological strategies: use of T bodies and universal receptors to redirect cytolytic T-cells," Front Biosci., 1999, 4:D386-D393.
Day et al., "PD-1 expression on HIV-specific T cells is associated with T cell exhaustion and disease progression," Nature, Sep. 21, 2006, 443(7109):350-354.
Deeks et al., "A Phase II Randomized Study of HIV-Specific T-Cell Gene Therapy in Subjects with Undetectable Plasma Viremia on Combination Antiretroviral Therapy," Mol Ther., 2002, 5(6):788-797.
Gattinoni et al., "Paths to sternness: building the ultimate antitumour T cell," Nat Rev Cancer, Oct. 2012, 12(10):671-684.
Ghoneim et al., "Cell Intrinsic Barriers of T Cell-Based Immunotherapy," Trends Mol Med., Dec. 2016, 22(12):1000-1011.
Golubovskaya et al., "Different Subsets of T Cells, Memory, Effector Functions, and CAR-T Immunotherapy," Cancers, Mar. 15, 2016, 8(3):36.
Gomez-Mora et al., "Elevated humoral response to cytomegalovirus in HIV-infected individuals with poor CD4+ T-cell immune recovery," Sep. 21, 2017, 12(9):e0184433.
Hale et al., "Homology-Directed Recombination for Enhanced Engineering of Chimeric Antigen Receptor T Cells," Mol Ther Methods Clin Dev., Jan. 10, 2017, 4:192-203.
Hege et al., "Systemic T cell-independent tumor immunity after transplantation of universal receptor-modified bone marrow into SCID mice," J Exp Med., Dec. 1, 1996, 184(6):2261-2269.
International Search Report and Written Opinion in International Application No. PCT/US2020/025335, dated Jun. 16, 2020, 15 pages.
Larbi et al., "truly naive" to "exhausted senescent" T cells: when markers predict functionality, Cytometry A., Jan. 2014, 85(1):25-35.
Liu et al., "Chimeric antigen receptor (CAR)-modified natural killer cell-based immunotherapy and immunological synapse formation in cancer and HIV," Protein Cell, 2017, 8(12):861-877.
Malinkova et al., "Cyclin-dependent kinase inhibitors for cancer therapy: a patent review (2009-2014)," Expert Opin Ther Pat., Jul. 10, 2015, 25(9):953-970.
Peters and Sette et al., "NetMHCpan, a Method for Quantitative Predictions of Peptide Binding to Any HLA-A and -B Locus Protein of Known Sequence," PLOS One, Aug. 29, 2007, 2(8):e796.
Saayman et al., "Potent and Targeted Activation of Latent HIV-1 Using the CRISPR/dCas9 Activator Complex," Mol Ther., 2016, 24(3):488-498.
Sahu et al., "Anti-HIV designer T cells progressively eradicate a latently infected cell line by sequentially inducing HIV reactivation then killing the newly gp120-positive cells," Virology, 2013, 446(1-2):268-275.
Shingai et al., "Antibody-mediated immunotherapy of macaques chronically infected with SHIV suppresses viraemia," Nature, 2013, 503:277-280.
Sylwester et al., "Broadly targeted human cytomegalovirus-specific CD4 + and CD8 + T cells dominate the memory compartments of exposed subjects," J Exp Med., 2005, 202(5):673-685.
Trautmann et al., Upregulation of PD-1 expression on HIV-specific CDS+ T cells leads to reversible immune dysfunction, Nat Med., Oct. 2006, 12(10):1198-1202.
Wang et al., "A transgene-encoded cell surface polypeptide for selection, in vivo tracking, and ablation of engineered cells," Blood, 2011, 118(5):1255-1263.
Wang et al., "Modified H5 promoter improves stability of insert genes while maintaining immunogenicity during extended passage of genetically engineered MVA vaccines," Vaccine, 2010, 28(6):1547-1557.
Yang et al., "Lysis of HIV-1-infected cells and inhibition of viral replication by universal receptor T cells," Proc Natl Acad Sci USA., Oct. 14, 1997, 94(21):11478-11483.
Booiman et al., "Terminal differentiation of T cells is strongly associated with CMV infection and increased in HIV-positive individuals on ART and lifestyle matched controls," PLoS One, Aug. 2017, 12(8):e0183357, 17 pages.
Bouvin-Pley et al., "Drift of the HIV-1 Envelope Glycoprotein gp120 toward Increased Neutralization Resistance over the Course of the Epidemic: a Comprehensive Study Using the Most Potent and Broadly Neutralizing Monoclonal Antibodies," Journal of Virology, Dec. 2014, 88(23):13910-13917.
Collman et al., "An Infectious Molecular Clone of an Unusual Macrophage-Tropic and Highly Cytopathic Strain of Human Immunodeficiency Virus Type 1," Journal of Virology, Dec. 1992, 66(12):7517-7521.
Diskin et al., "Increasing the Potency and Breadth of an HIV Antibody by using Structure-Based Rational Design," Science, Dec. 2011, 334(6060):1289-1293.
Jonnalagadda et al., "Chimeric Antigen Receptors With Mutated IgG4 Fc Spacer Avoid Fc Receptor Binding and Improve T Cell Persistence and Antitumor Efficacy," Molecular Therapy, Apr. 2015, 23(4):757-768.
La Rosa et al., "MVA vaccine encoding CMV antigens safely induces durable expansion of CMV-specific T cells in healthy adults," Blood, Jan. 2017, 129(1):114-125.
Sok et al., "HIV Broadly Neutralizing Antibodies: Taking Good Care of the 98%," Immunity, Nov. 2016, 45(5):958-960.
Wang et al., "Engraftment of human central memory-derived effector $CD8^+$ T cells in immunodeficient mice, " Blood, Feb. 2011, 117(6):1888-1898.
Wu et al., "Rational Design of Envelope Identifies Broadly Neutralizing Human Monoclonal Antibodies to HIV-1," Science, Aug. 2010, 329(5993):856-861.
Cooper et al., "Enhanced antilymphoma efficacy of CD19-redirected influenza MP1-specific CTLs by cotransfer of T cells modified to present influenza MP1," Blood, 2005, 105(4):1622-1631.
Cruz et al., "Infusion of donor-derived CD19-redircted virus-specific T cells for B-cell malignancies relapsed after allogeneic stem cell transplant: a phase 1 study," Blood, 2013, 122(17):2965-2973.
Diskin et al., "Restricting HIV-1 pathways for escape using rationally designed anti-HIV-1 antibodies," J. Exp. Med., Jun. 3, 2013, 210(6):1235-1249.
Finzi et al., "Identification of a reservoir for HIV-1 in patients on highly active antiretroviral therapy," Science, 1997, 278(5341):1295-1300 (Abstract Only).
Hermankova et al., "Analysis of Human Immunodeficiency Virus Type 1 Gene Expression in Latently Infected Resting CD4+ T Lymphocytes in Vivo," J Virol, 2003, 77(13):7383-7392.
Huang, "Identification of a CD4-Binding-Site Antibody to HIV that Evolved Near-Pan Neutralization Breadth," Immunity, Nov. 15, 2015, 45(5):1108-1121.
Kalos et al., "T cells with chimeric antigen receptors have patent antitumor effects and can establish memory in patients with advanced Leukemia," Sci. Transl. Med., 2011, 3(95):95re73 (Abstract Only).
Klein et al., "HIV therapy by a combination of broadly neutralizing antibodies in humanized mice," Nature, 2012, 592(7427):118-122 (Abstract Only).
La Rosa et al., "Clinical Evaluation of Safety and Immunogenicity of PADRE-Cytomegalovirus (CMV) and Tetanus-CMV Fusion Peptide Vaccines With or Without PF03512676 Adjuvant," Journal of Infectious Diseases, 2012, 205(8):1294-1304.
Leen et al., "Cytotoxic T lymphocyte therapy with donor T cells prevents and treats adenovirus and Epstein-barr virus infections after haploidentical and matched unrelated stem cell transplantation," Blood, 2009, 114(19):4283-92.
Pule et al., "Virus-specific T cells engineered to coexpress tumor-specific receptors: persistence and antitumor activity in individuals with neuroblastoma," Nature Medicine, 2008, 14(11):1264-1270 (Abstract Only).
Shan et al., "Stimulation of HIV-1 Specific Cytolytic T Lymphocytes Facilitates Elimination of Latent Viral Reservoir after Virus Reactivation," Immunity, 2012, 36(3):491-501.

(56) References Cited

OTHER PUBLICATIONS

Sloan et al., "Targeting HIV Reservoir of Infected CD4 T Cells by Dual-Affinity Re-Targeting Molecules (DARTs) that Bind HIV Envelope and Recruit Cytotoxic T Cells," PLoS Pathg., 2015, 11(11):e1005233, 29 pages.
U.S. Appl. No. 18/856,156, filed Oct. 11, 2024, Wang et al.
Leibman et al., "Supraphysiologic control over HIV-1 replication mediated by CD8 T cells expressing a re-engineered CD-4 based chimeric antigen receptor," PLoS Pathogens, Oct. 2017, 13(10):e1006613, 30 pages.
Liu et al., "Novel CD4-Based Bispecific Chimeric Antigen Receptor Designed for Enhanced Anti-HIV Potency and Absence of HIV Entry Receptor Activity," Journal of Virology, Jul. 2015, 89(13):6685-6694.
Wagner, "Quarter Century of Anti-HIV CAR T Cells," Current HIV/AIDS Reports, Apr. 2018, 15(2):147-154.

* cited by examiner (A)

(B)

Monoclonal antibody
45-46
PGT128
3BC176
N6
PGDM1400
PGT126
PGT145
PG9
PG16
VRCO1
VRCO7-523
X5
35O22
10E8
3BNC117
CD4-17b

FIGURE 5A

| Binding Site | Ab Name | Leader peptide (Bold) and Heavy Chain variable region (Hv) | Light Chain Variable region (Lv) | Reference |
|---|---|---|---|---|
| CD4 | 45-46 | **MLLLVTSLLLCELPHPAFLLIP**QVRLSQSGGQMKKPGESMRLSCRASGYEFLNCPINWIRLAPGRRPEWMGWLKPRGGAVNYARKFQGRVTMTRDVYSDTAFLELRSLTSDDTAVYFCTRGKYCTARDYYNWDFEHWGRGAPVTVSS SEQ ID NO: 101 | EIVLTQSPATLSLSPGETAIISCRTSQSGSLAWYQQRPGQAPRLVIYSGSTRAAGIPDRFSGSRWGADYNLSISNLESGDFGVYYCQQYEFFGQGTKVQVDIK SEQ ID NO: 54 | Scheid et al, 2011 |
| V3 glycan | PGT121 | **MLLLVTSLLLCELPHPAFLLIP**QMQLQESGPGLVKPSETLSLTCSVSGASISDSYWSWIRRSPGKGLEWIGYVHKSGDTNYSPSLKSRVNLSLDTSKNQVSLSLVAATAADSGKYYCARTLHGRRIYGIVAFNEWFTYFYMDVWGNGTQVTVSS SEQ ID NO: 102 | SDISVAPGETARISCGEKSLGSRAVQWYQHRAGQAPSLIIYNNQDRPSGIPERFSGSPDSPFGTTATLTITSVEAGDEADYYCHIWDSRVPTKWVFGGGTTLTVL SEQ ID NO: 55 | Walker et al, 2011 |
| V2 Glycan | PGDM1400 | **MLLLVTSLLLCELPHPAFLLIP**QAQLVQSGPEVRKPGTSVKVSCKAPGNTLKTYDLHWVRSVPGQGLQWMGWISHEGDKKVIVERFKAKVTIDWDRSTNTAYLQLSGLTSGDTAVYYCAKGSKHRLRDYALYDDDGALNWAVDVDYLSNLEFWGQGTAVTVSS SEQ ID NO: 103 | DFVLTQSPHSLSVTPGESASISCKSSHSLIHGDRNNYLAWYVQKPGRSPQLLIYLASSRASGVPDRFSGSGSDKDFTLKISRVETEDVGTYYCMQGRESPWTFGQGTKVDIKRT SEQ ID NO: 56 | Sok et al, 2014 |
| V3/CD4i | 3BC176 | **MLLLVTSLLLCELPHPAFLLIP**QVQLMQSGAQLKKPGDSLKISCKASGYNFIDYHIHWVRLAPGRGLEWMGWIDPVGGITKYAGQFQGRLSLTRDTSTNTLFLELSRLTAGDTAVYFCARSMRPVDHGIDYSGLFVFHFWGRGSDVLVSS SEQ ID NO: 104 | QSVLTQPASVSASPGQSITVSCTGSRNDVGGYDFVSWYQAHPGGVPKLLIYEISKRPSGIPQRFSGSRSGNTASLTISGLQDDDEADYYCCSYASYDRLIFGGGTRVSVL SEQ ID NO: 57 | Klein et al, 2012 |
| V3 glycan | PGT126 | **MLLLVTSLLLCELPHPAFLLIP**QPQLQESGPGLVEASETLSLTCTVSGDSTAACDYFWGWVRQPPGKGLEWIGGLSHCAGYYNTGWTYHNPSLKSRLTISLDTPKNQVFLKLNSVTAADTAIYYCARFDGEVLVYHDWPKPAWVDLWGRGTLVTVTVSS SEQ ID NO: 105 | QSALTQPPSASGSPGQSISISCTGTSNRFVSWYQQHPGKAPKLVIYGVNKRPSGVPDRFSGSKSGNTASLTVSGLQTDDEAVYYCSSLVGNWDVIFGGGTKLTVL SEQ ID NO: 58 | Walker et al, 2011 |
| V3 glycan | PGT128 | **MLLLVTSLLLCELPHPAFLLIP**QPQLQESGPTLVEASETLSLTCAVSGDSTAACNSFWGWVRQPPGKGLEWVGSLSHCASYWNRGWTYHNPSLKSRLTLALDTPKNLVFLKLNSVTAADTATYYCARFGGEVLRYTDWPKPAWVDLWGRGTLVTVSS SEQ ID NO: 106 | QSALTQPPSASGSPGQSITISCTGTSNNFVSWYQQHAGKAPKLVIYDVNKRPSGVPDRFSGSKSGNTASLTVSGLQTDDEAVYYCGSLVGNWDVIFGGGTKLTVL SEQ ID NO: 59 | Walker et al, 2011 |
| V1/V2 glycan | PGT145 | **MLLLVTSLLLCELPHPAFLLIP**QVQLVQSGAEVKKPGSSVKVSCKASGNSFSNHDVHWVRQATGQGLEWMGWMSHEGDKTGLAQKFQGRVTITRDSGASTVYMELRGLTADDTAIYYCLTGSKHRLRDYFLYNEYGPNYEEWGDYLATLDVWGHGTAVTVSS SEQ ID NO: 107 | EVVITQSPLFLPVTPGEAASLSCKCSHSLQHSTGANYLAWYLQRPGQTPRLLIHLATHRASGVPDRFSGSGSGTDFTLKISRVESDDVGTYYCMQGLHSPWTFGQGTKVEIKRT SEQ ID NO: 60 | Walker et al, 2011 |
| V2 Glycan | PG9 | **MLLLVTSLLLCELPHPAFLLIP**QRLVESGGGVVQPGSSLRLSCAASGFDFSRQGMHWVRQAPGQGLEWVAFIKYDGSEKYHADSVWGRLSISRDNSKDTLYLQMNSLRVEDTATYFCVREAGGPDYRNGYNYYDFYDGYYNYHYMDVWGKGTTVTVSS SEQ ID NO: 108 | QSALTQPASVSGSPGQSITISCNGTSNDVGGYESVSWYQQHPGKAPKVVIYDVSKRPSGVSNRFSGSKSGNTASLTISGLQAEDEGDYYCKSLTSTRRRVFGTGTKLTVL SEQ ID NO: 61 | Walker et al, 2009 |
| V2 Glycan | PG16 | **MLLLVTSLLLCELPHPAFLLIP**QEQLVESGGGVVQPGGSLRLSCLASGFTFHKYGMHWVRQAPGKGLEWVALISDDGMRKYHSDSMWGRVTISRDNSKNTLYLQFSSLKVEDTAMFFCAREAGGPIWHDDVKYYDFNDGYYNYHYMDVWGKGTTVTVSS SEQ ID NO: 109 | QSALTQPASVSGSPGQTITISCNGTSSDVGGFDSVSWYQQSPGKAPKVMVFDVSHRPSGISNRFSGSKSGNTASLTISGLHIEDEGDYFCSSLTDRSHRIFGGGTKVTVL SEQ ID NO: 62 | Walker et al, 2009 |
| CD4 | VRC01 | **MLLLVTSLLLCELPHPAFLLIP**QVQLVQSGGQMKKPGESMRISCRASGYEFIDCTLNWIRLAPGKRPEWMGWLKPRGGAVNYARPLQGRVTMTRDVYSDTAFLELRSLTVDDTAVYFCTRGKNCDYNWDFEHWGRGTPVIVSS SEQ ID NO: 110 | EIVLTQSPGTLSLSPGETAIISCRTSQYGSLAWYQQRPGQAPRLVIYSGSTRAAGIPDRFSGSRWGPDYNLTISNLESGDFGVYYCQQYEFFGQGTKVQVDIKR SEQ ID NO: 63 | Wu et al, 2010 |
| CD4 | VRC07-523 | **MLLLVTSLLLCELPHPAFLLIP**QVRLSQSGGQMKKPGDSMRISCRASGYEFINCPINWIRLAPGKRPEWMGWMKPRHGAVSYARQLQGRVTMTRDMYSETAFLELRSLTSDDTAVYFCTRGKYCTARDYYNWDFEHWGQGTPVTVSS SEQ ID NO: 111 | SLTQSPGTLSLSPGETAIISCRTSQYGSLAWYQQRPGQAPRLVIYSGSTRAAGIPDRFSGSRWGPDYNLTISNLESGDFGVYYCQQYEFFGQGTKVQVDIKR SEQ ID NO: 64 | Rudicell et al, 2014 |
| CD4i | X5 | **MLLLVTSLLLCELPHPAFLLIP**LEQSGAEVKKPGSSVQVSCKASGGTFSMYGFNWVRQAPGHGLEWMGGIIPIFGTSNYAQKFRGRVTFTADQATSTAYMELTNLRSDDTAVYYCARDFGPDWEDGDSYDGSGRGFFDFWGQGTLVTVSS SEQ ID NO: 112 | ELVLTQSPGTLSLSAGERATLSCRASQSVSGSLAWYQQKPGQAPRLLIYGASTRATGIPDRFSGSGSGTDFTLTIGRLEPEDLAVYYCQQYGTSPYTFGQGTKLEI SEQ ID NO: 65 | Moulard et al, 2002 |
| GP41-120 interface | 35O22 | **MLLLVTSLLLCELPHPAFLLIP**QGQLVQSGAELKKPGASVKISCKTSGYRFNFYHINWIRQTAGRGPEWMGWISPYSGDKNLAPAFQDRVIMTTDTEVPVTSFTSTGAAYMEIRNLKFDDTGTYFCAKGLLRDGSSTWLPYLWGQGTLLTVSS SEQ ID NO: 113 | QSVLTQSASVSGSLGQSVTISCTGPNSVCCSHKSISWYQWPPGRAPTLIIYEDNERAPGISPRFSGYKSYWSAYLTISDLRPEDETTYYCCSYTHNSGCVFGTGTKVSV SEQ ID NO: 66 | Huang et al, 2014 |
| MPER | 10E8 | **MLLLVTSLLLCELPHPAFLLIP**EVQLVESGGGLVKPGGSLRLSCSASGFDFDNAWMTWVRQPPGKGLEWVGRITGPGEGWSVDYAAPVEGRFTISRLNSINFLYLEMNNLRMEDSGLYFCARTGKYYDFWSGYPPGEEYFQDWGRGTLVTVSS SEQ ID NO: 114 | SYELTQETGVSVALGRTVTITCRGDSLRSHYASWYQKKPGQAPILLFYGKNNRPSGVPDRFSGSASGNRASLTISGAQAEDDAEYYCSSRDKSGSRLSVFGGGTKLTVL SEQ ID NO: 67 | Huang et al, 2012 |

FIGURE 5B

| Binding Site | Ab Name | Leader peptide (Bold) and Heavy Chain variable region (Hv) | Light Chain Variable region (Lv) | Reference |
|---|---|---|---|---|
| CD4 | 3BNC117 | **MLLLVTSLLLCELPHPAFLLIP**QVQLLQSGAAVTKPGASVRVSCE<br>ASGYNIRDYFIHWWRQAPGQGLQWVGWINPKTGQPNNPRQF<br>QGRVSLTRHASWDFDTFSFYMDLKALRSDDTAVYFCARQRSDY<br>WDFDVWGSGTQVTVSSASTKGP SEQ ID NO: 115 | DIQMTQSPSSLSASVGDTVTITCQANGYLNWYQQRRGK<br>APKLLIYDGSKLERGVPSRFSGRRWGQEYNLTINNLQPE<br>DIATYFCQVYEFVVPGTRLDLKRTVAAP<br>SEQ ID NO: 68 | Scheid et al, 2011 |
| CD4 | N6 | RAHLVQSGTAMKKPGASVRVSCQTSGYTFTAHILFWFRQAPGR<br>GLEWVGWIKPQYGAVNFGGGFRDRVTLTRDVYREIAYMDIRGL<br>KPDDTAVYYCARDRSYGDSSWALDAWGQGTTVVVSA | YIHVTQSPSSLSVSIGDRVTINCQTSQGVGSDLHWYQHK<br>PGRAPKLLIHHTSSVEDGVPSRFSGSGFHTSFNLTISDLQA<br>DDIATYYCQVLQFFGRGSRLHIK SEQ ID NO: 99 | Huang et al, 2016 |
| | | SEQ ID NO: 100 (ABOVE) SEQ ID NO: 96 (BELOW) | | |
| CD4 | 45-46 (G54W) | QVRLSQSGGQMKKPGESMRLSCRASGYEFLNCPINWIRLAPGR<br>RPEWMGWLKPRWGAVNYARKFQGRVTMTRDVYSDTAFLELR<br>SLTSDDTAVYFCTRGKYCTARDYYNWDFEHWGRGAPVTVSS | SEIVLTQSPATLSLSPGETAIISCRTSQSGSLAWYQQRPGQ<br>APRLVIYSGSTRAAGIPDRFSGSRWGADYNLSISNLESGD<br>FGVYYCQQYEFFGQGTKVQVDIK SEQ ID NO: 69 | Diskin et al, 2011 |
| CD4 | 45-46 (G54W-S28Y) | QVRLSQSGGQMKKPGESMRLSCRASGYEFLNCPINWIRLAPGR<br>RPEWMGWLKPRWGAVNYARKFQGRVTMTRDVYSDTAFLELR<br>SLTSDDTAVYFCTRGKYCTARDYYNWDFEHWGRGAPVTVSS | SEIVLTQSPATLSLSPGETAIISCRTSQYGSLAWYQQRPGQ<br>APRLVIYSGSTRAAGIPDRFSGSRWGADYNLSISNLESGD<br>FGVYYCQQYEFFGQGTKVQVDIK SEQ ID NO: 70 | Diskin et al, 2013 |
| | | SEQ ID NO: 116 (ABOVE) SEQ ID NO: 117 (BELOW) | | |
| CD4 | CD4-17b | MVRGVPFRHLLLVLQLALLPAATQGKKVVLGKKGDTVELTCTAS<br>QKKSIQFHWKNSNQIKILGNQGSFLTKGPSKLNDRADSRRSLWD<br>QGNFPLIIKNLKIEDSDTYICEVEDQKEEVQLLVFGLTANSDTHLL<br>QGQSLTLTLESPPGSSPSVQCRSPRGKNIQGGKTLSVSQLELQDS<br>GTWTCTVLQNQKKVEFKIDIVVLAFQKASGGGGSGGGGSQVQL<br>LESGAEVKKPGSSVKVSCKASGDTFIRYSFTWVRQAPGQGLEW<br>MGRIITILDVAHYAPHLQGRVTITADKSTSTVYLELRNLRSDDTAV<br>YFCAGVYEGEADEGEYDNNGFLKHWGQGTLVTVSSGGGGSGG<br>GGSGGGGSELELTQSPATLSVSPGERATLSCRASESVSSDLAWYQ<br>QKPGQAPRLLIYGASTRATGVPARFSGSGSGAEFTLTISSLQSEDF<br>AVYYCQQYNNWPPRYTFGQGTRLEIKAAA | – | Liu et al, 2015 |

FIGURE 14A
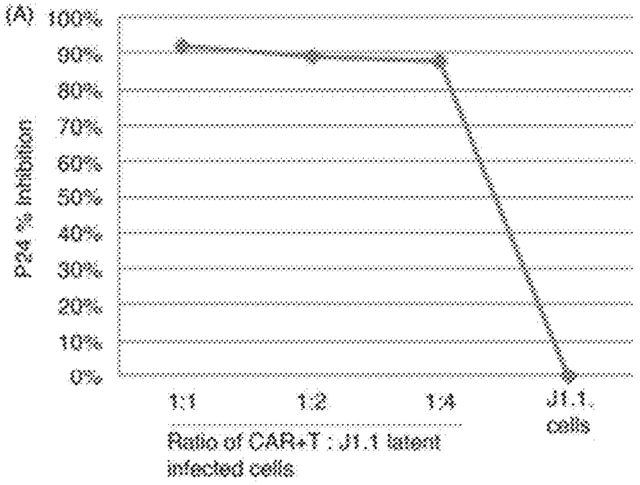
(B)
| J1.1/PMA | P24 Stain | J1.1/PMA | % Inhibition | J1.1/PMA | EGFR- | EGFR+ |
|---|---|---|---|---|---|---|
| 1:1 | 0.7% | 1:1 | 92.3% | 1:1 | 0.7% | 0.0% |
| 1:2 | 1.0% | 1:2 | 89.0% | 1:2 | 0.7% | 0.3% |
| 1:4 | 1.1% | 1:4 | 87.9% | 1:4 | 1.0% | 0.1% |
| 0:1 | 9.1% | 0:1 | 0.0% | 0:1 | 9.1% | 0.0% |
FIGURE 14B
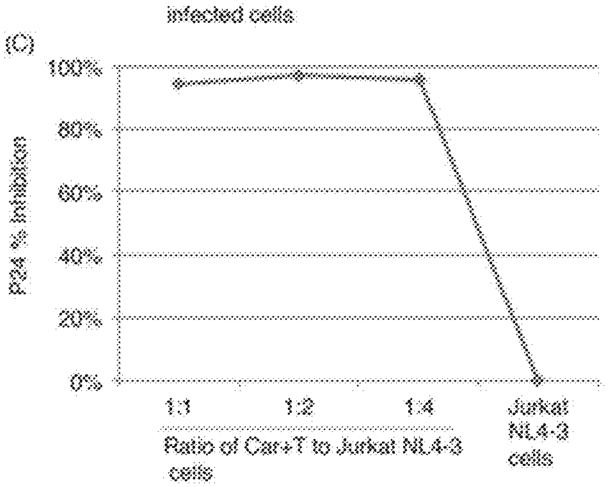
(D)
| Jurkat/NL4-3 | P24 Stain | Jurkat/ NL4-3 | % Inhibition | Jurkat/NL4-3 | EGFR- | EGFR+ |
|---|---|---|---|---|---|---|
| 1:1 | 1.4% | 1:1 | 94.2% | 1:1 | 0.7% | 0.7% |
| 1:2 | 0.6% | 1:2 | 97.5% | 1:2 | 0.6% | 0.0% |
| 1:4 | 1.0% | 1:4 | 95.9% | 1:4 | 0.9% | 0.1% |
| 0:1 | 24.1% | 0:1 | 0.0% | 0:1 | 24.1% | 0.0% |
FIGURE 14D
FIGURE 14C FIGURE 15A
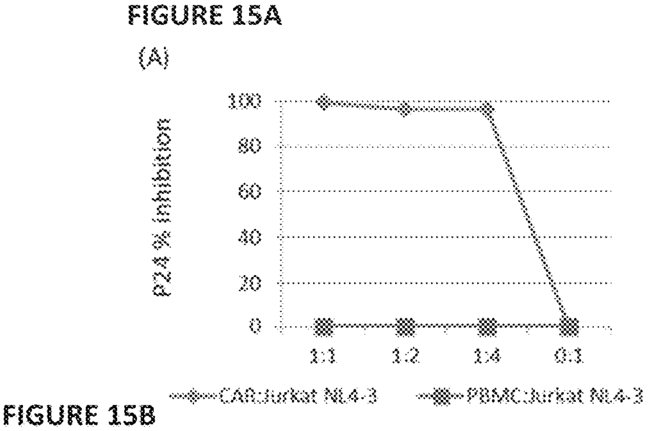
FIGURE 15B
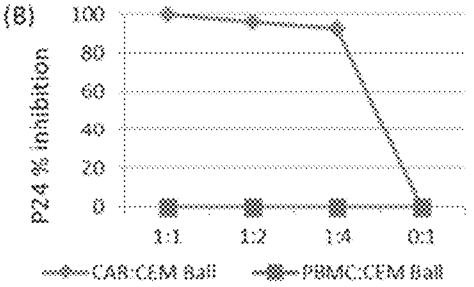
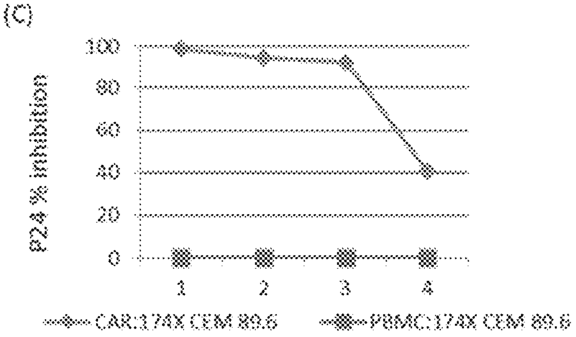
FIGURE 15C
FIGURE 15D
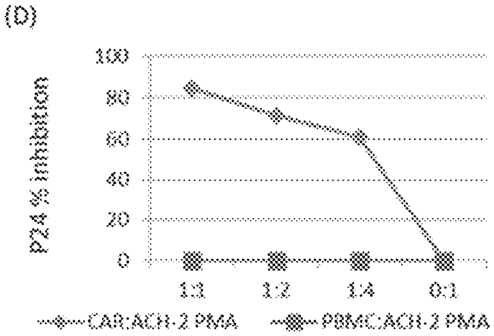
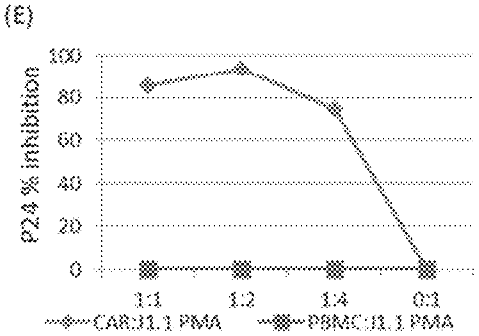
FIGURE 15E YU2-N332S (resistant to PGT128)
Day 5 (3:1 E:T)

HIV p24 expression

Single CAR:
- HBV S5
- 3BC176
- PGT128
- 45-46
- N6

Combinations:
- 3BC176 + PGT128
- 3BC176 + 45-46
- PGT128 + 45-46
- 3BC176 + PGT128 + 45-46
- 3BC176 + N6
- PGT128 + N6
- 3BC176 + PGT128 + N6

HIVsccc(4c-46, Gc4W)-IgG4(HL-CH3)-CD4tm-41BB-Zeta-TcA-EGcRt

MLLLVTSLLLCELPHPAcLLIPQVRLSQSGGQMKKPGESMRLSCRASGYEcLNCPINWIRLAPGRRPEWMGWLKPRWGAVNYAR
KcQGRVTMTRDVYSDTAcLELRSLTSDDTAVYcCTRGKYCTARDYYNWDcEHWGRGAPVTVSSGGGSGGGSGGGSGGGSEIVLT
QSPATLSLSPGETAIISCRTSQSGSLAWYQQRPGQAPRLVIYSGSTRAAGIPDRcSGSRWGADYNLSISNLESGDcGVYYCQQYEcc
GQGTKVQVDIKESKYGPPCPPCPGGGSSGGGSGGQPREPQVYTLPPSQEEMTKNQVSLTCLVKGcYPSDIAVEWESNGQPENNY
KTTPPVLDSDGSccLYSRLTVDKSRWQEGNVcSCSVMHEALHNHYTQKSLSLSLGKMALIVLGGVAGLLLcIGLGIccKRGRKKLLYIc
KQPcMRPVQTTQEEDGCSCRcPEEEEGGCELGGGRVKcSRSADAPAYQQGQNQLYNELNLGRREEYDVLDKRRGRDPEMGGKP
RRKNPQEGLYNELQKDKMAEAYSEIGMKGERRRGKGHDGLYQGLSTATKDTYDALHMQALPPRLEGGGEGRGSLLTCGDVEEN
PGPRMLLLVTSLLLCELPHPAcLLIPRKVCNGIGIGEcKDSLSINATNIKHcKNCTSISGDLHILPVAcRGDScTHTPPLDPQELDILKTVK
EITGcLLIQAWPENRTDLHAcENLEIIRGRTKQHGQcSLAVVSLNITSLGLRSLKEISDGDVIISGNKNLCYANTINWKKLcGTSGQKT
KIISNRGENSCKATGQVCHALCSPEGCWGPEPRDCVSCRNVSRGRECVDKCNLLEGEPREcVENSECIQCHPECLPQAMNITCTGR
GPDNCIQCAHYIDGPHCVKTCPAGVMGENNTLVWKYADAGHVCHLCHPNCTYGCTGPGLEGCPTNGPKIPSIATGMVGALLLLL
VVALGIGLcM (SEQ ID NO: 41)

FIGURE 32B

| | | |
|---|---|---|
| GMCSFRa signal peptide | MLLLVTSLLLCELPHPAFLLIP | (SEQ ID NO: 26) |
| HIVscFv (45-46, G54W) | QVRLSQSGGQMKKPGESMRLSCRASGYEFLNCPINWIRLAPGRRPEWMGWLKPR***W***GAVNYARKFQGRVTMTRDVYSDTAFLELRSLTSDDTAVYFCTRGKYCTARDYYNWDFEHWGRGAPVTVSSGGGSGGGSGGGSGGGSEIVLTQSPATLSLSPGETAIISCRTSQSGSLAWYQQRPGQAPRLVIYSGSTRAAGIPDRFSGSRWGADYNLSISNLESGDFGVYYCQQYEFFGQGTKVQVDIK | (SEQ ID NO: 72) |
| IgG4Hinge(smP) | ESKYGPPCP***P***CP | (SEQ ID NO: 3) |
| Linker | GGGSSGGGSG | (SEQ ID NO: 2) |
| IgG4 CH3 | GQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK | (SEQ ID NO: 12) |
| CD4 transmembrane | MALIVLGGVAGLLLFIGLGIFF | (SEQ ID NO: 73) |
| 4-1BB cyto | KRGRKKLLYIFKQPFMRPVQTTQEEDGCSCRFPEEEEGGCEL | (SEQ ID NO: 24) |
| (Gly)3 | GGG | |
| Zeta | RVKFSRSADAPAYQQGQNQLYNELNLGRREEYDVLDKRRGRDPEMGGKPRRKNPQEGLYNELQKDKMAEAYSEIGMKGERRRGKGHDGLYQGLSTATKDTYDALHMQALPPR | (SEQ ID NO: 21) |
| T2A | LEGGGEGRGSLLTCGDVEENPGPR | (SEQ ID NO: 74) |
| GMCSFRa signal peptide | MLLLVTSLLLCELPHPAFLLIP | (SEQ ID NO: 26) |
| EGFRt | RKVCNGIGIGEFKDSLSINATNIKHFKNCTSISGDLHILPVAFRGDSFTHTPPLDPQELDILKTVKEITGFLLIQAWPENRTDLHAFENLEIIRGRTKQHGQFSLAVVSLNITSLGLRSLKEISDGDVIISGNKNLCYANTINWKKLFGTSGQKTKIISNRGENSCKATGQVCHALCSPEGCWGPEPRDCVSCRNVSRGRECVDKCNLLEGEPREFVENSECIQCHPECLPQAMNITCTGRGPDNCIQCAHYIDGPHCVKTCPAGVMGENNTLVWKYADAGHVCHLCHPNCTYGCTGPGLEGCPTNGPKIPSIATGMVGALLLLLVVALGIGLFM | (SEQ ID NO: 75) |

FIGURE 33A

HIVscFv(45-46, G54W)-IgG4(L235E,N297Q)-CD4tm-41BB-Zeta-T2A-EGFRt

MLLLVTSLLLCELPHPAFLLIPQVRLSQSGGQMKKPGESMRLSCRASGYEFLNCPINWIRLAPGRRPEWMGWLKPRWGAVN
YARKFQGRVTMTRDVYSDTAFLELRSLTSDDTAVYFCTRGKYCTARDYYNWDFEHWGRGAPVTVSSGGGSGGGSGGGSG
GGSEIVLTQSPATLSLSPGETAIISCRTSQSGSLAWYQQRPGQAPRLVIYSGSTRAAGIPDRFSGSRWGADYNLSISNLESGDFG
VYYCQQYEFFGQGTKVQVDIKESKYGPPCPPCPAPEFEGGPSVFLFPPKPKDTLMISRTPEVTCVVVDVSQEDPEVQFNWYV
DGVEVHNAKTKPREEQFQSTYRVVSVLTVLHQDWLNGKEYKCKVSNKGLPSSIEKTISKAKGQPREPQVYTLPPSQEEMTK
NQVSLTCLVKGFYPSDIAVEWESNGQPENNYKTTPPVLDSDGSFFLYSRLTVDKSRWQEGNVFSCSVMHEALHNHYTQKSL
SLSLGKMALIVLGGVAGLLLFIGLGIFFKRGRKKLLYIFKQPFMRPVQTTQEEDGCSCRFPEEEEGGCELGGGRVKFSRSADA
PAYQQGQNQLYNELNLGRREEYDVLDKRRGRDPEMGGKPRRKNPQEGLYNELQKDKMAEAYSEIGMKGERRRGKGHDGL
YQGLSTATKDTYDALHMQALPPRLEGGGEGRGSLLTCGDVEENPGPRMLLLVTSLLLCELPHPAFLLIPRKVCNGIGIGEFKD
SLSINATNIKHFKNCTSISGDLHILPVAFRGDSFTHTPPLDPQELDILKTVKEITGFLLIQAWPENRTDLHAFENLEIIRGRTKQH
GQFSLAVVSLNITSLGLRSLKEISDGDVIISGNKNLCYANTINWKKLFGTSGQKTKIISNRGENSCKATGQVCHALCSPEGCW
GPEPRDCVSCRNVSRGRECVDKCNLLEGEPREFVENSECIQCHPECLPQAMNITCTGRGPDNCIQCAHYIDGPHCVKTCPAG
VMGENNTLVWKYADAGHVCHLCHPNCTYGCTGPGLEGCPTNGPKIPSIATGMVGALLLLLVVALGIGLFM (SEQ ID NO: 42)

FIGURE 33B

| | | |
|---|---|---|
| GMCSFRa signal peptide | MLLLVTSLLLCELPHPAFLLIP | (SEQ ID NO: 26) |
| HIVscFv(45-46, G54W) | QVRLSQSGGQMKKPGESMRLSCRASGYEFLNCPINWIRLAPGRRPEWMGWLKPRWGAVNYARKFQGRVTMTRDVYSDTAFLELRSLTSDDTAVYFCTRGKYCTARDYYNWDFEHWGRGAPVTVSSGGGSGGGSGGGSGGGSEIVLTQSPATLSLSPGETAIISCRTSQSGSLAWYQQRPGQAPRLVIYSGSTRAAGIPDRFSGSRWGADYNLSISNLESGDFGVYYCQQYEFFGQGTKVQVDIK | (SEQ ID NO: 72) |
| IgG4(SmP)(L235E, N297Q) | ESKYGPPCPPCPAPEFEGGPSVFLFPPKPKDTLMISRTPEVTCVVVDVSQEDPEVQFNWYVDGVEVHNAKTKPREEQFQSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK | (SEQ ID NO: 77) |
| CD4 transmembrane | MALIVLGGVAGLLLFIGLGIFF | (SEQ ID NO: 73) |
| 4-1BB cyto | KRGRKKLLYIFKQPFMRPVQTTQEEDGCSCRFPEEEEGGCEL | (SEQ ID NO: 24) |
| (Gly)3 | GGG | |
| Zeta | RVKFSRSADAPAYQQGQNQLYNELNLGRREEYDVLDKRRGRDPEMGGKPRRKNPQEGLYNELQKDKMAEAYSEIGMKGERRRGKGHDGLYQGLSTATKDTYDALHMQALPPR | (SEQ ID NO: 21) |
| T2A | LEGGGEGRGSLLTCGDVEENPGPR | (SEQ ID NO: 74) |
| GMCSFRa signal peptide | MLLLVTSLLLCELPHPAFLLIP | (SEQ ID NO: 26) |
| EGFRt | RKVCNGIGIGEFKDSLSINATNIKHFKNCTSISGDLHILPVAFRGDSFTHTPPLDPQELDILKTVKEITGFLLIQAWPENRTDLHAFENLEIIRGRTKQHGQFSLAVVSLNITSLGLRSLKEISDGDVIISGNKNLCYANTINWKKLFGTSGQKTKIISNRGENSCKATGQVCHALCSPEGCWGPEPRDCVSCRNVSRGRECVDKCNLLEGEPREFVENSECIQCHPECLPQAMNITCTGRGPDNCIQCAHYIDGPHCVKTCPAGVMGENNTLVWKYADAGHVCHLCHPNCTYGCTGPGLEGCPTNGPKIPSIATGMVGALLLLLVVALGIGLFM | (SEQ ID NO: 75) |

FIGURE 34A

HIVscFv(45-46, G54W)-IgG4H-CD28tm-41BB-Zeta-T2A-EGFRt

MLLLVTSLLLCELPHPAFLLIPQVRLSQSGGQMKKPGESMRLSCRASGYEFLNCPINWIRLAPGRRPEWMGWLKPRWGAVNYAR
KFQGRVTMTRDVYSDTAFLELRSLTSDDTAVYFCTRGKYCTARDYYNWDFEHWGRGAPVTVSSGGGSGGGSGGGSGGGSEIVLT
QSPATLSLSPGETAIISCRTSQSGSLAWYQQRPGQAPRLVIYSGSTRAAGIPDRFSGSRWGADYNLSISNLESGDFGVYYCQQYEFF
GQGTKVQVDIKESKYGPPCPPCPMFWVLVVVGGVLACYSLLVTVAFIIFWVKRGRKKLLYIFKQPFMRPVQTTQEEDGCSCRFPEE
EEGGCELGGGRVKFSRSADAPAYQQGQNQLYNELNLGRREEYDVLDKRRGRDPEMGGKPRRKNPQEGLYNELQKDKMAEAYSE
IGMKGERRRGKGHDGLYQGLSTATKDTYDALHMQALPPRLEGGGEGRGSLLTCGDVEENPGPRMLLLVTSLLLCELPHPAFLLIPR
KVCNGIGIGEFKDSLSINATNIKHFKNCTSISGDLHILPVAFRGDSFTHTPPLDPQELDILKTVKEITGFLLIQAWPENRTDLHAFENLEI
IRGRTKQHGQFSLAVVSLNITSLGLRSLKEISDGDVIISGNKNLCYANTINWKKLFGTSGQKTKIISNRGENSCKATGQVCHALCSPEG
CWGPEPRDCVSCRNVSRGRECVDKCNLLEGEPREFVENSECIQCHPECLPQAMNITCTGRGPDNCIQCAHYIDGPHCVKTCPAGV
MGENNTLVWKYADAGHVCHLCHPNCTYGCTGPGLEGCPTNGPKIPSIATGMVGALLLLLVVALGIGLFM (SEQ ID NO: 43)

FIGURE 34B

| | | |
|---|---|---|
| GMCSFRa signal peptide | MLLLVTSLLLCELPHPAFLLIP | (SEQ ID NO: 26) |
| HIVscFv (45-46, G54W) | QVRLSQSGGQMKKPGESMRLSCRASGYEFLNCPINWIRLAPGRRPEWMGWLKPRWGAVNYAR<br>KFQGRVTMTRDVYSDTAFLELRSLTSDDTAVYFCTRGKYCTARDYYNWDFEHWGRGAPVTVSSG<br>GGSGGGSGGGSGGGSEIVLTQSPATLSLSPGETAIISCRTSQSGSLAWYQQRPGQAPRLVIYSGSTR<br>AAGIPDRFSGSRWGADYNLSISNLESGDFGVYYCQQYEFFGQGTKVQVDIK | (SEQ ID NO: 72) |
| IgG4Hinge(smP) | ESKYGPPCPPCP | (SEQ ID NO: 3) |
| CD28 transmembrane | MFWVLVVVGGVLACYSLLVTVAFIIFWV | (SEQ ID NO: 15) |
| 4-1BB cyto | KRGRKKLLYIFKQPFMRPVQTTQEEDGCSCRFPEEEEGGCEL | (SEQ ID NO: 24) |
| (Gly)3 | GGG | |
| Zeta | RVKFSRSADAPAYQQGQNQLYNELNLGRREEYDVLDKRRGRDPEMGGKPRRKNPQEGLYNELQ<br>KDKMAEAYSEIGMKGERRRGKGHDGLYQGLSTATKDTYDALHMQALPPR | (SEQ ID NO: 21) |
| T2A | LEGGGEGRGSLLTCGDVEENPGPR | (SEQ ID NO: 74) |
| GMCSFRa signal peptide | MLLLVTSLLLCELPHPAFLLIP | (SEQ ID NO: 26) |
| EGFRt | RKVCNGIGIGEFKDSLSINATNIKHFKNCTSISGDLHILPVAFRGDSFTHTPPLDPQELDILKTVKEITG<br>FLLIQAWPENRTDLHAFENLEIIRGRTKQHGQFSLAVVSLNITSLGLRSLKEISDGDVIISGNKNLCYA<br>NTINWKKLFGTSGQKTKIISNRGENSCKATGQVCHALCSPEGCWGPEPRDCVSCRNVSRGRECVD<br>KCNLLEGEPREFVENSECIQCHPECLPQAMNITCTGRGPDNCIQCAHYIDGPHCVKTCPAGVMGE<br>NNTLVWKYADAGHVCHLCHPNCTYGCTGPGLEGCPTNGPKIPSIATGMVGALLLLLVVALGIGLF<br>M | (SEQ ID NO: 75) |

FIGURE 35A

HIVscFv(45-46, G54W,S28Y)-IgG4(HL-CH3)-CD4tm-41BB-Zeta-T2A-EGFRt

MLLLVTSLLLCELPHPAFLLIPQVRLSQSGGQMKKPGESMRLSCRASGYEFLNCPINWIRLAPGRRPEWMGWLKPRWGAVNYAR
KFQGRVTMTRDVYSDTAFLELRSLTSDDTAVYFCTRGKYCTARDYYNWDFEHWGRGAPVTVSSGGGSGGGSGGGSGGGSEIVLT
QSPATLSLSPGETAIISCRTSQYGSLAWYQQRPGQAPRLVIYSGSTRAAGIPDRFSGSRWGADYNLSISNLESGDFGVYYCQQYEFF
GQGTKVQVDIKESKYGPPCPPCPGGGSSGGGSGGQPREPQVYTLPPSQEEMTKNQVSLTCLVKGFYPSDIAVEWESNGQPENNY
KTTPPVLDSDGSFFLYSRLTVDKSRWQEGNVFSCSVMHEALHNHYTQKSLSLSLGKMALIVLGGVAGLLLFIGLGIFFKRGRKKLLYIF
KQPFMRPVQTTQEEDGCSCRFPEEEEGGCELGGGRVKFSRSADAPAYQQGQNQLYNELNLGRREEYDVLDKRRGRDPEMGGKP
RRKNPQEGLYNELQKDKMAEAYSEIGMKGERRRGKGHDGLYQGLSTATKDTYDALHMQALPPRLEGGGEGRGSLLTCGDVEEN
PGPRMLLLVTSLLLCELPHPAFLLIPRKVCNGIGIGEFKDSLSINATNIKHFKNCTSISGDLHILPVAFRGDSFTHTPPLDPQELDILKTVK
EITGFLLIQAWPENRTDLHAFENLEIIRGRTKQHGQFSLAVVSLNITSLGLRSLKEISDGDVIISGNKNLCYANTINWKKLFGTSGQKT
KIISNRGENSCKATGQVCHALCSPEGCWGPEPRDCVSCRNVSRGRECVDKCNLLEGEPREFVENSECIQCHPECLPQAMNITCTGR
GPDNCIQCAHYIDGPHCVKTCPAGVMGENNTLVWKYADAGHVCHLCHPNCTYGCTGPGLEGCPTNGPKIPSIATGMVGALLLLL
VVALGIGLFM (SEQ ID NO: 44)

FIGURE 35B

| | | |
|---|---|---|
| GMCSFRa signal peptide | MLLLVTSLLLCELPHPAFLLIP | (SEQ ID NO: 26) |
| HIVscFv(45-46, G54W, S28Y) | QVRLSQSGGQMKKPGESMRLSCRASGYEFLNCPINWIRLAPGRRPEWMGWLKPRWGAVNYARKFQGRVTMTRDVYSDTAFLELRSLTSDDTAVYFCTRGKYCTARDYYNWDFEHWGRGAPVTVSSGGGSGGGSGGGSGGGSEIVLTQSPATLSLSPGETAIISCRTSQYGSLAWYQQRPGQAPRLVIYSGSTRAAGIPDRFSGSRWGADYNLSISNLESGDFGVYYCQQYEFFGQGTKVQVDIK | (SEQ ID NO: 80) |
| IgG4Hinge(SmP) | ESKYGPPCPPCP | (SEQ ID NO: 3) |
| Linker | GGGSSGGGSG | (SEQ ID NO: 2) |
| IgG4 CH3 | GQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK | (SEQ ID NO: 12) |
| CD4 transmembrane | MALIVLGGVAGLLLFIGLGIFF | (SEQ ID NO: 73) |
| 4-1BB cyto | KRGRKKLLYIFKQPFMRPVQTTQEEDGCSCRFPEEEEGGCEL | (SEQ ID NO: 24) |
| (Gly)3 | GGG | |
| Zeta | RVKFSRSADAPAYQQGQNQLYNELNLGRREEYDVLDKRRGRDPEMGGKPRRKNPQEGLYNELQKDKMAEAYSEIGMKGERRRGKGHDGLYQGLSTATKDTYDALHMQALPPR | (SEQ ID NO: 21) |
| T2A | LEGGGEGRGSLLTCGDVEENPGPR | (SEQ ID NO: 74) |
| GMCSFRa signal peptide | MLLLVTSLLLCELPHPAFLLIP | (SEQ ID NO: 26) |
| EGFRt | RKVCNGIGIGEFKDSLSINATNIKHFKNCTSISGDLHILPVAFRGDSFTHTPPLDPQELDILKTVKEITGFLLIQAWPENRTDLHAFENLEIIRGRTKQHGQFSLAVVSLNITSLGLRSLKEISDGDVIISGNKNLCYANTINWKKLFGTSGQKTKIISNRGENSCKATGQVCHALCSPEGCWGPEPRDCVSCRNVSRGRECVDKCNLLEGEPREFVENSECIQCHPECLPQAMNITCTGRGPDNCIQCAHYIDGPHCVKTCPAGVMGENNTLVWKYADAGHVCHLCHPNCTYGCTGPGLEGCPTNGPKIPSIATGMVGALLLLLVVALGIGLFM | (SEQ ID NO: 75) |

FIGURE 36A

HIVscFv(45-46, G54W,S28Y)-IgG4H-CD28tm-41BB-Zeta-T2A-EGFRt

MLLLVTSLLLCELPHPAFLLIPQVRLSQSGGQMKKPGESMRLSCRASGYEFLNCPINWIRLAPGRRPEWMGWLKPRWGAVNYAR
KFQGRVTMTRDVYSDTAFLELRSLTSDDTAVYFCTRGKYCTARDYYNWDFEHWGRGAPVTVSSGGGSGGGSGGGSGGGSEIVLT
QSPATLSLSPGETAIISCRTSQYGSLAWYQQRPGQAPRLVIYSGSTRAAGIPDRFSGSRWGADYNLSISNLESGDFGVYYCQQYEFF
GQGTKVQVDIKESKYGPPCPPCPMFWVLVVVGGVLACYSLLVTVAFIIFWVKRGRKKLLYIFKQPFMRPVQTTQEEDGCSCRFPEE
EEGGCELGGGRVKFSRSADAPAYQQGQNQLYNELNLGRREEYDVLDKRRGRDPEMGGKPRRKNPQEGLYNELQKDKMAEAYSE
IGMKGERRRGKGHDGLYQGLSTATKDTYDALHMQALPPRLEGGGEGRGSLLTCGDVEENPGPRMLLLVTSLLLCELPHPAFLLIPR
KVCNGIGIGEFKDSLSINATNIKHFKNCTSISGDLHILPVAFRGDSFTHTPPLDPQELDILKTVKEITGFLLIQAWPENRTDLHAFENLEI
IRGRTKQHGQFSLAVVSLNITSLGLRSLKEISDGDVIISGNKNLCYANTINWKKLFGTSGQKTKIISNRGENSCKATGQVCHALCSPEG
CWGPEPRDCVSCRNVSRGRECVDKCNLLEGEPREFVENSECIQCHPECLPQAMNITCTGRGPDNCIQCAHYIDGPHCVKTCPAGV
MGENNTLVWKYADAGHVCHLCHPNCTYGCTGPGLEGCPTNGPKIPSIATGMVGALLLLLVVALGIGLFM (SEQ ID NO: 45)

FIGURE 36B

| | | |
|---|---|---|
| GMCSFRa signal peptide | MLLLVTSLLLCELPHPAFLLIP | (SEQ ID NO: 26) |
| HIVscFv(45-46, G54W, S28Y) | QVRLSQSGGQMKKPGESMRLSCRASGYEFLNCPINWIRLAPGRRPEWMGWLKPRWGAV NYARKFQGRVTMTRDVYSDTAFLELRSLTSDDTAVYFCTRGKYCTARDYYNWDFEHWGRG APVTVSSGGGSGGGSGGGSGGGSEIVLTQSPATLSLSPGETAIISCRTSQYGSLAWYQQRPG QAPRLVIYSGSTRAAGIPDRFSGSRWGADYNLSISNLESGDFGVYYCQQYEFFGQGTKVQV DIK | (SEQ ID NO: 80) |
| IgG4Hinge(SmP) | ESKYGPPCPPCP | (SEQ ID NO: 3) |
| CD28 transmembrane | MFWVLVVVGGVLACYSLLVTVAFIIFWV | (SEQ ID NO: 15) |
| 4-1BB cyto | KRGRKKLLYIFKQPFMRPVQTTQEEDGCSCRFPEEEEGGCEL | (SEQ ID NO: 24) |
| (Gly)3 | GGG | |
| Zeta | RVKFSRSADAPAYQQGQNQLYNELNLGRREEYDVLDKRRGRDPEMGGKPRRKNPQEGLY NELQKDKMAEAYSEIGMKGERRRGKGHDGLYQGLSTATKDTYDALHMQALPPR | (SEQ ID NO: 21) |
| T2A | LEGGGEGRGSLLTCGDVEENPGPR | (SEQ ID NO: 74) |
| GMCSFRa signal peptide | MLLLVTSLLLCELPHPAFLLIP | (SEQ ID NO: 26) |
| EGFRt | RKVCNGIGIGEFKDSLSINATNIKHFKNCTSISGDLHILPVAFRGDSFTHTPPLDPQELDILKTV KEITGFLLIQAWPENRTDLHAFENLEIIRGRTKQHGQFSLAVVSLNITSLGLRSLKEISDGDVIIS GNKNLCYANTINWKKLFGTSGQKTKIISNRGENSCKATGQVCHALCSPEGCWGPEPRDCVS CRNVSRGRECVDKCNLLEGEPREFVENSECIQCHPECLPQAMNITCTGRGPDNCIQCAHYID GPHCVKTCPAGVMGENNTLVWKYADAGHVCHLCHPNCTYGCTGPGLEGCPTNGPKIPSIA TGMVGALLLLLVVALGIGLFM | (SEQ ID NO: 75) |

FIGURE 37A

HIVscFv(45-46, G54W,S28Y)-IgG4(L235E,N297Q)-CD4tm-41BB-Zeta-T2A-EGFRt

MLLLVTSLLLCELPHPAFLLIPQVRLSQSGGQMKKPGESMRLSCRASGYEFLNCPINWIRLAPGRRPEWMGWLKPRWGAVNYAR
KFQGRVTMTRDVYSDTAFLELRSLTSDDTAVYFCTRGKYCTARDYYNWDFEHWGRGAPVTVSSGGGSGGGSGGGSGGGSEIVLT
QSPATLSLSPGETAIISCRTSQYGSLAWYQQRPGQAPRLVIYSGSTRAAGIPDRFSGSRWGADYNLSISNLESGDFGVYYCQQYEFF
GQGTKVQVDIKESKYGPPCPPCPAPEFEGGPSVFLFPPKPKDTLMISRTPEVTCVVVDVSQEDPEVQFNWYVDGVEVHNAKTKPR
EEQFQSTYRVVSVLTVLHQDWLNGKEYKCKVSNKGLPSSIEKTISKAKGQPREPQVYTLPPSQEEMTKNQVSLTCLVKGFYPSDIAV
EWESNGQPENNYKTTPPVLDSDGSFFLYSRLTVDKSRWQEGNVFSCSVMHEALHNHYTQKSLSLSLGKMALIVLGGVAGLLLFIGL
GIFFKRGRKKLLYIFKQPFMRPVQTTQEEDGCSCRFPEEEEGGCELGGGRVKFSRSADAPAYQQGQNQLYNELNLGRREEYDVLDK
RRGRDPEMGGKPRRKNPQEGLYNELQKDKMAEAYSEIGMKGERRRGKGHDGLYQGLSTATKDTYDALHMQALPPRLEGGGEG
RGSLLTCGDVEENPGPRMLLLVTSLLLCELPHPAFLLIPRKVCNGIGIGEFKDSLSINATNIKHFKNCTSISGDLHILPVAFRGDSFTHTP
PLDPQELDILKTVKEITGFLLIQAWPENRTDLHAFENLEIIRGRTKQHGQFSLAVVSLNITSLGLRSLKEISDGDVIISGNKNLCYANTIN
WKKLFGTSGQKTKIISNRGENSCKATGQVCHALCSPEGCWGPEPRDCVSCRNVSRGRECVDKCNLLEGEPREFVENSECIQCHPEC
LPQAMNITCTGRGPDNCIQCAHYIDGPHCVKTCPAGVMGENNTLVWKYADAGHVCHLCHPNCTYGCTGPGLEGCPTNGPKIPSI
ATGMVGALLLLLVVALGIGLFM (SEQ ID NO: 46)

FIGURE 37B

| | | |
|---|---|---|
| GMCSFRa signal peptide | MLLLVTSLLLCELPHPAFLLIP | (SEQ ID NO: 26) |
| HIVscFv(45-46, G54W,S28Y) | QVRLSQSGGQMKKPGESMRLSCRASGYEFLNCPINWIRLAPGRRPEWMGWLKPRWGAVNYARKFQGRVTMTRDVYSDTAFLELRSLTSDDTAVYFCTRGKYCTARDYYNWDFEHWGRGAPVTVSSGGGSGGGSGGGSGGGSEIVLTQSPATLSLSPGETAIISCRTSQYGSLAWYQQRPGQAPRLVIYSGSTRAAGIPDRFSGSRWGADYNLSISNLESGDFGVYYCQQYEFFGQGTKVQVDIK | (SEQ ID NO: 80) |
| IgG4(SmP)(L235E, N297Q) | ESKYGPPCPPCPAPEFEGGPSVFLFPPKPKDTLMISRTPEVTCVVVDVSQEDPEVQFNWYVDGVEVHNAKTKPREEQFQSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK | (SEQ ID NO: 77) |
| CD4 transmembrane | MALIVLGGVAGLLLFIGLGIFF | (SEQ ID NO: 73) |
| 4-1BB cyto | KRGRKKLLYIFKQPFMRPVQTTQEEDGCSCRFPEEEEGGCEL | (SEQ ID NO: 24) |
| (Gly)3 | GGG | |
| Zeta | RVKFSRSADAPAYQQGQNQLYNELNLGRREEYDVLDKRRGRDPEMGGKPRRKNPQEGLYNELQKDKMAEAYSEIGMKGERRRGKGHDGLYQGLSTATKDTYDALHMQALPPR | (SEQ ID NO: 21) |
| T2A | LEGGGEGRGSLLTCGDVEENPGPR | (SEQ ID NO: 74) |
| GMCSFRa signal peptide | MLLLVTSLLLCELPHPAFLLIP | (SEQ ID NO: 26) |
| EGFRt | RKVCNGIGIGEFKDSLSINATNIKHFKNCTSISGDLHILPVAFRGDSFTHTPPLDPQELDILKTVKEITGFLLIQAWPENRTDLHAFENLEIIRGRTKQHGQFSLAVVSLNITSLGLRSLKEISDGDVIISGNKNLCYANTINWKKLFGTSGQKTKIISNRGENSCKATGQVCHALCSPEGCWGPEPRDCVSCRNVSRGRECVDKCNLLEGEPREFVENSECIQCHPECLPQAMNITCTGRGPDNCIQCAHYIDGPHCVKTCPAGVMGENNTLVWKYADAGHVCHLCHPNCTYGCTGPGLEGCPTNGPKIPSIATGMVGALLLLLVVALGIGLFM | (SEQ ID NO: 75) |

FIGURE 38A

HIVscFv(45-46, WT)-IgG4(HL-CH3)-CD4tm-41BB-Zeta-T2A-EGFRt

MLLLVTSLLLCELPHPAFLLIPQVRLSQSGGQMKKPGESMRLSCRASGYEFLNCPINWIRLAPGRRPEWMGWLKPRGGAVNYARK
FQGRVTMTRDVYSDTAFLELRSLTSDDTAVYFCTRGKYCTARDYYNWDFEHWGRGAPVTVSSGGGSGGGSGGGSGGGSEIVLT
QSPATLSLSPGETAIISCRTSQSGSLAWYQQRPGQAPRLVIYSGSTRAAGIPDRFSGSRWGADYNLSISNLESGDFGVYYCQQYEFF
GQGTKVQVDIKESKYGPPCPPCPGGGSSGGGSGGQPREPQVYTLPPSQEEMTKNQVSLTCLVKGFYPSDIAVEWESNGQPENNY
KTTPPVLDSDGSFFLYSRLTVDKSRWQEGNVFSCSVMHEALHNHYTQKSLSLSLGKMALIVLGGVAGLLLFIGLGIFFKRGRKKLLYIF
KQPFMRPVQTTQEEDGCSCRFPEEEEGGCELGGGRVKFSRSADAPAYQQGQNQLYNELNLGRREEYDVLDKRRGRDPEMGGKP
RRKNPQEGLYNELQKDKMAEAYSEIGMKGERRRGKGHDGLYQGLSTATKDTYDALHMQALPPRLEGGGEGRGSLLTCGDVEEN
PGPRMLLLVTSLLLCELPHPAFLLIPRKVCNGIGIGEFKDSLSINATNIKHFKNCTSISGDLHILPVAFRGDSFTHTPPLDPQELDILKTVK
EITGFLLIQAWPENRTDLHAFENLEIIRGRTKQHGQFSLAVVSLNITSLGLRSLKEISDGDVIISGNKNLCYANTINWKKLFGTSGQKT
KIISNRGENSCKATGQVCHALCSPEGCWGPEPRDCVSCRNVSRGRECVDKCNLLEGEPREFVENSECIQCHPECLPQAMNITCTGR
GPDNCIQCAHYIDGPHCVKTCPAGVMGENNTLVWKYADAGHVCHLCHPNCTYGCTGPGLEGCPTNGPKIPSIATGMVGALLLLL
VVALGIGLFM (SEQ ID NO: 47)

FIGURE 38B

| | | |
|---|---|---|
| GMCSFRa signal peptide | MLLLVTSLLLCELPHPAFLLIP | (SEQ ID NO: 26) |
| HIVscFv | QVRLSQSGGQMKKPGESMRLSCRASGYEFLNCPINWIRLAPGRRPEWMGWLKPRGGAVNYARKF QGRVTMTRDVYSDTAFLELRSLTSDDTAVYFCTRGKYCTARDYYNWDFEHWGRGAPVTVSSGGGSG GGSGGGSGGGSEIVLTQSPATLSLSPGETAIISCRTSQSGSLAWYQQRPGQAPRLVIYSGSTRAAGIPD RFSGSRWGADYNLSISNLESGDFGVYYCQQYEFFGQGTKVQVDIKE | (SEQ ID NO: 84) |
| IgG4Hinge(SmP) | SKYGPPCPPCP | (SEQ ID NO: 85) |
| Linker | GGGSSGGGSG | (SEQ ID NO: 2) |
| IgG4 CH3 | GQPREPQVYTLPPSQEEMTKNQVSLTCLVKGFYPSDIAVEWESNGQPENNYKTTPPVLDSDGSFFLYS RLTVDKSRWQEGNVFSCSVMHEALHNHYTQKSLSLSLGK | (SEQ ID NO: 12) |
| CD4 transmembrane | MALIVLGGVAGLLLFIGLGIFF | (SEQ ID NO: 73) |
| 4-1BB cyto | KRGRKKLLYIFKQPFMRPVQTTQEEDGCSCRFPEEEEGGCEL | (SEQ ID NO: 24) |
| (Gly)3 | GGG | |
| Zeta | RVKFSRSADAPAYQQGQNQLYNELNLGRREEYDVLDKRRGRDPEMGGKPRRKNPQEGLYNELQKD KMAEAYSEIGMKGERRRGKGHDGLYQGLSTATKDTYDALHMQALPPR | (SEQ ID NO: 21) |
| T2A | LEGGGEGRGSLLTCGDVEENPGPR | (SEQ ID NO: 74) |
| GMCSFRa signal peptide | MLLLVTSLLLCELPHPAFLLIP | (SEQ ID NO: 26) |
| EGFRt | RKVCNGIGIGEFKDSLSINATNIKHFKNCTSISGDLHILPVAFRGDSFTHTPPLDPQELDILKTVKEITGFLL IQAWPENRTDLHAFENLEIIRGRTKQHGQFSLAVVSLNITSLGLRSLKEISDGDVIISGNKNLCYANTIN WKKLFGTSGQKTKIISNRGENSCKATGQVCHALCSPEGCWGPEPRDCVSCRNVSRGRECVDKCNLLE GEPREFVENSECIQCHPECLPQAMNITCTGRGPDNCIQCAHYIDGPHCVKTCPAGVMGENNTLVWK YADAGHVCHLCHPNCTYGCTGPGLEGCPTNGPKIPSIATGMVGALLLLLVVALGIGLFM | (SEQ ID NO: 75) |

FIGURE 39A

HIVscFv(45-46, WT)-IgG4(L235E,N297Q)-CD4tm-41BB-Zeta-T2A-EGFRt

MLLLVTSLLLCELPHPAFLLIPQVRLSQSGGQMKKPGESMRLSCRASGYEFLNCPINWIRLAPGRRPEWMGWLKPRGGAVNYARK
FQGRVTMTRDVYSDTAFLELRSLTSDDTAVYFCTRGKYCTARDYYNWDFEHWGRGAPVTVSSGGGSGGGSGGGSGGGSEIVLT
QSPATLSLSPGETAIISCRTSQSGSLAWYQQRPGQAPRLVIYSGSTRAAGIPDRFSGSRWGADYNLSISNLESGDFGVYYCQQYEFF
GQGTKVQVDIKESKYGPPCPPCPAPEFEGGPSVFLFPPKPKDTLMISRTPEVTCVVVDVSQEDPEVQFNWYVDGVEVHNAKTKPR
EEQFQSTYRVVSVLTVLHQDWLNGKEYKCKVSNKGLPSSIEKTISKAKGQPREPQVYTLPPSQEEMTKNQVSLTCLVKGFYPSDIAV
EWESNGQPENNYKTTPPVLDSDGSFFLYSRLTVDKSRWQEGNVFSCSVMHEALHNHYTQKSLSLSLGKMALIVLGGVAGLLLFIGL
GIFFKRGRKKLLYIFKQPFMRPVQTTQEEDGCSCRFPEEEEGGCELGGGRVKFSRSADAPAYQQGQNQLYNELNLGRREEYDVLDK
RRGRDPEMGGKPRRKNPQEGLYNELQKDKMAEAYSEIGMKGERRRGKGHDGLYQGLSTATKDTYDALHMQALPPRLEGGGEG
RGSLLTCGDVEENPGPRMLLLVTSLLLCELPHPAFLLIPRKVCNGIGIGEFKDSLSINATNIKHFKNCTSISGDLHILPVAFRGDSFTHTP
PLDPQELDILKTVKEITGFLLIQAWPENRTDLHAFENLEIIRGRTKQHGQFSLAVVSLNITSLGLRSLKEISDGDVIISGNKNLCYANTIN
WKKLFGTSGQKTKIISNRGENSCKATGQVCHALCSPEGCWGPEPRDCVSCRNVSRGRECVDKCNLLEGEPREFVENSECIQCHPEC
LPQAMNITCTGRGPDNCIQCAHYIDGPHCVKTCPAGVMGENNTLVWKYADAGHVCHLCHPNCTYGCTGPGLEGCPTNGPKIPSI
ATGMVGALLLLLVVALGIGLFM (SEQ ID NO: 48)

FIGURE 39B

| | | |
|---|---|---|
| GMCSFRa signal peptide | MLLLVTSLLLCELPHPAFLLIP | (SEQ ID NO: 26) |
| HIVscFv (45-46,WT) | QVRLSQSGGQMKKPGESMRLSCRASGYEFLNCPINWIRLAPGRRPEWMGWLKPRGGAVNYAR<br>KFQGRVTMTRDVYSDTAFLELRSLTSDDTAVYFCTRGKYCTARDYYNWDFEHWGRGAPVTVSSG<br>GGSGGGSGGGSGGGSEIVLTQSPATLSLSPGETAIISCRTSQSGSLAWYQQRPGQAPRLVIYSGSTR<br>AAGIPDRFSGSRWGADYNLSISNLESGDFGVYYCQQYEFFGQGTKVQVDIK | (SEQ ID NO: 87) |
| IgG4(SmP)(L235E, N297Q) | ESKYGPPCPPCPAPEFEGGPSVFLFPPKPKDTLMISRTPEVTCVVVDVSQEDPEVQFNWYVDGVE<br>VHNAKTKPREEQFQSTYRVVSVLTVLHQDWLNGKEYKCKVSNKGLPSSIEKTISKAKGQPREPQVY<br>TLPPSQEEMTKNQVSLTCLVKGFYPSDIAVEWESNGQPENNYKTTPPVLDSDGSFFLYSRLTVDKS<br>RWQEGNVFSCSVMHEALHNHYTQKSLSLSLGK | (SEQ ID NO: 77) |
| CD4 transmembrane | MALIVLGGVAGLLLFIGLGIFF | (SEQ ID NO: 73) |
| 4-1BB cyto | KRGRKKLLYIFKQPFMRPVQTTQEEDGCSCRFPEEEEGGCEL | (SEQ ID NO: 24) |
| (Gly)3 | GGG | |
| Zeta | RVKFSRSADAPAYQQGQNQLYNELNLGRREEYDVLDKRRGRDPEMGGKPRRKNPQEGLYNELQ<br>KDKMAEAYSEIGMKGERRRGKGHDGLYQGLSTATKDTYDALHMQALPPR | (SEQ ID NO: 21) |
| T2A | LEGGGEGRGSLLTCGDVEENPGPR | (SEQ ID NO: 74) |
| GMCSFRa signal peptide | MLLLVTSLLLCELPHPAFLLIP | (SEQ ID NO: 26) |
| EGFRt | RKVCNGIGIGEFKDSLSINATNIKHFKNCTSISGDLHILPVAFRGDSFTHTPPLDPQELDILKTVKEITG<br>FLLIQAWPENRTDLHAFENLEIIRGRTKQHGQFSLAVVSLNITSLGLRSLKEISDGDVIISGNKNLCYA<br>NTINWKKLFGTSGQKTKIISNRGENSCKATGQVCHALCSPEGCWGPEPRDCVSCRNVSRGRECVD<br>KCNLLEGEPREFVENSECIQCHPECLPQAMNITCTGRGPDNCIQCAHYIDGPHCVKTCPAGVMGE<br>NNTLVWKYADAGHVCHLCHPNCTYGCTGPGLEGCPTNGPKIPSIATGMVGALLLLLVVALGIGLF<br>M | (SEQ ID NO: 75) |

FIGURE 40A

HIVscFv(45-46, WT)-IgG4H-CD28tm-41BB-Zeta-T2A-EGFRt

MLLLVTSLLLCELPHPAFLLIPQVRLSQSGGQMKKPGESMRLSCRASGYEFLNCPINWIRLAPGRRPEWMGWLKPRGGAVNYARK
FQGRVTMTRDVYSDTAFLELRSLTSDDTAVYFCTRGKYCTARDYYNWDFEHWGRGAPVTVSSGGGSGGGSGGGSGGGSEIVLT
QSPATLSLSPGETAIISCRTSQSGSLAWYQQRPGQAPRLVIYSGSTRAAGIPDRFSGSRWGADYNLSISNLESGDFGVYYCQQYEFF
GQGTKVQVDIKESKYGPPCPPCPMFWVLVVVGGVLACYSLLVTVAFIIFWVKRGRKKLLYIFKQPFMRPVQTTQEEDGCSCRFPEE
EEGGCELGGGRVKFSRSADAPAYQQGQNQLYNELNLGRREEYDVLDKRRGRDPEMGGKPRRKNPQEGLYNELQKDKMAEAYSE
IGMKGERRRGKGHDGLYQGLSTATKDTYDALHMQALPPRLEGGGEGRGSLLTCGDVEENPGPRMLLLVTSLLLCELPHPAFLLIPR
KVCNGIGIGEFKDSLSINATNIKHFKNCTSISGDLHILPVAFRGDSFTHTPPLDPQELDILKTVKEITGFLLIQAWPENRTDLHAFENLEI
IRGRTKQHGQFSLAVVSLNITSLGLRSLKEISDGDVIISGNKNLCYANTINWKKLFGTSGQKTKIISNRGENSCKATGQVCHALCSPEG
CWGPEPRDCVSCRNVSRGRECVDKCNLLEGEPREFVENSECIQCHPECLPQAMNITCTGRGPDNCIQCAHYIDGPHCVKTCPAGV
MGENNTLVWKYADAGHVCHLCHPNCTYGCTGPGLEGCPTNGPKIPSIATGMVGALLLLLVVALGIGLFM (SEQ ID NO: 49)

FIGURE 40B

| | | |
|---|---|---|
| GMCSFRa signal peptide | MLLLVTSLLLCELPHPAFLLIP | (SEQ ID NO: 26) |
| HIVscFv | QVRLSQSGGQMKKPGESMRLSCRASGYEFLNCPINWIRLAPGRRPEWMGWLKPRGGAVNY ARKFQGRVTMTRDVYSDTAFLELRSLTSDDTAVYFCTRGKYCTARDYYNWDFEHWGRGAPVT VSSGGGSGGGSGGGSGGGSEIVLTQSPATLSLSPGETAIISCRTSQSGSLAWYQQRPGQAPRLV IYSGSTRAAGIPDRFSGSRWGADYNLSISNLESGDFGVYYCQQYEFFGQGTKVQVDIK | (SEQ ID NO: 87) |
| IgG4Hinge(SmP) | ESKYGPPCPPCP | (SEQ ID NO: 3) |
| CD28 transmembrane | MFWVLVVVGGVLACYSLLVTVAFIIFWV | (SEQ ID NO: 15) |
| 4-1BB cyto | KRGRKKLLYIFKQPFMRPVQTTQEEDGCSCRFPEEEEGGCEL | (SEQ ID NO: 24) |
| (Gly)3 | GGG | |
| Zeta | RVKFSRSADAPAYQQGQNQLYNELNLGRREEYDVLDKRRGRDPEMGGKPRRKNPQEGLYNE LQKDKMAEAYSEIGMKGERRRGKGHDGLYQGLSTATKDTYDALHMQALPPR | (SEQ ID NO: 21) |
| T2A | LEGGGEGRGSLLTCGDVEENPGPR | (SEQ ID NO: 74) |
| GMCSFRa signal peptide | MLLLVTSLLLCELPHPAFLLIP | (SEQ ID NO: 26) |
| EGFRt | RKVCNGIGIGEFKDSLSINATNIKHFKNCTSISGDLHILPVAFRGDSFTHTPPLDPQELDILKTVKEI TGFLLIQAWPENRTDLHAFENLEIIRGRTKQHGQFSLAVVSLNITSLGLRSLKEISDGDVIISGNKN LCYANTINWKKLFGTSGQKTKIISNRGENSCKATGQVCHALCSPEGCWGPEPRDCVSCRNVSR GRECVDKCNLLEGEPREFVENSECIQCHPECLPQAMNITCTGRGPDNCIQCAHYIDGPHCVKTC PAGVMGENNTLVWKYADAGHVCHLCHPNCTYGCTGPGLEGCPTNGPKIPSIATGMVGALLLL LVVALGIGLFM | (SEQ ID NO: 75) |

FIGURE 41A

HIVscFv(N6)-IgG4(HL-CH3)-CD4tm-41BB-Zeta-T2A-EGFRt

MLLLVTSLLLCELPHPAFLLIPRAHLVQSGTAMKKPGASVRVSCQTSGYTFTAHILFWFRQAPGRGLEWVGWIKPQYGAVNFGGG
FRDRVTLTRDVYREIAYMDIRGLKPDDTAVYYCARDRSYGDSSWALDAWGQGTTVVVSAGGGSGGGSGGGSGGGSYIHVTQSP
SSLSVSIGDRVTINCQTSQGVGSDLHWYQHKPGRAPKLLIHHTSSVEDGVPSRFSGSGFHTSFNLTISDLQADDIATYYCQVLQFFG
RGSRLHIKESKYGPPCPPCPGGGSSGGGSGGQPREPQVYTLPPSQEEMTKNQVSLTCLVKGFYPSDIAVEWESNGQPENNYKTTP
PVLDSDGSFFLYSRLTVDKSRWQEGNVFSCSVMHEALHNHYTQKSLSLSLGKMALIVLGGVAGLLLFIGLGIFFKRGRKKLLYIFKQP
FMRPVQTTQEEDGCSCRFPEEEEGGCELGGGRVKFSRSADAPAYQQGQNQLYNELNLGRREEYDVLDKRRGRDPEMGGKPRRK
NPQEGLYNELQKDKMAEAYSEIGMKGERRRGKGHDGLYQGLSTATKDTYDALHMQALPPRLEGGGEGRGSLLTCGDVEENPGP
RMLLLVTSLLLCELPHPAFLLIPRKVCNGIGIGEFKDSLSINATNIKHFKNCTSISGDLHILPVAFRGDSFTHTPPLDPQELDILKTVKEIT
GFLLIQAWPENRTDLHAFENLEIIRGRTKQHGQFSLAVVSLNITSLGLRSLKEISDGDVIISGNKNLCYANTINWKKLFGTSGQKTKIIS
NRGENSCKATGQVCHALCSPEGCWGPEPRDCVSCRNVSRGRECVDKCNLLEGEPREFVENSECIQCHPECLPQAMNITCTGRGP
DNCIQCAHYIDGPHCVKTCPAGVMGENNTLVWKYADAGHVCHLCHPNCTYGCTGPGLEGCPTNGPKIPSIATGMVGALLLLLVV
ALGIGLFM (SEQ ID NO: 50)

FIGURE 41B

| | | |
|---|---|---|
| GMCSFRa signal peptide | MLLLVTSLLLCELPHPAFLLIP | (SEQ ID NO: 26) |
| HIVscFv(N6) | RAHLVQSGTAMKKPGASVRVSCQTSGYTFTAHILFWFRQAPGRGLEWVGWIKPQYGAVNFGGGFRDRVTLTRDVYREIAYMDIRGLKPDDTAVYYCARDRSYGDSSWALDAWGQGTTVVVSAGGGSGGGSGGGSGGGSYIHVTQSPSSLSVSIGDRVTINCQTSQGVGSDLHWYQHKPGRAPKLLIHHTSSVEDGVPSRFSGSGFHTSFNLTISDLQADDIATYYCQVLQFFGRGSRLHIK | (SEQ ID NO: 90) |
| IgG4Hinge(SmP) | ESKYGPPCPPCP | (SEQ ID NO: 3) |
| Linker | GGGSSGGGSG | (SEQ ID NO: 2) |
| IgG4 CH3 | GQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK | (SEQ ID NO: 12) |
| CD4 transmembrane | MALIVLGGVAGLLLFIGLGIFF | (SEQ ID NO: 73) |
| 4-1BB cyto | KRGRKKLLYIFKQPFMRPVQTTQEEDGCSCRFPEEEEGGCEL | (SEQ ID NO: 24) |
| (Gly)3 | GGG | |
| Zeta | RVKFSRSADAPAYQQGQNQLYNELNLGRREEYDVLDKRRGRDPEMGGKPRRKNPQEGLYNELQKDKMAEAYSEIGMKGERRRGKGHDGLYQGLSTATKDTYDALHMQALPPR | (SEQ ID NO: 21) |
| T2A | LEGGGEGRGSLLTCGDVEENPGPR | (SEQ ID NO: 74) |
| GMCSFRa signal peptide | MLLLVTSLLLCELPHPAFLLIP | (SEQ ID NO: 26) |
| EGFRt | RKVCNGIGIGEFKDSLSINATNIKHFKNCTSISGDLHILPVAFRGDSFTHTPPLDPQELDILKTVKEITGFLLIQAWPENRTDLHAFENLEIIRGRTKQHGQFSLAVVSLNITSLGLRSLKEISDGDVIISGNKNLCYANTINWKKLFGTSGQKTKIISNRGENSCKATGQVCHALCSPEGCWGPEPRDCVSCRNVSRGRECVDKCNLLEGEPREFVENSECIQCHPECLPQAMNITCTGRGPDNCIQCAHYIDGPHCVKTCPAGVMGENNTLVWKYADAGHVCHLCHPNCTYGCTGPGLEGCPTNGPKIPSIATGMVGALLLLLVVALGIGLFM | (SEQ ID NO: 75) |

FIGURE 42A

HIVscFv(N6)-IgG4(L235E,N297Q)-CD4tm-41BB-Zeta-T2A-EGFRt

MLLLVTSLLLCELPHPAFLLIPRAHLVQSGTAMKKPGASVRVSCQTSGYTFTAHILFWFRQAPGRGLEWVGWIKPQYGAVNFGGG
FRDRVTLTRDVYREIAYMDIRGLKPDDTAVYYCARDRSYGDSSWALDAWGQGTTVVVSAGGGSGGGSGGGSGGGSYIHVTQSP
SSLSVSIGDRVTINCQTSQGVGSDLHWYQHKPGRAPKLLIHHTSSVEDGVPSRFSGSGFHTSFNLTISDLQADDIATYYCQVLQFFG
RGSRLHIKESKYGPPCPPCPAPEFEGGPSVFLFPPKPKDTLMISRTPEVTCVVVDVSQEDPEVQFNWYVDGVEVHNAKTKPREEQF
QSTYRVVSVLTVLHQDWLNGKEYKCKVSNKGLPSSIEKTISKAKGQPREPQVYTLPPSQEEMTKNQVSLTCLVKGFYPSDIAVEWES
NGQPENNYKTTPPVLDSDGSFFLYSRLTVDKSRWQEGNVFSCSVMHEALHNHYTQKSLSLSLGKMALIVLGGVAGLLLFIGLGIFFK
RGRKKLLYIFKQPFMRPVQTTQEEDGCSCRFPEEEEGGCELGGGRVKFSRSADAPAYQQGQNQLYNELNLGRREEYDVLDKRRGR
DPEMGGKPRRKNPQEGLYNELQKDKMAEAYSEIGMKGERRRGKGHDGLYQGLSTATKDTYDALHMQALPPRLEGGGEGRGSLL
TCGDVEENPGPRMLLLVTSLLLCELPHPAFLLIPRKVCNGIGIGEFKDSLSINATNIKHFKNCTSISGDLHILPVAFRGDSFTHTPPLDP
QELDILKTVKEITGFLLIQAWPENRTDLHAFENLEIIRGRTKQHGQFSLAVVSLNITSLGLRSLKEISDGDVIISGNKNLCYANTINWKK
LFGTSGQKTKIISNRGENSCKATGQVCHALCSPEGCWGPEPRDCVSCRNVSRGRECVDKCNLLEGEPREFVENSECIQCHPECLPQ
AMNITCTGRGPDNCIQCAHYIDGPHCVKTCPAGVMGENNTLVWKYADAGHVCHLCHPNCTYGCTGPGLEGCPTNGPKIPSIAT
GMVGALLLLLVVALGIGLFM (SEQ ID NO: 51)

FIGURE 42B

| | | |
|---|---|---|
| GMCSFRa signal peptide | MLLLVTSLLLCELPHPAFLLIP | (SEQ ID NO: 26) |
| HIVscFv (N6) | RAHLVQSGTAMKKPGASVRVSCQTSGYTFTAHILFWFRQAPGRGLEWVGWIKPQYGAVNF GGGFRDRVTLTRDVYREIAYMDIRGLKPDDTAVYYCARDRSYGDSSWALDAWGQGTTVVV SAGGGSGGGSGGGSGGGSYIHVTQSPSSLSVSIGDRVTINCQTSQGVGSDLHWYQHKPGRA PKLLIHHTSSVEDGVPSRFSGSGFHTSFNLTISDLQADDIATYYCQVLQFFGRGSRLHIK | (SEQ ID NO: 90) |
| IgG4(SmP)(L235E, N297Q) | ESKYGPPCPPCPAPEFEGGPSVFLFPPKPKDTLMISRTPEVTCVVVDVSQEDPEVQFNWYVD GVEVHNAKTKPREEQFQSTYRVVSVLTVLHQDWLNGKEYKCKVSNKGLPSSIEKTISKAKGQ PREPQVYTLPPSQEEMTKNQVSLTCLVKGFYPSDIAVEWESNGQPENNYKTTPPVLDSDGSF FLYSRLTVDKSRWQEGNVFSCSVMHEALHNHYTQKSLSLSLGK | (SEQ ID NO: 77) |
| CD4 transmembrane | MALIVLGGVAGLLLFIGLGIFF | (SEQ ID NO: 73) |
| 4-1BB cyto | KRGRKKLLYIFKQPFMRPVQTTQEEDGCSCRFPEEEEGGCEL | (SEQ ID NO: 24) |
| (Gly)3 | GGG | |
| Zeta | RVKFSRSADAPAYQQGQNQLYNELNLGRREEYDVLDKRRGRDPEMGGKPRRKNPQEGLYN ELQKDKMAEAYSEIGMKGERRRGKGHDGLYQGLSTATKDTYDALHMQALPPR | (SEQ ID NO: 21) |
| T2A | LEGGGEGRGSLLTCGDVEENPGPR | (SEQ ID NO: 74) |
| GMCSFRa signal peptide | MLLLVTSLLLCELPHPAFLLIP | (SEQ ID NO: 26) |
| EGFRt | RKVCNGIGIGEFKDSLSINATNIKHFKNCTSISGDLHILPVAFRGDSFTHTPPLDPQELDILKTVK EITGFLLIQAWPENRTDLHAFENLEIIRGRTKQHGQFSLAVVSLNITSLGLRSLKEISDGDVIISG NKNLCYANTINWKKLFGTSGQKTKIISNRGENSCKATGQVCHALCSPEGCWGPEPRDCVSCR NVSRGRECVDKCNLLEGEPREFVENSECIQCHPECLPQAMNITCTGRGPDNCIQCAHYIDGP HCVKTCPAGVMGENNTLVWKYADAGHVCHLCHPNCTYGCTGPGLEGCPTNGPKIPSIATG MVGALLLLLVVALGIGLFM | (SEQ ID NO: 75) |

FIGURE 43A

HIVscFv(N6)-IgG4H-CD28tm-41BB-Zeta-T2A-EGFRt

MLLLVTSLLLCELPHPAFLLIPRAHLVQSGTAMKKPGASVRVSCQTSGYTFTAHILFWFRQAPGRGLEWVGWIKPQYGAVNFGGG
FRDRVTLTRDVYREIAYMDIRGLKPDDTAVYYCARDRSYGDSSWALDAWGQGTTVVVSAGGGSGGGSGGGSGGGSYIHVTQSP
SSLSVSIGDRVTINCQTSQGVGSDLHWYQHKPGRAPKLLIHHTSSVEDGVPSRFSGSGFHTSFNLTISDLQADDIATYYCQVLQFFG
RGSRLHIKESKYGPPCPPCPMFWVLVVVGGVLACYSLLVTVAFIIFWVKRGRKKLLYIFKQPFMRPVQTTQEEDGCSCRFPEEEEGG
CELGGGRVKFSRSADAPAYQQGQNQLYNELNLGRREEYDVLDKRRGRDPEMGGKPRRKNPQEGLYNELQKDKMAEAYSEIGMK
GERRRGKGHDGLYQGLSTATKDTYDALHMQALPPRLEGGGEGRGSLLTCGDVEENPGPRMLLLVTSLLLCELPHPAFLLIPRKVCN
GIGIGEFKDSLSINATNIKHFKNCTSISGDLHILPVAFRGDSFTHTPPLDPQELDILKTVKEITGFLLIQAWPENRTDLHAFENLEIIRGRT
KQHGQFSLAVVSLNITSLGLRSLKEISDGDVIISGNKNLCYANTINWKKLFGTSGQKTKIISNRGENSCKATGQVCHALCSPEGCWG
PEPRDCVSCRNVSRGRECVDKCNLLEGEPREFVENSECIQCHPECLPQAMNITCTGRGPDNCIQCAHYIDGPHCVKTCPAGVMGE
NNTLVWKYADAGHVCHLCHPNCTYGCTGPGLEGCPTNGPKIPSIATGMVGALLLLLVVALGIGLFM (SEQ ID NO: 52)

FIGURE 43B

| | | |
|---|---|---|
| GMCSFRa signal peptide | MLLLVTSLLLCELPHPAFLLIP | (SEQ ID NO: 26) |
| HIVscFv(N6) | RAHLVQSGTAMKKPGASVRVSCQTSGYTFTAHILFWFRQAPGRGLEWVGWIKPQYGAVNFGGGFR DRVTLTRDVYREIAYMDIRGLKPDDTAVYYCARDRSYGDSSWALDAWGQGTTVVVSAGGGSGGGSG GGSGGGSYIHVTQSPSSLSVSIGDRVTINCQTSQGVGSDLHWYQHKPGRAPKLLIHHTSSVEDGVPSRF SGSGFHTSFNLTISDLQADDIATYYCQVLQFFGRGSRLHIK | (SEQ ID NO: 90) |
| IgG4Hinge(SmP) | ESKYGPPCPPCP | (SEQ ID NO: 3) |
| CD28 transmembrane | MFWVLVVVGGVLACYSLLVTVAFIIFWV | (SEQ ID NO: 15) |
| 4-1BB cyto | KRGRKKLLYIFKQPFMRPVQTTQEEDGCSCRFPEEEEGGCEL | (SEQ ID NO: 24) |
| (Gly)3 | GGG | |
| Zeta | RVKFSRSADAPAYQQGQNQLYNELNLGRREEYDVLDKRRGRDPEMGGKPRRKNPQEGLYNELQKDK MAEAYSEIGMKGERRRGKGHDGLYQGLSTATKDTYDALHMQALPPR | (SEQ ID NO: 21) |
| T2A | LEGGGEGRGSLLTCGDVEENPGPR | (SEQ ID NO: 74) |
| GMCSFRa signal peptide | MLLLVTSLLLCELPHPAFLLIP | (SEQ ID NO: 26) |
| EGFRt | RKVCNGIGIGEFKDSLSINATNIKHFKNCTSISGDLHILPVAFRGDSFTHTPPLDPQELDILKTVKEITGFLLI QAWPENRTDLHAFENLEIIRGRTKQHGQFSLAVVSLNITSLGLRSLKEISDGDVIISGNKNLCYANTINW KKLFGTSGQKTKIISNRGENSCKATGQVCHALCSPEGCWGPEPRDCVSCRNVSRGRECVDKCNLLEGE PREFVENSECIQCHPECLPQAMNITCTGRGPDNCIQCAHYIDGPHCVKTCPAGVMGENNTLVWKYAD AGHVCHLCHPNCTYGCTGPGLEGCPTNGPKIPSIATGMVGALLLLLVVALGIGLFM | (SEQ ID NO: 75) |

SEQUENCE LISTING

```
<160> NUMBER OF SEQ ID NOS: 117

<210> SEQ ID NO 1

<400> SEQUENCE: 1

000


<210> SEQ ID NO 2
<211> LENGTH: 10
<212> TYPE: PRT
<213> ORGANISM: Artificial Sequence
<220> FEATURE:
<223> OTHER INFORMATION: Synthetic peptide

<400> SEQUENCE: 2

Gly Gly Gly Ser Ser Gly Gly Gly Ser Gly
1               5                   10


<210> SEQ ID NO 3
<211> LENGTH: 12
<212> TYPE: PRT
<213> ORGANISM: Artificial Sequence
<220> FEATURE:
<223> OTHER INFORMATION: Synthetic peptide

<400> SEQUENCE: 3

Glu Ser Lys Tyr Gly Pro Pro Cys Pro Pro Cys Pro
1               5                   10


<210> SEQ ID NO 4
<211> LENGTH: 12
<212> TYPE: PRT
<213> ORGANISM: Artificial Sequence
<220> FEATURE:
<223> OTHER INFORMATION: Synthetic peptide

<400> SEQUENCE: 4

Glu Ser Lys Tyr Gly Pro Pro Cys Pro Ser Cys Pro
1               5                   10


<210> SEQ ID NO 5
<211> LENGTH: 22
<212> TYPE: PRT
```

<213> ORGANISM: Artificial Sequence
<220> FEATURE:
<223> OTHER INFORMATION: Synthetic peptide

<400> SEQUENCE: 5

Glu Ser Lys Tyr Gly Pro Pro Cys Pro Pro Cys Pro Gly Gly Gly Ser
1 5 10 15

Ser Gly Gly Gly Ser Gly
20

<210> SEQ ID NO 6
<211> LENGTH: 39
<212> TYPE: PRT
<213> ORGANISM: Homo sapiens

<400> SEQUENCE: 6

Ile Glu Val Met Tyr Pro Pro Pro Tyr Leu Asp Asn Glu Lys Ser Asn
1 5 10 15

Gly Thr Ile Ile His Val Lys Gly Lys His Leu Cys Pro Ser Pro Leu
20 25 30

Phe Pro Gly Pro Ser Lys Pro
35

<210> SEQ ID NO 7
<211> LENGTH: 48
<212> TYPE: PRT
<213> ORGANISM: Homo sapiens

<400> SEQUENCE: 7

Ala Lys Pro Thr Thr Thr Pro Ala Pro Arg Pro Pro Thr Pro Ala Pro
1 5 10 15

Thr Ile Ala Ser Gln Pro Leu Ser Leu Arg Pro Glu Ala Cys Arg Pro
20 25 30

Ala Ala Gly Gly Ala Val His Thr Arg Gly Leu Asp Phe Ala Cys Asp
35 40 45

<210> SEQ ID NO 8
<211> LENGTH: 45
<212> TYPE: PRT
<213> ORGANISM: Homo sapiens

<400> SEQUENCE: 8

Thr Thr Thr Pro Ala Pro Arg Pro Pro Thr Pro Ala Pro Thr Ile Ala
1 5 10 15

Ser Gln Pro Leu Ser Leu Arg Pro Glu Ala Cys Arg Pro Ala Ala Gly
20 25 30

Gly Ala Val His Thr Arg Gly Leu Asp Phe Ala Cys Asp
35 40 45

<210> SEQ ID NO 9
<211> LENGTH: 129
<212> TYPE: PRT
<213> ORGANISM: Artificial Sequence
<220> FEATURE:
<223> OTHER INFORMATION: Synthetic polypeptide

<400> SEQUENCE: 9

Glu Ser Lys Tyr Gly Pro Pro Cys Pro Pro Cys Pro Gly Gly Gly Ser
1 5 10 15

Ser Gly Gly Gly Ser Gly Gly Gln Pro Arg Glu Pro Gln Val Tyr Thr
20 25 30

```
Leu Pro Pro Ser Gln Glu Glu Met Thr Lys Asn Gln Val Ser Leu Thr
        35                  40                  45

Cys Leu Val Lys Gly Phe Tyr Pro Ser Asp Ile Ala Val Glu Trp Glu
    50                  55                  60

Ser Asn Gly Gln Pro Glu Asn Asn Tyr Lys Thr Thr Pro Pro Val Leu
65                  70                  75                  80

Asp Ser Asp Gly Ser Phe Phe Leu Tyr Ser Arg Leu Thr Val Asp Lys
                85                  90                  95

Ser Arg Trp Gln Glu Gly Asn Val Phe Ser Cys Ser Val Met His Glu
            100                 105                 110

Ala Leu His Asn His Tyr Thr Gln Lys Ser Leu Ser Leu Ser Leu Gly
        115                 120                 125

Lys


<210> SEQ ID NO 10
<211> LENGTH: 229
<212> TYPE: PRT
<213> ORGANISM: Artificial Sequence
<220> FEATURE:
<223> OTHER INFORMATION: Synthetic polypeptide

<400> SEQUENCE: 10

Glu Ser Lys Tyr Gly Pro Pro Cys Pro Ser Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Gln Ala Lys Thr Lys Pro Arg Glu Glu Gln Phe Gln Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225


<210> SEQ ID NO 11
<211> LENGTH: 229
<212> TYPE: PRT
```

<213> ORGANISM: Artificial Sequence
<220> FEATURE:
<223> OTHER INFORMATION: Synthetic polypeptide

<400> SEQUENCE: 11

```
Glu Ser Lys Tyr Gly Pro Pro Cys Pro Pro Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Gln Ala Lys Thr Lys Pro Arg Glu Glu Gln Phe Gln Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225
```

<210> SEQ ID NO 12
<211> LENGTH: 107
<212> TYPE: PRT
<213> ORGANISM: Homo sapiens

<400> SEQUENCE: 12

```
Gly Gln Pro Arg Glu Pro Gln Val Tyr Thr Leu Pro Pro Ser Gln Glu
1               5                   10                  15

Glu Met Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
    50                  55                  60

Phe Leu Tyr Ser Arg Leu Thr Val Asp Lys Ser Arg Trp Gln Glu Gly
65                  70                  75                  80

Asn Val Phe Ser Cys Ser Val Met His Glu Ala Leu His Asn His Tyr
                85                  90                  95

Thr Gln Lys Ser Leu Ser Leu Ser Leu Gly Lys
            100                 105
```

<210> SEQ ID NO 13
<211> LENGTH: 21
<212> TYPE: PRT
<213> ORGANISM: Homo sapiens

<400> SEQUENCE: 13

```
Leu Cys Tyr Leu Leu Asp Gly Ile Leu Phe Ile Tyr Gly Val Ile Leu
1               5                   10                  15

Thr Ala Leu Phe Leu
            20
```

<210> SEQ ID NO 14
<211> LENGTH: 27
<212> TYPE: PRT
<213> ORGANISM: Homo sapiens

<400> SEQUENCE: 14

```
Phe Trp Val Leu Val Val Val Gly Gly Val Leu Ala Cys Tyr Ser Leu
1               5                   10                  15

Leu Val Thr Val Ala Phe Ile Ile Phe Trp Val
            20                  25
```

<210> SEQ ID NO 15
<211> LENGTH: 28
<212> TYPE: PRT
<213> ORGANISM: Homo sapiens

<400> SEQUENCE: 15

```
Met Phe Trp Val Leu Val Val Val Gly Gly Val Leu Ala Cys Tyr Ser
1               5                   10                  15

Leu Leu Val Thr Val Ala Phe Ile Ile Phe Trp Val
            20                  25
```

<210> SEQ ID NO 16
<211> LENGTH: 22
<212> TYPE: PRT
<213> ORGANISM: Homo sapiens

<400> SEQUENCE: 16

```
Met Ala Leu Ile Val Leu Gly Gly Val Ala Gly Leu Leu Leu Phe Ile
1               5                   10                  15

Gly Leu Gly Ile Phe Phe
            20
```

<210> SEQ ID NO 17
<211> LENGTH: 21
<212> TYPE: PRT
<213> ORGANISM: Homo sapiens

<400> SEQUENCE: 17

```
Ile Tyr Ile Trp Ala Pro Leu Ala Gly Thr Cys Gly Val Leu Leu Leu
1               5                   10                  15

Ser Leu Val Ile Thr
            20
```

<210> SEQ ID NO 18
<211> LENGTH: 23
<212> TYPE: PRT
<213> ORGANISM: Homo sapiens

<400> SEQUENCE: 18

Ile Tyr Ile Trp Ala Pro Leu Ala Gly Thr Cys Gly Val Leu Leu Leu
1 5 10 15

Ser Leu Val Ile Thr Leu Tyr
20

<210> SEQ ID NO 19
<211> LENGTH: 24
<212> TYPE: PRT
<213> ORGANISM: Homo sapiens

<400> SEQUENCE: 19

Ile Tyr Ile Trp Ala Pro Leu Ala Gly Thr Cys Gly Val Leu Leu Leu
1 5 10 15

Ser Leu Val Ile Thr Leu Tyr Cys
20

<210> SEQ ID NO 20
<211> LENGTH: 27
<212> TYPE: PRT
<213> ORGANISM: Homo sapiens

<400> SEQUENCE: 20

Ile Ile Ser Phe Phe Leu Ala Leu Thr Ser Thr Ala Leu Leu Phe Leu
1 5 10 15

Leu Phe Phe Leu Thr Leu Arg Phe Ser Val Val
20 25

<210> SEQ ID NO 21
<211> LENGTH: 112
<212> TYPE: PRT
<213> ORGANISM: Homo sapiens

<400> SEQUENCE: 21

Arg Val Lys Phe Ser Arg Ser Ala Asp Ala Pro Ala Tyr Gln Gln Gly
1 5 10 15

Gln Asn Gln Leu Tyr Asn Glu Leu Asn Leu Gly Arg Arg Glu Glu Tyr
20 25 30

Asp Val Leu Asp Lys Arg Arg Gly Arg Asp Pro Glu Met Gly Gly Lys
35 40 45

Pro Arg Arg Lys Asn Pro Gln Glu Gly Leu Tyr Asn Glu Leu Gln Lys
50 55 60

Asp Lys Met Ala Glu Ala Tyr Ser Glu Ile Gly Met Lys Gly Glu Arg
65 70 75 80

Arg Arg Gly Lys Gly His Asp Gly Leu Tyr Gln Gly Leu Ser Thr Ala
85 90 95

Thr Lys Asp Thr Tyr Asp Ala Leu His Met Gln Ala Leu Pro Pro Arg
100 105 110

<210> SEQ ID NO 22
<211> LENGTH: 41
<212> TYPE: PRT
<213> ORGANISM: Homo sapiens

<400> SEQUENCE: 22

Arg Ser Lys Arg Ser Arg Leu Leu His Ser Asp Tyr Met Asn Met Thr
1 5 10 15

Pro Arg Arg Pro Gly Pro Thr Arg Lys His Tyr Gln Pro Tyr Ala Pro
20 25 30

Pro Arg Asp Phe Ala Ala Tyr Arg Ser
35 40

<210> SEQ ID NO 23
<211> LENGTH: 41
<212> TYPE: PRT
<213> ORGANISM: Homo sapiens

<400> SEQUENCE: 23

```
Arg Ser Lys Arg Ser Arg Gly Gly His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
        35                  40
```

<210> SEQ ID NO 24
<211> LENGTH: 42
<212> TYPE: PRT
<213> ORGANISM: Homo sapiens

<400> SEQUENCE: 24

```
Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40
```

<210> SEQ ID NO 25
<211> LENGTH: 42
<212> TYPE: PRT
<213> ORGANISM: Homo sapiens

<400> SEQUENCE: 25

```
Ala Leu Tyr Leu Leu Arg Arg Asp Gln Arg Leu Pro Pro Asp Ala His
1               5                   10                  15

Lys Pro Pro Gly Gly Gly Ser Phe Arg Thr Pro Ile Gln Glu Glu Gln
            20                  25                  30

Ala Asp Ala His Ser Thr Leu Ala Lys Ile
        35                  40
```

<210> SEQ ID NO 26
<211> LENGTH: 22
<212> TYPE: PRT
<213> ORGANISM: Homo sapiens

<400> SEQUENCE: 26

```
Met Leu Leu Leu Val Thr Ser Leu Leu Leu Cys Glu Leu Pro His Pro
1               5                   10                  15

Ala Phe Leu Leu Ile Pro
            20
```

<210> SEQ ID NO 27
<211> LENGTH: 24
<212> TYPE: PRT
<213> ORGANISM: Artificial Sequence
<220> FEATURE:
<223> OTHER INFORMATION: Synthetic peptide

<400> SEQUENCE: 27

```
Leu Glu Gly Gly Gly Glu Gly Arg Gly Ser Leu Leu Thr Cys Gly Asp
1               5                   10                  15
```

Val Glu Glu Asn Pro Gly Pro Arg
20

<210> SEQ ID NO 28
<211> LENGTH: 354
<212> TYPE: PRT
<213> ORGANISM: Artificial Sequence
<220> FEATURE:
<223> OTHER INFORMATION: Synthetic polypeptide

<400> SEQUENCE: 28

Leu Val Thr Ser Leu Leu Leu Cys Glu Leu Pro His Pro Ala Phe Leu
1 5 10 15

Leu Ile Pro Arg Lys Val Cys Asn Gly Ile Gly Ile Gly Glu Phe Lys
20 25 30

Asp Ser Leu Ser Ile Asn Ala Thr Asn Ile Lys His Phe Lys Asn Cys
35 40 45

Thr Ser Ile Ser Gly Asp Leu His Ile Leu Pro Val Ala Phe Arg Gly
50 55 60

Asp Ser Phe Thr His Thr Pro Pro Leu Asp Pro Gln Glu Leu Asp Ile
65 70 75 80

Leu Lys Thr Val Lys Glu Ile Thr Gly Phe Leu Leu Ile Gln Ala Trp
85 90 95

Pro Glu Asn Arg Thr Asp Leu His Ala Phe Glu Asn Leu Glu Ile Ile
100 105 110

Arg Gly Arg Thr Lys Gln His Gly Gln Phe Ser Leu Ala Val Val Ser
115 120 125

Leu Asn Ile Thr Ser Leu Gly Leu Arg Ser Leu Lys Glu Ile Ser Asp
130 135 140

Gly Asp Val Ile Ile Ser Gly Asn Lys Asn Leu Cys Tyr Ala Asn Thr
145 150 155 160

Ile Asn Trp Lys Lys Leu Phe Gly Thr Ser Gly Gln Lys Thr Lys Ile
165 170 175

Ile Ser Asn Arg Gly Glu Asn Ser Cys Lys Ala Thr Gly Gln Val Cys
180 185 190

His Ala Leu Cys Ser Pro Glu Gly Cys Trp Gly Pro Glu Pro Arg Asp
195 200 205

Cys Val Ser Cys Arg Asn Val Ser Arg Gly Arg Glu Cys Val Asp Lys
210 215 220

Cys Asn Leu Leu Glu Gly Glu Pro Arg Glu Phe Val Glu Asn Ser Glu
225 230 235 240

Cys Ile Gln Cys His Pro Glu Cys Leu Pro Gln Ala Met Asn Ile Thr
245 250 255

Cys Thr Gly Arg Gly Pro Asp Asn Cys Ile Gln Cys Ala His Tyr Ile
260 265 270

Asp Gly Pro His Cys Val Lys Thr Cys Pro Ala Gly Val Met Gly Glu
275 280 285

Asn Asn Thr Leu Val Trp Lys Tyr Ala Asp Ala Gly His Val Cys His
290 295 300

Leu Cys His Pro Asn Cys Thr Tyr Gly Cys Thr Gly Pro Gly Leu Glu
305 310 315 320

Gly Cys Pro Thr Asn Gly Pro Lys Ile Pro Ser Ile Ala Thr Gly Met
325 330 335

Val Gly Ala Leu Leu Leu Leu Leu Val Val Ala Leu Gly Ile Gly Leu
340 345 350

Phe Met

<210> SEQ ID NO 29
<211> LENGTH: 576
<212> TYPE: PRT
<213> ORGANISM: Artificial Sequence
<220> FEATURE:
<223> OTHER INFORMATION: Synthetic polypeptide

<400> SEQUENCE: 29

```
Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45

Gly Trp Leu Lys Pro Arg Trp Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser Gly Gly Gly
        115                 120                 125

Ser Gly Gly Gly Ser Gly Gly Gly Ser Gly Gly Gly Ser Glu Ile Val
    130                 135                 140

Leu Thr Gln Ser Pro Ala Thr Leu Ser Leu Ser Pro Gly Glu Thr Ala
145                 150                 155                 160

Ile Ile Ser Cys Arg Thr Ser Gln Ser Gly Ser Leu Ala Trp Tyr Gln
                165                 170                 175

Gln Arg Pro Gly Gln Ala Pro Arg Leu Val Ile Tyr Ser Gly Ser Thr
            180                 185                 190

Arg Ala Ala Gly Ile Pro Asp Arg Phe Ser Gly Ser Arg Trp Gly Ala
        195                 200                 205

Asp Tyr Asn Leu Ser Ile Ser Asn Leu Glu Ser Gly Asp Phe Gly Val
    210                 215                 220

Tyr Tyr Cys Gln Gln Tyr Glu Phe Phe Gly Gln Gly Thr Lys Val Gln
225                 230                 235                 240

Val Asp Ile Lys Glu Ser Lys Tyr Gly Pro Pro Cys Pro Pro Cys Pro
                245                 250                 255

Gly Gly Gly Ser Ser Gly Gly Gly Ser Gly Gly Gln Pro Arg Glu Pro
            260                 265                 270

Gln Val Tyr Thr Leu Pro Pro Ser Gln Glu Glu Met Thr Lys Asn Gln
        275                 280                 285

Val Ser Leu Thr Cys Leu Val Lys Gly Phe Tyr Pro Ser Asp Ile Ala
    290                 295                 300

Val Glu Trp Glu Ser Asn Gly Gln Pro Glu Asn Asn Tyr Lys Thr Thr
305                 310                 315                 320

Pro Pro Val Leu Asp Ser Asp Gly Ser Phe Phe Leu Tyr Ser Arg Leu
                325                 330                 335

Thr Val Asp Lys Ser Arg Trp Gln Glu Gly Asn Val Phe Ser Cys Ser
            340                 345                 350

Val Met His Glu Ala Leu His Asn His Tyr Thr Gln Lys Ser Leu Ser
```

```
        355                 360                 365

Leu Ser Leu Gly Lys Met Ala Leu Ile Val Leu Gly Gly Val Ala Gly
    370                 375                 380

Leu Leu Leu Phe Ile Gly Leu Gly Ile Phe Phe Lys Arg Gly Arg Lys
385                 390                 395                 400

Lys Leu Leu Tyr Ile Phe Lys Gln Pro Phe Met Arg Pro Val Gln Thr
                405                 410                 415

Thr Gln Glu Glu Asp Gly Cys Ser Cys Arg Phe Pro Glu Glu Glu Glu
            420                 425                 430

Gly Gly Cys Glu Leu Gly Gly Gly Arg Val Lys Phe Ser Arg Ser Ala
        435                 440                 445

Asp Ala Pro Ala Tyr Gln Gln Gly Gln Asn Gln Leu Tyr Asn Glu Leu
    450                 455                 460

Asn Leu Gly Arg Arg Glu Glu Tyr Asp Val Leu Asp Lys Arg Arg Gly
465                 470                 475                 480

Arg Asp Pro Glu Met Gly Gly Lys Pro Arg Arg Lys Asn Pro Gln Glu
                485                 490                 495

Gly Leu Tyr Asn Glu Leu Gln Lys Asp Lys Met Ala Glu Ala Tyr Ser
            500                 505                 510

Glu Ile Gly Met Lys Gly Glu Arg Arg Arg Gly Lys Gly His Asp Gly
        515                 520                 525

Leu Tyr Gln Gly Leu Ser Thr Ala Thr Lys Asp Thr Tyr Asp Ala Leu
    530                 535                 540

His Met Gln Ala Leu Pro Pro Arg Leu Glu Gly Gly Gly Glu Gly Arg
545                 550                 555                 560

Gly Ser Leu Leu Thr Cys Gly Asp Val Glu Glu Asn Pro Gly Pro Arg
                565                 570                 575


<210> SEQ ID NO 30
<211> LENGTH: 676
<212> TYPE: PRT
<213> ORGANISM: Artificial Sequence
<220> FEATURE:
<223> OTHER INFORMATION: Synthetic polypeptide

<400> SEQUENCE: 30

Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45

Gly Trp Leu Lys Pro Arg Trp Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser Gly Gly Gly
        115                 120                 125

Ser Gly Gly Gly Ser Gly Gly Gly Ser Gly Gly Gly Ser Glu Ile Val
    130                 135                 140

Leu Thr Gln Ser Pro Ala Thr Leu Ser Leu Ser Pro Gly Glu Thr Ala
```

```
145                 150                 155                 160

Ile Ile Ser Cys Arg Thr Ser Gln Ser Gly Ser Leu Ala Trp Tyr Gln
                165                 170                 175

Gln Arg Pro Gly Gln Ala Pro Arg Leu Val Ile Tyr Ser Gly Ser Thr
            180                 185                 190

Arg Ala Ala Gly Ile Pro Asp Arg Phe Ser Gly Ser Arg Trp Gly Ala
        195                 200                 205

Asp Tyr Asn Leu Ser Ile Ser Asn Leu Glu Ser Gly Asp Phe Gly Val
    210                 215                 220

Tyr Tyr Cys Gln Gln Tyr Glu Phe Phe Gly Gln Gly Thr Lys Val Gln
225                 230                 235                 240

Val Asp Ile Lys Glu Ser Lys Tyr Gly Pro Pro Cys Pro Pro Cys Pro
                245                 250                 255

Ala Pro Glu Phe Glu Gly Gly Pro Ser Val Phe Leu Phe Pro Pro Lys
            260                 265                 270

Pro Lys Asp Thr Leu Met Ile Ser Arg Thr Pro Glu Val Thr Cys Val
        275                 280                 285

Val Val Asp Val Ser Gln Glu Asp Pro Glu Val Gln Phe Asn Trp Tyr
    290                 295                 300

Val Asp Gly Val Glu Val His Asn Ala Lys Thr Lys Pro Arg Glu Glu
305                 310                 315                 320

Gln Phe Gln Ser Thr Tyr Arg Val Val Ser Val Leu Thr Val Leu His
                325                 330                 335

Gln Asp Trp Leu Asn Gly Lys Glu Tyr Lys Cys Lys Val Ser Asn Lys
            340                 345                 350

Gly Leu Pro Ser Ser Ile Glu Lys Thr Ile Ser Lys Ala Lys Gly Gln
        355                 360                 365

Pro Arg Glu Pro Gln Val Tyr Thr Leu Pro Pro Ser Gln Glu Glu Met
    370                 375                 380

Thr Lys Asn Gln Val Ser Leu Thr Cys Leu Val Lys Gly Phe Tyr Pro
385                 390                 395                 400

Ser Asp Ile Ala Val Glu Trp Glu Ser Asn Gly Gln Pro Glu Asn Asn
                405                 410                 415

Tyr Lys Thr Thr Pro Pro Val Leu Asp Ser Asp Gly Ser Phe Phe Leu
            420                 425                 430

Tyr Ser Arg Leu Thr Val Asp Lys Ser Arg Trp Gln Glu Gly Asn Val
        435                 440                 445

Phe Ser Cys Ser Val Met His Glu Ala Leu His Asn His Tyr Thr Gln
    450                 455                 460

Lys Ser Leu Ser Leu Ser Leu Gly Lys Met Ala Leu Ile Val Leu Gly
465                 470                 475                 480

Gly Val Ala Gly Leu Leu Leu Phe Ile Gly Leu Gly Ile Phe Phe Lys
                485                 490                 495

Arg Gly Arg Lys Lys Leu Leu Tyr Ile Phe Lys Gln Pro Phe Met Arg
            500                 505                 510

Pro Val Gln Thr Thr Gln Glu Glu Asp Gly Cys Ser Cys Arg Phe Pro
        515                 520                 525

Glu Glu Glu Glu Gly Gly Cys Glu Leu Gly Gly Gly Arg Val Lys Phe
    530                 535                 540

Ser Arg Ser Ala Asp Ala Pro Ala Tyr Gln Gln Gly Gln Asn Gln Leu
545                 550                 555                 560

Tyr Asn Glu Leu Asn Leu Gly Arg Arg Glu Glu Tyr Asp Val Leu Asp
                565                 570                 575
```

```
Lys Arg Arg Gly Arg Asp Pro Glu Met Gly Gly Lys Pro Arg Arg Lys
            580                 585                 590

Asn Pro Gln Glu Gly Leu Tyr Asn Glu Leu Gln Lys Asp Lys Met Ala
        595                 600                 605

Glu Ala Tyr Ser Glu Ile Gly Met Lys Gly Glu Arg Arg Arg Gly Lys
    610                 615                 620

Gly His Asp Gly Leu Tyr Gln Gly Leu Ser Thr Ala Thr Lys Asp Thr
625                 630                 635                 640

Tyr Asp Ala Leu His Met Gln Ala Leu Pro Pro Arg Leu Glu Gly Gly
                645                 650                 655

Gly Glu Gly Arg Gly Ser Leu Leu Thr Cys Gly Asp Val Glu Glu Asn
            660                 665                 670

Pro Gly Pro Arg
        675


<210> SEQ ID NO 31
<211> LENGTH: 465
<212> TYPE: PRT
<213> ORGANISM: Artificial Sequence
<220> FEATURE:
<223> OTHER INFORMATION: Synthetic polypeptide

<400> SEQUENCE: 31

Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45

Gly Trp Leu Lys Pro Arg Trp Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser Gly Gly Gly
        115                 120                 125

Ser Gly Gly Gly Ser Gly Gly Gly Ser Gly Gly Gly Ser Glu Ile Val
    130                 135                 140

Leu Thr Gln Ser Pro Ala Thr Leu Ser Leu Ser Pro Gly Glu Thr Ala
145                 150                 155                 160

Ile Ile Ser Cys Arg Thr Ser Gln Ser Gly Ser Leu Ala Trp Tyr Gln
                165                 170                 175

Gln Arg Pro Gly Gln Ala Pro Arg Leu Val Ile Tyr Ser Gly Ser Thr
            180                 185                 190

Arg Ala Ala Gly Ile Pro Asp Arg Phe Ser Gly Ser Arg Trp Gly Ala
        195                 200                 205

Asp Tyr Asn Leu Ser Ile Ser Asn Leu Glu Ser Gly Asp Phe Gly Val
    210                 215                 220

Tyr Tyr Cys Gln Gln Tyr Glu Phe Phe Gly Gln Gly Thr Lys Val Gln
225                 230                 235                 240

Val Asp Ile Lys Glu Ser Lys Tyr Gly Pro Pro Cys Pro Pro Cys Pro
                245                 250                 255
```

```
Met Phe Trp Val Leu Val Val Val Gly Gly Val Leu Ala Cys Tyr Ser
            260                 265                 270

Leu Leu Val Thr Val Ala Phe Ile Ile Phe Trp Val Lys Arg Gly Arg
        275                 280                 285

Lys Lys Leu Leu Tyr Ile Phe Lys Gln Pro Phe Met Arg Pro Val Gln
    290                 295                 300

Thr Thr Gln Glu Glu Asp Gly Cys Ser Cys Arg Phe Pro Glu Glu Glu
305                 310                 315                 320

Glu Gly Gly Cys Glu Leu Gly Gly Gly Arg Val Lys Phe Ser Arg Ser
                325                 330                 335

Ala Asp Ala Pro Ala Tyr Gln Gln Gly Gln Asn Gln Leu Tyr Asn Glu
            340                 345                 350

Leu Asn Leu Gly Arg Arg Glu Glu Tyr Asp Val Leu Asp Lys Arg Arg
        355                 360                 365

Gly Arg Asp Pro Glu Met Gly Gly Lys Pro Arg Arg Lys Asn Pro Gln
    370                 375                 380

Glu Gly Leu Tyr Asn Glu Leu Gln Lys Asp Lys Met Ala Glu Ala Tyr
385                 390                 395                 400

Ser Glu Ile Gly Met Lys Gly Glu Arg Arg Arg Gly Lys Gly His Asp
                405                 410                 415

Gly Leu Tyr Gln Gly Leu Ser Thr Ala Thr Lys Asp Thr Tyr Asp Ala
            420                 425                 430

Leu His Met Gln Ala Leu Pro Pro Arg Leu Glu Gly Gly Gly Glu Gly
        435                 440                 445

Arg Gly Ser Leu Leu Thr Cys Gly Asp Val Glu Glu Asn Pro Gly Pro
    450                 455                 460

Arg
465


<210> SEQ ID NO 32
<211> LENGTH: 576
<212> TYPE: PRT
<213> ORGANISM: Artificial Sequence
<220> FEATURE:
<223> OTHER INFORMATION: Synthetic polypeptide

<400> SEQUENCE: 32

Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45

Gly Trp Leu Lys Pro Arg Trp Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser Gly Gly Gly
        115                 120                 125

Ser Gly Gly Gly Ser Gly Gly Gly Ser Gly Gly Gly Ser Glu Ile Val
    130                 135                 140
```

```
Leu Thr Gln Ser Pro Ala Thr Leu Ser Leu Ser Pro Gly Glu Thr Ala
145                 150                 155                 160

Ile Ile Ser Cys Arg Thr Ser Gln Tyr Gly Ser Leu Ala Trp Tyr Gln
                165                 170                 175

Gln Arg Pro Gly Gln Ala Pro Arg Leu Val Ile Tyr Ser Gly Ser Thr
            180                 185                 190

Arg Ala Ala Gly Ile Pro Asp Arg Phe Ser Gly Ser Arg Trp Gly Ala
        195                 200                 205

Asp Tyr Asn Leu Ser Ile Ser Asn Leu Glu Ser Gly Asp Phe Gly Val
    210                 215                 220

Tyr Tyr Cys Gln Gln Tyr Glu Phe Phe Gly Gln Gly Thr Lys Val Gln
225                 230                 235                 240

Val Asp Ile Lys Glu Ser Lys Tyr Gly Pro Pro Cys Pro Pro Cys Pro
                245                 250                 255

Gly Gly Gly Ser Ser Gly Gly Gly Ser Gly Gly Gln Pro Arg Glu Pro
            260                 265                 270

Gln Val Tyr Thr Leu Pro Pro Ser Gln Glu Glu Met Thr Lys Asn Gln
        275                 280                 285

Val Ser Leu Thr Cys Leu Val Lys Gly Phe Tyr Pro Ser Asp Ile Ala
    290                 295                 300

Val Glu Trp Glu Ser Asn Gly Gln Pro Glu Asn Asn Tyr Lys Thr Thr
305                 310                 315                 320

Pro Pro Val Leu Asp Ser Asp Gly Ser Phe Phe Leu Tyr Ser Arg Leu
                325                 330                 335

Thr Val Asp Lys Ser Arg Trp Gln Glu Gly Asn Val Phe Ser Cys Ser
            340                 345                 350

Val Met His Glu Ala Leu His Asn His Tyr Thr Gln Lys Ser Leu Ser
        355                 360                 365

Leu Ser Leu Gly Lys Met Ala Leu Ile Val Leu Gly Gly Val Ala Gly
    370                 375                 380

Leu Leu Leu Phe Ile Gly Leu Gly Ile Phe Phe Lys Arg Gly Arg Lys
385                 390                 395                 400

Lys Leu Leu Tyr Ile Phe Lys Gln Pro Phe Met Arg Pro Val Gln Thr
                405                 410                 415

Thr Gln Glu Glu Asp Gly Cys Ser Cys Arg Phe Pro Glu Glu Glu Glu
            420                 425                 430

Gly Gly Cys Glu Leu Gly Gly Gly Arg Val Lys Phe Ser Arg Ser Ala
        435                 440                 445

Asp Ala Pro Ala Tyr Gln Gln Gly Gln Asn Gln Leu Tyr Asn Glu Leu
    450                 455                 460

Asn Leu Gly Arg Arg Glu Glu Tyr Asp Val Leu Asp Lys Arg Arg Gly
465                 470                 475                 480

Arg Asp Pro Glu Met Gly Gly Lys Pro Arg Arg Lys Asn Pro Gln Glu
                485                 490                 495

Gly Leu Tyr Asn Glu Leu Gln Lys Asp Lys Met Ala Glu Ala Tyr Ser
            500                 505                 510

Glu Ile Gly Met Lys Gly Glu Arg Arg Arg Gly Lys Gly His Asp Gly
        515                 520                 525

Leu Tyr Gln Gly Leu Ser Thr Ala Thr Lys Asp Thr Tyr Asp Ala Leu
    530                 535                 540

His Met Gln Ala Leu Pro Pro Arg Leu Glu Gly Gly Gly Glu Gly Arg
545                 550                 555                 560
```

```
Gly Ser Leu Leu Thr Cys Gly Asp Val Glu Glu Asn Pro Gly Pro Arg
                565                 570                 575


<210> SEQ ID NO 33
<211> LENGTH: 465
<212> TYPE: PRT
<213> ORGANISM: Artificial Sequence
<220> FEATURE:
<223> OTHER INFORMATION: Synthetic polypeptide

<400> SEQUENCE: 33

Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45

Gly Trp Leu Lys Pro Arg Trp Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser Gly Gly Gly
        115                 120                 125

Ser Gly Gly Gly Ser Gly Gly Gly Ser Gly Gly Gly Ser Glu Ile Val
    130                 135                 140

Leu Thr Gln Ser Pro Ala Thr Leu Ser Leu Ser Pro Gly Glu Thr Ala
145                 150                 155                 160

Ile Ile Ser Cys Arg Thr Ser Gln Tyr Gly Ser Leu Ala Trp Tyr Gln
                165                 170                 175

Gln Arg Pro Gly Gln Ala Pro Arg Leu Val Ile Tyr Ser Gly Ser Thr
            180                 185                 190

Arg Ala Ala Gly Ile Pro Asp Arg Phe Ser Gly Ser Arg Trp Gly Ala
        195                 200                 205

Asp Tyr Asn Leu Ser Ile Ser Asn Leu Glu Ser Gly Asp Phe Gly Val
    210                 215                 220

Tyr Tyr Cys Gln Gln Tyr Glu Phe Phe Gly Gln Gly Thr Lys Val Gln
225                 230                 235                 240

Val Asp Ile Lys Glu Ser Lys Tyr Gly Pro Pro Cys Pro Pro Cys Pro
                245                 250                 255

Met Phe Trp Val Leu Val Val Val Gly Gly Val Leu Ala Cys Tyr Ser
            260                 265                 270

Leu Leu Val Thr Val Ala Phe Ile Ile Phe Trp Val Lys Arg Gly Arg
        275                 280                 285

Lys Lys Leu Leu Tyr Ile Phe Lys Gln Pro Phe Met Arg Pro Val Gln
    290                 295                 300

Thr Thr Gln Glu Glu Asp Gly Cys Ser Cys Arg Phe Pro Glu Glu Glu
305                 310                 315                 320

Glu Gly Gly Cys Glu Leu Gly Gly Gly Arg Val Lys Phe Ser Arg Ser
                325                 330                 335

Ala Asp Ala Pro Ala Tyr Gln Gln Gly Gln Asn Gln Leu Tyr Asn Glu
            340                 345                 350
```

```
Leu Asn Leu Gly Arg Arg Glu Glu Tyr Asp Val Leu Asp Lys Arg Arg
        355                 360                 365

Gly Arg Asp Pro Glu Met Gly Gly Lys Pro Arg Arg Lys Asn Pro Gln
    370                 375                 380

Glu Gly Leu Tyr Asn Glu Leu Gln Lys Asp Lys Met Ala Glu Ala Tyr
385                 390                 395                 400

Ser Glu Ile Gly Met Lys Gly Glu Arg Arg Arg Gly Lys Gly His Asp
                405                 410                 415

Gly Leu Tyr Gln Gly Leu Ser Thr Ala Thr Lys Asp Thr Tyr Asp Ala
            420                 425                 430

Leu His Met Gln Ala Leu Pro Pro Arg Leu Glu Gly Gly Gly Glu Gly
        435                 440                 445

Arg Gly Ser Leu Leu Thr Cys Gly Asp Val Glu Glu Asn Pro Gly Pro
    450                 455                 460

Arg
465
```

<210> SEQ ID NO 34
<211> LENGTH: 676
<212> TYPE: PRT
<213> ORGANISM: Artificial Sequence
<220> FEATURE:
<223> OTHER INFORMATION: Synthetic polypeptide

<400> SEQUENCE: 34

```
Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45

Gly Trp Leu Lys Pro Arg Trp Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser Gly Gly Gly
        115                 120                 125

Ser Gly Gly Gly Ser Gly Gly Gly Ser Gly Gly Gly Ser Glu Ile Val
    130                 135                 140

Leu Thr Gln Ser Pro Ala Thr Leu Ser Leu Ser Pro Gly Glu Thr Ala
145                 150                 155                 160

Ile Ile Ser Cys Arg Thr Ser Gln Tyr Gly Ser Leu Ala Trp Tyr Gln
                165                 170                 175

Gln Arg Pro Gly Gln Ala Pro Arg Leu Val Ile Tyr Ser Gly Ser Thr
            180                 185                 190

Arg Ala Ala Gly Ile Pro Asp Arg Phe Ser Gly Ser Arg Trp Gly Ala
        195                 200                 205

Asp Tyr Asn Leu Ser Ile Ser Asn Leu Glu Ser Gly Asp Phe Gly Val
    210                 215                 220

Tyr Tyr Cys Gln Gln Tyr Glu Phe Phe Gly Gln Gly Thr Lys Val Gln
225                 230                 235                 240
```

```
Val Asp Ile Lys Glu Ser Lys Tyr Gly Pro Pro Cys Pro Pro Cys Pro
                245                 250                 255

Ala Pro Glu Phe Glu Gly Gly Pro Ser Val Phe Leu Phe Pro Pro Lys
            260                 265                 270

Pro Lys Asp Thr Leu Met Ile Ser Arg Thr Pro Glu Val Thr Cys Val
        275                 280                 285

Val Val Asp Val Ser Gln Glu Asp Pro Glu Val Gln Phe Asn Trp Tyr
    290                 295                 300

Val Asp Gly Val Glu Val His Asn Ala Lys Thr Lys Pro Arg Glu Glu
305                 310                 315                 320

Gln Phe Gln Ser Thr Tyr Arg Val Val Ser Val Leu Thr Val Leu His
                325                 330                 335

Gln Asp Trp Leu Asn Gly Lys Glu Tyr Lys Cys Lys Val Ser Asn Lys
            340                 345                 350

Gly Leu Pro Ser Ser Ile Glu Lys Thr Ile Ser Lys Ala Lys Gly Gln
        355                 360                 365

Pro Arg Glu Pro Gln Val Tyr Thr Leu Pro Pro Ser Gln Glu Glu Met
    370                 375                 380

Thr Lys Asn Gln Val Ser Leu Thr Cys Leu Val Lys Gly Phe Tyr Pro
385                 390                 395                 400

Ser Asp Ile Ala Val Glu Trp Glu Ser Asn Gly Gln Pro Glu Asn Asn
                405                 410                 415

Tyr Lys Thr Thr Pro Pro Val Leu Asp Ser Asp Gly Ser Phe Phe Leu
            420                 425                 430

Tyr Ser Arg Leu Thr Val Asp Lys Ser Arg Trp Gln Glu Gly Asn Val
        435                 440                 445

Phe Ser Cys Ser Val Met His Glu Ala Leu His Asn His Tyr Thr Gln
    450                 455                 460

Lys Ser Leu Ser Leu Ser Leu Gly Lys Met Ala Leu Ile Val Leu Gly
465                 470                 475                 480

Gly Val Ala Gly Leu Leu Leu Phe Ile Gly Leu Gly Ile Phe Phe Lys
                485                 490                 495

Arg Gly Arg Lys Lys Leu Leu Tyr Ile Phe Lys Gln Pro Phe Met Arg
            500                 505                 510

Pro Val Gln Thr Thr Gln Glu Glu Asp Gly Cys Ser Cys Arg Phe Pro
        515                 520                 525

Glu Glu Glu Glu Gly Gly Cys Glu Leu Gly Gly Gly Arg Val Lys Phe
    530                 535                 540

Ser Arg Ser Ala Asp Ala Pro Ala Tyr Gln Gln Gly Gln Asn Gln Leu
545                 550                 555                 560

Tyr Asn Glu Leu Asn Leu Gly Arg Arg Glu Glu Tyr Asp Val Leu Asp
                565                 570                 575

Lys Arg Arg Gly Arg Asp Pro Glu Met Gly Gly Lys Pro Arg Arg Lys
            580                 585                 590

Asn Pro Gln Glu Gly Leu Tyr Asn Glu Leu Gln Lys Asp Lys Met Ala
        595                 600                 605

Glu Ala Tyr Ser Glu Ile Gly Met Lys Gly Glu Arg Arg Arg Gly Lys
    610                 615                 620

Gly His Asp Gly Leu Tyr Gln Gly Leu Ser Thr Ala Thr Lys Asp Thr
625                 630                 635                 640

Tyr Asp Ala Leu His Met Gln Ala Leu Pro Pro Arg Leu Glu Gly Gly
                645                 650                 655

Gly Glu Gly Arg Gly Ser Leu Leu Thr Cys Gly Asp Val Glu Glu Asn
```

```
            660                 665                 670

Pro Gly Pro Arg
        675


<210> SEQ ID NO 35
<211> LENGTH: 576
<212> TYPE: PRT
<213> ORGANISM: Artificial Sequence
<220> FEATURE:
<223> OTHER INFORMATION: Synthetic polypeptide

<400> SEQUENCE: 35

Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45

Gly Trp Leu Lys Pro Arg Gly Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser Gly Gly Gly
        115                 120                 125

Ser Gly Gly Gly Ser Gly Gly Gly Ser Gly Gly Gly Ser Glu Ile Val
    130                 135                 140

Leu Thr Gln Ser Pro Ala Thr Leu Ser Leu Ser Pro Gly Glu Thr Ala
145                 150                 155                 160

Ile Ile Ser Cys Arg Thr Ser Gln Ser Gly Ser Leu Ala Trp Tyr Gln
                165                 170                 175

Gln Arg Pro Gly Gln Ala Pro Arg Leu Val Ile Tyr Ser Gly Ser Thr
            180                 185                 190

Arg Ala Ala Gly Ile Pro Asp Arg Phe Ser Gly Ser Arg Trp Gly Ala
        195                 200                 205

Asp Tyr Asn Leu Ser Ile Ser Asn Leu Glu Ser Gly Asp Phe Gly Val
    210                 215                 220

Tyr Tyr Cys Gln Gln Tyr Glu Phe Phe Gly Gln Gly Thr Lys Val Gln
225                 230                 235                 240

Val Asp Ile Lys Glu Ser Lys Tyr Gly Pro Pro Cys Pro Pro Cys Pro
                245                 250                 255

Gly Gly Gly Ser Ser Gly Gly Gly Ser Gly Gly Gln Pro Arg Glu Pro
            260                 265                 270

Gln Val Tyr Thr Leu Pro Pro Ser Gln Glu Glu Met Thr Lys Asn Gln
        275                 280                 285

Val Ser Leu Thr Cys Leu Val Lys Gly Phe Tyr Pro Ser Asp Ile Ala
    290                 295                 300

Val Glu Trp Glu Ser Asn Gly Gln Pro Glu Asn Asn Tyr Lys Thr Thr
305                 310                 315                 320

Pro Pro Val Leu Asp Ser Asp Gly Ser Phe Phe Leu Tyr Ser Arg Leu
                325                 330                 335

Thr Val Asp Lys Ser Arg Trp Gln Glu Gly Asn Val Phe Ser Cys Ser
```

```
            340                 345                 350

Val Met His Glu Ala Leu His Asn His Tyr Thr Gln Lys Ser Leu Ser
        355                 360                 365

Leu Ser Leu Gly Lys Met Ala Leu Ile Val Leu Gly Gly Val Ala Gly
    370                 375                 380

Leu Leu Leu Phe Ile Gly Leu Gly Ile Phe Phe Lys Arg Gly Arg Lys
385                 390                 395                 400

Lys Leu Leu Tyr Ile Phe Lys Gln Pro Phe Met Arg Pro Val Gln Thr
                405                 410                 415

Thr Gln Glu Glu Asp Gly Cys Ser Cys Arg Phe Pro Glu Glu Glu Glu
            420                 425                 430

Gly Gly Cys Glu Leu Gly Gly Gly Arg Val Lys Phe Ser Arg Ser Ala
        435                 440                 445

Asp Ala Pro Ala Tyr Gln Gln Gly Gln Asn Gln Leu Tyr Asn Glu Leu
    450                 455                 460

Asn Leu Gly Arg Arg Glu Glu Tyr Asp Val Leu Asp Lys Arg Arg Gly
465                 470                 475                 480

Arg Asp Pro Glu Met Gly Gly Lys Pro Arg Arg Lys Asn Pro Gln Glu
                485                 490                 495

Gly Leu Tyr Asn Glu Leu Gln Lys Asp Lys Met Ala Glu Ala Tyr Ser
            500                 505                 510

Glu Ile Gly Met Lys Gly Glu Arg Arg Arg Gly Lys Gly His Asp Gly
        515                 520                 525

Leu Tyr Gln Gly Leu Ser Thr Ala Thr Lys Asp Thr Tyr Asp Ala Leu
    530                 535                 540

His Met Gln Ala Leu Pro Pro Arg Leu Glu Gly Gly Gly Glu Gly Arg
545                 550                 555                 560

Gly Ser Leu Leu Thr Cys Gly Asp Val Glu Glu Asn Pro Gly Pro Arg
                565                 570                 575


<210> SEQ ID NO 36
<211> LENGTH: 676
<212> TYPE: PRT
<213> ORGANISM: Artificial Sequence
<220> FEATURE:
<223> OTHER INFORMATION: Synthetic polypeptide

<400> SEQUENCE: 36

Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45

Gly Trp Leu Lys Pro Arg Gly Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser Gly Gly Gly
        115                 120                 125

Ser Gly Gly Gly Ser Gly Gly Gly Ser Gly Gly Gly Ser Glu Ile Val
```

```
    130                 135                 140

Leu Thr Gln Ser Pro Ala Thr Leu Ser Leu Ser Pro Gly Glu Thr Ala
145                 150                 155                 160

Ile Ile Ser Cys Arg Thr Ser Gln Ser Gly Ser Leu Ala Trp Tyr Gln
                165                 170                 175

Gln Arg Pro Gly Gln Ala Pro Arg Leu Val Ile Tyr Ser Gly Ser Thr
            180                 185                 190

Arg Ala Ala Gly Ile Pro Asp Arg Phe Ser Gly Ser Arg Trp Gly Ala
        195                 200                 205

Asp Tyr Asn Leu Ser Ile Ser Asn Leu Glu Ser Gly Asp Phe Gly Val
    210                 215                 220

Tyr Tyr Cys Gln Gln Tyr Glu Phe Phe Gly Gln Gly Thr Lys Val Gln
225                 230                 235                 240

Val Asp Ile Lys Glu Ser Lys Tyr Gly Pro Pro Cys Pro Pro Cys Pro
                245                 250                 255

Ala Pro Glu Phe Glu Gly Gly Pro Ser Val Phe Leu Phe Pro Pro Lys
            260                 265                 270

Pro Lys Asp Thr Leu Met Ile Ser Arg Thr Pro Glu Val Thr Cys Val
        275                 280                 285

Val Val Asp Val Ser Gln Glu Asp Pro Glu Val Gln Phe Asn Trp Tyr
    290                 295                 300

Val Asp Gly Val Glu Val His Asn Ala Lys Thr Lys Pro Arg Glu Glu
305                 310                 315                 320

Gln Phe Gln Ser Thr Tyr Arg Val Val Ser Val Leu Thr Val Leu His
                325                 330                 335

Gln Asp Trp Leu Asn Gly Lys Glu Tyr Lys Cys Lys Val Ser Asn Lys
            340                 345                 350

Gly Leu Pro Ser Ser Ile Glu Lys Thr Ile Ser Lys Ala Lys Gly Gln
        355                 360                 365

Pro Arg Glu Pro Gln Val Tyr Thr Leu Pro Pro Ser Gln Glu Glu Met
    370                 375                 380

Thr Lys Asn Gln Val Ser Leu Thr Cys Leu Val Lys Gly Phe Tyr Pro
385                 390                 395                 400

Ser Asp Ile Ala Val Glu Trp Glu Ser Asn Gly Gln Pro Glu Asn Asn
                405                 410                 415

Tyr Lys Thr Thr Pro Pro Val Leu Asp Ser Asp Gly Ser Phe Phe Leu
            420                 425                 430

Tyr Ser Arg Leu Thr Val Asp Lys Ser Arg Trp Gln Glu Gly Asn Val
        435                 440                 445

Phe Ser Cys Ser Val Met His Glu Ala Leu His Asn His Tyr Thr Gln
    450                 455                 460

Lys Ser Leu Ser Leu Ser Leu Gly Lys Met Ala Leu Ile Val Leu Gly
465                 470                 475                 480

Gly Val Ala Gly Leu Leu Leu Phe Ile Gly Leu Gly Ile Phe Phe Lys
                485                 490                 495

Arg Gly Arg Lys Lys Leu Leu Tyr Ile Phe Lys Gln Pro Phe Met Arg
            500                 505                 510

Pro Val Gln Thr Thr Gln Glu Glu Asp Gly Cys Ser Cys Arg Phe Pro
        515                 520                 525

Glu Glu Glu Glu Gly Gly Cys Glu Leu Gly Gly Gly Arg Val Lys Phe
    530                 535                 540

Ser Arg Ser Ala Asp Ala Pro Ala Tyr Gln Gln Gly Gln Asn Gln Leu
545                 550                 555                 560
```

Tyr Asn Glu Leu Asn Leu Gly Arg Arg Glu Glu Tyr Asp Val Leu Asp
565 570 575

Lys Arg Arg Gly Arg Asp Pro Glu Met Gly Gly Lys Pro Arg Arg Lys
580 585 590

Asn Pro Gln Glu Gly Leu Tyr Asn Glu Leu Gln Lys Asp Lys Met Ala
595 600 605

Glu Ala Tyr Ser Glu Ile Gly Met Lys Gly Glu Arg Arg Arg Gly Lys
610 615 620

Gly His Asp Gly Leu Tyr Gln Gly Leu Ser Thr Ala Thr Lys Asp Thr
625 630 635 640

Tyr Asp Ala Leu His Met Gln Ala Leu Pro Pro Arg Leu Glu Gly Gly
645 650 655

Gly Glu Gly Arg Gly Ser Leu Leu Thr Cys Gly Asp Val Glu Glu Asn
660 665 670

Pro Gly Pro Arg
675

<210> SEQ ID NO 37
<211> LENGTH: 465
<212> TYPE: PRT
<213> ORGANISM: Artificial Sequence
<220> FEATURE:
<223> OTHER INFORMATION: Synthetic polypeptide

<400> SEQUENCE: 37

Gln Val Arg Leu Ser Gln Ser Gly Gly Gln Met Lys Lys Pro Gly Glu
1 5 10 15

Ser Met Arg Leu Ser Cys Arg Ala Ser Gly Tyr Glu Phe Leu Asn Cys
20 25 30

Pro Ile Asn Trp Ile Arg Leu Ala Pro Gly Arg Arg Pro Glu Trp Met
35 40 45

Gly Trp Leu Lys Pro Arg Gly Gly Ala Val Asn Tyr Ala Arg Lys Phe
50 55 60

Gln Gly Arg Val Thr Met Thr Arg Asp Val Tyr Ser Asp Thr Ala Phe
65 70 75 80

Leu Glu Leu Arg Ser Leu Thr Ser Asp Asp Thr Ala Val Tyr Phe Cys
85 90 95

Thr Arg Gly Lys Tyr Cys Thr Ala Arg Asp Tyr Tyr Asn Trp Asp Phe
100 105 110

Glu His Trp Gly Arg Gly Ala Pro Val Thr Val Ser Ser Gly Gly Gly
115 120 125

Ser Gly Gly Gly Ser Gly Gly Gly Ser Gly Gly Gly Ser Glu Ile Val
130 135 140

Leu Thr Gln Ser Pro Ala Thr Leu Ser Leu Ser Pro Gly Glu Thr Ala
145 150 155 160

Ile Ile Ser Cys Arg Thr Ser Gln Ser Gly Ser Leu Ala Trp Tyr Gln
165 170 175

Gln Arg Pro Gly Gln Ala Pro Arg Leu Val Ile Tyr Ser Gly Ser Thr
180 185 190

Arg Ala Ala Gly Ile Pro Asp Arg Phe Ser Gly Ser Arg Trp Gly Ala
195 200 205

Asp Tyr Asn Leu Ser Ile Ser Asn Leu Glu Ser Gly Asp Phe Gly Val
210 215 220

Tyr Tyr Cys Gln Gln Tyr Glu Phe Phe Gly Gln Gly Thr Lys Val Gln
225 230 235 240

```
Val Asp Ile Lys Glu Ser Lys Tyr Gly Pro Pro Cys Pro Pro Cys Pro
                245                 250                 255

Met Phe Trp Val Leu Val Val Val Gly Gly Val Leu Ala Cys Tyr Ser
            260                 265                 270

Leu Leu Val Thr Val Ala Phe Ile Ile Phe Trp Val Lys Arg Gly Arg
        275                 280                 285

Lys Lys Leu Leu Tyr Ile Phe Lys Gln Pro Phe Met Arg Pro Val Gln
    290                 295                 300

Thr Thr Gln Glu Glu Asp Gly Cys Ser Cys Arg Phe Pro Glu Glu Glu
305                 310                 315                 320

Glu Gly Gly Cys Glu Leu Gly Gly Gly Arg Val Lys Phe Ser Arg Ser
                325                 330                 335

Ala Asp Ala Pro Ala Tyr Gln Gln Gly Gln Asn Gln Leu Tyr Asn Glu
            340                 345                 350

Leu Asn Leu Gly Arg Arg Glu Glu Tyr Asp Val Leu Asp Lys Arg Arg
        355                 360                 365

Gly Arg Asp Pro Glu Met Gly Gly Lys Pro Arg Arg Lys Asn Pro Gln
    370                 375                 380

Glu Gly Leu Tyr Asn Glu Leu Gln Lys Asp Lys Met Ala Glu Ala Tyr
385                 390                 395                 400

Ser Glu Ile Gly Met Lys Gly Glu Arg Arg Arg Gly Lys Gly His Asp
                405                 410                 415

Gly Leu Tyr Gln Gly Leu Ser Thr Ala Thr Lys Asp Thr Tyr Asp Ala
            420                 425                 430

Leu His Met Gln Ala Leu Pro Pro Arg Leu Glu Gly Gly Gly Glu Gly
        435                 440                 445

Arg Gly Ser Leu Leu Thr Cys Gly Asp Val Glu Glu Asn Pro Gly Pro
    450                 455                 460

Arg
465
```

<210> SEQ ID NO 38
<211> LENGTH: 573
<212> TYPE: PRT
<213> ORGANISM: Artificial Sequence
<220> FEATURE:
<223> OTHER INFORMATION: Synthetic polypeptide

<400> SEQUENCE: 38

```
Arg Ala His Leu Val Gln Ser Gly Thr Ala Met Lys Lys Pro Gly Ala
1               5                   10                  15

Ser Val Arg Val Ser Cys Gln Thr Ser Gly Tyr Thr Phe Thr Ala His
            20                  25                  30

Ile Leu Phe Trp Phe Arg Gln Ala Pro Gly Arg Gly Leu Glu Trp Val
        35                  40                  45

Gly Trp Ile Lys Pro Gln Tyr Gly Ala Val Asn Phe Gly Gly Gly Phe
    50                  55                  60

Arg Asp Arg Val Thr Leu Thr Arg Asp Val Tyr Arg Glu Ile Ala Tyr
65                  70                  75                  80

Met Asp Ile Arg Gly Leu Lys Pro Asp Asp Thr Ala Val Tyr Tyr Cys
                85                  90                  95

Ala Arg Asp Arg Ser Tyr Gly Asp Ser Ser Trp Ala Leu Asp Ala Trp
            100                 105                 110

Gly Gln Gly Thr Thr Val Val Val Ser Ala Gly Gly Gly Ser Gly Gly
        115                 120                 125
```

-continued

```
Gly Ser Gly Gly Gly Ser Gly Gly Gly Ser Tyr Ile His Val Thr Gln
    130                 135                 140

Ser Pro Ser Ser Leu Ser Val Ser Ile Gly Asp Arg Val Thr Ile Asn
145                 150                 155                 160

Cys Gln Thr Ser Gln Gly Val Gly Ser Asp Leu His Trp Tyr Gln His
                165                 170                 175

Lys Pro Gly Arg Ala Pro Lys Leu Leu Ile His His Thr Ser Ser Val
            180                 185                 190

Glu Asp Gly Val Pro Ser Arg Phe Ser Gly Ser Gly Phe His Thr Ser
        195                 200                 205

Phe Asn Leu Thr Ile Ser Asp Leu Gln Ala Asp Asp Ile Ala Thr Tyr
    210                 215                 220

Tyr Cys Gln Val Leu Gln Phe Phe Gly Arg Gly Ser Arg Leu His Ile
225                 230                 235                 240

Lys Glu Ser Lys Tyr Gly Pro Pro Cys Pro Pro Cys Pro Gly Gly Gly
                245                 250                 255

Ser Ser Gly Gly Gly Ser Gly Gly Gln Pro Arg Glu Pro Gln Val Tyr
            260                 265                 270

Thr Leu Pro Pro Ser Gln Glu Glu Met Thr Lys Asn Gln Val Ser Leu
        275                 280                 285

Thr Cys Leu Val Lys Gly Phe Tyr Pro Ser Asp Ile Ala Val Glu Trp
    290                 295                 300

Glu Ser Asn Gly Gln Pro Glu Asn Asn Tyr Lys Thr Thr Pro Pro Val
305                 310                 315                 320

Leu Asp Ser Asp Gly Ser Phe Phe Leu Tyr Ser Arg Leu Thr Val Asp
                325                 330                 335

Lys Ser Arg Trp Gln Glu Gly Asn Val Phe Ser Cys Ser Val Met His
            340                 345                 350

Glu Ala Leu His Asn His Tyr Thr Gln Lys Ser Leu Ser Leu Ser Leu
        355                 360                 365

Gly Lys Met Ala Leu Ile Val Leu Gly Gly Val Ala Gly Leu Leu Leu
    370                 375                 380

Phe Ile Gly Leu Gly Ile Phe Phe Lys Arg Gly Arg Lys Lys Leu Leu
385                 390                 395                 400

Tyr Ile Phe Lys Gln Pro Phe Met Arg Pro Val Gln Thr Thr Gln Glu
                405                 410                 415

Glu Asp Gly Cys Ser Cys Arg Phe Pro Glu Glu Glu Glu Gly Gly Cys
            420                 425                 430

Glu Leu Gly Gly Gly Arg Val Lys Phe Ser Arg Ser Ala Asp Ala Pro
        435                 440                 445

Ala Tyr Gln Gln Gly Gln Asn Gln Leu Tyr Asn Glu Leu Asn Leu Gly
    450                 455                 460

Arg Arg Glu Glu Tyr Asp Val Leu Asp Lys Arg Arg Gly Arg Asp Pro
465                 470                 475                 480

Glu Met Gly Gly Lys Pro Arg Arg Lys Asn Pro Gln Glu Gly Leu Tyr
                485                 490                 495

Asn Glu Leu Gln Lys Asp Lys Met Ala Glu Ala Tyr Ser Glu Ile Gly
            500                 505                 510

Met Lys Gly Glu Arg Arg Arg Gly Lys Gly His Asp Gly Leu Tyr Gln
        515                 520                 525

Gly Leu Ser Thr Ala Thr Lys Asp Thr Tyr Asp Ala Leu His Met Gln
    530                 535                 540
```

```
Ala Leu Pro Pro Arg Leu Glu Gly Gly Gly Glu Gly Arg Gly Ser Leu
545                 550                 555                 560

Leu Thr Cys Gly Asp Val Glu Glu Asn Pro Gly Pro Arg
                565                 570


<210> SEQ ID NO 39
<211> LENGTH: 673
<212> TYPE: PRT
<213> ORGANISM: Artificial Sequence
<220> FEATURE:
<223> OTHER INFORMATION: Synthetic polypeptide

<400> SEQUENCE: 39

Arg Ala His Leu Val Gln Ser Gly Thr Ala Met Lys Lys Pro Gly Ala
1               5                   10                  15

Ser Val Arg Val Ser Cys Gln Thr Ser Gly Tyr Thr Phe Thr Ala His
            20                  25                  30

Ile Leu Phe Trp Phe Arg Gln Ala Pro Gly Arg Gly Leu Glu Trp Val
        35                  40                  45

Gly Trp Ile Lys Pro Gln Tyr Gly Ala Val Asn Phe Gly Gly Gly Phe
    50                  55                  60

Arg Asp Arg Val Thr Leu Thr Arg Asp Val Tyr Arg Glu Ile Ala Tyr
65                  70                  75                  80

Met Asp Ile Arg Gly Leu Lys Pro Asp Asp Thr Ala Val Tyr Tyr Cys
                85                  90                  95

Ala Arg Asp Arg Ser Tyr Gly Asp Ser Ser Trp Ala Leu Asp Ala Trp
            100                 105                 110

Gly Gln Gly Thr Thr Val Val Val Ser Ala Gly Gly Gly Ser Gly Gly
        115                 120                 125

Gly Ser Gly Gly Gly Ser Gly Gly Gly Ser Tyr Ile His Val Thr Gln
    130                 135                 140

Ser Pro Ser Ser Leu Ser Val Ser Ile Gly Asp Arg Val Thr Ile Asn
145                 150                 155                 160

Cys Gln Thr Ser Gln Gly Val Gly Ser Asp Leu His Trp Tyr Gln His
                165                 170                 175

Lys Pro Gly Arg Ala Pro Lys Leu Leu Ile His His Thr Ser Ser Val
            180                 185                 190

Glu Asp Gly Val Pro Ser Arg Phe Ser Gly Ser Gly Phe His Thr Ser
        195                 200                 205

Phe Asn Leu Thr Ile Ser Asp Leu Gln Ala Asp Asp Ile Ala Thr Tyr
    210                 215                 220

Tyr Cys Gln Val Leu Gln Phe Phe Gly Arg Gly Ser Arg Leu His Ile
225                 230                 235                 240

Lys Glu Ser Lys Tyr Gly Pro Pro Cys Pro Pro Cys Pro Ala Pro Glu
                245                 250                 255

Phe Glu Gly Gly Pro Ser Val Phe Leu Phe Pro Pro Lys Pro Lys Asp
            260                 265                 270

Thr Leu Met Ile Ser Arg Thr Pro Glu Val Thr Cys Val Val Val Asp
        275                 280                 285

Val Ser Gln Glu Asp Pro Glu Val Gln Phe Asn Trp Tyr Val Asp Gly
    290                 295                 300

Val Glu Val His Asn Ala Lys Thr Lys Pro Arg Glu Glu Gln Phe Gln
305                 310                 315                 320

Ser Thr Tyr Arg Val Val Ser Val Leu Thr Val Leu His Gln Asp Trp
                325                 330                 335
```

```
Leu Asn Gly Lys Glu Tyr Lys Cys Lys Val Ser Asn Lys Gly Leu Pro
            340                 345                 350

Ser Ser Ile Glu Lys Thr Ile Ser Lys Ala Lys Gly Gln Pro Arg Glu
        355                 360                 365

Pro Gln Val Tyr Thr Leu Pro Pro Ser Gln Glu Glu Met Thr Lys Asn
    370                 375                 380

Gln Val Ser Leu Thr Cys Leu Val Lys Gly Phe Tyr Pro Ser Asp Ile
385                 390                 395                 400

Ala Val Glu Trp Glu Ser Asn Gly Gln Pro Glu Asn Asn Tyr Lys Thr
                405                 410                 415

Thr Pro Pro Val Leu Asp Ser Asp Gly Ser Phe Phe Leu Tyr Ser Arg
            420                 425                 430

Leu Thr Val Asp Lys Ser Arg Trp Gln Glu Gly Asn Val Phe Ser Cys
        435                 440                 445

Ser Val Met His Glu Ala Leu His Asn His Tyr Thr Gln Lys Ser Leu
    450                 455                 460

Ser Leu Ser Leu Gly Lys Met Ala Leu Ile Val Leu Gly Gly Val Ala
465                 470                 475                 480

Gly Leu Leu Leu Phe Ile Gly Leu Gly Ile Phe Phe Lys Arg Gly Arg
                485                 490                 495

Lys Lys Leu Leu Tyr Ile Phe Lys Gln Pro Phe Met Arg Pro Val Gln
            500                 505                 510

Thr Thr Gln Glu Glu Asp Gly Cys Ser Cys Arg Phe Pro Glu Glu Glu
        515                 520                 525

Glu Gly Gly Cys Glu Leu Gly Gly Gly Arg Val Lys Phe Ser Arg Ser
    530                 535                 540

Ala Asp Ala Pro Ala Tyr Gln Gln Gly Gln Asn Gln Leu Tyr Asn Glu
545                 550                 555                 560

Leu Asn Leu Gly Arg Arg Glu Glu Tyr Asp Val Leu Asp Lys Arg Arg
                565                 570                 575

Gly Arg Asp Pro Glu Met Gly Gly Lys Pro Arg Arg Lys Asn Pro Gln
            580                 585                 590

Glu Gly Leu Tyr Asn Glu Leu Gln Lys Asp Lys Met Ala Glu Ala Tyr
        595                 600                 605

Ser Glu Ile Gly Met Lys Gly Glu Arg Arg Arg Gly Lys Gly His Asp
    610                 615                 620

Gly Leu Tyr Gln Gly Leu Ser Thr Ala Thr Lys Asp Thr Tyr Asp Ala
625                 630                 635                 640

Leu His Met Gln Ala Leu Pro Pro Arg Leu Glu Gly Gly Gly Glu Gly
                645                 650                 655

Arg Gly Ser Leu Leu Thr Cys Gly Asp Val Glu Glu Asn Pro Gly Pro
            660                 665                 670

Arg
```

<210> SEQ ID NO 40
<211> LENGTH: 462
<212> TYPE: PRT
<213> ORGANISM: Artificial Sequence
<220> FEATURE:
<223> OTHER INFORMATION: Synthetic polypeptide

<400> SEQUENCE: 40

```
Arg Ala His Leu Val Gln Ser Gly Thr Ala Met Lys Lys Pro Gly Ala
1               5                   10                  15

Ser Val Arg Val Ser Cys Gln Thr Ser Gly Tyr Thr Phe Thr Ala His
```

```
            20                  25                  30

Ile Leu Phe Trp Phe Arg Gln Ala Pro Gly Arg Gly Leu Glu Trp Val
        35                  40                  45

Gly Trp Ile Lys Pro Gln Tyr Gly Ala Val Asn Phe Gly Gly Gly Phe
    50                  55                  60

Arg Asp Arg Val Thr Leu Thr Arg Asp Val Tyr Arg Glu Ile Ala Tyr
65                  70                  75                  80

Met Asp Ile Arg Gly Leu Lys Pro Asp Asp Thr Ala Val Tyr Tyr Cys
                85                  90                  95

Ala Arg Asp Arg Ser Tyr Gly Asp Ser Ser Trp Ala Leu Asp Ala Trp
            100                 105                 110

Gly Gln Gly Thr Thr Val Val Val Ser Ala Gly Gly Gly Ser Gly Gly
        115                 120                 125

Gly Ser Gly Gly Gly Ser Gly Gly Gly Ser Tyr Ile His Val Thr Gln
    130                 135                 140

Ser Pro Ser Ser Leu Ser Val Ser Ile Gly Asp Arg Val Thr Ile Asn
145                 150                 155                 160

Cys Gln Thr Ser Gln Gly Val Gly Ser Asp Leu His Trp Tyr Gln His
                165                 170                 175

Lys Pro Gly Arg Ala Pro Lys Leu Leu Ile His His Thr Ser Ser Val
            180                 185                 190

Glu Asp Gly Val Pro Ser Arg Phe Ser Gly Ser Gly Phe His Thr Ser
        195                 200                 205

Phe Asn Leu Thr Ile Ser Asp Leu Gln Ala Asp Asp Ile Ala Thr Tyr
    210                 215                 220

Tyr Cys Gln Val Leu Gln Phe Phe Gly Arg Gly Ser Arg Leu His Ile
225                 230                 235                 240

Lys Glu Ser Lys Tyr Gly Pro Pro Cys Pro Pro Cys Pro Met Phe Trp
                245                 250                 255

Val Leu Val Val Val Gly Gly Val Leu Ala Cys Tyr Ser Leu Leu Val
            260                 265                 270

Thr Val Ala Phe Ile Ile Phe Trp Val Lys Arg Gly Arg Lys Lys Leu
        275                 280                 285

Leu Tyr Ile Phe Lys Gln Pro Phe Met Arg Pro Val Gln Thr Thr Gln
    290                 295                 300

Glu Glu Asp Gly Cys Ser Cys Arg Phe Pro Glu Glu Glu Glu Gly Gly
305                 310                 315                 320

Cys Glu Leu Gly Gly Gly Arg Val Lys Phe Ser Arg Ser Ala Asp Ala
                325                 330                 335

Pro Ala Tyr Gln Gln Gly Gln Asn Gln Leu Tyr Asn Glu Leu Asn Leu
            340                 345                 350

Gly Arg Arg Glu Glu Tyr Asp Val Leu Asp Lys Arg Arg Gly Arg Asp
        355                 360                 365

Pro Glu Met Gly Gly Lys Pro Arg Arg Lys Asn Pro Gln Glu Gly Leu
    370                 375                 380

Tyr Asn Glu Leu Gln Lys Asp Lys Met Ala Glu Ala Tyr Ser Glu Ile
385                 390                 395                 400

Gly Met Lys Gly Glu Arg Arg Arg Gly Lys Gly His Asp Gly Leu Tyr
                405                 410                 415

Gln Gly Leu Ser Thr Ala Thr Lys Asp Thr Tyr Asp Ala Leu His Met
            420                 425                 430

Gln Ala Leu Pro Pro Arg Leu Glu Gly Gly Gly Glu Gly Arg Gly Ser
        435                 440                 445
```

Leu Leu Thr Cys Gly Asp Val Glu Glu Asn Pro Gly Pro Arg
450 455 460

<210> SEQ ID NO 41
<211> LENGTH: 955
<212> TYPE: PRT
<213> ORGANISM: Artificial Sequence
<220> FEATURE:
<223> OTHER INFORMATION: Synthetic polypeptide

<400> SEQUENCE: 41

Met Leu Leu Leu Val Thr Ser Leu Leu Leu Cys Glu Leu Pro His Pro
1 5 10 15

Ala Phe Leu Leu Ile Pro Gln Val Arg Leu Ser Gln Ser Gly Gly Gln
20 25 30

Met Lys Lys Pro Gly Glu Ser Met Arg Leu Ser Cys Arg Ala Ser Gly
35 40 45

Tyr Glu Phe Leu Asn Cys Pro Ile Asn Trp Ile Arg Leu Ala Pro Gly
50 55 60

Arg Arg Pro Glu Trp Met Gly Trp Leu Lys Pro Arg Trp Gly Ala Val
65 70 75 80

Asn Tyr Ala Arg Lys Phe Gln Gly Arg Val Thr Met Thr Arg Asp Val
85 90 95

Tyr Ser Asp Thr Ala Phe Leu Glu Leu Arg Ser Leu Thr Ser Asp Asp
100 105 110

Thr Ala Val Tyr Phe Cys Thr Arg Gly Lys Tyr Cys Thr Ala Arg Asp
115 120 125

Tyr Tyr Asn Trp Asp Phe Glu His Trp Gly Arg Gly Ala Pro Val Thr
130 135 140

Val Ser Ser Gly Gly Gly Ser Gly Gly Gly Ser Gly Gly Gly Ser Gly
145 150 155 160

Gly Gly Ser Glu Ile Val Leu Thr Gln Ser Pro Ala Thr Leu Ser Leu
165 170 175

Ser Pro Gly Glu Thr Ala Ile Ile Ser Cys Arg Thr Ser Gln Ser Gly
180 185 190

Ser Leu Ala Trp Tyr Gln Gln Arg Pro Gly Gln Ala Pro Arg Leu Val
195 200 205

Ile Tyr Ser Gly Ser Thr Arg Ala Ala Gly Ile Pro Asp Arg Phe Ser
210 215 220

Gly Ser Arg Trp Gly Ala Asp Tyr Asn Leu Ser Ile Ser Asn Leu Glu
225 230 235 240

Ser Gly Asp Phe Gly Val Tyr Tyr Cys Gln Gln Tyr Glu Phe Phe Gly
245 250 255

Gln Gly Thr Lys Val Gln Val Asp Ile Lys Glu Ser Lys Tyr Gly Pro
260 265 270

Pro Cys Pro Pro Cys Pro Gly Gly Gly Ser Ser Gly Gly Gly Ser Gly
275 280 285

Gly Gln Pro Arg Glu Pro Gln Val Tyr Thr Leu Pro Pro Ser Gln Glu
290 295 300

Glu Met Thr Lys Asn Gln Val Ser Leu Thr Cys Leu Val Lys Gly Phe
305 310 315 320

Tyr Pro Ser Asp Ile Ala Val Glu Trp Glu Ser Asn Gly Gln Pro Glu
325 330 335

Asn Asn Tyr Lys Thr Thr Pro Pro Val Leu Asp Ser Asp Gly Ser Phe
340 345 350

```
Phe Leu Tyr Ser Arg Leu Thr Val Asp Lys Ser Arg Trp Gln Glu Gly
        355                 360                 365

Asn Val Phe Ser Cys Ser Val Met His Glu Ala Leu His Asn His Tyr
    370                 375                 380

Thr Gln Lys Ser Leu Ser Leu Ser Leu Gly Lys Met Ala Leu Ile Val
385                 390                 395                 400

Leu Gly Gly Val Ala Gly Leu Leu Leu Phe Ile Gly Leu Gly Ile Phe
                405                 410                 415

Phe Lys Arg Gly Arg Lys Lys Leu Leu Tyr Ile Phe Lys Gln Pro Phe
            420                 425                 430

Met Arg Pro Val Gln Thr Thr Gln Glu Glu Asp Gly Cys Ser Cys Arg
        435                 440                 445

Phe Pro Glu Glu Glu Glu Gly Gly Cys Glu Leu Gly Gly Gly Arg Val
    450                 455                 460

Lys Phe Ser Arg Ser Ala Asp Ala Pro Ala Tyr Gln Gln Gly Gln Asn
465                 470                 475                 480

Gln Leu Tyr Asn Glu Leu Asn Leu Gly Arg Arg Glu Glu Tyr Asp Val
                485                 490                 495

Leu Asp Lys Arg Arg Gly Arg Asp Pro Glu Met Gly Gly Lys Pro Arg
            500                 505                 510

Arg Lys Asn Pro Gln Glu Gly Leu Tyr Asn Glu Leu Gln Lys Asp Lys
        515                 520                 525

Met Ala Glu Ala Tyr Ser Glu Ile Gly Met Lys Gly Glu Arg Arg Arg
    530                 535                 540

Gly Lys Gly His Asp Gly Leu Tyr Gln Gly Leu Ser Thr Ala Thr Lys
545                 550                 555                 560

Asp Thr Tyr Asp Ala Leu His Met Gln Ala Leu Pro Pro Arg Leu Glu
                565                 570                 575

Gly Gly Gly Glu Gly Arg Gly Ser Leu Leu Thr Cys Gly Asp Val Glu
            580                 585                 590

Glu Asn Pro Gly Pro Arg Met Leu Leu Leu Val Thr Ser Leu Leu Leu
        595                 600                 605

Cys Glu Leu Pro His Pro Ala Phe Leu Leu Ile Pro Arg Lys Val Cys
    610                 615                 620

Asn Gly Ile Gly Ile Gly Glu Phe Lys Asp Ser Leu Ser Ile Asn Ala
625                 630                 635                 640

Thr Asn Ile Lys His Phe Lys Asn Cys Thr Ser Ile Ser Gly Asp Leu
                645                 650                 655

His Ile Leu Pro Val Ala Phe Arg Gly Asp Ser Phe Thr His Thr Pro
            660                 665                 670

Pro Leu Asp Pro Gln Glu Leu Asp Ile Leu Lys Thr Val Lys Glu Ile
        675                 680                 685

Thr Gly Phe Leu Leu Ile Gln Ala Trp Pro Glu Asn Arg Thr Asp Leu
    690                 695                 700

His Ala Phe Glu Asn Leu Glu Ile Ile Arg Gly Arg Thr Lys Gln His
705                 710                 715                 720

Gly Gln Phe Ser Leu Ala Val Val Ser Leu Asn Ile Thr Ser Leu Gly
                725                 730                 735

Leu Arg Ser Leu Lys Glu Ile Ser Asp Gly Asp Val Ile Ile Ser Gly
            740                 745                 750

Asn Lys Asn Leu Cys Tyr Ala Asn Thr Ile Asn Trp Lys Lys Leu Phe
        755                 760                 765
```

Gly Thr Ser Gly Gln Lys Thr Lys Ile Ile Ser Asn Arg Gly Glu Asn
770 775 780

Ser Cys Lys Ala Thr Gly Gln Val Cys His Ala Leu Cys Ser Pro Glu
785 790 795 800

Gly Cys Trp Gly Pro Glu Pro Arg Asp Cys Val Ser Cys Arg Asn Val
805 810 815

Ser Arg Gly Arg Glu Cys Val Asp Lys Cys Asn Leu Leu Glu Gly Glu
820 825 830

Pro Arg Glu Phe Val Glu Asn Ser Glu Cys Ile Gln Cys His Pro Glu
835 840 845

Cys Leu Pro Gln Ala Met Asn Ile Thr Cys Thr Gly Arg Gly Pro Asp
850 855 860

Asn Cys Ile Gln Cys Ala His Tyr Ile Asp Gly Pro His Cys Val Lys
865 870 875 880

Thr Cys Pro Ala Gly Val Met Gly Glu Asn Asn Thr Leu Val Trp Lys
885 890 895

Tyr Ala Asp Ala Gly His Val Cys His Leu Cys His Pro Asn Cys Thr
900 905 910

Tyr Gly Cys Thr Gly Pro Gly Leu Glu Gly Cys Pro Thr Asn Gly Pro
915 920 925

Lys Ile Pro Ser Ile Ala Thr Gly Met Val Gly Ala Leu Leu Leu Leu
930 935 940

Leu Val Val Ala Leu Gly Ile Gly Leu Phe Met
945 950 955

<210> SEQ ID NO 42
<211> LENGTH: 1055
<212> TYPE: PRT
<213> ORGANISM: Artificial Sequence
<220> FEATURE:
<223> OTHER INFORMATION: Synthetic polypeptide

<400> SEQUENCE: 42

Met Leu Leu Leu Val Thr Ser Leu Leu Leu Cys Glu Leu Pro His Pro
1 5 10 15

Ala Phe Leu Leu Ile Pro Gln Val Arg Leu Ser Gln Ser Gly Gly Gln
20 25 30

Met Lys Lys Pro Gly Glu Ser Met Arg Leu Ser Cys Arg Ala Ser Gly
35 40 45

Tyr Glu Phe Leu Asn Cys Pro Ile Asn Trp Ile Arg Leu Ala Pro Gly
50 55 60

Arg Arg Pro Glu Trp Met Gly Trp Leu Lys Pro Arg Trp Gly Ala Val
65 70 75 80

Asn Tyr Ala Arg Lys Phe Gln Gly Arg Val Thr Met Thr Arg Asp Val
85 90 95

Tyr Ser Asp Thr Ala Phe Leu Glu Leu Arg Ser Leu Thr Ser Asp Asp
100 105 110

Thr Ala Val Tyr Phe Cys Thr Arg Gly Lys Tyr Cys Thr Ala Arg Asp
115 120 125

Tyr Tyr Asn Trp Asp Phe Glu His Trp Gly Arg Gly Ala Pro Val Thr
130 135 140

Val Ser Ser Gly Gly Gly Ser Gly Gly Gly Ser Gly Gly Gly Ser Gly
145 150 155 160

Gly Gly Ser Glu Ile Val Leu Thr Gln Ser Pro Ala Thr Leu Ser Leu
165 170 175

```
Ser Pro Gly Glu Thr Ala Ile Ile Ser Cys Arg Thr Ser Gln Ser Gly
            180                 185                 190

Ser Leu Ala Trp Tyr Gln Gln Arg Pro Gly Gln Ala Pro Arg Leu Val
        195                 200                 205

Ile Tyr Ser Gly Ser Thr Arg Ala Ala Gly Ile Pro Asp Arg Phe Ser
    210                 215                 220

Gly Ser Arg Trp Gly Ala Asp Tyr Asn Leu Ser Ile Ser Asn Leu Glu
225                 230                 235                 240

Ser Gly Asp Phe Gly Val Tyr Tyr Cys Gln Gln Tyr Glu Phe Phe Gly
                245                 250                 255

Gln Gly Thr Lys Val Gln Val Asp Ile Lys Glu Ser Lys Tyr Gly Pro
            260                 265                 270

Pro Cys Pro Pro Cys Pro Ala Pro Glu Phe Glu Gly Gly Pro Ser Val
        275                 280                 285

Phe Leu Phe Pro Pro Lys Pro Lys Asp Thr Leu Met Ile Ser Arg Thr
    290                 295                 300

Pro Glu Val Thr Cys Val Val Val Asp Val Ser Gln Glu Asp Pro Glu
305                 310                 315                 320

Val Gln Phe Asn Trp Tyr Val Asp Gly Val Glu Val His Asn Ala Lys
                325                 330                 335

Thr Lys Pro Arg Glu Glu Gln Phe Gln Ser Thr Tyr Arg Val Val Ser
            340                 345                 350

Val Leu Thr Val Leu His Gln Asp Trp Leu Asn Gly Lys Glu Tyr Lys
        355                 360                 365

Cys Lys Val Ser Asn Lys Gly Leu Pro Ser Ser Ile Glu Lys Thr Ile
    370                 375                 380

Ser Lys Ala Lys Gly Gln Pro Arg Glu Pro Gln Val Tyr Thr Leu Pro
385                 390                 395                 400

Pro Ser Gln Glu Glu Met Thr Lys Asn Gln Val Ser Leu Thr Cys Leu
                405                 410                 415

Val Lys Gly Phe Tyr Pro Ser Asp Ile Ala Val Glu Trp Glu Ser Asn
            420                 425                 430

Gly Gln Pro Glu Asn Asn Tyr Lys Thr Thr Pro Pro Val Leu Asp Ser
        435                 440                 445

Asp Gly Ser Phe Phe Leu Tyr Ser Arg Leu Thr Val Asp Lys Ser Arg
    450                 455                 460

Trp Gln Glu Gly Asn Val Phe Ser Cys Ser Val Met His Glu Ala Leu
465                 470                 475                 480

His Asn His Tyr Thr Gln Lys Ser Leu Ser Leu Ser Leu Gly Lys Met
                485                 490                 495

Ala Leu Ile Val Leu Gly Gly Val Ala Gly Leu Leu Leu Phe Ile Gly
            500                 505                 510

Leu Gly Ile Phe Phe Lys Arg Gly Arg Lys Lys Leu Leu Tyr Ile Phe
        515                 520                 525

Lys Gln Pro Phe Met Arg Pro Val Gln Thr Thr Gln Glu Glu Asp Gly
    530                 535                 540

Cys Ser Cys Arg Phe Pro Glu Glu Glu Glu Gly Gly Cys Glu Leu Gly
545                 550                 555                 560

Gly Gly Arg Val Lys Phe Ser Arg Ser Ala Asp Ala Pro Ala Tyr Gln
                565                 570                 575

Gln Gly Gln Asn Gln Leu Tyr Asn Glu Leu Asn Leu Gly Arg Arg Glu
            580                 585                 590

Glu Tyr Asp Val Leu Asp Lys Arg Arg Gly Arg Asp Pro Glu Met Gly
```

```
        595                 600                 605

Gly Lys Pro Arg Arg Lys Asn Pro Gln Glu Gly Leu Tyr Asn Glu Leu
    610                 615                 620

Gln Lys Asp Lys Met Ala Glu Ala Tyr Ser Glu Ile Gly Met Lys Gly
625                 630                 635                 640

Glu Arg Arg Arg Gly Lys Gly His Asp Gly Leu Tyr Gln Gly Leu Ser
                645                 650                 655

Thr Ala Thr Lys Asp Thr Tyr Asp Ala Leu His Met Gln Ala Leu Pro
            660                 665                 670

Pro Arg Leu Glu Gly Gly Gly Glu Gly Arg Gly Ser Leu Leu Thr Cys
        675                 680                 685

Gly Asp Val Glu Glu Asn Pro Gly Pro Arg Met Leu Leu Leu Val Thr
    690                 695                 700

Ser Leu Leu Leu Cys Glu Leu Pro His Pro Ala Phe Leu Leu Ile Pro
705                 710                 715                 720

Arg Lys Val Cys Asn Gly Ile Gly Ile Gly Glu Phe Lys Asp Ser Leu
                725                 730                 735

Ser Ile Asn Ala Thr Asn Ile Lys His Phe Lys Asn Cys Thr Ser Ile
            740                 745                 750

Ser Gly Asp Leu His Ile Leu Pro Val Ala Phe Arg Gly Asp Ser Phe
        755                 760                 765

Thr His Thr Pro Pro Leu Asp Pro Gln Glu Leu Asp Ile Leu Lys Thr
    770                 775                 780

Val Lys Glu Ile Thr Gly Phe Leu Leu Ile Gln Ala Trp Pro Glu Asn
785                 790                 795                 800

Arg Thr Asp Leu His Ala Phe Glu Asn Leu Glu Ile Ile Arg Gly Arg
                805                 810                 815

Thr Lys Gln His Gly Gln Phe Ser Leu Ala Val Val Ser Leu Asn Ile
            820                 825                 830

Thr Ser Leu Gly Leu Arg Ser Leu Lys Glu Ile Ser Asp Gly Asp Val
        835                 840                 845

Ile Ile Ser Gly Asn Lys Asn Leu Cys Tyr Ala Asn Thr Ile Asn Trp
    850                 855                 860

Lys Lys Leu Phe Gly Thr Ser Gly Gln Lys Thr Lys Ile Ile Ser Asn
865                 870                 875                 880

Arg Gly Glu Asn Ser Cys Lys Ala Thr Gly Gln Val Cys His Ala Leu
                885                 890                 895

Cys Ser Pro Glu Gly Cys Trp Gly Pro Glu Pro Arg Asp Cys Val Ser
            900                 905                 910

Cys Arg Asn Val Ser Arg Gly Arg Glu Cys Val Asp Lys Cys Asn Leu
        915                 920                 925

Leu Glu Gly Glu Pro Arg Glu Phe Val Glu Asn Ser Glu Cys Ile Gln
    930                 935                 940

Cys His Pro Glu Cys Leu Pro Gln Ala Met Asn Ile Thr Cys Thr Gly
945                 950                 955                 960

Arg Gly Pro Asp Asn Cys Ile Gln Cys Ala His Tyr Ile Asp Gly Pro
                965                 970                 975

His Cys Val Lys Thr Cys Pro Ala Gly Val Met Gly Glu Asn Asn Thr
            980                 985                 990

Leu Val Trp Lys Tyr Ala Asp Ala  Gly His Val Cys His  Leu Cys His
        995                 1000                1005

Pro Asn  Cys Thr Tyr Gly Cys  Thr Gly Pro Gly Leu  Glu Gly Cys
    1010                1015                1020
```

Pro Thr Asn Gly Pro Lys Ile Pro Ser Ile Ala Thr Gly Met Val
1025 1030 1035

Gly Ala Leu Leu Leu Leu Leu Val Val Ala Leu Gly Ile Gly Leu
1040 1045 1050

Phe Met
1055

<210> SEQ ID NO 43
<211> LENGTH: 844
<212> TYPE: PRT
<213> ORGANISM: Artificial Sequence
<220> FEATURE:
<223> OTHER INFORMATION: Synthetic polypeptide

<400> SEQUENCE: 43

Met Leu Leu Leu Val Thr Ser Leu Leu Leu Cys Glu Leu Pro His Pro
1 5 10 15

Ala Phe Leu Leu Ile Pro Gln Val Arg Leu Ser Gln Ser Gly Gly Gln
20 25 30

Met Lys Lys Pro Gly Glu Ser Met Arg Leu Ser Cys Arg Ala Ser Gly
35 40 45

Tyr Glu Phe Leu Asn Cys Pro Ile Asn Trp Ile Arg Leu Ala Pro Gly
50 55 60

Arg Arg Pro Glu Trp Met Gly Trp Leu Lys Pro Arg Trp Gly Ala Val
65 70 75 80

Asn Tyr Ala Arg Lys Phe Gln Gly Arg Val Thr Met Thr Arg Asp Val
85 90 95

Tyr Ser Asp Thr Ala Phe Leu Glu Leu Arg Ser Leu Thr Ser Asp Asp
100 105 110

Thr Ala Val Tyr Phe Cys Thr Arg Gly Lys Tyr Cys Thr Ala Arg Asp
115 120 125

Tyr Tyr Asn Trp Asp Phe Glu His Trp Gly Arg Gly Ala Pro Val Thr
130 135 140

Val Ser Ser Gly Gly Gly Ser Gly Gly Gly Ser Gly Gly Gly Ser Gly
145 150 155 160

Gly Gly Ser Glu Ile Val Leu Thr Gln Ser Pro Ala Thr Leu Ser Leu
165 170 175

Ser Pro Gly Glu Thr Ala Ile Ile Ser Cys Arg Thr Ser Gln Ser Gly
180 185 190

Ser Leu Ala Trp Tyr Gln Gln Arg Pro Gly Gln Ala Pro Arg Leu Val
195 200 205

Ile Tyr Ser Gly Ser Thr Arg Ala Ala Gly Ile Pro Asp Arg Phe Ser
210 215 220

Gly Ser Arg Trp Gly Ala Asp Tyr Asn Leu Ser Ile Ser Asn Leu Glu
225 230 235 240

Ser Gly Asp Phe Gly Val Tyr Tyr Cys Gln Gln Tyr Glu Phe Phe Gly
245 250 255

Gln Gly Thr Lys Val Gln Val Asp Ile Lys Glu Ser Lys Tyr Gly Pro
260 265 270

Pro Cys Pro Pro Cys Pro Met Phe Trp Val Leu Val Val Val Gly Gly
275 280 285

Val Leu Ala Cys Tyr Ser Leu Leu Val Thr Val Ala Phe Ile Ile Phe
290 295 300

Trp Val Lys Arg Gly Arg Lys Lys Leu Leu Tyr Ile Phe Lys Gln Pro
305 310 315 320

-continued

```
Phe Met Arg Pro Val Gln Thr Thr Gln Glu Glu Asp Gly Cys Ser Cys
                325                 330                 335

Arg Phe Pro Glu Glu Glu Glu Gly Gly Cys Glu Leu Gly Gly Gly Arg
            340                 345                 350

Val Lys Phe Ser Arg Ser Ala Asp Ala Pro Ala Tyr Gln Gln Gly Gln
        355                 360                 365

Asn Gln Leu Tyr Asn Glu Leu Asn Leu Gly Arg Arg Glu Glu Tyr Asp
    370                 375                 380

Val Leu Asp Lys Arg Arg Gly Arg Asp Pro Glu Met Gly Gly Lys Pro
385                 390                 395                 400

Arg Arg Lys Asn Pro Gln Glu Gly Leu Tyr Asn Glu Leu Gln Lys Asp
                405                 410                 415

Lys Met Ala Glu Ala Tyr Ser Glu Ile Gly Met Lys Gly Glu Arg Arg
            420                 425                 430

Arg Gly Lys Gly His Asp Gly Leu Tyr Gln Gly Leu Ser Thr Ala Thr
        435                 440                 445

Lys Asp Thr Tyr Asp Ala Leu His Met Gln Ala Leu Pro Pro Arg Leu
    450                 455                 460

Glu Gly Gly Gly Glu Gly Arg Gly Ser Leu Leu Thr Cys Gly Asp Val
465                 470                 475                 480

Glu Glu Asn Pro Gly Pro Arg Met Leu Leu Leu Val Thr Ser Leu Leu
                485                 490                 495

Leu Cys Glu Leu Pro His Pro Ala Phe Leu Leu Ile Pro Arg Lys Val
            500                 505                 510

Cys Asn Gly Ile Gly Ile Gly Glu Phe Lys Asp Ser Leu Ser Ile Asn
        515                 520                 525

Ala Thr Asn Ile Lys His Phe Lys Asn Cys Thr Ser Ile Ser Gly Asp
    530                 535                 540

Leu His Ile Leu Pro Val Ala Phe Arg Gly Asp Ser Phe Thr His Thr
545                 550                 555                 560

Pro Pro Leu Asp Pro Gln Glu Leu Asp Ile Leu Lys Thr Val Lys Glu
                565                 570                 575

Ile Thr Gly Phe Leu Leu Ile Gln Ala Trp Pro Glu Asn Arg Thr Asp
            580                 585                 590

Leu His Ala Phe Glu Asn Leu Glu Ile Ile Arg Gly Arg Thr Lys Gln
        595                 600                 605

His Gly Gln Phe Ser Leu Ala Val Val Ser Leu Asn Ile Thr Ser Leu
    610                 615                 620

Gly Leu Arg Ser Leu Lys Glu Ile Ser Asp Gly Asp Val Ile Ile Ser
625                 630                 635                 640

Gly Asn Lys Asn Leu Cys Tyr Ala Asn Thr Ile Asn Trp Lys Lys Leu
                645                 650                 655

Phe Gly Thr Ser Gly Gln Lys Thr Lys Ile Ile Ser Asn Arg Gly Glu
            660                 665                 670

Asn Ser Cys Lys Ala Thr Gly Gln Val Cys His Ala Leu Cys Ser Pro
        675                 680                 685

Glu Gly Cys Trp Gly Pro Glu Pro Arg Asp Cys Val Ser Cys Arg Asn
    690                 695                 700

Val Ser Arg Gly Arg Glu Cys Val Asp Lys Cys Asn Leu Leu Glu Gly
705                 710                 715                 720

Glu Pro Arg Glu Phe Val Glu Asn Ser Glu Cys Ile Gln Cys His Pro
                725                 730                 735
```

```
Glu Cys Leu Pro Gln Ala Met Asn Ile Thr Cys Thr Gly Arg Gly Pro
            740                 745                 750

Asp Asn Cys Ile Gln Cys Ala His Tyr Ile Asp Gly Pro His Cys Val
        755                 760                 765

Lys Thr Cys Pro Ala Gly Val Met Gly Glu Asn Asn Thr Leu Val Trp
    770                 775                 780

Lys Tyr Ala Asp Ala Gly His Val Cys His Leu Cys His Pro Asn Cys
785                 790                 795                 800

Thr Tyr Gly Cys Thr Gly Pro Gly Leu Glu Gly Cys Pro Thr Asn Gly
                805                 810                 815

Pro Lys Ile Pro Ser Ile Ala Thr Gly Met Val Gly Ala Leu Leu Leu
            820                 825                 830

Leu Leu Val Val Ala Leu Gly Ile Gly Leu Phe Met
        835                 840


<210> SEQ ID NO 44
<211> LENGTH: 955
<212> TYPE: PRT
<213> ORGANISM: Artificial Sequence
<220> FEATURE:
<223> OTHER INFORMATION: Synthetic polypeptide

<400> SEQUENCE: 44

Met Leu Leu Leu Val Thr Ser Leu Leu Leu Cys Glu Leu Pro His Pro
1               5                   10                  15

Ala Phe Leu Leu Ile Pro Gln Val Arg Leu Ser Gln Ser Gly Gly Gln
            20                  25                  30

Met Lys Lys Pro Gly Glu Ser Met Arg Leu Ser Cys Arg Ala Ser Gly
        35                  40                  45

Tyr Glu Phe Leu Asn Cys Pro Ile Asn Trp Ile Arg Leu Ala Pro Gly
    50                  55                  60

Arg Arg Pro Glu Trp Met Gly Trp Leu Lys Pro Arg Trp Gly Ala Val
65                  70                  75                  80

Asn Tyr Ala Arg Lys Phe Gln Gly Arg Val Thr Met Thr Arg Asp Val
                85                  90                  95

Tyr Ser Asp Thr Ala Phe Leu Glu Leu Arg Ser Leu Thr Ser Asp Asp
            100                 105                 110

Thr Ala Val Tyr Phe Cys Thr Arg Gly Lys Tyr Cys Thr Ala Arg Asp
        115                 120                 125

Tyr Tyr Asn Trp Asp Phe Glu His Trp Gly Arg Gly Ala Pro Val Thr
    130                 135                 140

Val Ser Ser Gly Gly Gly Ser Gly Gly Gly Ser Gly Gly Gly Ser Gly
145                 150                 155                 160

Gly Gly Ser Glu Ile Val Leu Thr Gln Ser Pro Ala Thr Leu Ser Leu
                165                 170                 175

Ser Pro Gly Glu Thr Ala Ile Ile Ser Cys Arg Thr Ser Gln Tyr Gly
            180                 185                 190

Ser Leu Ala Trp Tyr Gln Gln Arg Pro Gly Gln Ala Pro Arg Leu Val
        195                 200                 205

Ile Tyr Ser Gly Ser Thr Arg Ala Ala Gly Ile Pro Asp Arg Phe Ser
    210                 215                 220

Gly Ser Arg Trp Gly Ala Asp Tyr Asn Leu Ser Ile Ser Asn Leu Glu
225                 230                 235                 240

Ser Gly Asp Phe Gly Val Tyr Tyr Cys Gln Gln Tyr Glu Phe Phe Gly
                245                 250                 255
```

```
Gln Gly Thr Lys Val Gln Val Asp Ile Lys Glu Ser Lys Tyr Gly Pro
            260                 265                 270

Pro Cys Pro Pro Cys Pro Gly Gly Gly Ser Ser Gly Gly Gly Ser Gly
        275                 280                 285

Gly Gln Pro Arg Glu Pro Gln Val Tyr Thr Leu Pro Pro Ser Gln Glu
    290                 295                 300

Glu Met Thr Lys Asn Gln Val Ser Leu Thr Cys Leu Val Lys Gly Phe
305                 310                 315                 320

Tyr Pro Ser Asp Ile Ala Val Glu Trp Glu Ser Asn Gly Gln Pro Glu
                325                 330                 335

Asn Asn Tyr Lys Thr Thr Pro Pro Val Leu Asp Ser Asp Gly Ser Phe
            340                 345                 350

Phe Leu Tyr Ser Arg Leu Thr Val Asp Lys Ser Arg Trp Gln Glu Gly
        355                 360                 365

Asn Val Phe Ser Cys Ser Val Met His Glu Ala Leu His Asn His Tyr
    370                 375                 380

Thr Gln Lys Ser Leu Ser Leu Ser Leu Gly Lys Met Ala Leu Ile Val
385                 390                 395                 400

Leu Gly Gly Val Ala Gly Leu Leu Leu Phe Ile Gly Leu Gly Ile Phe
                405                 410                 415

Phe Lys Arg Gly Arg Lys Lys Leu Leu Tyr Ile Phe Lys Gln Pro Phe
            420                 425                 430

Met Arg Pro Val Gln Thr Thr Gln Glu Glu Asp Gly Cys Ser Cys Arg
        435                 440                 445

Phe Pro Glu Glu Glu Glu Gly Gly Cys Glu Leu Gly Gly Gly Arg Val
    450                 455                 460

Lys Phe Ser Arg Ser Ala Asp Ala Pro Ala Tyr Gln Gln Gly Gln Asn
465                 470                 475                 480

Gln Leu Tyr Asn Glu Leu Asn Leu Gly Arg Arg Glu Glu Tyr Asp Val
                485                 490                 495

Leu Asp Lys Arg Arg Gly Arg Asp Pro Glu Met Gly Gly Lys Pro Arg
            500                 505                 510

Arg Lys Asn Pro Gln Glu Gly Leu Tyr Asn Glu Leu Gln Lys Asp Lys
        515                 520                 525

Met Ala Glu Ala Tyr Ser Glu Ile Gly Met Lys Gly Glu Arg Arg Arg
    530                 535                 540

Gly Lys Gly His Asp Gly Leu Tyr Gln Gly Leu Ser Thr Ala Thr Lys
545                 550                 555                 560

Asp Thr Tyr Asp Ala Leu His Met Gln Ala Leu Pro Pro Arg Leu Glu
                565                 570                 575

Gly Gly Gly Glu Gly Arg Gly Ser Leu Leu Thr Cys Gly Asp Val Glu
            580                 585                 590

Glu Asn Pro Gly Pro Arg Met Leu Leu Leu Val Thr Ser Leu Leu Leu
        595                 600                 605

Cys Glu Leu Pro His Pro Ala Phe Leu Leu Ile Pro Arg Lys Val Cys
    610                 615                 620

Asn Gly Ile Gly Ile Gly Glu Phe Lys Asp Ser Leu Ser Ile Asn Ala
625                 630                 635                 640

Thr Asn Ile Lys His Phe Lys Asn Cys Thr Ser Ile Ser Gly Asp Leu
                645                 650                 655

His Ile Leu Pro Val Ala Phe Arg Gly Asp Ser Phe Thr His Thr Pro
            660                 665                 670

Pro Leu Asp Pro Gln Glu Leu Asp Ile Leu Lys Thr Val Lys Glu Ile
```

```
        675                 680                 685

Thr Gly Phe Leu Leu Ile Gln Ala Trp Pro Glu Asn Arg Thr Asp Leu
    690                 695                 700

His Ala Phe Glu Asn Leu Glu Ile Ile Arg Gly Arg Thr Lys Gln His
705                 710                 715                 720

Gly Gln Phe Ser Leu Ala Val Val Ser Leu Asn Ile Thr Ser Leu Gly
                725                 730                 735

Leu Arg Ser Leu Lys Glu Ile Ser Asp Gly Asp Val Ile Ile Ser Gly
            740                 745                 750

Asn Lys Asn Leu Cys Tyr Ala Asn Thr Ile Asn Trp Lys Lys Leu Phe
        755                 760                 765

Gly Thr Ser Gly Gln Lys Thr Lys Ile Ile Ser Asn Arg Gly Glu Asn
    770                 775                 780

Ser Cys Lys Ala Thr Gly Gln Val Cys His Ala Leu Cys Ser Pro Glu
785                 790                 795                 800

Gly Cys Trp Gly Pro Glu Pro Arg Asp Cys Val Ser Cys Arg Asn Val
                805                 810                 815

Ser Arg Gly Arg Glu Cys Val Asp Lys Cys Asn Leu Leu Glu Gly Glu
            820                 825                 830

Pro Arg Glu Phe Val Glu Asn Ser Glu Cys Ile Gln Cys His Pro Glu
        835                 840                 845

Cys Leu Pro Gln Ala Met Asn Ile Thr Cys Thr Gly Arg Gly Pro Asp
    850                 855                 860

Asn Cys Ile Gln Cys Ala His Tyr Ile Asp Gly Pro His Cys Val Lys
865                 870                 875                 880

Thr Cys Pro Ala Gly Val Met Gly Glu Asn Asn Thr Leu Val Trp Lys
                885                 890                 895

Tyr Ala Asp Ala Gly His Val Cys His Leu Cys His Pro Asn Cys Thr
            900                 905                 910

Tyr Gly Cys Thr Gly Pro Gly Leu Glu Gly Cys Pro Thr Asn Gly Pro
        915                 920                 925

Lys Ile Pro Ser Ile Ala Thr Gly Met Val Gly Ala Leu Leu Leu Leu
    930                 935                 940

Leu Val Val Ala Leu Gly Ile Gly Leu Phe Met
945                 950                 955


<210> SEQ ID NO 45
<211> LENGTH: 844
<212> TYPE: PRT
<213> ORGANISM: Artificial Sequence
<220> FEATURE:
<223> OTHER INFORMATION: Synthetic polypeptide

<400> SEQUENCE: 45

Met Leu Leu Leu Val Thr Ser Leu Leu Leu Cys Glu Leu Pro His Pro
1               5                   10                  15

Ala Phe Leu Leu Ile Pro Gln Val Arg Leu Ser Gln Ser Gly Gly Gln
            20                  25                  30

Met Lys Lys Pro Gly Glu Ser Met Arg Leu Ser Cys Arg Ala Ser Gly
        35                  40                  45

Tyr Glu Phe Leu Asn Cys Pro Ile Asn Trp Ile Arg Leu Ala Pro Gly
    50                  55                  60

Arg Arg Pro Glu Trp Met Gly Trp Leu Lys Pro Arg Trp Gly Ala Val
65                  70                  75                  80

Asn Tyr Ala Arg Lys Phe Gln Gly Arg Val Thr Met Thr Arg Asp Val
```

```
                85                  90                  95

Tyr Ser Asp Thr Ala Phe Leu Glu Leu Arg Ser Leu Thr Ser Asp Asp
            100                 105                 110

Thr Ala Val Tyr Phe Cys Thr Arg Gly Lys Tyr Cys Thr Ala Arg Asp
        115                 120                 125

Tyr Tyr Asn Trp Asp Phe Glu His Trp Gly Arg Gly Ala Pro Val Thr
    130                 135                 140

Val Ser Ser Gly Gly Gly Ser Gly Gly Gly Ser Gly Gly Gly Ser Gly
145                 150                 155                 160

Gly Gly Ser Glu Ile Val Leu Thr Gln Ser Pro Ala Thr Leu Ser Leu
                165                 170                 175

Ser Pro Gly Glu Thr Ala Ile Ile Ser Cys Arg Thr Ser Gln Tyr Gly
            180                 185                 190

Ser Leu Ala Trp Tyr Gln Gln Arg Pro Gly Gln Ala Pro Arg Leu Val
        195                 200                 205

Ile Tyr Ser Gly Ser Thr Arg Ala Ala Gly Ile Pro Asp Arg Phe Ser
    210                 215                 220

Gly Ser Arg Trp Gly Ala Asp Tyr Asn Leu Ser Ile Ser Asn Leu Glu
225                 230                 235                 240

Ser Gly Asp Phe Gly Val Tyr Tyr Cys Gln Gln Tyr Glu Phe Phe Gly
                245                 250                 255

Gln Gly Thr Lys Val Gln Val Asp Ile Lys Glu Ser Lys Tyr Gly Pro
            260                 265                 270

Pro Cys Pro Pro Cys Pro Met Phe Trp Val Leu Val Val Val Gly Gly
        275                 280                 285

Val Leu Ala Cys Tyr Ser Leu Leu Val Thr Val Ala Phe Ile Ile Phe
    290                 295                 300

Trp Val Lys Arg Gly Arg Lys Lys Leu Leu Tyr Ile Phe Lys Gln Pro
305                 310                 315                 320

Phe Met Arg Pro Val Gln Thr Thr Gln Glu Glu Asp Gly Cys Ser Cys
                325                 330                 335

Arg Phe Pro Glu Glu Glu Glu Gly Gly Cys Glu Leu Gly Gly Gly Arg
            340                 345                 350

Val Lys Phe Ser Arg Ser Ala Asp Ala Pro Ala Tyr Gln Gln Gly Gln
        355                 360                 365

Asn Gln Leu Tyr Asn Glu Leu Asn Leu Gly Arg Arg Glu Glu Tyr Asp
    370                 375                 380

Val Leu Asp Lys Arg Arg Gly Arg Asp Pro Glu Met Gly Gly Lys Pro
385                 390                 395                 400

Arg Arg Lys Asn Pro Gln Glu Gly Leu Tyr Asn Glu Leu Gln Lys Asp
                405                 410                 415

Lys Met Ala Glu Ala Tyr Ser Glu Ile Gly Met Lys Gly Glu Arg Arg
            420                 425                 430

Arg Gly Lys Gly His Asp Gly Leu Tyr Gln Gly Leu Ser Thr Ala Thr
        435                 440                 445

Lys Asp Thr Tyr Asp Ala Leu His Met Gln Ala Leu Pro Pro Arg Leu
    450                 455                 460

Glu Gly Gly Gly Glu Gly Arg Gly Ser Leu Leu Thr Cys Gly Asp Val
465                 470                 475                 480

Glu Glu Asn Pro Gly Pro Arg Met Leu Leu Leu Val Thr Ser Leu Leu
                485                 490                 495

Leu Cys Glu Leu Pro His Pro Ala Phe Leu Leu Ile Pro Arg Lys Val
            500                 505                 510
```

Cys Asn Gly Ile Gly Ile Gly Glu Phe Lys Asp Ser Leu Ser Ile Asn
515 520 525

Ala Thr Asn Ile Lys His Phe Lys Asn Cys Thr Ser Ile Ser Gly Asp
530 535 540

Leu His Ile Leu Pro Val Ala Phe Arg Gly Asp Ser Phe Thr His Thr
545 550 555 560

Pro Pro Leu Asp Pro Gln Glu Leu Asp Ile Leu Lys Thr Val Lys Glu
565 570 575

Ile Thr Gly Phe Leu Leu Ile Gln Ala Trp Pro Glu Asn Arg Thr Asp
580 585 590

Leu His Ala Phe Glu Asn Leu Glu Ile Ile Arg Gly Arg Thr Lys Gln
595 600 605

His Gly Gln Phe Ser Leu Ala Val Val Ser Leu Asn Ile Thr Ser Leu
610 615 620

Gly Leu Arg Ser Leu Lys Glu Ile Ser Asp Gly Asp Val Ile Ile Ser
625 630 635 640

Gly Asn Lys Asn Leu Cys Tyr Ala Asn Thr Ile Asn Trp Lys Lys Leu
645 650 655

Phe Gly Thr Ser Gly Gln Lys Thr Lys Ile Ile Ser Asn Arg Gly Glu
660 665 670

Asn Ser Cys Lys Ala Thr Gly Gln Val Cys His Ala Leu Cys Ser Pro
675 680 685

Glu Gly Cys Trp Gly Pro Glu Pro Arg Asp Cys Val Ser Cys Arg Asn
690 695 700

Val Ser Arg Gly Arg Glu Cys Val Asp Lys Cys Asn Leu Leu Glu Gly
705 710 715 720

Glu Pro Arg Glu Phe Val Glu Asn Ser Glu Cys Ile Gln Cys His Pro
725 730 735

Glu Cys Leu Pro Gln Ala Met Asn Ile Thr Cys Thr Gly Arg Gly Pro
740 745 750

Asp Asn Cys Ile Gln Cys Ala His Tyr Ile Asp Gly Pro His Cys Val
755 760 765

Lys Thr Cys Pro Ala Gly Val Met Gly Glu Asn Asn Thr Leu Val Trp
770 775 780

Lys Tyr Ala Asp Ala Gly His Val Cys His Leu Cys His Pro Asn Cys
785 790 795 800

Thr Tyr Gly Cys Thr Gly Pro Gly Leu Glu Gly Cys Pro Thr Asn Gly
805 810 815

Pro Lys Ile Pro Ser Ile Ala Thr Gly Met Val Gly Ala Leu Leu Leu
820 825 830

Leu Leu Val Val Ala Leu Gly Ile Gly Leu Phe Met
835 840

<210> SEQ ID NO 46
<211> LENGTH: 1055
<212> TYPE: PRT
<213> ORGANISM: Artificial Sequence
<220> FEATURE:
<223> OTHER INFORMATION: Synthetic polypeptide

<400> SEQUENCE: 46

Met Leu Leu Leu Val Thr Ser Leu Leu Leu Cys Glu Leu Pro His Pro
1 5 10 15

Ala Phe Leu Leu Ile Pro Gln Val Arg Leu Ser Gln Ser Gly Gly Gln
20 25 30

```
Met Lys Lys Pro Gly Glu Ser Met Arg Leu Ser Cys Arg Ala Ser Gly
        35                  40                  45

Tyr Glu Phe Leu Asn Cys Pro Ile Asn Trp Ile Arg Leu Ala Pro Gly
    50                  55                  60

Arg Arg Pro Glu Trp Met Gly Trp Leu Lys Pro Arg Trp Gly Ala Val
65                  70                  75                  80

Asn Tyr Ala Arg Lys Phe Gln Gly Arg Val Thr Met Thr Arg Asp Val
                85                  90                  95

Tyr Ser Asp Thr Ala Phe Leu Glu Leu Arg Ser Leu Thr Ser Asp Asp
            100                 105                 110

Thr Ala Val Tyr Phe Cys Thr Arg Gly Lys Tyr Cys Thr Ala Arg Asp
        115                 120                 125

Tyr Tyr Asn Trp Asp Phe Glu His Trp Gly Arg Gly Ala Pro Val Thr
    130                 135                 140

Val Ser Ser Gly Gly Gly Ser Gly Gly Gly Ser Gly Gly Gly Ser Gly
145                 150                 155                 160

Gly Gly Ser Glu Ile Val Leu Thr Gln Ser Pro Ala Thr Leu Ser Leu
                165                 170                 175

Ser Pro Gly Glu Thr Ala Ile Ile Ser Cys Arg Thr Ser Gln Tyr Gly
            180                 185                 190

Ser Leu Ala Trp Tyr Gln Gln Arg Pro Gly Gln Ala Pro Arg Leu Val
        195                 200                 205

Ile Tyr Ser Gly Ser Thr Arg Ala Ala Gly Ile Pro Asp Arg Phe Ser
    210                 215                 220

Gly Ser Arg Trp Gly Ala Asp Tyr Asn Leu Ser Ile Ser Asn Leu Glu
225                 230                 235                 240

Ser Gly Asp Phe Gly Val Tyr Tyr Cys Gln Gln Tyr Glu Phe Phe Gly
                245                 250                 255

Gln Gly Thr Lys Val Gln Val Asp Ile Lys Glu Ser Lys Tyr Gly Pro
            260                 265                 270

Pro Cys Pro Pro Cys Pro Ala Pro Glu Phe Glu Gly Gly Pro Ser Val
        275                 280                 285

Phe Leu Phe Pro Pro Lys Pro Lys Asp Thr Leu Met Ile Ser Arg Thr
    290                 295                 300

Pro Glu Val Thr Cys Val Val Val Asp Val Ser Gln Glu Asp Pro Glu
305                 310                 315                 320

Val Gln Phe Asn Trp Tyr Val Asp Gly Val Glu Val His Asn Ala Lys
                325                 330                 335

Thr Lys Pro Arg Glu Glu Gln Phe Gln Ser Thr Tyr Arg Val Val Ser
            340                 345                 350

Val Leu Thr Val Leu His Gln Asp Trp Leu Asn Gly Lys Glu Tyr Lys
        355                 360                 365

Cys Lys Val Ser Asn Lys Gly Leu Pro Ser Ser Ile Glu Lys Thr Ile
    370                 375                 380

Ser Lys Ala Lys Gly Gln Pro Arg Glu Pro Gln Val Tyr Thr Leu Pro
385                 390                 395                 400

Pro Ser Gln Glu Glu Met Thr Lys Asn Gln Val Ser Leu Thr Cys Leu
                405                 410                 415

Val Lys Gly Phe Tyr Pro Ser Asp Ile Ala Val Glu Trp Glu Ser Asn
            420                 425                 430

Gly Gln Pro Glu Asn Asn Tyr Lys Thr Thr Pro Pro Val Leu Asp Ser
        435                 440                 445
```

```
Asp Gly Ser Phe Phe Leu Tyr Ser Arg Leu Thr Val Asp Lys Ser Arg
    450                 455                 460

Trp Gln Glu Gly Asn Val Phe Ser Cys Ser Val Met His Glu Ala Leu
465                 470                 475                 480

His Asn His Tyr Thr Gln Lys Ser Leu Ser Leu Ser Leu Gly Lys Met
                485                 490                 495

Ala Leu Ile Val Leu Gly Gly Val Ala Gly Leu Leu Leu Phe Ile Gly
            500                 505                 510

Leu Gly Ile Phe Phe Lys Arg Gly Arg Lys Lys Leu Leu Tyr Ile Phe
        515                 520                 525

Lys Gln Pro Phe Met Arg Pro Val Gln Thr Thr Gln Glu Glu Asp Gly
    530                 535                 540

Cys Ser Cys Arg Phe Pro Glu Glu Glu Glu Gly Gly Cys Glu Leu Gly
545                 550                 555                 560

Gly Gly Arg Val Lys Phe Ser Arg Ser Ala Asp Ala Pro Ala Tyr Gln
                565                 570                 575

Gln Gly Gln Asn Gln Leu Tyr Asn Glu Leu Asn Leu Gly Arg Arg Glu
            580                 585                 590

Glu Tyr Asp Val Leu Asp Lys Arg Arg Gly Arg Asp Pro Glu Met Gly
        595                 600                 605

Gly Lys Pro Arg Arg Lys Asn Pro Gln Glu Gly Leu Tyr Asn Glu Leu
    610                 615                 620

Gln Lys Asp Lys Met Ala Glu Ala Tyr Ser Glu Ile Gly Met Lys Gly
625                 630                 635                 640

Glu Arg Arg Arg Gly Lys Gly His Asp Gly Leu Tyr Gln Gly Leu Ser
                645                 650                 655

Thr Ala Thr Lys Asp Thr Tyr Asp Ala Leu His Met Gln Ala Leu Pro
            660                 665                 670

Pro Arg Leu Glu Gly Gly Gly Glu Gly Arg Gly Ser Leu Leu Thr Cys
        675                 680                 685

Gly Asp Val Glu Glu Asn Pro Gly Pro Arg Met Leu Leu Leu Val Thr
    690                 695                 700

Ser Leu Leu Leu Cys Glu Leu Pro His Pro Ala Phe Leu Leu Ile Pro
705                 710                 715                 720

Arg Lys Val Cys Asn Gly Ile Gly Ile Gly Glu Phe Lys Asp Ser Leu
                725                 730                 735

Ser Ile Asn Ala Thr Asn Ile Lys His Phe Lys Asn Cys Thr Ser Ile
            740                 745                 750

Ser Gly Asp Leu His Ile Leu Pro Val Ala Phe Arg Gly Asp Ser Phe
        755                 760                 765

Thr His Thr Pro Pro Leu Asp Pro Gln Glu Leu Asp Ile Leu Lys Thr
    770                 775                 780

Val Lys Glu Ile Thr Gly Phe Leu Leu Ile Gln Ala Trp Pro Glu Asn
785                 790                 795                 800

Arg Thr Asp Leu His Ala Phe Glu Asn Leu Glu Ile Ile Arg Gly Arg
                805                 810                 815

Thr Lys Gln His Gly Gln Phe Ser Leu Ala Val Val Ser Leu Asn Ile
            820                 825                 830

Thr Ser Leu Gly Leu Arg Ser Leu Lys Glu Ile Ser Asp Gly Asp Val
        835                 840                 845

Ile Ile Ser Gly Asn Lys Asn Leu Cys Tyr Ala Asn Thr Ile Asn Trp
    850                 855                 860

Lys Lys Leu Phe Gly Thr Ser Gly Gln Lys Thr Lys Ile Ile Ser Asn
```

865 870 875 880

Arg Gly Glu Asn Ser Cys Lys Ala Thr Gly Gln Val Cys His Ala Leu
885 890 895

Cys Ser Pro Glu Gly Cys Trp Gly Pro Glu Pro Arg Asp Cys Val Ser
900 905 910

Cys Arg Asn Val Ser Arg Gly Arg Glu Cys Val Asp Lys Cys Asn Leu
915 920 925

Leu Glu Gly Glu Pro Arg Glu Phe Val Glu Asn Ser Glu Cys Ile Gln
930 935 940

Cys His Pro Glu Cys Leu Pro Gln Ala Met Asn Ile Thr Cys Thr Gly
945 950 955 960

Arg Gly Pro Asp Asn Cys Ile Gln Cys Ala His Tyr Ile Asp Gly Pro
965 970 975

His Cys Val Lys Thr Cys Pro Ala Gly Val Met Gly Glu Asn Asn Thr
980 985 990

Leu Val Trp Lys Tyr Ala Asp Ala Gly His Val Cys His Leu Cys His
995 1000 1005

Pro Asn Cys Thr Tyr Gly Cys Thr Gly Pro Gly Leu Glu Gly Cys
1010 1015 1020

Pro Thr Asn Gly Pro Lys Ile Pro Ser Ile Ala Thr Gly Met Val
1025 1030 1035

Gly Ala Leu Leu Leu Leu Leu Val Val Ala Leu Gly Ile Gly Leu
1040 1045 1050

Phe Met
1055

<210> SEQ ID NO 47
<211> LENGTH: 955
<212> TYPE: PRT
<213> ORGANISM: Artificial Sequence
<220> FEATURE:
<223> OTHER INFORMATION: Synthetic polypeptide

<400> SEQUENCE: 47

Met Leu Leu Leu Val Thr Ser Leu Leu Leu Cys Glu Leu Pro His Pro
1 5 10 15

Ala Phe Leu Leu Ile Pro Gln Val Arg Leu Ser Gln Ser Gly Gly Gln
20 25 30

Met Lys Lys Pro Gly Glu Ser Met Arg Leu Ser Cys Arg Ala Ser Gly
35 40 45

Tyr Glu Phe Leu Asn Cys Pro Ile Asn Trp Ile Arg Leu Ala Pro Gly
50 55 60

Arg Arg Pro Glu Trp Met Gly Trp Leu Lys Pro Arg Gly Gly Ala Val
65 70 75 80

Asn Tyr Ala Arg Lys Phe Gln Gly Arg Val Thr Met Thr Arg Asp Val
85 90 95

Tyr Ser Asp Thr Ala Phe Leu Glu Leu Arg Ser Leu Thr Ser Asp Asp
100 105 110

Thr Ala Val Tyr Phe Cys Thr Arg Gly Lys Tyr Cys Thr Ala Arg Asp
115 120 125

Tyr Tyr Asn Trp Asp Phe Glu His Trp Gly Arg Gly Ala Pro Val Thr
130 135 140

Val Ser Ser Gly Gly Gly Ser Gly Gly Gly Ser Gly Gly Gly Ser Gly
145 150 155 160

Gly Gly Ser Glu Ile Val Leu Thr Gln Ser Pro Ala Thr Leu Ser Leu

-continued

```
                165                 170                 175

Ser Pro Gly Glu Thr Ala Ile Ile Ser Cys Arg Thr Ser Gln Ser Gly
            180                 185                 190

Ser Leu Ala Trp Tyr Gln Gln Arg Pro Gly Gln Ala Pro Arg Leu Val
        195                 200                 205

Ile Tyr Ser Gly Ser Thr Arg Ala Ala Gly Ile Pro Asp Arg Phe Ser
    210                 215                 220

Gly Ser Arg Trp Gly Ala Asp Tyr Asn Leu Ser Ile Ser Asn Leu Glu
225                 230                 235                 240

Ser Gly Asp Phe Gly Val Tyr Tyr Cys Gln Gln Tyr Glu Phe Phe Gly
                245                 250                 255

Gln Gly Thr Lys Val Gln Val Asp Ile Lys Glu Ser Lys Tyr Gly Pro
            260                 265                 270

Pro Cys Pro Pro Cys Pro Gly Gly Gly Ser Ser Gly Gly Gly Ser Gly
        275                 280                 285

Gly Gln Pro Arg Glu Pro Gln Val Tyr Thr Leu Pro Pro Ser Gln Glu
    290                 295                 300

Glu Met Thr Lys Asn Gln Val Ser Leu Thr Cys Leu Val Lys Gly Phe
305                 310                 315                 320

Tyr Pro Ser Asp Ile Ala Val Glu Trp Glu Ser Asn Gly Gln Pro Glu
                325                 330                 335

Asn Asn Tyr Lys Thr Thr Pro Pro Val Leu Asp Ser Asp Gly Ser Phe
            340                 345                 350

Phe Leu Tyr Ser Arg Leu Thr Val Asp Lys Ser Arg Trp Gln Glu Gly
        355                 360                 365

Asn Val Phe Ser Cys Ser Val Met His Glu Ala Leu His Asn His Tyr
    370                 375                 380

Thr Gln Lys Ser Leu Ser Leu Ser Leu Gly Lys Met Ala Leu Ile Val
385                 390                 395                 400

Leu Gly Gly Val Ala Gly Leu Leu Leu Phe Ile Gly Leu Gly Ile Phe
                405                 410                 415

Phe Lys Arg Gly Arg Lys Lys Leu Leu Tyr Ile Phe Lys Gln Pro Phe
            420                 425                 430

Met Arg Pro Val Gln Thr Thr Gln Glu Glu Asp Gly Cys Ser Cys Arg
        435                 440                 445

Phe Pro Glu Glu Glu Glu Gly Gly Cys Glu Leu Gly Gly Gly Arg Val
    450                 455                 460

Lys Phe Ser Arg Ser Ala Asp Ala Pro Ala Tyr Gln Gln Gly Gln Asn
465                 470                 475                 480

Gln Leu Tyr Asn Glu Leu Asn Leu Gly Arg Arg Glu Glu Tyr Asp Val
                485                 490                 495

Leu Asp Lys Arg Arg Gly Arg Asp Pro Glu Met Gly Gly Lys Pro Arg
            500                 505                 510

Arg Lys Asn Pro Gln Glu Gly Leu Tyr Asn Glu Leu Gln Lys Asp Lys
        515                 520                 525

Met Ala Glu Ala Tyr Ser Glu Ile Gly Met Lys Gly Glu Arg Arg Arg
    530                 535                 540

Gly Lys Gly His Asp Gly Leu Tyr Gln Gly Leu Ser Thr Ala Thr Lys
545                 550                 555                 560

Asp Thr Tyr Asp Ala Leu His Met Gln Ala Leu Pro Pro Arg Leu Glu
                565                 570                 575

Gly Gly Gly Glu Gly Arg Gly Ser Leu Leu Thr Cys Gly Asp Val Glu
            580                 585                 590
```

```
Glu Asn Pro Gly Pro Arg Met Leu Leu Leu Val Thr Ser Leu Leu Leu
        595                 600                 605

Cys Glu Leu Pro His Pro Ala Phe Leu Leu Ile Pro Arg Lys Val Cys
    610                 615                 620

Asn Gly Ile Gly Ile Gly Glu Phe Lys Asp Ser Leu Ser Ile Asn Ala
625                 630                 635                 640

Thr Asn Ile Lys His Phe Lys Asn Cys Thr Ser Ile Ser Gly Asp Leu
                645                 650                 655

His Ile Leu Pro Val Ala Phe Arg Gly Asp Ser Phe Thr His Thr Pro
            660                 665                 670

Pro Leu Asp Pro Gln Glu Leu Asp Ile Leu Lys Thr Val Lys Glu Ile
        675                 680                 685

Thr Gly Phe Leu Leu Ile Gln Ala Trp Pro Glu Asn Arg Thr Asp Leu
    690                 695                 700

His Ala Phe Glu Asn Leu Glu Ile Ile Arg Gly Arg Thr Lys Gln His
705                 710                 715                 720

Gly Gln Phe Ser Leu Ala Val Val Ser Leu Asn Ile Thr Ser Leu Gly
                725                 730                 735

Leu Arg Ser Leu Lys Glu Ile Ser Asp Gly Asp Val Ile Ile Ser Gly
            740                 745                 750

Asn Lys Asn Leu Cys Tyr Ala Asn Thr Ile Asn Trp Lys Lys Leu Phe
        755                 760                 765

Gly Thr Ser Gly Gln Lys Thr Lys Ile Ile Ser Asn Arg Gly Glu Asn
    770                 775                 780

Ser Cys Lys Ala Thr Gly Gln Val Cys His Ala Leu Cys Ser Pro Glu
785                 790                 795                 800

Gly Cys Trp Gly Pro Glu Pro Arg Asp Cys Val Ser Cys Arg Asn Val
                805                 810                 815

Ser Arg Gly Arg Glu Cys Val Asp Lys Cys Asn Leu Leu Glu Gly Glu
            820                 825                 830

Pro Arg Glu Phe Val Glu Asn Ser Glu Cys Ile Gln Cys His Pro Glu
        835                 840                 845

Cys Leu Pro Gln Ala Met Asn Ile Thr Cys Thr Gly Arg Gly Pro Asp
    850                 855                 860

Asn Cys Ile Gln Cys Ala His Tyr Ile Asp Gly Pro His Cys Val Lys
865                 870                 875                 880

Thr Cys Pro Ala Gly Val Met Gly Glu Asn Asn Thr Leu Val Trp Lys
                885                 890                 895

Tyr Ala Asp Ala Gly His Val Cys His Leu Cys His Pro Asn Cys Thr
            900                 905                 910

Tyr Gly Cys Thr Gly Pro Gly Leu Glu Gly Cys Pro Thr Asn Gly Pro
        915                 920                 925

Lys Ile Pro Ser Ile Ala Thr Gly Met Val Gly Ala Leu Leu Leu Leu
    930                 935                 940

Leu Val Val Ala Leu Gly Ile Gly Leu Phe Met
945                 950                 955
```

<210> SEQ ID NO 48
<211> LENGTH: 1055
<212> TYPE: PRT
<213> ORGANISM: Artificial Sequence
<220> FEATURE:
<223> OTHER INFORMATION: Synthetic polypeptide

<400> SEQUENCE: 48

-continued

```
Met Leu Leu Leu Val Thr Ser Leu Leu Leu Cys Glu Leu Pro His Pro
1               5                   10                  15

Ala Phe Leu Leu Ile Pro Gln Val Arg Leu Ser Gln Ser Gly Gly Gln
            20                  25                  30

Met Lys Lys Pro Gly Glu Ser Met Arg Leu Ser Cys Arg Ala Ser Gly
        35                  40                  45

Tyr Glu Phe Leu Asn Cys Pro Ile Asn Trp Ile Arg Leu Ala Pro Gly
    50                  55                  60

Arg Arg Pro Glu Trp Met Gly Trp Leu Lys Pro Arg Gly Gly Ala Val
65                  70                  75                  80

Asn Tyr Ala Arg Lys Phe Gln Gly Arg Val Thr Met Thr Arg Asp Val
                85                  90                  95

Tyr Ser Asp Thr Ala Phe Leu Glu Leu Arg Ser Leu Thr Ser Asp Asp
            100                 105                 110

Thr Ala Val Tyr Phe Cys Thr Arg Gly Lys Tyr Cys Thr Ala Arg Asp
        115                 120                 125

Tyr Tyr Asn Trp Asp Phe Glu His Trp Gly Arg Gly Ala Pro Val Thr
    130                 135                 140

Val Ser Ser Gly Gly Gly Ser Gly Gly Gly Ser Gly Gly Gly Ser Gly
145                 150                 155                 160

Gly Gly Ser Glu Ile Val Leu Thr Gln Ser Pro Ala Thr Leu Ser Leu
                165                 170                 175

Ser Pro Gly Glu Thr Ala Ile Ile Ser Cys Arg Thr Ser Gln Ser Gly
            180                 185                 190

Ser Leu Ala Trp Tyr Gln Gln Arg Pro Gly Gln Ala Pro Arg Leu Val
        195                 200                 205

Ile Tyr Ser Gly Ser Thr Arg Ala Ala Gly Ile Pro Asp Arg Phe Ser
    210                 215                 220

Gly Ser Arg Trp Gly Ala Asp Tyr Asn Leu Ser Ile Ser Asn Leu Glu
225                 230                 235                 240

Ser Gly Asp Phe Gly Val Tyr Tyr Cys Gln Gln Tyr Glu Phe Phe Gly
                245                 250                 255

Gln Gly Thr Lys Val Gln Val Asp Ile Lys Glu Ser Lys Tyr Gly Pro
            260                 265                 270

Pro Cys Pro Pro Cys Pro Ala Pro Glu Phe Glu Gly Gly Pro Ser Val
        275                 280                 285

Phe Leu Phe Pro Pro Lys Pro Lys Asp Thr Leu Met Ile Ser Arg Thr
    290                 295                 300

Pro Glu Val Thr Cys Val Val Val Asp Val Ser Gln Glu Asp Pro Glu
305                 310                 315                 320

Val Gln Phe Asn Trp Tyr Val Asp Gly Val Glu Val His Asn Ala Lys
                325                 330                 335

Thr Lys Pro Arg Glu Glu Gln Phe Gln Ser Thr Tyr Arg Val Val Ser
            340                 345                 350

Val Leu Thr Val Leu His Gln Asp Trp Leu Asn Gly Lys Glu Tyr Lys
        355                 360                 365

Cys Lys Val Ser Asn Lys Gly Leu Pro Ser Ser Ile Glu Lys Thr Ile
    370                 375                 380

Ser Lys Ala Lys Gly Gln Pro Arg Glu Pro Gln Val Tyr Thr Leu Pro
385                 390                 395                 400

Pro Ser Gln Glu Glu Met Thr Lys Asn Gln Val Ser Leu Thr Cys Leu
                405                 410                 415
```

```
Val Lys Gly Phe Tyr Pro Ser Asp Ile Ala Val Glu Trp Glu Ser Asn
            420                 425                 430

Gly Gln Pro Glu Asn Asn Tyr Lys Thr Thr Pro Pro Val Leu Asp Ser
        435                 440                 445

Asp Gly Ser Phe Phe Leu Tyr Ser Arg Leu Thr Val Asp Lys Ser Arg
    450                 455                 460

Trp Gln Glu Gly Asn Val Phe Ser Cys Ser Val Met His Glu Ala Leu
465                 470                 475                 480

His Asn His Tyr Thr Gln Lys Ser Leu Ser Leu Ser Leu Gly Lys Met
                485                 490                 495

Ala Leu Ile Val Leu Gly Gly Val Ala Gly Leu Leu Leu Phe Ile Gly
            500                 505                 510

Leu Gly Ile Phe Phe Lys Arg Gly Arg Lys Lys Leu Leu Tyr Ile Phe
        515                 520                 525

Lys Gln Pro Phe Met Arg Pro Val Gln Thr Thr Gln Glu Glu Asp Gly
    530                 535                 540

Cys Ser Cys Arg Phe Pro Glu Glu Glu Glu Gly Gly Cys Glu Leu Gly
545                 550                 555                 560

Gly Gly Arg Val Lys Phe Ser Arg Ser Ala Asp Ala Pro Ala Tyr Gln
                565                 570                 575

Gln Gly Gln Asn Gln Leu Tyr Asn Glu Leu Asn Leu Gly Arg Arg Glu
            580                 585                 590

Glu Tyr Asp Val Leu Asp Lys Arg Arg Gly Arg Asp Pro Glu Met Gly
        595                 600                 605

Gly Lys Pro Arg Arg Lys Asn Pro Gln Glu Gly Leu Tyr Asn Glu Leu
    610                 615                 620

Gln Lys Asp Lys Met Ala Glu Ala Tyr Ser Glu Ile Gly Met Lys Gly
625                 630                 635                 640

Glu Arg Arg Arg Gly Lys Gly His Asp Gly Leu Tyr Gln Gly Leu Ser
                645                 650                 655

Thr Ala Thr Lys Asp Thr Tyr Asp Ala Leu His Met Gln Ala Leu Pro
            660                 665                 670

Pro Arg Leu Glu Gly Gly Gly Glu Gly Arg Gly Ser Leu Leu Thr Cys
        675                 680                 685

Gly Asp Val Glu Glu Asn Pro Gly Pro Arg Met Leu Leu Leu Val Thr
    690                 695                 700

Ser Leu Leu Leu Cys Glu Leu Pro His Pro Ala Phe Leu Leu Ile Pro
705                 710                 715                 720

Arg Lys Val Cys Asn Gly Ile Gly Ile Gly Glu Phe Lys Asp Ser Leu
                725                 730                 735

Ser Ile Asn Ala Thr Asn Ile Lys His Phe Lys Asn Cys Thr Ser Ile
            740                 745                 750

Ser Gly Asp Leu His Ile Leu Pro Val Ala Phe Arg Gly Asp Ser Phe
        755                 760                 765

Thr His Thr Pro Pro Leu Asp Pro Gln Glu Leu Asp Ile Leu Lys Thr
    770                 775                 780

Val Lys Glu Ile Thr Gly Phe Leu Leu Ile Gln Ala Trp Pro Glu Asn
785                 790                 795                 800

Arg Thr Asp Leu His Ala Phe Glu Asn Leu Glu Ile Ile Arg Gly Arg
                805                 810                 815

Thr Lys Gln His Gly Gln Phe Ser Leu Ala Val Val Ser Leu Asn Ile
            820                 825                 830

Thr Ser Leu Gly Leu Arg Ser Leu Lys Glu Ile Ser Asp Gly Asp Val
```

```
        835                 840                 845

Ile Ile Ser Gly Asn Lys Asn Leu Cys Tyr Ala Asn Thr Ile Asn Trp
    850                 855                 860

Lys Lys Leu Phe Gly Thr Ser Gly Gln Lys Thr Lys Ile Ile Ser Asn
865                 870                 875                 880

Arg Gly Glu Asn Ser Cys Lys Ala Thr Gly Gln Val Cys His Ala Leu
                885                 890                 895

Cys Ser Pro Glu Gly Cys Trp Gly Pro Glu Pro Arg Asp Cys Val Ser
            900                 905                 910

Cys Arg Asn Val Ser Arg Gly Arg Glu Cys Val Asp Lys Cys Asn Leu
        915                 920                 925

Leu Glu Gly Glu Pro Arg Glu Phe Val Glu Asn Ser Glu Cys Ile Gln
    930                 935                 940

Cys His Pro Glu Cys Leu Pro Gln Ala Met Asn Ile Thr Cys Thr Gly
945                 950                 955                 960

Arg Gly Pro Asp Asn Cys Ile Gln Cys Ala His Tyr Ile Asp Gly Pro
                965                 970                 975

His Cys Val Lys Thr Cys Pro Ala Gly Val Met Gly Glu Asn Asn Thr
            980                 985                 990

Leu Val Trp Lys Tyr Ala Asp Ala  Gly His Val Cys His  Leu Cys His
        995                 1000                1005

Pro Asn  Cys Thr Tyr Gly Cys  Thr Gly Pro Gly Leu  Glu Gly Cys
    1010                1015                1020

Pro Thr  Asn Gly Pro Lys Ile  Pro Ser Ile Ala Thr  Gly Met Val
    1025                1030                1035

Gly Ala  Leu Leu Leu Leu Leu  Val Val Ala Leu Gly  Ile Gly Leu
    1040                1045                1050

Phe Met
    1055
```

<210> SEQ ID NO 49
<211> LENGTH: 844
<212> TYPE: PRT
<213> ORGANISM: Artificial Sequence
<220> FEATURE:
<223> OTHER INFORMATION: Synthetic polypeptide

<400> SEQUENCE: 49

```
Met Leu Leu Leu Val Thr Ser Leu Leu Leu Cys Glu Leu Pro His Pro
1               5                   10                  15

Ala Phe Leu Leu Ile Pro Gln Val Arg Leu Ser Gln Ser Gly Gly Gln
            20                  25                  30

Met Lys Lys Pro Gly Glu Ser Met Arg Leu Ser Cys Arg Ala Ser Gly
        35                  40                  45

Tyr Glu Phe Leu Asn Cys Pro Ile Asn Trp Ile Arg Leu Ala Pro Gly
    50                  55                  60

Arg Arg Pro Glu Trp Met Gly Trp Leu Lys Pro Arg Gly Gly Ala Val
65                  70                  75                  80

Asn Tyr Ala Arg Lys Phe Gln Gly Arg Val Thr Met Thr Arg Asp Val
                85                  90                  95

Tyr Ser Asp Thr Ala Phe Leu Glu Leu Arg Ser Leu Thr Ser Asp Asp
            100                 105                 110

Thr Ala Val Tyr Phe Cys Thr Arg Gly Lys Tyr Cys Thr Ala Arg Asp
        115                 120                 125

Tyr Tyr Asn Trp Asp Phe Glu His Trp Gly Arg Gly Ala Pro Val Thr
```

```
    130                 135                 140

Val Ser Ser Gly Gly Gly Ser Gly Gly Gly Ser Gly Gly Gly Ser Gly
145                 150                 155                 160

Gly Gly Ser Glu Ile Val Leu Thr Gln Ser Pro Ala Thr Leu Ser Leu
                165                 170                 175

Ser Pro Gly Glu Thr Ala Ile Ile Ser Cys Arg Thr Ser Gln Ser Gly
            180                 185                 190

Ser Leu Ala Trp Tyr Gln Gln Arg Pro Gly Gln Ala Pro Arg Leu Val
        195                 200                 205

Ile Tyr Ser Gly Ser Thr Arg Ala Ala Gly Ile Pro Asp Arg Phe Ser
    210                 215                 220

Gly Ser Arg Trp Gly Ala Asp Tyr Asn Leu Ser Ile Ser Asn Leu Glu
225                 230                 235                 240

Ser Gly Asp Phe Gly Val Tyr Tyr Cys Gln Gln Tyr Glu Phe Phe Gly
                245                 250                 255

Gln Gly Thr Lys Val Gln Val Asp Ile Lys Glu Ser Lys Tyr Gly Pro
            260                 265                 270

Pro Cys Pro Pro Cys Pro Met Phe Trp Val Leu Val Val Val Gly Gly
        275                 280                 285

Val Leu Ala Cys Tyr Ser Leu Leu Val Thr Val Ala Phe Ile Ile Phe
    290                 295                 300

Trp Val Lys Arg Gly Arg Lys Lys Leu Leu Tyr Ile Phe Lys Gln Pro
305                 310                 315                 320

Phe Met Arg Pro Val Gln Thr Thr Gln Glu Glu Asp Gly Cys Ser Cys
                325                 330                 335

Arg Phe Pro Glu Glu Glu Glu Gly Gly Cys Glu Leu Gly Gly Gly Arg
            340                 345                 350

Val Lys Phe Ser Arg Ser Ala Asp Ala Pro Ala Tyr Gln Gln Gly Gln
        355                 360                 365

Asn Gln Leu Tyr Asn Glu Leu Asn Leu Gly Arg Arg Glu Glu Tyr Asp
    370                 375                 380

Val Leu Asp Lys Arg Arg Gly Arg Asp Pro Glu Met Gly Gly Lys Pro
385                 390                 395                 400

Arg Arg Lys Asn Pro Gln Glu Gly Leu Tyr Asn Glu Leu Gln Lys Asp
                405                 410                 415

Lys Met Ala Glu Ala Tyr Ser Glu Ile Gly Met Lys Gly Glu Arg Arg
            420                 425                 430

Arg Gly Lys Gly His Asp Gly Leu Tyr Gln Gly Leu Ser Thr Ala Thr
        435                 440                 445

Lys Asp Thr Tyr Asp Ala Leu His Met Gln Ala Leu Pro Pro Arg Leu
    450                 455                 460

Glu Gly Gly Gly Glu Gly Arg Gly Ser Leu Leu Thr Cys Gly Asp Val
465                 470                 475                 480

Glu Glu Asn Pro Gly Pro Arg Met Leu Leu Leu Val Thr Ser Leu Leu
                485                 490                 495

Leu Cys Glu Leu Pro His Pro Ala Phe Leu Leu Ile Pro Arg Lys Val
            500                 505                 510

Cys Asn Gly Ile Gly Ile Gly Glu Phe Lys Asp Ser Leu Ser Ile Asn
        515                 520                 525

Ala Thr Asn Ile Lys His Phe Lys Asn Cys Thr Ser Ile Ser Gly Asp
    530                 535                 540

Leu His Ile Leu Pro Val Ala Phe Arg Gly Asp Ser Phe Thr His Thr
545                 550                 555                 560
```

```
Pro Pro Leu Asp Pro Gln Glu Leu Asp Ile Leu Lys Thr Val Lys Glu
                565                 570                 575

Ile Thr Gly Phe Leu Leu Ile Gln Ala Trp Pro Glu Asn Arg Thr Asp
            580                 585                 590

Leu His Ala Phe Glu Asn Leu Glu Ile Ile Arg Gly Arg Thr Lys Gln
        595                 600                 605

His Gly Gln Phe Ser Leu Ala Val Val Ser Leu Asn Ile Thr Ser Leu
    610                 615                 620

Gly Leu Arg Ser Leu Lys Glu Ile Ser Asp Gly Asp Val Ile Ile Ser
625                 630                 635                 640

Gly Asn Lys Asn Leu Cys Tyr Ala Asn Thr Ile Asn Trp Lys Lys Leu
                645                 650                 655

Phe Gly Thr Ser Gly Gln Lys Thr Lys Ile Ile Ser Asn Arg Gly Glu
            660                 665                 670

Asn Ser Cys Lys Ala Thr Gly Gln Val Cys His Ala Leu Cys Ser Pro
        675                 680                 685

Glu Gly Cys Trp Gly Pro Glu Pro Arg Asp Cys Val Ser Cys Arg Asn
    690                 695                 700

Val Ser Arg Gly Arg Glu Cys Val Asp Lys Cys Asn Leu Leu Glu Gly
705                 710                 715                 720

Glu Pro Arg Glu Phe Val Glu Asn Ser Glu Cys Ile Gln Cys His Pro
                725                 730                 735

Glu Cys Leu Pro Gln Ala Met Asn Ile Thr Cys Thr Gly Arg Gly Pro
            740                 745                 750

Asp Asn Cys Ile Gln Cys Ala His Tyr Ile Asp Gly Pro His Cys Val
        755                 760                 765

Lys Thr Cys Pro Ala Gly Val Met Gly Glu Asn Asn Thr Leu Val Trp
    770                 775                 780

Lys Tyr Ala Asp Ala Gly His Val Cys His Leu Cys His Pro Asn Cys
785                 790                 795                 800

Thr Tyr Gly Cys Thr Gly Pro Gly Leu Glu Gly Cys Pro Thr Asn Gly
                805                 810                 815

Pro Lys Ile Pro Ser Ile Ala Thr Gly Met Val Gly Ala Leu Leu Leu
            820                 825                 830

Leu Leu Val Val Ala Leu Gly Ile Gly Leu Phe Met
        835                 840
```

<210> SEQ ID NO 50
<211> LENGTH: 952
<212> TYPE: PRT
<213> ORGANISM: Artificial Sequence
<220> FEATURE:
<223> OTHER INFORMATION: Synthetic polypeptide

<400> SEQUENCE: 50

```
Met Leu Leu Leu Val Thr Ser Leu Leu Leu Cys Glu Leu Pro His Pro
1               5                   10                  15

Ala Phe Leu Leu Ile Pro Arg Ala His Leu Val Gln Ser Gly Thr Ala
            20                  25                  30

Met Lys Lys Pro Gly Ala Ser Val Arg Val Ser Cys Gln Thr Ser Gly
        35                  40                  45

Tyr Thr Phe Thr Ala His Ile Leu Phe Trp Phe Arg Gln Ala Pro Gly
    50                  55                  60

Arg Gly Leu Glu Trp Val Gly Trp Ile Lys Pro Gln Tyr Gly Ala Val
65                  70                  75                  80
```

```
Asn Phe Gly Gly Gly Phe Arg Asp Arg Val Thr Leu Thr Arg Asp Val
                85                  90                  95

Tyr Arg Glu Ile Ala Tyr Met Asp Ile Arg Gly Leu Lys Pro Asp Asp
            100                 105                 110

Thr Ala Val Tyr Tyr Cys Ala Arg Asp Arg Ser Tyr Gly Asp Ser Ser
        115                 120                 125

Trp Ala Leu Asp Ala Trp Gly Gln Gly Thr Thr Val Val Val Ser Ala
    130                 135                 140

Gly Gly Gly Ser Gly Gly Gly Ser Gly Gly Gly Ser Gly Gly Gly Ser
145                 150                 155                 160

Tyr Ile His Val Thr Gln Ser Pro Ser Ser Leu Ser Val Ser Ile Gly
                165                 170                 175

Asp Arg Val Thr Ile Asn Cys Gln Thr Ser Gln Gly Val Gly Ser Asp
            180                 185                 190

Leu His Trp Tyr Gln His Lys Pro Gly Arg Ala Pro Lys Leu Leu Ile
        195                 200                 205

His His Thr Ser Ser Val Glu Asp Gly Val Pro Ser Arg Phe Ser Gly
    210                 215                 220

Ser Gly Phe His Thr Ser Phe Asn Leu Thr Ile Ser Asp Leu Gln Ala
225                 230                 235                 240

Asp Asp Ile Ala Thr Tyr Tyr Cys Gln Val Leu Gln Phe Phe Gly Arg
                245                 250                 255

Gly Ser Arg Leu His Ile Lys Glu Ser Lys Tyr Gly Pro Pro Cys Pro
            260                 265                 270

Pro Cys Pro Gly Gly Gly Ser Ser Gly Gly Gly Ser Gly Gly Gln Pro
        275                 280                 285

Arg Glu Pro Gln Val Tyr Thr Leu Pro Pro Ser Gln Glu Glu Met Thr
    290                 295                 300

Lys Asn Gln Val Ser Leu Thr Cys Leu Val Lys Gly Phe Tyr Pro Ser
305                 310                 315                 320

Asp Ile Ala Val Glu Trp Glu Ser Asn Gly Gln Pro Glu Asn Asn Tyr
                325                 330                 335

Lys Thr Thr Pro Pro Val Leu Asp Ser Asp Gly Ser Phe Phe Leu Tyr
            340                 345                 350

Ser Arg Leu Thr Val Asp Lys Ser Arg Trp Gln Glu Gly Asn Val Phe
        355                 360                 365

Ser Cys Ser Val Met His Glu Ala Leu His Asn His Tyr Thr Gln Lys
    370                 375                 380

Ser Leu Ser Leu Ser Leu Gly Lys Met Ala Leu Ile Val Leu Gly Gly
385                 390                 395                 400

Val Ala Gly Leu Leu Leu Phe Ile Gly Leu Gly Ile Phe Phe Lys Arg
                405                 410                 415

Gly Arg Lys Lys Leu Leu Tyr Ile Phe Lys Gln Pro Phe Met Arg Pro
            420                 425                 430

Val Gln Thr Thr Gln Glu Glu Asp Gly Cys Ser Cys Arg Phe Pro Glu
        435                 440                 445

Glu Glu Glu Gly Gly Cys Glu Leu Gly Gly Gly Arg Val Lys Phe Ser
    450                 455                 460

Arg Ser Ala Asp Ala Pro Ala Tyr Gln Gln Gly Gln Asn Gln Leu Tyr
465                 470                 475                 480

Asn Glu Leu Asn Leu Gly Arg Arg Glu Glu Tyr Asp Val Leu Asp Lys
                485                 490                 495
```

```
Arg Arg Gly Arg Asp Pro Glu Met Gly Gly Lys Pro Arg Arg Lys Asn
            500                 505                 510

Pro Gln Glu Gly Leu Tyr Asn Glu Leu Gln Lys Asp Lys Met Ala Glu
        515                 520                 525

Ala Tyr Ser Glu Ile Gly Met Lys Gly Glu Arg Arg Arg Gly Lys Gly
    530                 535                 540

His Asp Gly Leu Tyr Gln Gly Leu Ser Thr Ala Thr Lys Asp Thr Tyr
545                 550                 555                 560

Asp Ala Leu His Met Gln Ala Leu Pro Pro Arg Leu Glu Gly Gly Gly
                565                 570                 575

Glu Gly Arg Gly Ser Leu Leu Thr Cys Gly Asp Val Glu Glu Asn Pro
            580                 585                 590

Gly Pro Arg Met Leu Leu Leu Val Thr Ser Leu Leu Leu Cys Glu Leu
        595                 600                 605

Pro His Pro Ala Phe Leu Leu Ile Pro Arg Lys Val Cys Asn Gly Ile
    610                 615                 620

Gly Ile Gly Glu Phe Lys Asp Ser Leu Ser Ile Asn Ala Thr Asn Ile
625                 630                 635                 640

Lys His Phe Lys Asn Cys Thr Ser Ile Ser Gly Asp Leu His Ile Leu
                645                 650                 655

Pro Val Ala Phe Arg Gly Asp Ser Phe Thr His Thr Pro Pro Leu Asp
            660                 665                 670

Pro Gln Glu Leu Asp Ile Leu Lys Thr Val Lys Glu Ile Thr Gly Phe
        675                 680                 685

Leu Leu Ile Gln Ala Trp Pro Glu Asn Arg Thr Asp Leu His Ala Phe
    690                 695                 700

Glu Asn Leu Glu Ile Ile Arg Gly Arg Thr Lys Gln His Gly Gln Phe
705                 710                 715                 720

Ser Leu Ala Val Val Ser Leu Asn Ile Thr Ser Leu Gly Leu Arg Ser
                725                 730                 735

Leu Lys Glu Ile Ser Asp Gly Asp Val Ile Ile Ser Gly Asn Lys Asn
            740                 745                 750

Leu Cys Tyr Ala Asn Thr Ile Asn Trp Lys Lys Leu Phe Gly Thr Ser
        755                 760                 765

Gly Gln Lys Thr Lys Ile Ile Ser Asn Arg Gly Glu Asn Ser Cys Lys
    770                 775                 780

Ala Thr Gly Gln Val Cys His Ala Leu Cys Ser Pro Glu Gly Cys Trp
785                 790                 795                 800

Gly Pro Glu Pro Arg Asp Cys Val Ser Cys Arg Asn Val Ser Arg Gly
                805                 810                 815

Arg Glu Cys Val Asp Lys Cys Asn Leu Leu Glu Gly Glu Pro Arg Glu
            820                 825                 830

Phe Val Glu Asn Ser Glu Cys Ile Gln Cys His Pro Glu Cys Leu Pro
        835                 840                 845

Gln Ala Met Asn Ile Thr Cys Thr Gly Arg Gly Pro Asp Asn Cys Ile
    850                 855                 860

Gln Cys Ala His Tyr Ile Asp Gly Pro His Cys Val Lys Thr Cys Pro
865                 870                 875                 880

Ala Gly Val Met Gly Glu Asn Asn Thr Leu Val Trp Lys Tyr Ala Asp
                885                 890                 895

Ala Gly His Val Cys His Leu Cys His Pro Asn Cys Thr Tyr Gly Cys
            900                 905                 910

Thr Gly Pro Gly Leu Glu Gly Cys Pro Thr Asn Gly Pro Lys Ile Pro
```

```
        915                 920                 925

Ser Ile Ala Thr Gly Met Val Gly Ala Leu Leu Leu Leu Leu Val Val
    930                 935                 940

Ala Leu Gly Ile Gly Leu Phe Met
945                 950


<210> SEQ ID NO 51
<211> LENGTH: 1052
<212> TYPE: PRT
<213> ORGANISM: Artificial Sequence
<220> FEATURE:
<223> OTHER INFORMATION: Synthetic polypeptide

<400> SEQUENCE: 51

Met Leu Leu Leu Val Thr Ser Leu Leu Leu Cys Glu Leu Pro His Pro
1               5                   10                  15

Ala Phe Leu Leu Ile Pro Arg Ala His Leu Val Gln Ser Gly Thr Ala
            20                  25                  30

Met Lys Lys Pro Gly Ala Ser Val Arg Val Ser Cys Gln Thr Ser Gly
        35                  40                  45

Tyr Thr Phe Thr Ala His Ile Leu Phe Trp Phe Arg Gln Ala Pro Gly
    50                  55                  60

Arg Gly Leu Glu Trp Val Gly Trp Ile Lys Pro Gln Tyr Gly Ala Val
65                  70                  75                  80

Asn Phe Gly Gly Gly Phe Arg Asp Arg Val Thr Leu Thr Arg Asp Val
                85                  90                  95

Tyr Arg Glu Ile Ala Tyr Met Asp Ile Arg Gly Leu Lys Pro Asp Asp
            100                 105                 110

Thr Ala Val Tyr Tyr Cys Ala Arg Asp Arg Ser Tyr Gly Asp Ser Ser
        115                 120                 125

Trp Ala Leu Asp Ala Trp Gly Gln Gly Thr Thr Val Val Val Ser Ala
    130                 135                 140

Gly Gly Gly Ser Gly Gly Gly Ser Gly Gly Gly Ser Gly Gly Gly Ser
145                 150                 155                 160

Tyr Ile His Val Thr Gln Ser Pro Ser Ser Leu Ser Val Ser Ile Gly
                165                 170                 175

Asp Arg Val Thr Ile Asn Cys Gln Thr Ser Gln Gly Val Gly Ser Asp
            180                 185                 190

Leu His Trp Tyr Gln His Lys Pro Gly Arg Ala Pro Lys Leu Leu Ile
        195                 200                 205

His His Thr Ser Ser Val Glu Asp Gly Val Pro Ser Arg Phe Ser Gly
    210                 215                 220

Ser Gly Phe His Thr Ser Phe Asn Leu Thr Ile Ser Asp Leu Gln Ala
225                 230                 235                 240

Asp Asp Ile Ala Thr Tyr Tyr Cys Gln Val Leu Gln Phe Phe Gly Arg
                245                 250                 255

Gly Ser Arg Leu His Ile Lys Glu Ser Lys Tyr Gly Pro Pro Cys Pro
            260                 265                 270

Pro Cys Pro Ala Pro Glu Phe Glu Gly Gly Pro Ser Val Phe Leu Phe
        275                 280                 285

Pro Pro Lys Pro Lys Asp Thr Leu Met Ile Ser Arg Thr Pro Glu Val
    290                 295                 300

Thr Cys Val Val Val Asp Val Ser Gln Glu Asp Pro Glu Val Gln Phe
305                 310                 315                 320

Asn Trp Tyr Val Asp Gly Val Glu Val His Asn Ala Lys Thr Lys Pro
```

```
                325                 330                 335

Arg Glu Glu Gln Phe Gln Ser Thr Tyr Arg Val Val Ser Val Leu Thr
            340                 345                 350

Val Leu His Gln Asp Trp Leu Asn Gly Lys Glu Tyr Lys Cys Lys Val
        355                 360                 365

Ser Asn Lys Gly Leu Pro Ser Ser Ile Glu Lys Thr Ile Ser Lys Ala
    370                 375                 380

Lys Gly Gln Pro Arg Glu Pro Gln Val Tyr Thr Leu Pro Pro Ser Gln
385                 390                 395                 400

Glu Glu Met Thr Lys Asn Gln Val Ser Leu Thr Cys Leu Val Lys Gly
                405                 410                 415

Phe Tyr Pro Ser Asp Ile Ala Val Glu Trp Glu Ser Asn Gly Gln Pro
            420                 425                 430

Glu Asn Asn Tyr Lys Thr Thr Pro Pro Val Leu Asp Ser Asp Gly Ser
        435                 440                 445

Phe Phe Leu Tyr Ser Arg Leu Thr Val Asp Lys Ser Arg Trp Gln Glu
    450                 455                 460

Gly Asn Val Phe Ser Cys Ser Val Met His Glu Ala Leu His Asn His
465                 470                 475                 480

Tyr Thr Gln Lys Ser Leu Ser Leu Ser Leu Gly Lys Met Ala Leu Ile
                485                 490                 495

Val Leu Gly Gly Val Ala Gly Leu Leu Leu Phe Ile Gly Leu Gly Ile
            500                 505                 510

Phe Phe Lys Arg Gly Arg Lys Lys Leu Leu Tyr Ile Phe Lys Gln Pro
        515                 520                 525

Phe Met Arg Pro Val Gln Thr Thr Gln Glu Glu Asp Gly Cys Ser Cys
    530                 535                 540

Arg Phe Pro Glu Glu Glu Glu Gly Gly Cys Glu Leu Gly Gly Gly Arg
545                 550                 555                 560

Val Lys Phe Ser Arg Ser Ala Asp Ala Pro Ala Tyr Gln Gln Gly Gln
                565                 570                 575

Asn Gln Leu Tyr Asn Glu Leu Asn Leu Gly Arg Arg Glu Glu Tyr Asp
            580                 585                 590

Val Leu Asp Lys Arg Arg Gly Arg Asp Pro Glu Met Gly Gly Lys Pro
        595                 600                 605

Arg Arg Lys Asn Pro Gln Glu Gly Leu Tyr Asn Glu Leu Gln Lys Asp
    610                 615                 620

Lys Met Ala Glu Ala Tyr Ser Glu Ile Gly Met Lys Gly Glu Arg Arg
625                 630                 635                 640

Arg Gly Lys Gly His Asp Gly Leu Tyr Gln Gly Leu Ser Thr Ala Thr
                645                 650                 655

Lys Asp Thr Tyr Asp Ala Leu His Met Gln Ala Leu Pro Pro Arg Leu
            660                 665                 670

Glu Gly Gly Gly Glu Gly Arg Gly Ser Leu Leu Thr Cys Gly Asp Val
        675                 680                 685

Glu Glu Asn Pro Gly Pro Arg Met Leu Leu Leu Val Thr Ser Leu Leu
    690                 695                 700

Leu Cys Glu Leu Pro His Pro Ala Phe Leu Leu Ile Pro Arg Lys Val
705                 710                 715                 720

Cys Asn Gly Ile Gly Ile Gly Glu Phe Lys Asp Ser Leu Ser Ile Asn
                725                 730                 735

Ala Thr Asn Ile Lys His Phe Lys Asn Cys Thr Ser Ile Ser Gly Asp
            740                 745                 750
```

```
Leu His Ile Leu Pro Val Ala Phe Arg Gly Asp Ser Phe Thr His Thr
        755                 760                 765

Pro Pro Leu Asp Pro Gln Glu Leu Asp Ile Leu Lys Thr Val Lys Glu
    770                 775                 780

Ile Thr Gly Phe Leu Leu Ile Gln Ala Trp Pro Glu Asn Arg Thr Asp
785                 790                 795                 800

Leu His Ala Phe Glu Asn Leu Glu Ile Ile Arg Gly Arg Thr Lys Gln
                805                 810                 815

His Gly Gln Phe Ser Leu Ala Val Val Ser Leu Asn Ile Thr Ser Leu
            820                 825                 830

Gly Leu Arg Ser Leu Lys Glu Ile Ser Asp Gly Asp Val Ile Ile Ser
        835                 840                 845

Gly Asn Lys Asn Leu Cys Tyr Ala Asn Thr Ile Asn Trp Lys Lys Leu
    850                 855                 860

Phe Gly Thr Ser Gly Gln Lys Thr Lys Ile Ile Ser Asn Arg Gly Glu
865                 870                 875                 880

Asn Ser Cys Lys Ala Thr Gly Gln Val Cys His Ala Leu Cys Ser Pro
                885                 890                 895

Glu Gly Cys Trp Gly Pro Glu Pro Arg Asp Cys Val Ser Cys Arg Asn
            900                 905                 910

Val Ser Arg Gly Arg Glu Cys Val Asp Lys Cys Asn Leu Leu Glu Gly
        915                 920                 925

Glu Pro Arg Glu Phe Val Glu Asn Ser Glu Cys Ile Gln Cys His Pro
    930                 935                 940

Glu Cys Leu Pro Gln Ala Met Asn Ile Thr Cys Thr Gly Arg Gly Pro
945                 950                 955                 960

Asp Asn Cys Ile Gln Cys Ala His Tyr Ile Asp Gly Pro His Cys Val
                965                 970                 975

Lys Thr Cys Pro Ala Gly Val Met Gly Glu Asn Asn Thr Leu Val Trp
            980                 985                 990

Lys Tyr Ala Asp Ala Gly His Val  Cys His Leu Cys His  Pro Asn Cys
        995                 1000                 1005

Thr Tyr  Gly Cys Thr Gly Pro  Gly Leu Glu Gly Cys  Pro Thr Asn
    1010                 1015                 1020

Gly Pro  Lys Ile Pro Ser Ile  Ala Thr Gly Met Val  Gly Ala Leu
    1025                 1030                 1035

Leu Leu  Leu Leu Val Val Ala  Leu Gly Ile Gly Leu  Phe Met
    1040                 1045                 1050


<210> SEQ ID NO 52
<211> LENGTH: 841
<212> TYPE: PRT
<213> ORGANISM: Artificial Sequence
<220> FEATURE:
<223> OTHER INFORMATION: Synthetic polypeptide

<400> SEQUENCE: 52

Met Leu Leu Leu Val Thr Ser Leu Leu Leu Cys Glu Leu Pro His Pro
1               5                   10                  15

Ala Phe Leu Leu Ile Pro Arg Ala His Leu Val Gln Ser Gly Thr Ala
            20                  25                  30

Met Lys Lys Pro Gly Ala Ser Val Arg Val Ser Cys Gln Thr Ser Gly
        35                  40                  45

Tyr Thr Phe Thr Ala His Ile Leu Phe Trp Phe Arg Gln Ala Pro Gly
    50                  55                  60
```

```
Arg Gly Leu Glu Trp Val Gly Trp Ile Lys Pro Gln Tyr Gly Ala Val
65                  70                  75                  80

Asn Phe Gly Gly Gly Phe Arg Asp Arg Val Thr Leu Thr Arg Asp Val
                85                  90                  95

Tyr Arg Glu Ile Ala Tyr Met Asp Ile Arg Gly Leu Lys Pro Asp Asp
            100                 105                 110

Thr Ala Val Tyr Tyr Cys Ala Arg Asp Arg Ser Tyr Gly Asp Ser Ser
        115                 120                 125

Trp Ala Leu Asp Ala Trp Gly Gln Gly Thr Thr Val Val Val Ser Ala
    130                 135                 140

Gly Gly Gly Ser Gly Gly Gly Ser Gly Gly Gly Ser Gly Gly Gly Ser
145                 150                 155                 160

Tyr Ile His Val Thr Gln Ser Pro Ser Ser Leu Ser Val Ser Ile Gly
                165                 170                 175

Asp Arg Val Thr Ile Asn Cys Gln Thr Ser Gln Gly Val Gly Ser Asp
            180                 185                 190

Leu His Trp Tyr Gln His Lys Pro Gly Arg Ala Pro Lys Leu Leu Ile
        195                 200                 205

His His Thr Ser Ser Val Glu Asp Gly Val Pro Ser Arg Phe Ser Gly
    210                 215                 220

Ser Gly Phe His Thr Ser Phe Asn Leu Thr Ile Ser Asp Leu Gln Ala
225                 230                 235                 240

Asp Asp Ile Ala Thr Tyr Tyr Cys Gln Val Leu Gln Phe Phe Gly Arg
                245                 250                 255

Gly Ser Arg Leu His Ile Lys Glu Ser Lys Tyr Gly Pro Pro Cys Pro
            260                 265                 270

Pro Cys Pro Met Phe Trp Val Leu Val Val Val Gly Gly Val Leu Ala
        275                 280                 285

Cys Tyr Ser Leu Leu Val Thr Val Ala Phe Ile Ile Phe Trp Val Lys
    290                 295                 300

Arg Gly Arg Lys Lys Leu Leu Tyr Ile Phe Lys Gln Pro Phe Met Arg
305                 310                 315                 320

Pro Val Gln Thr Thr Gln Glu Glu Asp Gly Cys Ser Cys Arg Phe Pro
                325                 330                 335

Glu Glu Glu Glu Gly Gly Cys Glu Leu Gly Gly Gly Arg Val Lys Phe
            340                 345                 350

Ser Arg Ser Ala Asp Ala Pro Ala Tyr Gln Gln Gly Gln Asn Gln Leu
        355                 360                 365

Tyr Asn Glu Leu Asn Leu Gly Arg Arg Glu Glu Tyr Asp Val Leu Asp
    370                 375                 380

Lys Arg Arg Gly Arg Asp Pro Glu Met Gly Gly Lys Pro Arg Arg Lys
385                 390                 395                 400

Asn Pro Gln Glu Gly Leu Tyr Asn Glu Leu Gln Lys Asp Lys Met Ala
                405                 410                 415

Glu Ala Tyr Ser Glu Ile Gly Met Lys Gly Glu Arg Arg Arg Gly Lys
            420                 425                 430

Gly His Asp Gly Leu Tyr Gln Gly Leu Ser Thr Ala Thr Lys Asp Thr
        435                 440                 445

Tyr Asp Ala Leu His Met Gln Ala Leu Pro Pro Arg Leu Glu Gly Gly
    450                 455                 460

Gly Glu Gly Arg Gly Ser Leu Leu Thr Cys Gly Asp Val Glu Glu Asn
465                 470                 475                 480
```

```
Pro Gly Pro Arg Met Leu Leu Leu Val Thr Ser Leu Leu Leu Cys Glu
                485                 490                 495

Leu Pro His Pro Ala Phe Leu Leu Ile Pro Arg Lys Val Cys Asn Gly
            500                 505                 510

Ile Gly Ile Gly Glu Phe Lys Asp Ser Leu Ser Ile Asn Ala Thr Asn
        515                 520                 525

Ile Lys His Phe Lys Asn Cys Thr Ser Ile Ser Gly Asp Leu His Ile
    530                 535                 540

Leu Pro Val Ala Phe Arg Gly Asp Ser Phe Thr His Thr Pro Pro Leu
545                 550                 555                 560

Asp Pro Gln Glu Leu Asp Ile Leu Lys Thr Val Lys Glu Ile Thr Gly
                565                 570                 575

Phe Leu Leu Ile Gln Ala Trp Pro Glu Asn Arg Thr Asp Leu His Ala
            580                 585                 590

Phe Glu Asn Leu Glu Ile Ile Arg Gly Arg Thr Lys Gln His Gly Gln
        595                 600                 605

Phe Ser Leu Ala Val Val Ser Leu Asn Ile Thr Ser Leu Gly Leu Arg
    610                 615                 620

Ser Leu Lys Glu Ile Ser Asp Gly Asp Val Ile Ile Ser Gly Asn Lys
625                 630                 635                 640

Asn Leu Cys Tyr Ala Asn Thr Ile Asn Trp Lys Lys Leu Phe Gly Thr
                645                 650                 655

Ser Gly Gln Lys Thr Lys Ile Ile Ser Asn Arg Gly Glu Asn Ser Cys
            660                 665                 670

Lys Ala Thr Gly Gln Val Cys His Ala Leu Cys Ser Pro Glu Gly Cys
        675                 680                 685

Trp Gly Pro Glu Pro Arg Asp Cys Val Ser Cys Arg Asn Val Ser Arg
    690                 695                 700

Gly Arg Glu Cys Val Asp Lys Cys Asn Leu Leu Glu Gly Glu Pro Arg
705                 710                 715                 720

Glu Phe Val Glu Asn Ser Glu Cys Ile Gln Cys His Pro Glu Cys Leu
                725                 730                 735

Pro Gln Ala Met Asn Ile Thr Cys Thr Gly Arg Gly Pro Asp Asn Cys
            740                 745                 750

Ile Gln Cys Ala His Tyr Ile Asp Gly Pro His Cys Val Lys Thr Cys
        755                 760                 765

Pro Ala Gly Val Met Gly Glu Asn Asn Thr Leu Val Trp Lys Tyr Ala
    770                 775                 780

Asp Ala Gly His Val Cys His Leu Cys His Pro Asn Cys Thr Tyr Gly
785                 790                 795                 800

Cys Thr Gly Pro Gly Leu Glu Gly Cys Pro Thr Asn Gly Pro Lys Ile
                805                 810                 815

Pro Ser Ile Ala Thr Gly Met Val Gly Ala Leu Leu Leu Leu Leu Val
            820                 825                 830

Val Ala Leu Gly Ile Gly Leu Phe Met
        835                 840


<210> SEQ ID NO 53

<400> SEQUENCE: 53

000


<210> SEQ ID NO 54
<211> LENGTH: 101
```

```
<212> TYPE: PRT
<213> ORGANISM: Artificial Sequence
<220> FEATURE:
<223> OTHER INFORMATION: Synthetic polypeptide

<400> SEQUENCE: 54

Glu Ile Val Leu Thr Gln Ser Pro Ala Thr Leu Ser Leu Ser Pro Gly
1               5                   10                  15

Glu Thr Ala Ile Ile Ser Cys Arg Thr Ser Gln Ser Gly Ser Leu Ala
            20                  25                  30

Trp Tyr Gln Gln Arg Pro Gly Gln Ala Pro Arg Leu Val Ile Tyr Ser
        35                  40                  45

Gly Ser Thr Arg Ala Ala Gly Ile Pro Asp Arg Phe Ser Arg Trp Gly
    50                  55                  60

Ala Asp Tyr Asn Leu Ser Ile Ser Asn Leu Glu Ser Gly Asp Phe Gly
65                  70                  75                  80

Val Tyr Tyr Cys Gln Gln Tyr Glu Phe Phe Gly Gln Gly Thr Lys Val
                85                  90                  95

Gln Val Asp Ile Lys
            100


<210> SEQ ID NO 55
<211> LENGTH: 105
<212> TYPE: PRT
<213> ORGANISM: Artificial Sequence
<220> FEATURE:
<223> OTHER INFORMATION: Synthetic polypeptide

<400> SEQUENCE: 55

Ser Asp Ile Ser Val Ala Pro Gly Glu Thr Ala Arg Ile Ser Cys Gly
1               5                   10                  15

Glu Lys Ser Leu Gly Ser Arg Ala Val Gln Trp Tyr Gln His Arg Ala
            20                  25                  30

Gly Gln Ala Pro Ser Leu Ile Ile Tyr Asn Asn Gln Asp Arg Pro Ser
        35                  40                  45

Gly Ile Pro Glu Arg Phe Ser Gly Ser Pro Asp Ser Pro Phe Gly Thr
    50                  55                  60

Thr Ala Thr Leu Thr Ile Thr Ser Val Glu Ala Gly Asp Glu Ala Asp
65                  70                  75                  80

Tyr Tyr Cys His Ile Trp Asp Ser Arg Val Pro Thr Lys Trp Val Phe
                85                  90                  95

Gly Gly Gly Thr Thr Leu Thr Val Leu
            100                 105


<210> SEQ ID NO 56
<211> LENGTH: 114
<212> TYPE: PRT
<213> ORGANISM: Artificial Sequence
<220> FEATURE:
<223> OTHER INFORMATION: Synthetic polypeptide

<400> SEQUENCE: 56

Asp Phe Val Leu Thr Gln Ser Pro His Ser Leu Ser Val Thr Pro Gly
1               5                   10                  15

Glu Ser Ala Ser Ile Ser Cys Lys Ser Ser His Ser Leu Ile His Gly
            20                  25                  30

Asp Arg Asn Asn Tyr Leu Ala Trp Tyr Val Gln Lys Pro Gly Arg Ser
        35                  40                  45

Pro Gln Leu Leu Ile Tyr Leu Ala Ser Ser Arg Ala Ser Gly Val Pro
```

```
    50                  55                  60

Asp Arg Phe Ser Gly Ser Gly Ser Asp Lys Asp Phe Thr Leu Lys Ile
65                  70                  75                  80

Ser Arg Val Glu Thr Glu Asp Val Gly Thr Tyr Tyr Cys Met Gln Gly
                85                  90                  95

Arg Glu Ser Pro Trp Thr Phe Gly Gln Gly Thr Lys Val Asp Ile Lys
            100                 105                 110

Arg Thr


<210> SEQ ID NO 57
<211> LENGTH: 110
<212> TYPE: PRT
<213> ORGANISM: Artificial Sequence
<220> FEATURE:
<223> OTHER INFORMATION: Synthetic polypeptide

<400> SEQUENCE: 57

Gln Ser Val Leu Thr Gln Pro Ala Ser Val Ser Ala Ser Pro Gly Gln
1               5                   10                  15

Ser Ile Thr Val Ser Cys Thr Gly Ser Arg Asn Asp Val Gly Gly Tyr
            20                  25                  30

Asp Phe Val Ser Trp Tyr Gln Arg His Pro Gly Gly Val Pro Lys Leu
        35                  40                  45

Ile Ile Tyr Glu Ile Ser Lys Arg Pro Ser Gly Ile Pro Gln Arg Phe
    50                  55                  60

Ser Gly Ser Arg Ser Gly Asn Thr Ala Ser Leu Thr Ile Ser Gly Leu
65                  70                  75                  80

Gln Asp Asp Asp Glu Ala Asp Tyr Tyr Cys Cys Ser Tyr Ala Ser Tyr
                85                  90                  95

Asp Arg Leu Ile Phe Gly Gly Gly Thr Arg Val Ser Val Leu
            100                 105                 110


<210> SEQ ID NO 58
<211> LENGTH: 105
<212> TYPE: PRT
<213> ORGANISM: Artificial Sequence
<220> FEATURE:
<223> OTHER INFORMATION: Synthetic polypeptide

<400> SEQUENCE: 58

Gln Ser Ala Leu Thr Gln Pro Pro Ser Ala Ser Gly Ser Pro Gly Gln
1               5                   10                  15

Ser Ile Ser Ile Ser Cys Thr Gly Thr Ser Asn Arg Phe Val Ser Trp
            20                  25                  30

Tyr Gln Gln His Pro Gly Lys Ala Pro Lys Leu Val Ile Tyr Gly Val
        35                  40                  45

Asn Lys Arg Pro Ser Gly Val Pro Asp Arg Phe Ser Gly Ser Lys Ser
    50                  55                  60

Gly Asn Thr Ala Ser Leu Thr Val Ser Gly Leu Gln Thr Asp Asp Glu
65                  70                  75                  80

Ala Val Tyr Tyr Cys Ser Ser Leu Val Gly Asn Trp Asp Val Ile Phe
                85                  90                  95

Gly Gly Gly Thr Lys Leu Thr Val Leu
            100                 105


<210> SEQ ID NO 59
<211> LENGTH: 105
<212> TYPE: PRT
```

```
<213> ORGANISM: Artificial Sequence
<220> FEATURE:
<223> OTHER INFORMATION: Synthetic polypeptide

<400> SEQUENCE: 59

Gln Ser Ala Leu Thr Gln Pro Pro Ser Ala Ser Gly Ser Pro Gly Gln
1               5                   10                  15

Ser Ile Thr Ile Ser Cys Thr Gly Thr Ser Asn Asn Phe Val Ser Trp
            20                  25                  30

Tyr Gln Gln His Ala Gly Lys Ala Pro Lys Leu Val Ile Tyr Asp Val
        35                  40                  45

Asn Lys Arg Pro Ser Gly Val Pro Asp Arg Phe Ser Gly Ser Lys Ser
    50                  55                  60

Gly Asn Thr Ala Ser Leu Thr Val Ser Gly Leu Gln Thr Asp Asp Glu
65                  70                  75                  80

Ala Val Tyr Tyr Cys Gly Ser Leu Val Gly Asn Trp Asp Val Ile Phe
                85                  90                  95

Gly Gly Gly Thr Lys Leu Thr Val Leu
            100                 105


<210> SEQ ID NO 60
<211> LENGTH: 114
<212> TYPE: PRT
<213> ORGANISM: Artificial Sequence
<220> FEATURE:
<223> OTHER INFORMATION: Synthetic polypeptide

<400> SEQUENCE: 60

Glu Val Val Ile Thr Gln Ser Pro Leu Phe Leu Pro Val Thr Pro Gly
1               5                   10                  15

Glu Ala Ala Ser Leu Ser Cys Lys Cys Ser His Ser Leu Gln His Ser
            20                  25                  30

Thr Gly Ala Asn Tyr Leu Ala Trp Tyr Leu Gln Arg Pro Gly Gln Thr
        35                  40                  45

Pro Arg Leu Leu Ile His Leu Ala Thr His Arg Ala Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ser Asp Asp Val Gly Thr Tyr Tyr Cys Met Gln Gly
                85                  90                  95

Leu His Ser Pro Trp Thr Phe Gly Gln Gly Thr Lys Val Glu Ile Lys
            100                 105                 110

Arg Thr


<210> SEQ ID NO 61
<211> LENGTH: 110
<212> TYPE: PRT
<213> ORGANISM: Artificial Sequence
<220> FEATURE:
<223> OTHER INFORMATION: Synthetic polypeptide

<400> SEQUENCE: 61

Gln Ser Ala Leu Thr Gln Pro Ala Ser Val Ser Gly Ser Pro Gly Gln
1               5                   10                  15

Ser Ile Thr Ile Ser Cys Asn Gly Thr Ser Asn Asp Val Gly Gly Tyr
            20                  25                  30

Glu Ser Val Ser Trp Tyr Gln Gln His Pro Gly Lys Ala Pro Lys Val
        35                  40                  45
```

```
Val Ile Tyr Asp Val Ser Lys Arg Pro Ser Gly Val Ser Asn Arg Phe
    50                  55                  60

Ser Gly Ser Lys Ser Gly Asn Thr Ala Ser Leu Thr Ile Ser Gly Leu
65                  70                  75                  80

Gln Ala Glu Asp Glu Gly Asp Tyr Tyr Cys Lys Ser Leu Thr Ser Thr
                85                  90                  95

Arg Arg Arg Val Phe Gly Thr Gly Thr Lys Leu Thr Val Leu
            100                 105                 110


<210> SEQ ID NO 62
<211> LENGTH: 110
<212> TYPE: PRT
<213> ORGANISM: Artificial Sequence
<220> FEATURE:
<223> OTHER INFORMATION: Synthetic polypeptide

<400> SEQUENCE: 62

Gln Ser Ala Leu Thr Gln Pro Ala Ser Val Ser Gly Ser Pro Gly Gln
1               5                   10                  15

Thr Ile Thr Ile Ser Cys Asn Gly Thr Ser Ser Asp Val Gly Gly Phe
            20                  25                  30

Asp Ser Val Ser Trp Tyr Gln Gln Ser Pro Gly Lys Ala Pro Lys Val
        35                  40                  45

Met Val Phe Asp Val Ser His Arg Pro Ser Gly Ile Ser Asn Arg Phe
    50                  55                  60

Ser Gly Ser Lys Ser Gly Asn Thr Ala Ser Leu Thr Ile Ser Gly Leu
65                  70                  75                  80

His Ile Glu Asp Glu Gly Asp Tyr Phe Cys Ser Ser Leu Thr Asp Arg
                85                  90                  95

Ser His Arg Ile Phe Gly Gly Gly Thr Lys Val Thr Val Leu
            100                 105                 110


<210> SEQ ID NO 63
<211> LENGTH: 104
<212> TYPE: PRT
<213> ORGANISM: Artificial Sequence
<220> FEATURE:
<223> OTHER INFORMATION: Synthetic polypeptide

<400> SEQUENCE: 63

Glu Ile Val Leu Thr Gln Ser Pro Gly Thr Leu Ser Leu Ser Pro Gly
1               5                   10                  15

Glu Thr Ala Ile Ile Ser Cys Arg Ile Ser Gln Tyr Gly Ser Leu Ala
            20                  25                  30

Trp Tyr Gln Gln Arg Pro Gly Gln Ala Pro Arg Leu Val Ile Tyr Ser
        35                  40                  45

Gly Ser Thr Arg Ala Ala Gly Ile Pro Asp Arg Phe Ser Gly Ser Arg
    50                  55                  60

Trp Gly Pro Asp Tyr Asn Leu Thr Ile Ser Asn Leu Glu Ser Gly Asp
65                  70                  75                  80

Phe Gly Val Tyr Tyr Cys Gln Gln Tyr Glu Phe Phe Gly Gln Gly Thr
                85                  90                  95

Lys Val Gln Val Asp Ile Lys Arg
            100


<210> SEQ ID NO 64
<211> LENGTH: 103
<212> TYPE: PRT
<213> ORGANISM: Artificial Sequence
```

<220> FEATURE:
<223> OTHER INFORMATION: Synthetic polypeptide

<400> SEQUENCE: 64

Ser Leu Thr Gln Ser Pro Gly Thr Leu Ser Leu Ser Pro Gly Glu Thr
1 5 10 15

Ala Ile Ile Ser Cys Arg Thr Ser Gln Tyr Gly Ser Leu Ala Trp Tyr
20 25 30

Gln Gln Arg Pro Gly Gln Ala Pro Arg Leu Val Ile Tyr Ser Gly Ser
35 40 45

Thr Arg Ala Ala Thr Gly Ile Pro Asp Arg Phe Ser Gly Ser Arg Trp
50 55 60

Gly Pro Asp Tyr Asn Leu Thr Ile Ser Asn Leu Glu Ser Gly Asp Phe
65 70 75 80

Gly Val Tyr Tyr Cys Gln Gln Tyr Glu Phe Phe Gly Gln Gly Thr Lys
85 90 95

Val Gln Val Asp Ile Lys Arg
100

<210> SEQ ID NO 65
<211> LENGTH: 107
<212> TYPE: PRT
<213> ORGANISM: Artificial Sequence
<220> FEATURE:
<223> OTHER INFORMATION: Synthetic polypeptide

<400> SEQUENCE: 65

Glu Leu Val Leu Thr Gln Ser Pro Gly Thr Leu Ser Leu Ser Ala Gly
1 5 10 15

Glu Arg Ala Thr Leu Ser Cys Arg Ala Ser Gln Ser Val Ser Ser Gly
20 25 30

Ser Leu Ala Trp Tyr Gln Gln Lys Pro Gly Gln Ala Pro Arg Leu Leu
35 40 45

Ile Tyr Gly Ala Ser Thr Arg Ala Thr Gly Ile Pro Asp Arg Phe Ser
50 55 60

Gly Ser Gly Ser Gly Thr Asp Phe Ile Leu Thr Ile Gly Arg Leu Glu
65 70 75 80

Pro Glu Asp Leu Ala Val Tyr Tyr Cys Gln Gln Tyr Gly Thr Ser Pro
85 90 95

Tyr Thr Phe Gly Gln Gly Thr Lys Leu Glu Ile
100 105

<210> SEQ ID NO 66
<211> LENGTH: 109
<212> TYPE: PRT
<213> ORGANISM: Artificial Sequence
<220> FEATURE:
<223> OTHER INFORMATION: Synthetic polypeptide

<400> SEQUENCE: 66

Gln Ser Val Leu Thr Gln Ser Ala Ser Val Ser Gly Ser Leu Gly Gln
1 5 10 15

Ser Val Thr Ile Ser Cys Thr Gly Pro Asn Ser Val Cys Cys Ser His
20 25 30

Lys Ser Ile Ser Trp Tyr Gln Trp Pro Pro Gly Arg Ala Pro Thr Leu
35 40 45

Ile Ile Tyr Glu Asp Asn Glu Arg Ala Pro Gly Ile Ser Pro Arg Phe
50 55 60

```
Ser Gly Tyr Lys Ser Tyr Trp Ser Ala Tyr Leu Thr Ile Ser Asp Leu
65                  70                  75                  80

Arg Pro Glu Asp Glu Thr Thr Tyr Tyr Cys Cys Ser Tyr Thr His Asn
                85                  90                  95

Ser Gly Cys Val Phe Gly Thr Gly Thr Lys Val Ser Val
            100                 105


<210> SEQ ID NO 67
<211> LENGTH: 108
<212> TYPE: PRT
<213> ORGANISM: Artificial Sequence
<220> FEATURE:
<223> OTHER INFORMATION: Synthetic polypeptide

<400> SEQUENCE: 67

Ser Tyr Glu Leu Thr Gln Glu Thr Gly Val Ser Val Ala Leu Gly Arg
1               5                   10                  15

Thr Val Thr Ile Thr Cys Arg Gly Asp Ser Leu Arg Ser His Tyr Ala
            20                  25                  30

Ser Trp Tyr Gln Lys Lys Pro Gly Gln Ala Pro Ile Leu Leu Phe Tyr
        35                  40                  45

Gly Lys Asn Asn Arg Pro Ser Gly Val Pro Asp Arg Phe Ser Gly Ala
    50                  55                  60

Ser Gly Asn Arg Ala Ser Leu Thr Ile Ser Gly Ala Gln Ala Glu Asp
65                  70                  75                  80

Asp Ala Glu Tyr Tyr Cys Ser Ser Arg Asp Lys Ser Gly Ser Arg Leu
                85                  90                  95

Ser Val Phe Gly Gly Gly Thr Lys Leu Thr Val Leu
            100                 105


<210> SEQ ID NO 68
<211> LENGTH: 105
<212> TYPE: PRT
<213> ORGANISM: Artificial Sequence
<220> FEATURE:
<223> OTHER INFORMATION: Synthetic polypeptide

<400> SEQUENCE: 68

Asp Ile Gln Met Thr Gln Ser Pro Ser Ser Leu Ser Ala Ser Val Gly
1               5                   10                  15

Asp Thr Val Thr Ile Thr Cys Gln Ala Asn Gly Tyr Leu Asn Trp Tyr
            20                  25                  30

Gln Gln Arg Arg Gly Lys Ala Pro Lys Leu Leu Ile Tyr Asp Gly Ser
        35                  40                  45

Lys Leu Glu Arg Gly Val Pro Ser Arg Phe Ser Gly Arg Arg Trp Gly
    50                  55                  60

Gln Glu Tyr Asn Leu Thr Ile Asn Asn Leu Gln Pro Glu Asp Ile Ala
65                  70                  75                  80

Thr Tyr Phe Cys Gln Val Tyr Glu Phe Val Val Pro Gly Thr Arg Leu
                85                  90                  95

Asp Leu Lys Arg Thr Val Ala Ala Pro
            100                 105


<210> SEQ ID NO 69
<211> LENGTH: 104
<212> TYPE: PRT
<213> ORGANISM: Artificial Sequence
<220> FEATURE:
<223> OTHER INFORMATION: Synthetic polypeptide
```

<400> SEQUENCE: 69

```
Ser Glu Ile Val Leu Thr Gln Ser Pro Ala Thr Leu Ser Leu Ser Pro
1               5                   10                  15

Gly Glu Thr Ala Ile Ile Ser Cys Arg Thr Ser Gln Ser Gly Ser Leu
            20                  25                  30

Ala Trp Tyr Gln Gln Arg Pro Gly Gln Ala Pro Arg Leu Val Ile Tyr
        35                  40                  45

Ser Gly Ser Thr Arg Ala Ala Gly Ile Pro Asp Arg Phe Ser Gly Ser
    50                  55                  60

Arg Trp Gly Ala Asp Tyr Asn Leu Ser Ile Ser Asn Leu Glu Ser Gly
65                  70                  75                  80

Asp Phe Gly Val Tyr Tyr Cys Gln Gln Tyr Glu Phe Phe Gly Gln Gly
                85                  90                  95

Thr Lys Val Gln Val Asp Ile Lys
            100
```

<210> SEQ ID NO 70
<211> LENGTH: 104
<212> TYPE: PRT
<213> ORGANISM: Artificial Sequence
<220> FEATURE:
<223> OTHER INFORMATION: Synthetic polypeptide

<400> SEQUENCE: 70

```
Ser Glu Ile Val Leu Thr Gln Ser Pro Ala Thr Leu Ser Leu Ser Pro
1               5                   10                  15

Gly Glu Thr Ala Ile Ile Ser Cys Arg Thr Ser Gln Tyr Gly Ser Leu
            20                  25                  30

Ala Trp Tyr Gln Gln Arg Pro Gly Gln Ala Pro Arg Leu Val Ile Tyr
        35                  40                  45

Ser Gly Ser Thr Arg Ala Ala Gly Ile Pro Asp Arg Phe Ser Gly Ser
    50                  55                  60

Arg Trp Gly Ala Asp Tyr Asn Leu Ser Ile Ser Asn Leu Glu Ser Gly
65                  70                  75                  80

Asp Phe Gly Val Tyr Tyr Cys Gln Gln Tyr Glu Phe Phe Gly Gln Gly
                85                  90                  95

Thr Lys Val Gln Val Asp Ile Lys
            100
```

<210> SEQ ID NO 71

<400> SEQUENCE: 71

000

<210> SEQ ID NO 72
<211> LENGTH: 244
<212> TYPE: PRT
<213> ORGANISM: Artificial Sequence
<220> FEATURE:
<223> OTHER INFORMATION: Synthetic polypeptide

<400> SEQUENCE: 72

```
Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45
```

Gly Trp Leu Lys Pro Arg Trp Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser Gly Gly Gly
        115                 120                 125

Ser Gly Gly Gly Ser Gly Gly Gly Ser Gly Gly Gly Ser Glu Ile Val
    130                 135                 140

Leu Thr Gln Ser Pro Ala Thr Leu Ser Leu Ser Pro Gly Glu Thr Ala
145                 150                 155                 160

Ile Ile Ser Cys Arg Thr Ser Gln Ser Gly Ser Leu Ala Trp Tyr Gln
                165                 170                 175

Gln Arg Pro Gly Gln Ala Pro Arg Leu Val Ile Tyr Ser Gly Ser Thr
            180                 185                 190

Arg Ala Ala Gly Ile Pro Asp Arg Phe Ser Gly Ser Arg Trp Gly Ala
        195                 200                 205

Asp Tyr Asn Leu Ser Ile Ser Asn Leu Glu Ser Gly Asp Phe Gly Val
    210                 215                 220

Tyr Tyr Cys Gln Gln Tyr Glu Phe Phe Gly Gln Gly Thr Lys Val Gln
225                 230                 235                 240

Val Asp Ile Lys

<210> SEQ ID NO 73
<211> LENGTH: 22
<212> TYPE: PRT
<213> ORGANISM: Artificial Sequence
<220> FEATURE:
<223> OTHER INFORMATION: Synthetic peptide

<400> SEQUENCE: 73

Met Ala Leu Ile Val Leu Gly Gly Val Ala Gly Leu Leu Leu Phe Ile
1               5                   10                  15

Gly Leu Gly Ile Phe Phe
            20

<210> SEQ ID NO 74
<211> LENGTH: 24
<212> TYPE: PRT
<213> ORGANISM: Artificial Sequence
<220> FEATURE:
<223> OTHER INFORMATION: Synthetic peptide

<400> SEQUENCE: 74

Leu Glu Gly Gly Gly Glu Gly Arg Gly Ser Leu Leu Thr Cys Gly Asp
1               5                   10                  15

Val Glu Glu Asn Pro Gly Pro Arg
            20

<210> SEQ ID NO 75
<211> LENGTH: 335
<212> TYPE: PRT
<213> ORGANISM: Artificial Sequence
<220> FEATURE:
<223> OTHER INFORMATION: Synthetic polypeptide

<400> SEQUENCE: 75

Arg Lys Val Cys Asn Gly Ile Gly Ile Gly Glu Phe Lys Asp Ser Leu
1 5 10 15

Ser Ile Asn Ala Thr Asn Ile Lys His Phe Lys Asn Cys Thr Ser Ile
20 25 30

Ser Gly Asp Leu His Ile Leu Pro Val Ala Phe Arg Gly Asp Ser Phe
35 40 45

Thr His Thr Pro Pro Leu Asp Pro Gln Glu Leu Asp Ile Leu Lys Thr
50 55 60

Val Lys Glu Ile Thr Gly Phe Leu Leu Ile Gln Ala Trp Pro Glu Asn
65 70 75 80

Arg Thr Asp Leu His Ala Phe Glu Asn Leu Glu Ile Ile Arg Gly Arg
85 90 95

Thr Lys Gln His Gly Gln Phe Ser Leu Ala Val Val Ser Leu Asn Ile
100 105 110

Thr Ser Leu Gly Leu Arg Ser Leu Lys Glu Ile Ser Asp Gly Asp Val
115 120 125

Ile Ile Ser Gly Asn Lys Asn Leu Cys Tyr Ala Asn Thr Ile Asn Trp
130 135 140

Lys Lys Leu Phe Gly Thr Ser Gly Gln Lys Thr Lys Ile Ile Ser Asn
145 150 155 160

Arg Gly Glu Asn Ser Cys Lys Ala Thr Gly Gln Val Cys His Ala Leu
165 170 175

Cys Ser Pro Glu Gly Cys Trp Gly Pro Glu Pro Arg Asp Cys Val Ser
180 185 190

Cys Arg Asn Val Ser Arg Gly Arg Glu Cys Val Asp Lys Cys Asn Leu
195 200 205

Leu Glu Gly Glu Pro Arg Glu Phe Val Glu Asn Ser Glu Cys Ile Gln
210 215 220

Cys His Pro Glu Cys Leu Pro Gln Ala Met Asn Ile Thr Cys Thr Gly
225 230 235 240

Arg Gly Pro Asp Asn Cys Ile Gln Cys Ala His Tyr Ile Asp Gly Pro
245 250 255

His Cys Val Lys Thr Cys Pro Ala Gly Val Met Gly Glu Asn Asn Thr
260 265 270

Leu Val Trp Lys Tyr Ala Asp Ala Gly His Val Cys His Leu Cys His
275 280 285

Pro Asn Cys Thr Tyr Gly Cys Thr Gly Pro Gly Leu Glu Gly Cys Pro
290 295 300

Thr Asn Gly Pro Lys Ile Pro Ser Ile Ala Thr Gly Met Val Gly Ala
305 310 315 320

Leu Leu Leu Leu Leu Val Val Ala Leu Gly Ile Gly Leu Phe Met
325 330 335

<210> SEQ ID NO 76

<400> SEQUENCE: 76

000

<210> SEQ ID NO 77
<211> LENGTH: 229
<212> TYPE: PRT
<213> ORGANISM: Artificial Sequence
<220> FEATURE:
<223> OTHER INFORMATION: Synthetic polypeptide

<400> SEQUENCE: 77

```
Glu Ser Lys Tyr Gly Pro Pro Cys Pro Pro Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Gln Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225
```

<210> SEQ ID NO 78

<400> SEQUENCE: 78

000

<210> SEQ ID NO 79

<400> SEQUENCE: 79

000

<210> SEQ ID NO 80
<211> LENGTH: 244
<212> TYPE: PRT
<213> ORGANISM: Artificial Sequence
<220> FEATURE:
<223> OTHER INFORMATION: Synthetic polypeptide

<400> SEQUENCE: 80

```
Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
```

```
        35                  40                  45

Gly Trp Leu Lys Pro Arg Trp Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser Gly Gly Gly
        115                 120                 125

Ser Gly Gly Gly Ser Gly Gly Gly Ser Gly Gly Gly Ser Glu Ile Val
    130                 135                 140

Leu Thr Gln Ser Pro Ala Thr Leu Ser Leu Ser Pro Gly Glu Thr Ala
145                 150                 155                 160

Ile Ile Ser Cys Arg Thr Ser Gln Tyr Gly Ser Leu Ala Trp Tyr Gln
                165                 170                 175

Gln Arg Pro Gly Gln Ala Pro Arg Leu Val Ile Tyr Ser Gly Ser Thr
            180                 185                 190

Arg Ala Ala Gly Ile Pro Asp Arg Phe Ser Gly Ser Arg Trp Gly Ala
        195                 200                 205

Asp Tyr Asn Leu Ser Ile Ser Asn Leu Glu Ser Gly Asp Phe Gly Val
    210                 215                 220

Tyr Tyr Cys Gln Gln Tyr Glu Phe Phe Gly Gln Gly Thr Lys Val Gln
225                 230                 235                 240

Val Asp Ile Lys
```

<210> SEQ ID NO 81

<400> SEQUENCE: 81

000

<210> SEQ ID NO 82

<400> SEQUENCE: 82

000

<210> SEQ ID NO 83

<400> SEQUENCE: 83

000

<210> SEQ ID NO 84
<211> LENGTH: 245
<212> TYPE: PRT
<213> ORGANISM: Artificial Sequence
<220> FEATURE:
<223> OTHER INFORMATION: Synthetic polypeptide

<400> SEQUENCE: 84

```
Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45
```

Gly Trp Leu Lys Pro Arg Gly Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser Gly Gly Gly
        115                 120                 125

Ser Gly Gly Gly Ser Gly Gly Gly Ser Gly Gly Gly Ser Glu Ile Val
    130                 135                 140

Leu Thr Gln Ser Pro Ala Thr Leu Ser Leu Ser Pro Gly Glu Thr Ala
145                 150                 155                 160

Ile Ile Ser Cys Arg Thr Ser Gln Ser Gly Ser Leu Ala Trp Tyr Gln
                165                 170                 175

Gln Arg Pro Gly Gln Ala Pro Arg Leu Val Ile Tyr Ser Gly Ser Thr
            180                 185                 190

Arg Ala Ala Gly Ile Pro Asp Arg Phe Ser Gly Ser Arg Trp Gly Ala
        195                 200                 205

Asp Tyr Asn Leu Ser Ile Ser Asn Leu Glu Ser Gly Asp Phe Gly Val
    210                 215                 220

Tyr Tyr Cys Gln Gln Tyr Glu Phe Phe Gly Gln Gly Thr Lys Val Gln
225                 230                 235                 240

Val Asp Ile Lys Glu
                245

<210> SEQ ID NO 85
<211> LENGTH: 11
<212> TYPE: PRT
<213> ORGANISM: Artificial Sequence
<220> FEATURE:
<223> OTHER INFORMATION: Synthetic peptide

<400> SEQUENCE: 85

Ser Lys Tyr Gly Pro Pro Cys Pro Pro Cys Pro
1               5                   10

<210> SEQ ID NO 86

<400> SEQUENCE: 86

000

<210> SEQ ID NO 87
<211> LENGTH: 244
<212> TYPE: PRT
<213> ORGANISM: Artificial Sequence
<220> FEATURE:
<223> OTHER INFORMATION: Synthetic polypeptide

<400> SEQUENCE: 87

Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45

```
Gly Trp Leu Lys Pro Arg Gly Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser Gly Gly Gly
        115                 120                 125

Ser Gly Gly Gly Ser Gly Gly Gly Ser Gly Gly Gly Ser Glu Ile Val
    130                 135                 140

Leu Thr Gln Ser Pro Ala Thr Leu Ser Leu Ser Pro Gly Glu Thr Ala
145                 150                 155                 160

Ile Ile Ser Cys Arg Thr Ser Gln Ser Gly Ser Leu Ala Trp Tyr Gln
                165                 170                 175

Gln Arg Pro Gly Gln Ala Pro Arg Leu Val Ile Tyr Ser Gly Ser Thr
            180                 185                 190

Arg Ala Ala Gly Ile Pro Asp Arg Phe Ser Gly Ser Arg Trp Gly Ala
        195                 200                 205

Asp Tyr Asn Leu Ser Ile Ser Asn Leu Glu Ser Gly Asp Phe Gly Val
    210                 215                 220

Tyr Tyr Cys Gln Gln Tyr Glu Phe Phe Gly Gln Gly Thr Lys Val Gln
225                 230                 235                 240

Val Asp Ile Lys


<210> SEQ ID NO 88

<400> SEQUENCE: 88

000


<210> SEQ ID NO 89

<400> SEQUENCE: 89

000


<210> SEQ ID NO 90
<211> LENGTH: 241
<212> TYPE: PRT
<213> ORGANISM: Artificial Sequence
<220> FEATURE:
<223> OTHER INFORMATION: Synthetic polypeptide

<400> SEQUENCE: 90

Arg Ala His Leu Val Gln Ser Gly Thr Ala Met Lys Lys Pro Gly Ala
1               5                   10                  15

Ser Val Arg Val Ser Cys Gln Thr Ser Gly Tyr Thr Phe Thr Ala His
            20                  25                  30

Ile Leu Phe Trp Phe Arg Gln Ala Pro Gly Arg Gly Leu Glu Trp Val
        35                  40                  45

Gly Trp Ile Lys Pro Gln Tyr Gly Ala Val Asn Phe Gly Gly Gly Phe
    50                  55                  60

Arg Asp Arg Val Thr Leu Thr Arg Asp Val Tyr Arg Glu Ile Ala Tyr
65                  70                  75                  80

Met Asp Ile Arg Gly Leu Lys Pro Asp Asp Thr Ala Val Tyr Tyr Cys
                85                  90                  95
```

```
Ala Arg Asp Arg Ser Tyr Gly Asp Ser Ser Trp Ala Leu Asp Ala Trp
            100                 105                 110

Gly Gln Gly Thr Thr Val Val Val Ser Ala Gly Gly Gly Ser Gly Gly
        115                 120                 125

Gly Ser Gly Gly Gly Ser Gly Gly Gly Ser Tyr Ile His Val Thr Gln
    130                 135                 140

Ser Pro Ser Ser Leu Ser Val Ser Ile Gly Asp Arg Val Thr Ile Asn
145                 150                 155                 160

Cys Gln Thr Ser Gln Gly Val Gly Ser Asp Leu His Trp Tyr Gln His
                165                 170                 175

Lys Pro Gly Arg Ala Pro Lys Leu Leu Ile His His Thr Ser Ser Val
            180                 185                 190

Glu Asp Gly Val Pro Ser Arg Phe Ser Gly Ser Gly Phe His Thr Ser
        195                 200                 205

Phe Asn Leu Thr Ile Ser Asp Leu Gln Ala Asp Asp Ile Ala Thr Tyr
    210                 215                 220

Tyr Cys Gln Val Leu Gln Phe Phe Gly Arg Gly Ser Arg Leu His Ile
225                 230                 235                 240

Lys
```

<210> SEQ ID NO 91

<400> SEQUENCE: 91

000

<210> SEQ ID NO 92

<400> SEQUENCE: 92

000

<210> SEQ ID NO 93
<211> LENGTH: 103
<212> TYPE: PRT
<213> ORGANISM: Artificial Sequence
<220> FEATURE:
<223> OTHER INFORMATION: Synthetic polypeptide

<400> SEQUENCE: 93

```
Glu Ile Val Leu Thr Gln Ser Pro Ala Thr Leu Ser Leu Ser Pro Gly
1               5                   10                  15

Glu Thr Ala Ile Ile Ser Cys Arg Thr Ser Gln Ser Gly Ser Leu Ala
            20                  25                  30

Trp Tyr Gln Gln Arg Pro Gly Gln Ala Pro Arg Leu Val Ile Tyr Ser
        35                  40                  45

Gly Ser Thr Arg Ala Ala Gly Ile Pro Asp Arg Phe Ser Gly Ser Arg
    50                  55                  60

Trp Gly Ala Asp Tyr Asn Leu Ser Ile Ser Asn Leu Glu Ser Gly Asp
65                  70                  75                  80

Phe Gly Val Tyr Tyr Cys Gln Gln Tyr Glu Phe Phe Gly Gln Gly Thr
                85                  90                  95

Lys Val Gln Val Asp Ile Lys
            100
```

<210> SEQ ID NO 94
<211> LENGTH: 125
<212> TYPE: PRT

<213> ORGANISM: Artificial Sequence
<220> FEATURE:
<223> OTHER INFORMATION: Synthetic polypeptide

<400> SEQUENCE: 94

```
Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45

Gly Trp Leu Lys Pro Arg Gly Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser
        115                 120                 125
```

<210> SEQ ID NO 95
<211> LENGTH: 103
<212> TYPE: PRT
<213> ORGANISM: Artificial Sequence
<220> FEATURE:
<223> OTHER INFORMATION: Synthetic polypeptide

<400> SEQUENCE: 95

```
Glu Ile Val Leu Thr Gln Ser Pro Ala Thr Leu Ser Leu Ser Pro Gly
1               5                   10                  15

Glu Thr Ala Ile Ile Ser Cys Arg Thr Ser Gln Ser Gly Ser Leu Ala
            20                  25                  30

Trp Tyr Gln Gln Arg Pro Gly Gln Ala Pro Arg Leu Val Ile Tyr Ser
        35                  40                  45

Gly Ser Thr Arg Ala Ala Gly Ile Pro Asp Arg Phe Ser Gly Ser Arg
    50                  55                  60

Trp Gly Ala Asp Tyr Asn Leu Ser Ile Ser Asn Leu Glu Ser Gly Asp
65                  70                  75                  80

Phe Gly Val Tyr Tyr Cys Gln Gln Tyr Glu Phe Phe Gly Gln Gly Thr
                85                  90                  95

Lys Val Gln Val Asp Ile Lys
            100
```

<210> SEQ ID NO 96
<211> LENGTH: 125
<212> TYPE: PRT
<213> ORGANISM: Artificial Sequence
<220> FEATURE:
<223> OTHER INFORMATION: Synthetic polypeptide

<400> SEQUENCE: 96

```
Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45
```

```
Gly Trp Leu Lys Pro Arg Trp Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser
        115                 120                 125
```

<210> SEQ ID NO 97
<211> LENGTH: 103
<212> TYPE: PRT
<213> ORGANISM: Artificial Sequence
<220> FEATURE:
<223> OTHER INFORMATION: Synthetic polypeptide

<400> SEQUENCE: 97

```
Glu Ile Val Leu Thr Gln Ser Pro Ala Thr Leu Ser Leu Ser Pro Gly
1               5                   10                  15

Glu Thr Ala Ile Ile Ser Cys Arg Thr Ser Gln Tyr Gly Ser Leu Ala
            20                  25                  30

Trp Tyr Gln Gln Arg Pro Gly Gln Ala Pro Arg Leu Val Ile Tyr Ser
        35                  40                  45

Gly Ser Thr Arg Ala Ala Gly Ile Pro Asp Arg Phe Ser Gly Ser Arg
    50                  55                  60

Trp Gly Ala Asp Tyr Asn Leu Ser Ile Ser Asn Leu Glu Ser Gly Asp
65                  70                  75                  80

Phe Gly Val Tyr Tyr Cys Gln Gln Tyr Glu Phe Phe Gly Gln Gly Thr
                85                  90                  95

Lys Val Gln Val Asp Ile Lys
            100
```

<210> SEQ ID NO 98
<211> LENGTH: 125
<212> TYPE: PRT
<213> ORGANISM: Artificial Sequence
<220> FEATURE:
<223> OTHER INFORMATION: Synthetic polypeptide

<400> SEQUENCE: 98

```
Gln Val Arg Leu Ser Gln Ser Gly Gly Gln Met Lys Lys Pro Gly Glu
1               5                   10                  15

Ser Met Arg Leu Ser Cys Arg Ala Ser Gly Tyr Glu Phe Leu Asn Cys
            20                  25                  30

Pro Ile Asn Trp Ile Arg Leu Ala Pro Gly Arg Arg Pro Glu Trp Met
        35                  40                  45

Gly Trp Leu Lys Pro Arg Trp Gly Ala Val Asn Tyr Ala Arg Lys Phe
    50                  55                  60

Gln Gly Arg Val Thr Met Thr Arg Asp Val Tyr Ser Asp Thr Ala Phe
65                  70                  75                  80

Leu Glu Leu Arg Ser Leu Thr Ser Asp Asp Thr Ala Val Tyr Phe Cys
                85                  90                  95

Thr Arg Gly Lys Tyr Cys Thr Ala Arg Asp Tyr Tyr Asn Trp Asp Phe
            100                 105                 110

Glu His Trp Gly Arg Gly Ala Pro Val Thr Val Ser Ser
```

115 120 125

<210> SEQ ID NO 99
<211> LENGTH: 103
<212> TYPE: PRT
<213> ORGANISM: Artificial Sequence
<220> FEATURE:
<223> OTHER INFORMATION: Synthetic polypeptide

<400> SEQUENCE: 99

Tyr Ile His Val Thr Gln Ser Pro Ser Ser Leu Ser Val Ser Ile Gly
1 5 10 15

Asp Arg Val Thr Ile Asn Cys Gln Thr Ser Gln Gly Val Gly Ser Asp
20 25 30

Leu His Trp Tyr Gln His Lys Pro Gly Arg Ala Pro Lys Leu Leu Ile
35 40 45

His His Thr Ser Ser Val Glu Asp Gly Val Pro Ser Arg Phe Ser Gly
50 55 60

Ser Gly Phe His Thr Ser Phe Asn Leu Thr Ile Ser Asp Leu Gln Ala
65 70 75 80

Asp Asp Ile Ala Thr Tyr Tyr Cys Gln Val Leu Gln Phe Phe Gly Arg
85 90 95

Gly Ser Arg Leu His Ile Lys
100

<210> SEQ ID NO 100
<211> LENGTH: 122
<212> TYPE: PRT
<213> ORGANISM: Artificial Sequence
<220> FEATURE:
<223> OTHER INFORMATION: Synthetic polypeptide

<400> SEQUENCE: 100

Arg Ala His Leu Val Gln Ser Gly Thr Ala Met Lys Lys Pro Gly Ala
1 5 10 15

Ser Val Arg Val Ser Cys Gln Thr Ser Gly Tyr Thr Phe Thr Ala His
20 25 30

Ile Leu Phe Trp Phe Arg Gln Ala Pro Gly Arg Gly Leu Glu Trp Val
35 40 45

Gly Trp Ile Lys Pro Gln Tyr Gly Ala Val Asn Phe Gly Gly Gly Phe
50 55 60

Arg Asp Arg Val Thr Leu Thr Arg Asp Val Tyr Arg Glu Ile Ala Tyr
65 70 75 80

Met Asp Ile Arg Gly Leu Lys Pro Asp Asp Thr Ala Val Tyr Tyr Cys
85 90 95

Ala Arg Asp Arg Ser Tyr Gly Asp Ser Ser Trp Ala Leu Asp Ala Trp
100 105 110

Gly Gln Gly Thr Thr Val Val Val Ser Ala
115 120

<210> SEQ ID NO 101
<211> LENGTH: 147
<212> TYPE: PRT
<213> ORGANISM: Artificial Sequence
<220> FEATURE:
<223> OTHER INFORMATION: Synthetic polypeptide

<400> SEQUENCE: 101

Met Leu Leu Leu Val Thr Ser Leu Leu Leu Cys Glu Leu Pro His Pro
1 5 10 15

Ala Phe Leu Leu Ile Pro Gln Val Arg Leu Ser Gln Ser Gly Gly Gln
20 25 30

Met Lys Lys Pro Gly Glu Ser Met Arg Leu Ser Cys Arg Ala Ser Gly
35 40 45

Tyr Glu Phe Leu Asn Cys Pro Ile Asn Trp Ile Arg Leu Ala Pro Gly
50 55 60

Arg Arg Pro Glu Trp Met Gly Trp Leu Lys Pro Arg Gly Gly Ala Val
65 70 75 80

Asn Tyr Ala Arg Lys Phe Gln Gly Arg Val Thr Met Thr Arg Asp Val
85 90 95

Tyr Ser Asp Thr Ala Phe Leu Glu Leu Arg Ser Leu Thr Ser Asp Asp
100 105 110

Thr Ala Val Tyr Phe Cys Thr Arg Gly Lys Tyr Cys Thr Ala Arg Asp
115 120 125

Tyr Tyr Asn Trp Asp Phe Glu His Trp Gly Arg Gly Ala Pro Val Thr
130 135 140

Val Ser Ser
145

<210> SEQ ID NO 102
<211> LENGTH: 154
<212> TYPE: PRT
<213> ORGANISM: Artificial Sequence
<220> FEATURE:
<223> OTHER INFORMATION: Synthetic polypeptide

<400> SEQUENCE: 102

Met Leu Leu Leu Val Thr Ser Leu Leu Leu Cys Glu Leu Pro His Pro
1 5 10 15

Ala Phe Leu Leu Ile Pro Gln Met Gln Leu Gln Glu Ser Gly Pro Gly
20 25 30

Leu Val Lys Pro Ser Glu Thr Leu Ser Leu Thr Cys Ser Val Ser Gly
35 40 45

Ala Ser Ile Ser Asp Ser Tyr Trp Ser Trp Ile Arg Arg Ser Pro Gly
50 55 60

Lys Gly Leu Glu Trp Ile Gly Tyr Val His Lys Ser Gly Asp Thr Asn
65 70 75 80

Tyr Ser Pro Ser Leu Lys Ser Arg Val Asn Leu Ser Leu Asp Thr Ser
85 90 95

Lys Asn Gln Val Ser Leu Ser Leu Val Ala Ala Thr Ala Ala Asp Ser
100 105 110

Gly Lys Tyr Tyr Cys Ala Arg Thr Leu His Gly Arg Arg Ile Tyr Gly
115 120 125

Ile Val Ala Phe Asn Glu Trp Phe Thr Tyr Phe Tyr Met Asp Val Trp
130 135 140

Gly Asn Gly Thr Gln Val Thr Val Ser Ser
145 150

<210> SEQ ID NO 103
<211> LENGTH: 163
<212> TYPE: PRT
<213> ORGANISM: Artificial Sequence
<220> FEATURE:
<223> OTHER INFORMATION: Synthetic polypeptide

<400> SEQUENCE: 103

Met Leu Leu Leu Val Thr Ser Leu Leu Leu Cys Glu Leu Pro His Pro

```
1               5                   10                  15

Ala Phe Leu Leu Ile Pro Gln Ala Gln Leu Val Gln Ser Gly Pro Glu
            20                  25                  30

Val Arg Lys Pro Gly Thr Ser Val Lys Val Ser Cys Lys Ala Pro Gly
        35                  40                  45

Asn Thr Leu Lys Thr Tyr Asp Leu His Trp Val Arg Ser Val Pro Gly
    50                  55                  60

Gln Gly Leu Gln Trp Met Gly Trp Ile Ser His Glu Gly Asp Lys Lys
65                  70                  75                  80

Val Ile Val Glu Arg Phe Lys Ala Lys Val Thr Ile Asp Trp Asp Arg
                85                  90                  95

Ser Thr Asn Thr Ala Tyr Leu Gln Leu Ser Gly Leu Thr Ser Gly Asp
            100                 105                 110

Thr Ala Val Tyr Tyr Cys Ala Lys Gly Ser Lys His Arg Leu Arg Asp
        115                 120                 125

Tyr Ala Leu Tyr Asp Asp Asp Gly Ala Leu Asn Trp Ala Val Asp Val
    130                 135                 140

Asp Tyr Leu Ser Asn Leu Glu Phe Trp Gly Gln Gly Thr Ala Val Thr
145                 150                 155                 160

Val Ser Ser
```

<210> SEQ ID NO 104
<211> LENGTH: 150
<212> TYPE: PRT
<213> ORGANISM: Artificial Sequence
<220> FEATURE:
<223> OTHER INFORMATION: Synthetic polypeptide

<400> SEQUENCE: 104

```
Met Leu Leu Leu Val Thr Ser Leu Leu Leu Cys Glu Leu Pro His Pro
1               5                   10                  15

Ala Phe Leu Leu Ile Pro Gln Val Gln Leu Met Gln Ser Gly Ala Gln
            20                  25                  30

Leu Arg Asp Pro Gly Asp Ser Leu Lys Ile Ser Cys Lys Ala Ser Gly
        35                  40                  45

Tyr Asn Phe Ile Asp Tyr His Ile His Trp Val Arg Leu Ala Pro Gly
    50                  55                  60

Arg Gly Leu Glu Trp Met Gly Trp Ile Asp Pro Val Gly Gly Ile Thr
65                  70                  75                  80

Lys Tyr Ala Gly Gln Phe Gln Gly Arg Leu Ser Leu Thr Arg Asp Thr
                85                  90                  95

Ser Thr Asn Thr Leu Phe Leu Glu Leu Ser Arg Leu Thr Ala Gly Asp
            100                 105                 110

Thr Ala Val Tyr Phe Cys Ala Arg Ser Met Arg Pro Val Asp His Gly
        115                 120                 125

Ile Asp Tyr Ser Gly Leu Phe Val Phe His Phe Trp Gly Arg Gly Ser
    130                 135                 140

Asp Val Leu Val Ser Ser
145                 150
```

<210> SEQ ID NO 105
<211> LENGTH: 159
<212> TYPE: PRT
<213> ORGANISM: Artificial Sequence
<220> FEATURE:
<223> OTHER INFORMATION: Synthetic polypeptide

<400> SEQUENCE: 105

Met Leu Leu Leu Val Thr Ser Leu Leu Leu Cys Glu Leu Pro His Pro
1               5                   10                  15

Ala Phe Leu Leu Ile Pro Gln Pro Gln Leu Gln Glu Ser Gly Pro Gly
            20                  25                  30

Leu Val Glu Ala Ser Glu Thr Leu Ser Leu Thr Cys Thr Val Ser Gly
        35                  40                  45

Asp Ser Thr Ala Ala Cys Asp Tyr Phe Trp Gly Trp Val Arg Gln Pro
    50                  55                  60

Pro Gly Lys Gly Leu Glu Trp Ile Gly Gly Leu Ser His Cys Ala Gly
65                  70                  75                  80

Tyr Tyr Asn Thr Gly Trp Thr Tyr His Asn Pro Ser Leu Lys Ser Arg
                85                  90                  95

Leu Thr Ile Ser Leu Asp Thr Pro Lys Asn Gln Val Phe Leu Lys Leu
            100                 105                 110

Asn Ser Val Thr Ala Ala Asp Thr Ala Ile Tyr Tyr Cys Ala Arg Phe
        115                 120                 125

Asp Gly Glu Val Leu Val Tyr His Asp Trp Pro Lys Pro Ala Trp Val
    130                 135                 140

Asp Leu Trp Gly Arg Gly Thr Leu Val Thr Val Thr Val Ser Ser
145                 150                 155

<210> SEQ ID NO 106
<211> LENGTH: 157
<212> TYPE: PRT
<213> ORGANISM: Artificial Sequence
<220> FEATURE:
<223> OTHER INFORMATION: Synthetic polypeptide

<400> SEQUENCE: 106

Met Leu Leu Leu Val Thr Ser Leu Leu Leu Cys Glu Leu Pro His Pro
1               5                   10                  15

Ala Phe Leu Leu Ile Pro Gln Pro Gln Leu Gln Glu Ser Gly Pro Thr
            20                  25                  30

Leu Val Glu Ala Ser Glu Thr Leu Ser Leu Thr Cys Ala Val Ser Gly
        35                  40                  45

Asp Ser Thr Ala Ala Cys Asn Ser Phe Trp Gly Trp Val Arg Gln Pro
    50                  55                  60

Pro Gly Lys Gly Leu Glu Trp Val Gly Ser Leu Ser His Cys Ala Ser
65                  70                  75                  80

Tyr Trp Asn Arg Gly Trp Thr Tyr His Asn Pro Ser Leu Lys Ser Arg
                85                  90                  95

Leu Thr Leu Ala Leu Asp Thr Pro Lys Asn Leu Val Phe Leu Lys Leu
            100                 105                 110

Asn Ser Val Thr Ala Ala Asp Thr Ala Thr Tyr Tyr Cys Ala Arg Phe
        115                 120                 125

Gly Gly Glu Val Leu Arg Tyr Thr Asp Trp Pro Lys Pro Ala Trp Val
    130                 135                 140

Asp Leu Trp Gly Arg Gly Thr Leu Val Thr Val Ser Ser
145                 150                 155

<210> SEQ ID NO 107
<211> LENGTH: 162
<212> TYPE: PRT
<213> ORGANISM: Artificial Sequence
<220> FEATURE:
<223> OTHER INFORMATION: Synthetic polypeptide

<400> SEQUENCE: 107

Met Leu Leu Leu Val Thr Ser Leu Leu Leu Cys Glu Leu Pro His Pro
1               5                   10                  15

Ala Phe Leu Leu Ile Pro Gln Val Gln Leu Val Gln Ser Gly Ala Glu
            20                  25                  30

Val Lys Lys Pro Gly Ser Ser Val Lys Val Ser Cys Lys Ala Ser Gly
        35                  40                  45

Asn Ser Phe Ser Asn His Asp Val His Trp Val Arg Gln Ala Thr Gly
    50                  55                  60

Gln Gly Leu Glu Trp Met Gly Trp Met Ser His Glu Gly Asp Lys Thr
65                  70                  75                  80

Gly Leu Ala Gln Lys Phe Gln Gly Arg Val Thr Ile Thr Arg Asp Ser
                85                  90                  95

Gly Ala Ser Thr Val Tyr Met Glu Leu Arg Gly Leu Thr Ala Asp Asp
            100                 105                 110

Thr Ala Ile Tyr Tyr Cys Leu Thr Gly Ser Lys His Arg Leu Arg Asp
        115                 120                 125

Tyr Phe Leu Tyr Asn Glu Tyr Gly Pro Asn Tyr Glu Glu Trp Gly Asp
    130                 135                 140

Tyr Leu Ala Thr Leu Asp Val Trp Gly His Gly Thr Ala Val Thr Val
145                 150                 155                 160

Ser Ser

<210> SEQ ID NO 108
<211> LENGTH: 157
<212> TYPE: PRT
<213> ORGANISM: Artificial Sequence
<220> FEATURE:
<223> OTHER INFORMATION: Synthetic polypeptide

<400> SEQUENCE: 108

Met Leu Leu Leu Val Thr Ser Leu Leu Leu Cys Glu Leu Pro His Pro
1               5                   10                  15

Ala Phe Leu Leu Ile Pro Gln Arg Leu Val Glu Ser Gly Gly Gly Val
            20                  25                  30

Val Gln Pro Gly Ser Ser Leu Arg Ser Cys Ala Ala Ser Gly Phe Asp
        35                  40                  45

Phe Ser Arg Gln Gly Met His Trp Val Arg Gln Ala Pro Gly Gln Gly
    50                  55                  60

Leu Glu Trp Val Ala Phe Ile Lys Tyr Asp Gly Ser Glu Lys Tyr His
65                  70                  75                  80

Ala Asp Ser Val Trp Gly Arg Leu Ser Ile Ser Arg Asp Asn Ser Lys
                85                  90                  95

Asp Thr Leu Tyr Leu Gln Met Asn Ser Leu Arg Val Glu Asp Thr Ala
            100                 105                 110

Thr Tyr Phe Cys Val Arg Glu Ala Gly Gly Pro Asp Tyr Arg Asn Gly
        115                 120                 125

Tyr Asn Tyr Tyr Asp Phe Tyr Asp Gly Tyr Tyr Asn Tyr His Tyr Met
    130                 135                 140

Asp Val Trp Gly Lys Gly Thr Thr Val Thr Val Ser Ser
145                 150                 155

<210> SEQ ID NO 109
<211> LENGTH: 159
<212> TYPE: PRT

<213> ORGANISM: Artificial Sequence
<220> FEATURE:
<223> OTHER INFORMATION: Synthetic polypeptide

<400> SEQUENCE: 109

Met Leu Leu Leu Val Thr Ser Leu Leu Leu Cys Glu Leu Pro His Pro
1 5 10 15

Ala Phe Leu Leu Ile Pro Gln Glu Gln Leu Val Glu Ser Gly Gly Gly
20 25 30

Val Val Gln Pro Gly Gly Ser Leu Arg Leu Ser Cys Leu Ala Ser Gly
35 40 45

Phe Thr Phe His Lys Tyr Gly Met His Trp Val Arg Gln Ala Pro Gly
50 55 60

Lys Gly Leu Glu Trp Val Ala Leu Ile Ser Asp Asp Gly Met Arg Lys
65 70 75 80

Tyr His Ser Asp Ser Met Trp Gly Arg Val Thr Ile Ser Arg Asp Asn
85 90 95

Ser Lys Asn Thr Leu Tyr Leu Gln Phe Ser Ser Leu Lys Val Glu Asp
100 105 110

Thr Ala Met Phe Phe Cys Ala Arg Glu Ala Gly Gly Pro Ile Trp His
115 120 125

Asp Asp Val Lys Tyr Tyr Asp Phe Asn Asp Gly Tyr Tyr Asn Tyr His
130 135 140

Tyr Met Asp Val Trp Gly Lys Gly Thr Thr Val Thr Val Ser Ser
145 150 155

<210> SEQ ID NO 110
<211> LENGTH: 143
<212> TYPE: PRT
<213> ORGANISM: Artificial Sequence
<220> FEATURE:
<223> OTHER INFORMATION: Synthetic polypeptide

<400> SEQUENCE: 110

Met Leu Leu Leu Val Thr Ser Leu Leu Leu Cys Glu Leu Pro His Pro
1 5 10 15

Ala Phe Leu Leu Ile Pro Gln Val Gln Leu Val Gln Ser Gly Gly Gln
20 25 30

Met Lys Lys Pro Gly Glu Ser Met Arg Ile Ser Cys Arg Ala Ser Gly
35 40 45

Tyr Glu Phe Ile Asp Cys Thr Leu Asn Trp Ile Arg Leu Ala Pro Gly
50 55 60

Lys Arg Pro Glu Trp Met Gly Trp Leu Lys Pro Arg Gly Gly Ala Val
65 70 75 80

Asn Tyr Ala Arg Pro Leu Gln Gly Arg Val Thr Met Thr Arg Asp Val
85 90 95

Tyr Ser Asp Thr Ala Phe Leu Glu Leu Arg Ser Leu Thr Val Asp Asp
100 105 110

Thr Ala Val Tyr Phe Cys Thr Arg Gly Lys Asn Cys Asp Tyr Asn Trp
115 120 125

Asp Phe Glu His Trp Gly Arg Gly Thr Pro Val Ile Val Ser Ser
130 135 140

<210> SEQ ID NO 111
<211> LENGTH: 147
<212> TYPE: PRT
<213> ORGANISM: Artificial Sequence
<220> FEATURE:

<223> OTHER INFORMATION: Synthetic polypeptide

<400> SEQUENCE: 111

Met Leu Leu Leu Val Thr Ser Leu Leu Leu Cys Glu Leu Pro His Pro
1 5 10 15

Ala Phe Leu Leu Ile Pro Gln Val Arg Leu Ser Gln Ser Gly Gly Gln
20 25 30

Met Lys Lys Pro Gly Asp Ser Met Arg Ile Ser Cys Arg Ala Ser Gly
35 40 45

Tyr Glu Phe Ile Asn Cys Pro Ile Asn Trp Ile Arg Leu Ala Pro Gly
50 55 60

Lys Arg Pro Glu Trp Met Gly Trp Met Lys Pro Arg His Gly Ala Val
65 70 75 80

Ser Tyr Ala Arg Gln Leu Gln Gly Arg Val Thr Met Thr Arg Asp Met
85 90 95

Tyr Ser Glu Thr Ala Phe Leu Glu Leu Arg Ser Leu Thr Ser Asp Asp
100 105 110

Thr Ala Val Tyr Phe Cys Thr Arg Gly Lys Tyr Cys Thr Ala Arg Asp
115 120 125

Tyr Tyr Asn Trp Asp Phe Glu His Trp Gly Gln Gly Thr Pro Val Thr
130 135 140

Val Ser Ser
145

<210> SEQ ID NO 112
<211> LENGTH: 150
<212> TYPE: PRT
<213> ORGANISM: Artificial Sequence
<220> FEATURE:
<223> OTHER INFORMATION: Synthetic polypeptide

<400> SEQUENCE: 112

Met Leu Leu Leu Val Thr Ser Leu Leu Leu Cys Glu Leu Pro His Pro
1 5 10 15

Ala Phe Leu Leu Ile Pro Leu Glu Gln Ser Gly Ala Glu Val Lys Lys
20 25 30

Pro Gly Ser Ser Val Gln Val Ser Cys Lys Ala Ser Gly Gly Thr Phe
35 40 45

Ser Met Tyr Gly Phe Asn Trp Val Arg Gln Ala Pro Gly His Gly Leu
50 55 60

Glu Trp Met Gly Gly Ile Ile Pro Ile Phe Gly Thr Ser Asn Tyr Ala
65 70 75 80

Gln Lys Phe Arg Gly Arg Val Thr Phe Thr Ala Asp Gln Ala Thr Ser
85 90 95

Thr Ala Tyr Met Glu Leu Thr Asn Leu Arg Ser Asp Asp Thr Ala Val
100 105 110

Tyr Tyr Cys Ala Arg Asp Phe Gly Pro Asp Trp Glu Asp Gly Asp Ser
115 120 125

Tyr Asp Gly Ser Gly Arg Gly Phe Phe Asp Phe Trp Gly Gln Gly Thr
130 135 140

Leu Val Thr Val Ser Ser
145 150

<210> SEQ ID NO 113
<211> LENGTH: 153
<212> TYPE: PRT
<213> ORGANISM: Artificial Sequence

```
<220> FEATURE:
<223> OTHER INFORMATION: Synthetic polypeptide

<400> SEQUENCE: 113

Met Leu Leu Leu Val Thr Ser Leu Leu Leu Cys Glu Leu Pro His Pro
1               5                   10                  15

Ala Phe Leu Leu Ile Pro Gln Gly Gln Leu Val Gln Ser Gly Ala Glu
            20                  25                  30

Leu Lys Lys Pro Gly Ala Ser Val Lys Ile Ser Cys Lys Thr Ser Gly
        35                  40                  45

Tyr Arg Phe Asn Phe Tyr His Ile Asn Trp Ile Arg Gln Thr Ala Gly
    50                  55                  60

Arg Gly Pro Glu Trp Met Gly Trp Ile Ser Pro Tyr Ser Gly Asp Lys
65                  70                  75                  80

Asn Leu Ala Pro Ala Phe Gln Asp Arg Val Ile Met Thr Thr Asp Thr
                85                  90                  95

Glu Val Pro Val Thr Ser Phe Thr Ser Thr Gly Ala Ala Tyr Met Glu
            100                 105                 110

Ile Arg Asn Leu Lys Phe Asp Asp Thr Gly Thr Tyr Phe Cys Ala Lys
        115                 120                 125

Gly Leu Leu Arg Asp Gly Ser Ser Thr Trp Leu Pro Tyr Leu Trp Gly
    130                 135                 140

Gln Gly Thr Leu Leu Thr Val Ser Ser
145                 150


<210> SEQ ID NO 114
<211> LENGTH: 153
<212> TYPE: PRT
<213> ORGANISM: Artificial Sequence
<220> FEATURE:
<223> OTHER INFORMATION: Synthetic polypeptide

<400> SEQUENCE: 114

Met Leu Leu Leu Val Thr Ser Leu Leu Leu Cys Glu Leu Pro His Pro
1               5                   10                  15

Ala Phe Leu Leu Ile Pro Glu Val Gln Leu Val Glu Ser Gly Gly Gly
            20                  25                  30

Leu Val Lys Pro Gly Gly Ser Leu Arg Leu Ser Cys Ser Ala Ser Gly
        35                  40                  45

Phe Asp Phe Asp Asn Ala Trp Met Thr Trp Val Arg Gln Pro Pro Gly
    50                  55                  60

Lys Gly Leu Glu Trp Val Gly Arg Ile Thr Gly Pro Gly Glu Gly Trp
65                  70                  75                  80

Ser Val Asp Tyr Ala Ala Pro Val Glu Gly Arg Phe Thr Ile Ser Arg
                85                  90                  95

Leu Asn Ser Ile Asn Phe Leu Tyr Leu Glu Met Asn Asn Leu Arg Met
            100                 105                 110

Glu Asp Ser Gly Leu Tyr Phe Cys Ala Arg Thr Gly Lys Tyr Tyr Asp
        115                 120                 125

Phe Trp Ser Gly Tyr Pro Pro Gly Glu Glu Tyr Phe Gln Asp Trp Gly
    130                 135                 140

Arg Gly Thr Leu Val Thr Val Ser Ser
145                 150


<210> SEQ ID NO 115
<211> LENGTH: 151
<212> TYPE: PRT
```

<213> ORGANISM: Artificial Sequence
<220> FEATURE:
<223> OTHER INFORMATION: Synthetic polypeptide

<400> SEQUENCE: 115

Met Leu Leu Leu Val Thr Ser Leu Leu Leu Cys Glu Leu Pro His Pro
1 5 10 15

Ala Phe Leu Leu Ile Pro Gln Val Gln Leu Leu Gln Ser Gly Ala Ala
20 25 30

Val Thr Lys Pro Gly Ala Ser Val Arg Val Ser Cys Glu Ala Ser Gly
35 40 45

Tyr Asn Ile Arg Asp Tyr Phe Ile His Trp Trp Arg Gln Ala Pro Gly
50 55 60

Gln Gly Leu Gln Trp Val Gly Trp Ile Asn Pro Lys Thr Gly Gln Pro
65 70 75 80

Asn Asn Pro Arg Gln Phe Gln Gly Arg Val Ser Leu Thr Arg His Ala
85 90 95

Ser Trp Asp Phe Asp Thr Phe Ser Phe Tyr Met Asp Leu Lys Ala Leu
100 105 110

Arg Ser Asp Asp Thr Ala Val Tyr Phe Cys Ala Arg Gln Arg Ser Asp
115 120 125

Tyr Trp Asp Phe Asp Val Trp Gly Ser Gly Thr Gln Val Thr Val Ser
130 135 140

Ser Ala Ser Thr Lys Gly Pro
145 150

<210> SEQ ID NO 116
<211> LENGTH: 125
<212> TYPE: PRT
<213> ORGANISM: Artificial Sequence
<220> FEATURE:
<223> OTHER INFORMATION: Synthetic polypeptide

<400> SEQUENCE: 116

Gln Val Arg Leu Ser Gln Ser Gly Gly Gln Met Lys Lys Pro Gly Glu
1 5 10 15

Ser Met Arg Leu Ser Cys Arg Ala Ser Gly Tyr Glu Phe Leu Asn Cys
20 25 30

Pro Ile Asn Trp Ile Arg Leu Ala Pro Gly Arg Arg Pro Glu Trp Met
35 40 45

Gly Trp Leu Lys Pro Arg Trp Gly Ala Val Asn Tyr Ala Arg Lys Phe
50 55 60

Gln Gly Arg Val Thr Met Thr Arg Asp Val Tyr Ser Asp Thr Ala Phe
65 70 75 80

Leu Glu Leu Arg Ser Leu Thr Ser Asp Asp Thr Ala Val Tyr Phe Cys
85 90 95

Thr Arg Gly Lys Tyr Cys Thr Ala Arg Asp Tyr Tyr Asn Trp Asp Phe
100 105 110

Glu His Trp Gly Arg Gly Ala Pro Val Thr Val Ser Ser
115 120 125

<210> SEQ ID NO 117
<211> LENGTH: 473
<212> TYPE: PRT
<213> ORGANISM: Artificial Sequence
<220> FEATURE:
<223> OTHER INFORMATION: Synthetic polypeptide

<400> SEQUENCE: 117

```
Met Val Arg Gly Val Pro Phe Arg His Leu Leu Leu Val Leu Gln Leu
1               5                   10                  15

Ala Leu Leu Pro Ala Ala Thr Gln Gly Lys Lys Val Val Leu Gly Lys
            20                  25                  30

Lys Gly Asp Thr Val Glu Leu Thr Cys Thr Ala Ser Gln Lys Lys Ser
        35                  40                  45

Ile Gln Phe His Trp Lys Asn Ser Asn Gln Ile Lys Ile Leu Gly Asn
    50                  55                  60

Gln Gly Ser Phe Leu Thr Lys Gly Pro Ser Lys Leu Asn Asp Arg Ala
65                  70                  75                  80

Asp Ser Arg Arg Ser Leu Trp Asp Gln Gly Asn Phe Pro Leu Ile Ile
                85                  90                  95

Lys Asn Leu Lys Ile Glu Asp Ser Asp Thr Tyr Ile Cys Glu Val Glu
            100                 105                 110

Asp Gln Lys Glu Glu Val Gln Leu Leu Val Phe Gly Leu Thr Ala Asn
        115                 120                 125

Ser Asp Thr His Leu Leu Gln Gly Gln Ser Leu Thr Leu Thr Leu Glu
    130                 135                 140

Ser Pro Pro Gly Ser Ser Pro Ser Val Gln Cys Arg Ser Pro Arg Gly
145                 150                 155                 160

Lys Asn Ile Gln Gly Gly Lys Thr Leu Ser Val Ser Gln Leu Glu Leu
                165                 170                 175

Gln Asp Ser Gly Thr Trp Thr Cys Thr Val Leu Gln Asn Gln Lys Lys
            180                 185                 190

Val Glu Phe Lys Ile Asp Ile Val Val Leu Ala Phe Gln Lys Ala Ser
        195                 200                 205

Gly Gly Gly Gly Ser Gly Gly Gly Gly Ser Gln Val Gln Leu Leu Glu
    210                 215                 220

Ser Gly Ala Glu Val Lys Lys Pro Gly Ser Ser Val Lys Val Ser Cys
225                 230                 235                 240

Lys Ala Ser Gly Asp Thr Phe Ile Arg Tyr Ser Phe Thr Trp Val Arg
                245                 250                 255

Gln Ala Pro Gly Gln Gly Leu Glu Trp Met Gly Arg Ile Ile Thr Ile
            260                 265                 270

Leu Asp Val Ala His Tyr Ala Pro His Leu Gln Gly Arg Val Thr Ile
        275                 280                 285

Thr Ala Asp Lys Ser Thr Ser Thr Val Tyr Leu Glu Leu Arg Asn Leu
    290                 295                 300

Arg Ser Asp Asp Thr Ala Val Tyr Phe Cys Ala Gly Val Tyr Glu Gly
305                 310                 315                 320

Glu Ala Asp Glu Gly Glu Tyr Asp Asn Asn Gly Phe Leu Lys Gly Trp
                325                 330                 335

Gly Gln Gly Thr Leu Val Thr Val Thr Ser Gly Gly Gly Gly Ser Gly
            340                 345                 350

Gly Gly Gly Ser Gly Gly Gly Gly Ser Glu Leu Glu Leu Thr Gln Ser
        355                 360                 365

Pro Ala Thr Leu Ser Val Ser Pro Gly Glu Arg Ala Thr Leu Ser Cys
    370                 375                 380

Arg Ala Ser Glu Ser Val Ser Ser Asp Leu Ala Trp Tyr Gln Gln Lys
385                 390                 395                 400

Pro Gly Gln Ala Pro Arg Leu Leu Ile Tyr Gly Ala Ser Thr Arg Ala
                405                 410                 415
```

-continued

```
Thr Gly Val Pro Ala Arg Phe Ser Gly Ser Gly Ser Gly Ala Glu Phe
            420                 425                 430

Thr Leu Thr Ile Ser Ser Leu Gln Ser Glu Asp Phe Ala Val Tyr Tyr
        435                 440                 445

Cys Gln Gln Tyr Asn Asn Trp Pro Pro Arg Tyr Thr Phe Gly Gln Gly
    450                 455                 460

Thr Arg Leu Glu Ile Lys Ala Ala Ala
465                 470
```

CAR FOR TREATMENT OF HIV INFECTION

CROSS-REFERENCE TO RELATED APPLICATIONS

This application is the National Stage Application of International Application No. PCT/US2018/057124, filed on Oct. 23, 2018, which claims priority to U.S. Application No. 62/576,063, filed on Oct. 23, 2017. The entire contents of the foregoing are incorporated herein by reference.

FEDERALLY SPONSORED RESEARCH OR DEVELOPMENT

This invention was made with government support under MH113407, AI099783, AI111139, and DK104681 awarded by the National Institutes of Health. The government has certain rights in the invention

SEQUENCE LISTING

This application contains a Sequence Listing that has been submitted electronically as an ASCII text file named Sequence_Listing.txt and is hereby incorporated in reference in its entirety. Said ASCII text file, created on Apr. 14, 2020, is 24, 6033 bytes in size.

BACKGROUND

HIV-infected individuals can develop a T cell response to HIV. However, the virus can largely evade endogenous T cell-mediated immune response through various mechanisms and, in the vast majority of cases, this loss of T cell function is critical for continued HIV replication. Thus, antiretroviral therapy (ART), which can dramatically reduce HIV replication, is currently the only method for control of HIV and has become the standard of care. Because ART does not eliminate the virus, people living with HIV must remain on ART therapy indefinitely. Accordingly, it has been suggested that there is a new way to develop an engineered immune response to provide long-lasting control of HIV infection in the absence of ART.

SUMMARY

Described herein are methods for reducing or eliminating HIV-infected cells, including latently infected cells, in an HIV-infected individual using chimeric antigen receptor (CAR) T cell therapy. The methods use a CMV-specific T cell platform for making CAR T cells that are redirected to kill HIV-infected cells and are responsive to a CMV vaccine to maintain and boost levels and activity of these immune cells. This immunotherapy, described herein, kills HIV-infected cells in a manner that also limits the emergence of viral escape, ultimately resulting in reduction or eradication of HIV-infected cells. The approach entails generating CMV-HIV CAR T cells and infusing these modified T cells into HIV subjects, either before, during, or after they have had their antiretroviral therapy (ART) removed (FIG. 1). In some cases, CMV-HIV CAR T cells targeted to two or more (e.g., four) distinct epitopes on the HIV gp120 membrane protein can be used (FIGS. 3A-3B).

In various embodiments: the chimeric antigen receptor comprises: a single-chain variable fragment (scFv) of an anti-HIV-1 gp120 antibody selected from those in FIGS. 3A-3B; a spacer region; a CD28 transmembrane domain; a CD28 co-signaling domain; and a CD3ζ signaling domain; the chimeric antigen receptor comprises: a HIV scFv; a spacer region; a CD4 transmembrane domain; a 4-1BB co-signaling domain; and a CD3ζ signaling domain; the chimeric antigen receptor comprises: a HIV scFv; a spacer region comprising an amino acid sequence selected from SEQ ID Nos:2-5 and 9-12; a CD4 transmembrane domain; a 4-1BB co-signaling domain; and a CD3ζ signaling domain; the chimeric antigen receptor comprises: a HIV scFv; a spacer region comprising an amino acid sequence selected from SEQ ID Nos:2-5 and 9-12; a CD28 transmembrane domain; a CD28 co-signaling domain; and a CD3ζ signaling domain; the chimeric antigen receptor comprises: a HIV scFv; a spacer a spacer comprising an amino acid sequence selected from SEQ ID Nos:2-5 and 9-12; CD4 transmembrane domain; a 4-1BB co-signaling domain; and CD3ζ signaling domain; the chimeric antigen receptor comprises: a spacer a spacer comprising an amino acid sequence selected from SEQ ID Nos:2-5 and 9-12; a CD28 transmembrane domain; a CD28 co-signaling domain; and a CD3ζ signaling domain; the chimeric antigen receptor comprises an amino acid sequence at least 95% identical to an amino acid sequence selected from: SEQ ID NOs: 20-40; the chimeric antigen receptor comprises an amino acid sequence identical to an amino acid sequence selected from: SEQ ID NOs: 29-30; the chimeric antigen receptor comprises an amino acid sequence identical to an amino acid sequence selected from: SEQ ID NOs: 29-40, each with no more than 5 single amino acid substitutions; at least 20%, 30%, or 40% of the transduced human T cells are central memory T cells; at least 30% of the transduced human T cells are CD4+ and CD62L+ or CD8+ and CD62L+; the population of human T cells are autologous to the patient; and the population of human T cells are allogenic to the patient. Described herein is a human T cell expressing: (a) a T cell receptor (TCR) that is activated by binding to a CMV antigen; and (b) a chimeric antigen receptor (CAR) comprising an antigen-binding domain that binds to an epitope on HIV gp120, a spacer, a transmembrane domain, a co-stimulatory domain, and a CD3 zeta signaling domain. In various embodiments: the antigen-binding domain is a scFv comprising a heavy chain variable region and a light chain variable region; the heavy chain variable region has an amino acid sequence as shown in FIGS. 5A-5B, and wherein the light chain variable region has an amino acid sequence that is the corresponding light chain variable region sequence shown in FIGS. 5A-5B; wherein the transmembrane domain is a CD4, CD8 or CD28 transmembrane domain; wherein the co-stimulatory domain is a 4-1BB or CD28 co-stimulatory domain; the cell expresses a second CAR wherein the first CAR comprises a first antigen-binding domain, a first spacer, a first transmembrane domain, a first co-stimulatory domain, and a first intracellular signaling domain, wherein the second CAR comprises a second antigen-binding domain, a second spacer, a second transmembrane domain, a second co-stimulatory domain, and a second intracellular signaling domain, wherein the first antigen-binding domain is different from the second antigen-binding domain, and wherein the first antigen-binding domain binds to a first epitope on HIV gp120, and the second antigen-binding domain binds to a second epitope on HIV gp120, wherein the second epitope is the same as or different from the first epitope; and the first antigen-binding domain comprises a first scFv, and the second antigen-binding domain comprises a second scFv, wherein the amino acid sequence of the first scFv is different from the amino acid sequence of the second scFv.

Also described is a method for treating HIV comprising administering to a patient in need thereof a population of human T cells comprising T cells expressing CAR targeted to two or more HIV gp120 epitopes. In various embodiments: the chimeric antigen receptor comprises: a HIV scFv; a spacer region; a CD4, CD8 or CD28 transmembrane domain; a 4-IBB of CD28 co-signaling domain; and a CD3ζ signaling domain; the T cells express a T cell receptor specific for a cytomegalovirus (CMV) antigen; the population of human T cells comprising T cells expressing CAR targeted to three or more HIV gp120 epitopes; the population of human T cells comprising T cells expressing CAR targeted to four or more HIV gp120 epitopes; the population of human T cells comprising T cells expressing CAR targeted to six or more HIV gp120 epitopes; the patient is not being administered anti-retroviral therapy at the time of administration; the patient is further administered a T cell antigen; the chimeric antigen receptor comprises an amino acid sequence identical to an amino acid sequence selected from: SEQ ID NOs: 29-40 or 41-53; the method further comprises: administering to the patient a viral vector encoding: (i) CMV pp65 and (ii) a fusion protein comprising exon 4 of CMV protein IE1 (e4) and exon 5 of CMV protein IE2 (e5) either prior to or subsequent to administering the composition comprising a population of T cells to the patient; the T cells are allogenic to the patient; T cells are engineered autologous T cells; the patient is treated to activate HIV-1 provirus before or after administration of the population of T cells; the T cells express a T cell receptor specific for a cytomegalovirus (CMV) antigen and are expanded in the presence of a T cell antigen before administration to the patient; the CMV antigen is a CMV peptide or a CMV vaccine; the expansion is in the presence of any HIV antigen and a CMV antigen; and the expansion is in the absence of an HIV antigen.

Also described is a method of treating HIV in an HIV infected subject, comprising: obtaining a population of cells comprising PBMC from the subject and treating the cells to obtain a subpopulation of T cells that express a TCR that binds to an CMV antigen; treating the subpopulation of cells to introduce a vector encoding a CAR that binds to an epitope on HIV gp120, thereby creating a population of bi-specific T cells expressing a TCR that binds to a CMV antigen and a CAR that binds to an epitope on HIV gp120; expanding the population of bi-specific T cells; and administering the expanded bi-specific T cells to the subject.

In various embodiments: the method further comprises administering a CMV antigen to the subject prior to obtaining a population of cells comprising PBMC from the subject; a CMV antigen is administered to the patient before, in conjunction with or after administering the expanded bi-specific T cells to the subject; the CAR comprises an antigen-binding domain that binds to an epitope on HIV gp120, a spacer, a transmembrane domain, a co-stimulatory domain, and a CD3 zeta signaling domain; the antigen-binding domain is a scFv comprising a heavy chain variable region and a light chain variable region; the heavy chain variable region has an amino acid sequence as shown in FIGS. 5A-5B, and wherein the light chain variable region has an amino acid sequence that is the corresponding light chain variable region sequence shown in FIGS. 5A-5B; the transmembrane domain is a CD4, CD8 or CD28 transmembrane domain; the co-stimulatory domain is a 4-1BB or CD28 co-stimulatory domain; the CAR comprises the amino acid sequence of any of SEQ ID NOS: 20-50 with up to 10 single amino acids substitutions; the CAR comprises the amino acid sequence of any of SEQ ID NOS: 20-50 with up to 5 single amino acids substitutions; the CAR comprises the amino acid sequence of any of SEQ ID NOS: 20-50 with up to 10 single amino acids substitutions; the T cells express a T cell receptor specific for a cytomegalovirus (CMV) antigen and are expanded in the presence of a T cell antigen before administration to the patient; the CMV antigen is a CMV peptide or a CMV vaccine; the expansion is in the presence of a HIV antigen and a CMV antigen; and the expansion is in the absence of an HIV antigen.

Also described is a method comprising: obtaining a population of PBMC comprising T cells express a TCR that binds to a CMV antigen; exposing the population of PBMC to a CMV antigen; treating the exposed cells to isolated a subpopulation of cells enriched for activated cells expressing a TCR that binds to a CMV antigen; treating the subpopulation of cells to introduce a vector encoding a CAR that binds to an epitope on HIV gp120, thereby creating a population of bi-specific T cells expressing a TCR that binds to a CMV antigen and a CAR binds to an epitope on HIV gp120.

In various embodiments: the CAR comprises an antigen-binding domain that binds to an epitope on HIV gp120, a spacer, a transmembrane domain, a co-stimulatory domain, and a CD3 zeta signaling domain; the antigen-binding domain is a scFv comprising a heavy chain variable region and a light chain variable region; the heavy chain variable region has an amino acid sequence as shown in FIGS. 5A-5B, and wherein the light chain variable region has an amino acid sequence that is the corresponding light chain variable region sequence shown in FIGS. 5A-5B; the transmembrane domain is a CD4, CD8 or CD28 transmembrane domain; the co-stimulatory domain is a 4-1BB or CD28 co-stimulatory domain; the CAR comprises the amino acid sequence of any of SEQ ID NOS: 20-50 with up to 10 single amino acids substitutions; the CAR comprises the amino acid sequence of any of SEQ ID NOS: 20-50 with up to 5 single amino acids substitutions; the CAR comprises the amino acid sequence of any of SEQ ID NOS: 20-50 with up to 10 single amino acids substitutions; the T cells express a T cell receptor specific for a cytomegalovirus (CMV) antigen and are expanded in the presence of a T cell antigen before administration to the patient; the CMV antigen is a CMV peptide or a CMV vaccine; the expansion is in the presence of any HIV antigen and a CMV antigen; and the expansion is in the absence of an HIV antigen.

Described herein are CARs incorporating an scFv target to surface subunit of the HIV-1 envelope glycoprotein gp120 (e.g., one of the scFv described herein), which can be used alone or in various combinations to target HIV-infected cells. Among the gp120 binding sites that can be targeted are: V1/2 glycan, V1-2-3 glycan, V3 glycan, the mannose dependent site, CD4/V3, CD4 binding site, proximal CD4b spike, the membrane proximal region, gp41-120 interface. These binding sites and certain known antibodies targeting each are depicted in FIG. 3A and FIG. 3B. Thus, among the known scFv that can be incorporated into a CAR for use in the methods described herein are: 45-46, PGT121, PGDM1400, 3BC176, PGY126, PGT128, PGT145, PG9, PG16, VRC01, VRC07-523, X5, 35O22, 10E8, 3BNC117, and CD4-17b. For example, a combination of CAR constructs each incorporating one or more of N6, PGDM1400, PGT121 or 3BC176 scFv can be used. The pooled CAR vectors can be used to transduce the respective HIV subject-derived CMV-specific T cells that are then re-infused into the subject. Notably, the bi-specific nature of these CAR T cells allows CMV vaccine induced activation of the particular T cells.

(1) an endogenous T cell receptor (TCR) complex that can be activated by MHC-presented CMV immunogenic peptides from the CMV-MVA Triplex vaccine; (2) chimeric antigen receptor (CAR) redirecting the T cells to gp120-expressing HIV-infected cells. The CAR construct contains the extracellular scFv domain of the broadly neutralizing antibody (bNAb) N6 with a linker, a transmembrane domain, a costimulatory domain (4-1BB), and the CD3ζ domain for T cell activation; and (3) a truncated human epidermal growth factor receptor (EGFRt) to serve as tracking/suicide element activated by cetuximab should CRS or neurotoxicity be observed.

Figure 1:
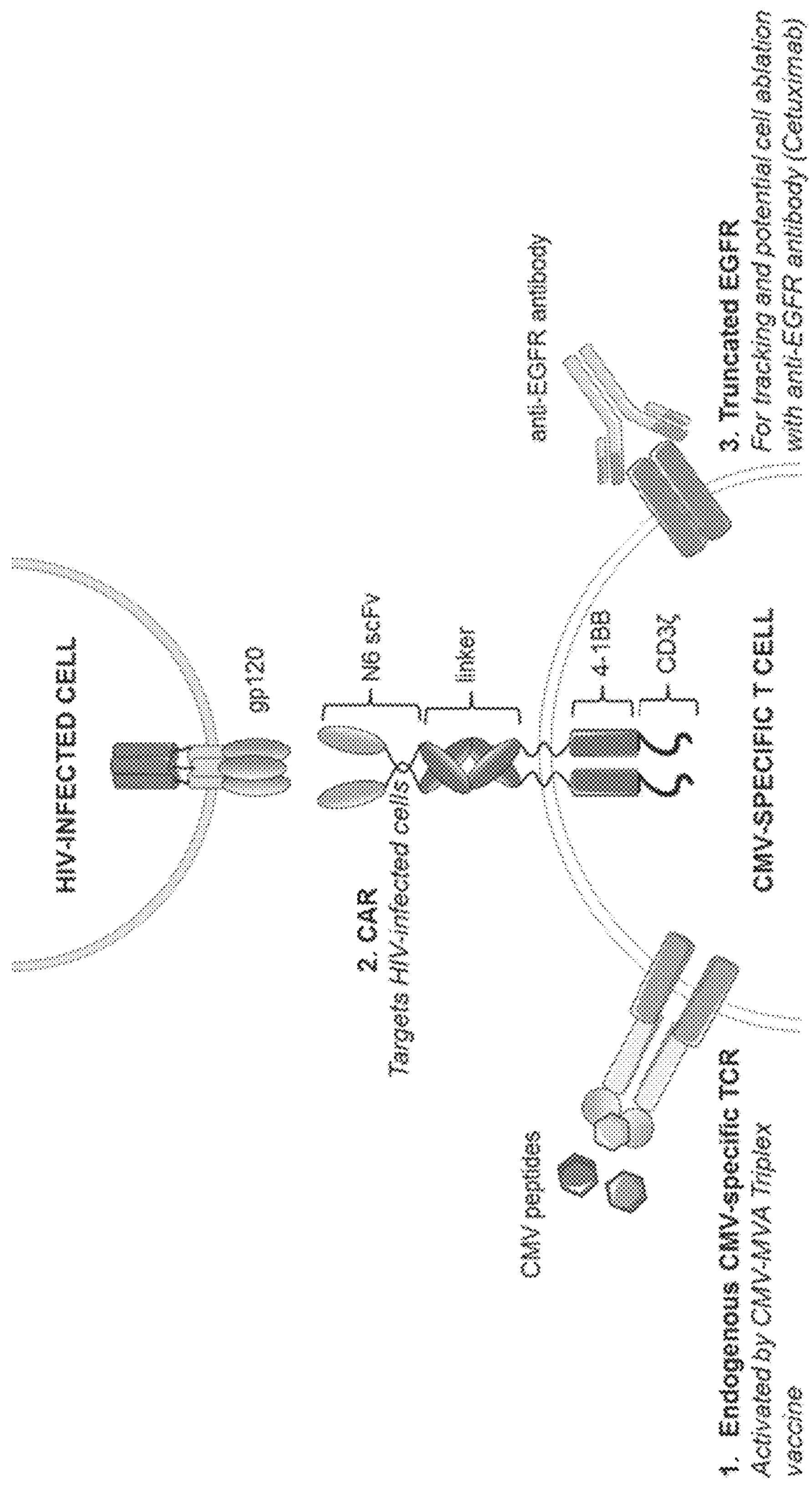
FIG. 1 is a schematic depiction of an example of a CMV-HIV CAR T cell. These CMV-specific T cells express.
Figure 2:
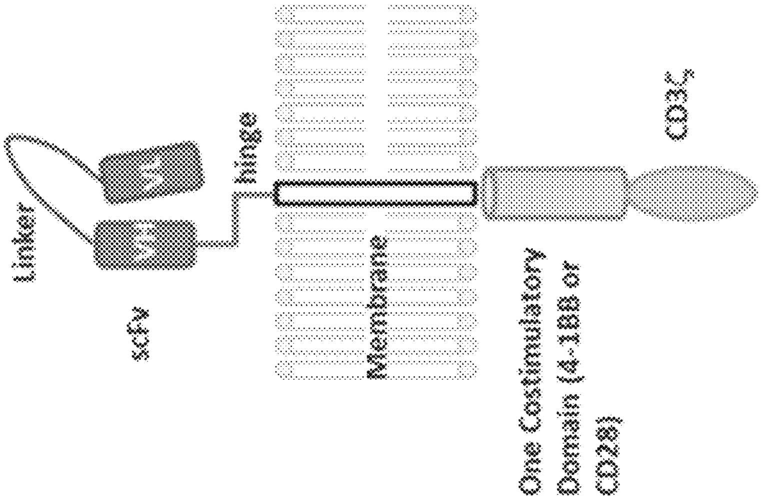

FIG. 2 is a schematic depiction of a chimeric antigen receptor (CAR).

Figures 3A, 3B:
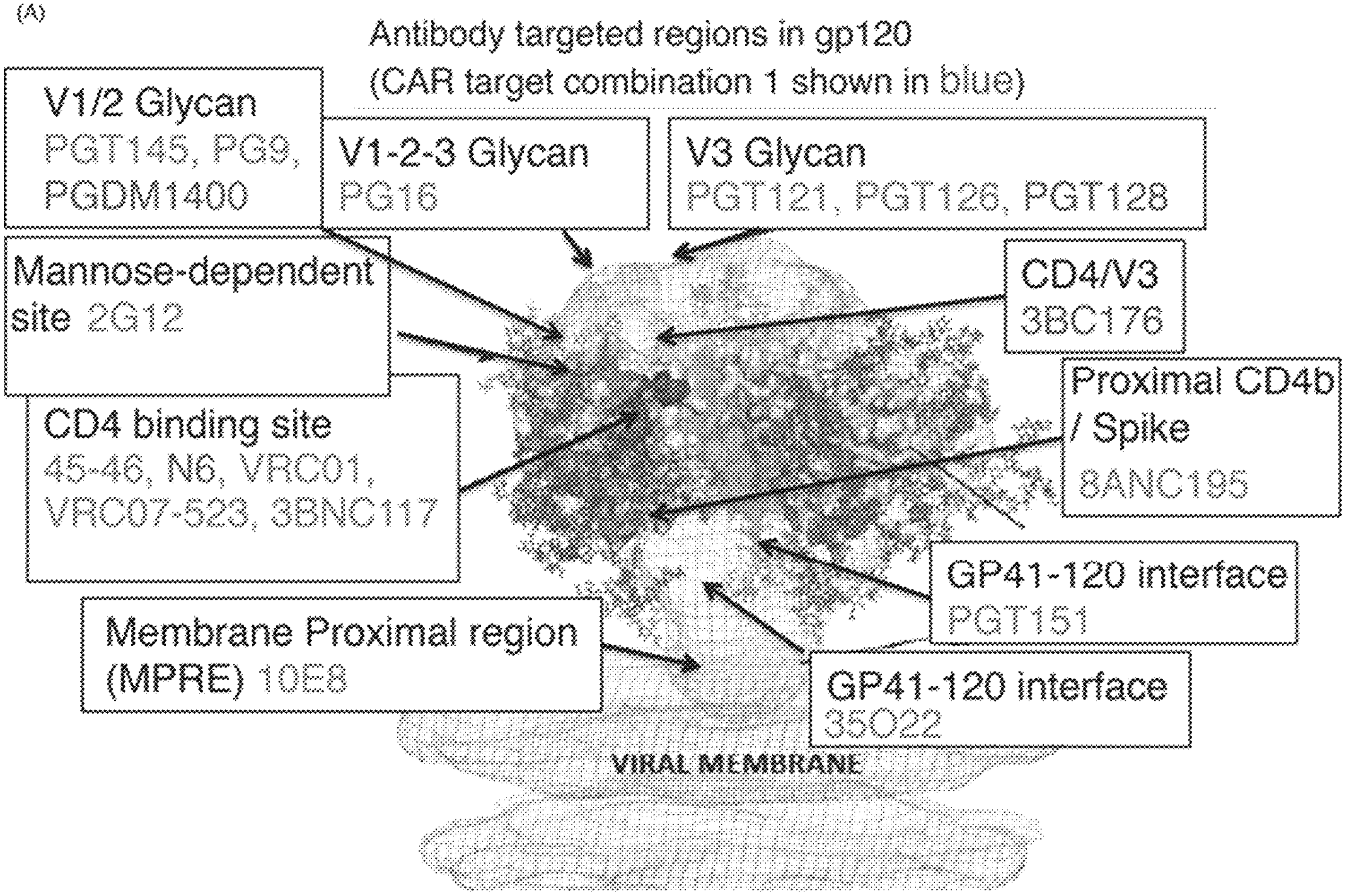

FIGS. 3A-3B are schematic depictions of neutralizing antibody sites on the gp120 HIV envelope protein. A shows various well documented antibody target epitopes with selected antibodies, including those used in swarm (PGDM1400, N6, PGT128, 3BC176). CD4+/CD8+ CAR T-cells are generated with the ability to target the PGDM1400, PGT121, N6 and 3BC176 binding sites. Each site can be targeted alone or in various combinations to avoid a priori the emergence of HIV viral mutations and resistance. B lists 16 different monoclonal antibodies that have been previously reported to potently suppress or neutralize HIV-infected cells by HIVgp120 targeting. An scFv from each has been cloned into a CAR. In each case the CAR uses the IgG4(L235E, N297Q) hinge, 4-1BB co-stimulatory domain and CD3 zeta stimulatory domain.

Figure 4:
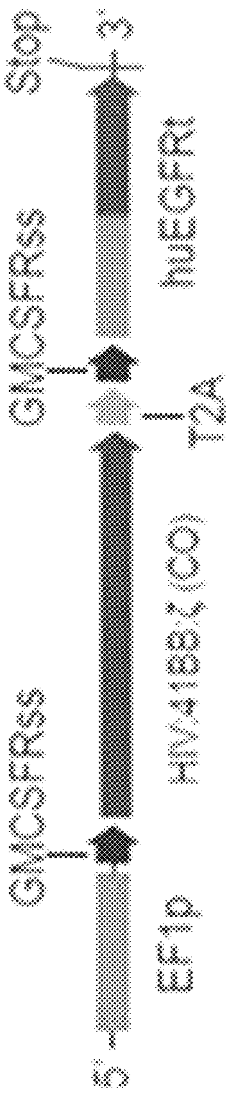

FIG. 4 is a schematic depiction of the CAR lentivirus construct. The construct contains an anti-gp120 scFv based on a broadly neutralizing antibody (bNAb), a spacer, a transmembrane domain, a 4-1BB costimulatory element a CD3 zeta domain, and a truncated human epidermal growth factor receptor (EGRFt).

FIGS. 5A-5B is a table providing examples of heavy chain and light chain antibody sequences that can be used to produce HIVgp120-targeted CAR.

Figure 6:
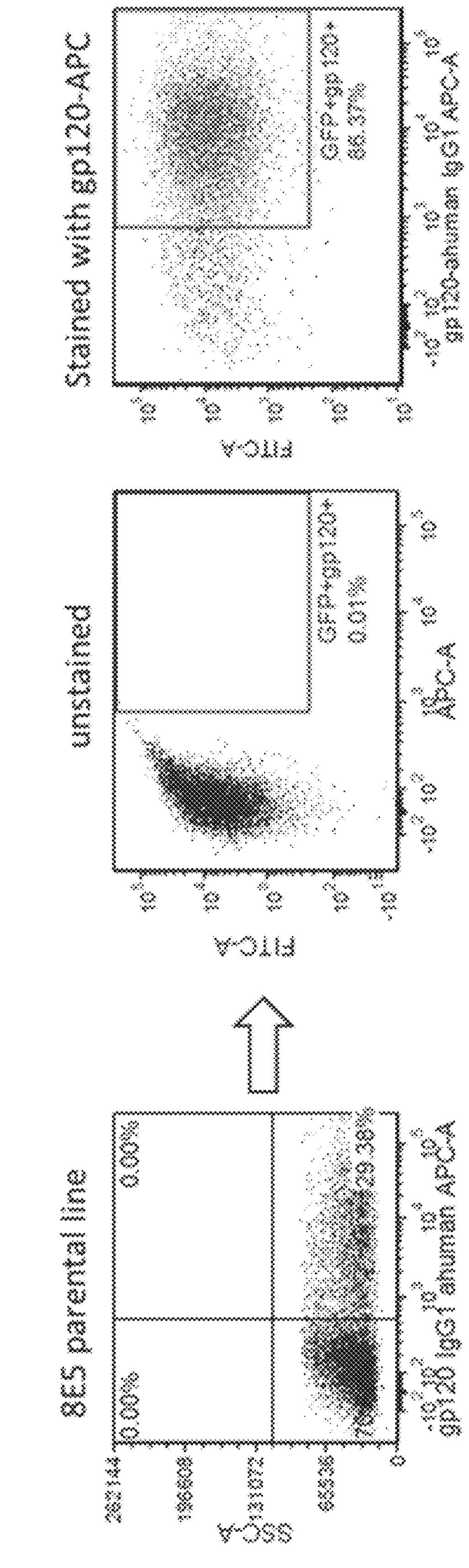

FIG. 6 depicts FACS results showing the development of the gp120-8E5 cell line. Approximately 30% of the parental 8E5 cells express gp120 (left panel). Upon transduction with a lentiviral vector, transduced cells were sorted for eGFP and gp120 after 14 days in culture and 86.4% were double positive.

Figure 7A:
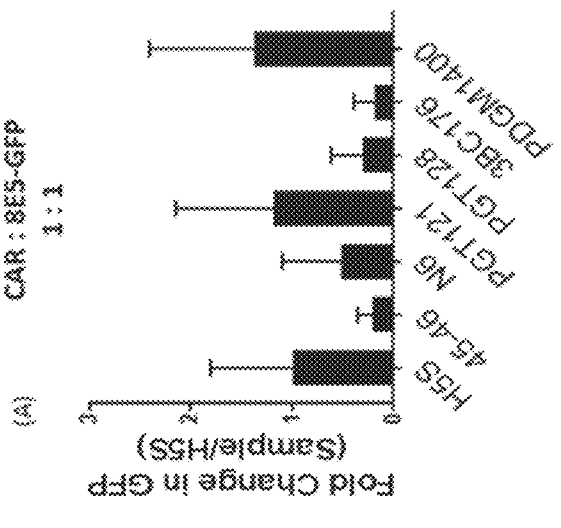
Figure 7B:
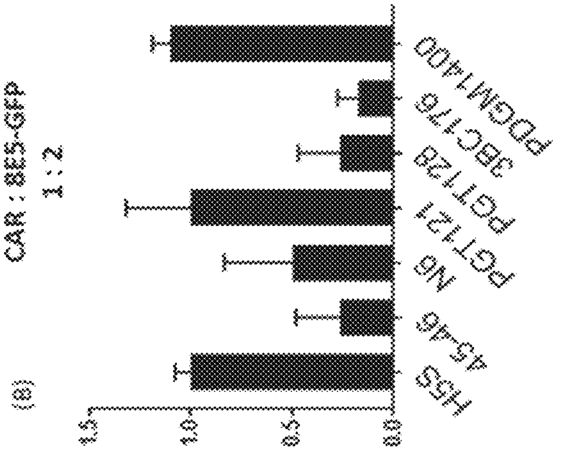
Figure 7C:
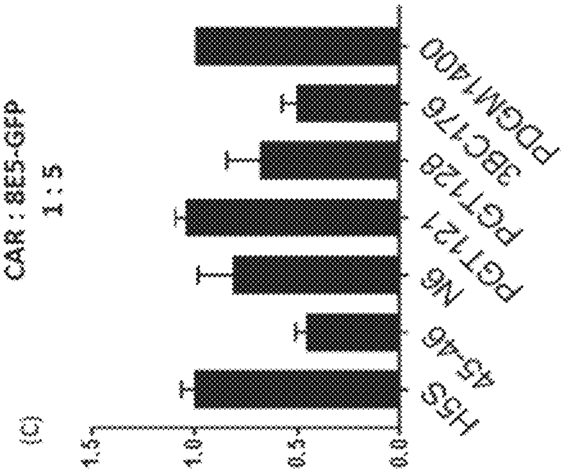

FIGS. 7A-7C depicts the results of a study showing the cytotoxic effect of various HIV-CAR T cells on $gp120^{pos}$ 8E5-eGFP+ cells. Various CARs expressing the scFv of 45-46, N6, PGT121, PGT128, 3BC176 PDGM1400 and control 5S antibody (directed to HBV infection) were developed to target HIVgp120. In each case, the CAR construct includes the IgG4(L235E, N297Q) hinge, 4-1BB co-stimulatory domain and CD3 zeta stimulatory domain. The CAR T cells were then interrogated for killing at 1 to 1 (A), 1 to 2 (B), or 1 to 5 (C) ratio of CAR T cells to target $gp120^{pos}$ 8E5-eGFP+ cells. A dose dependent effect is observed with the 45-46, N6, PGT128 and 3BC176-derived CARs, supporting the notion that these 4 CARs can be used as a swarm.

Figure 8:
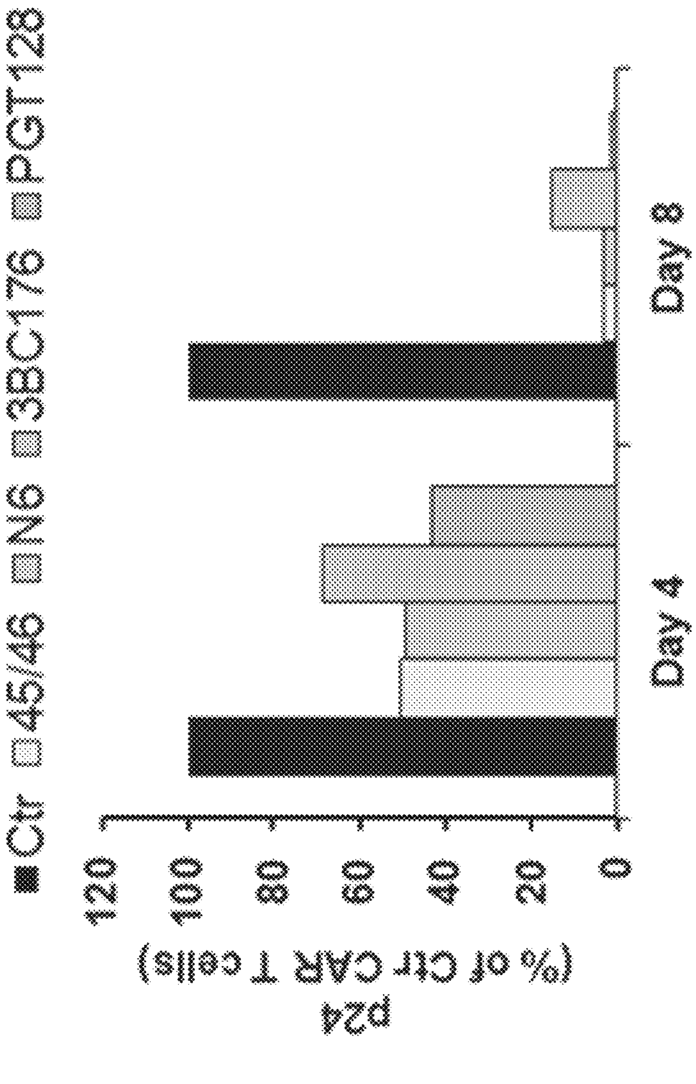

FIG. 8 depicts the results of an evaluation of the antiviral activity of HIV-CAR T cells on chronic HIV (NL4-3) infected Jurkat cells. CAR T cells targeting different binding sites on HIVgp120 were able to kill chronically HIV-infected Jurkat cells. CAR T cells targeting the EBV binding site S5 were used as negative control.

Figures 9A, 9B:
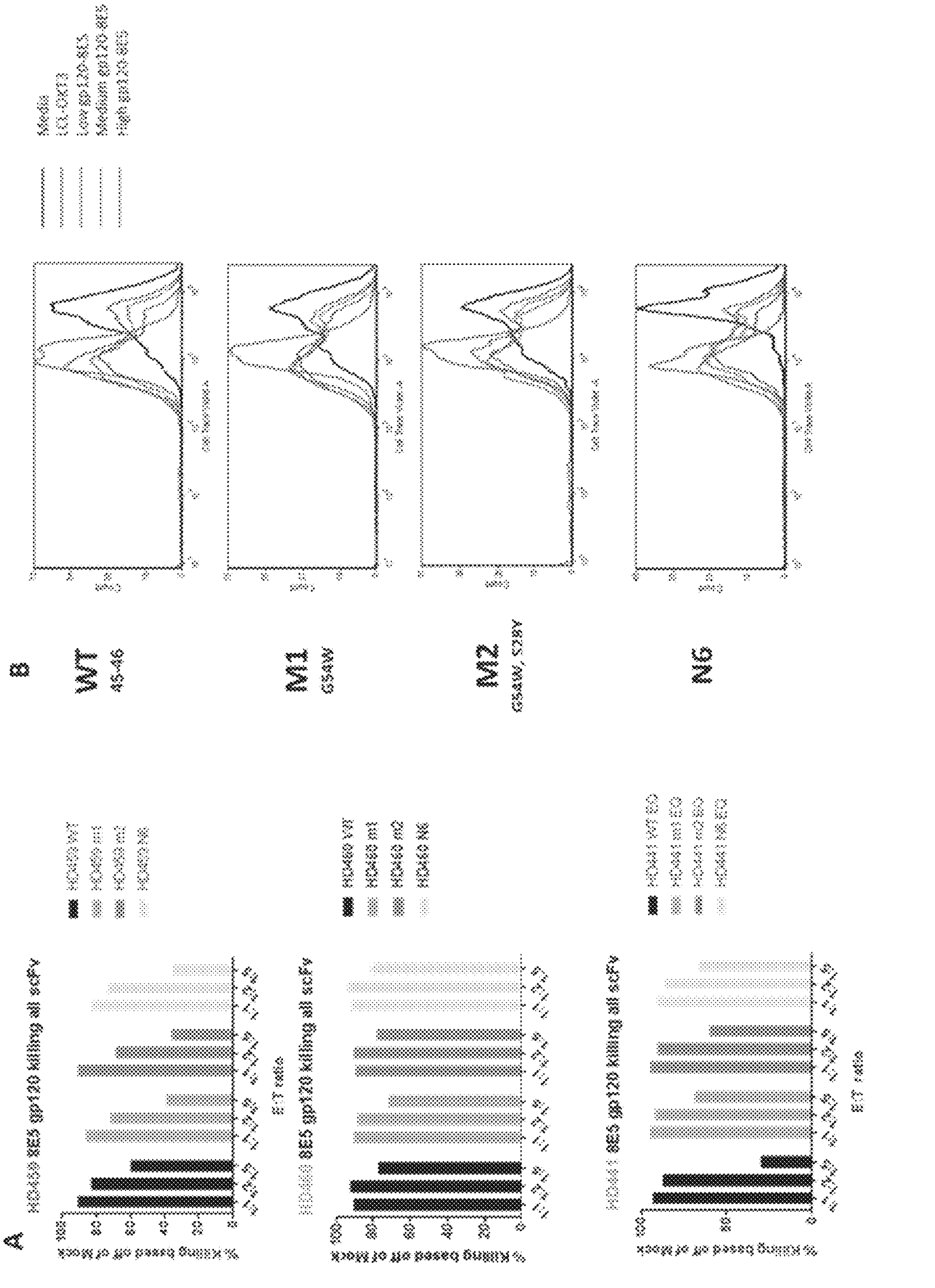

FIGS. 9A-9B depicts the results of an evaluation of the cytotoxicity of HIV-CAR T cells against $gp120^{pos}$ 8E5-eGFP+ cells. HIV-CAR T cells expressing different anti-gp120 scFvs (WT, M1, and M2 45-46 bNAb and N6 bNAb as shown in Table 4) were generated from three healthy donors (HD459, HD460, and HD441). These HIV-CAR T cells were co-cultured with $gp120^{pos}$ 8E5-eGFP+ cells at different E:T ratios. 96 hours later, cytotoxicity was determined by measuring GFP+ cells remaining in the co-culture. Cytotoxicity was normalized off of mock T-cell killing against $gp120^{pos}$ 8E5-eGFP+ cells. B contains graphs showing antigen-driven proliferation of HIV-CAR T cells. To track T-cell proliferation, HIV-CAR T cells expressing different gp120-specific scFvs were stained with 2 μM Cell Trace Violet and co-cultured with varying concentrations of $gp120^{pos}$ 8E5-eGFP+ cells (E:T ratios: 2:1, 1:1, and 0.5:1). 96 hours later, cells were harvested and stained with antibodies specific for T-cell markers and run on the flow cytometer. CAR T cells were gated by EGFR staining and proliferation was based off of CAR+ T cells. T cells in media served as negative control, while T-cells against LCL-OKT3 (a line engineered to express CD3 receptors) served as positive control.

Figure 10A:
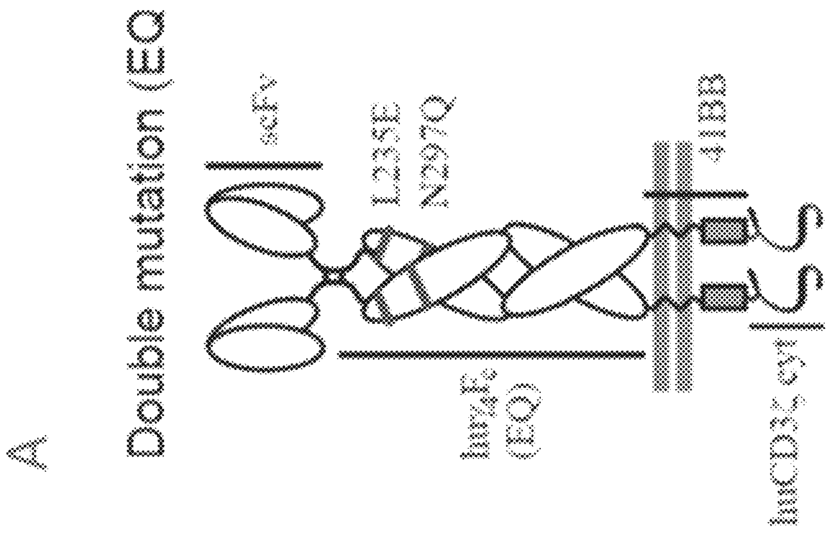
Figure 10B:
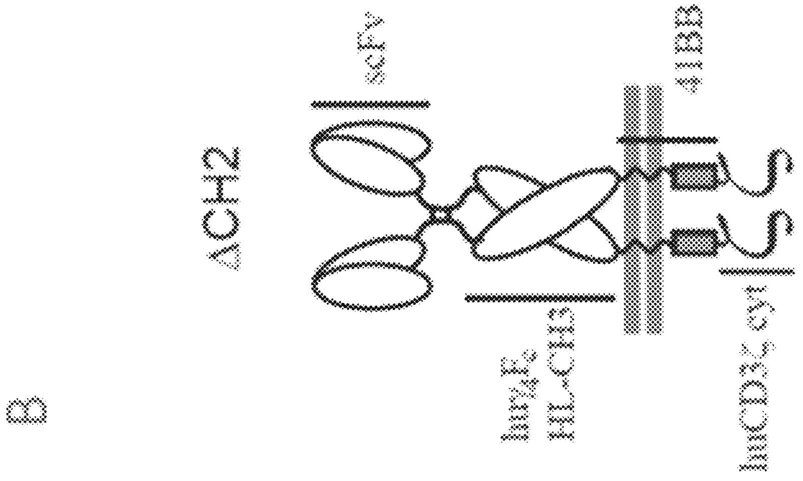

FIGS. 10A-10B are a schematic depiction of HIV-CAR constructs with varying extracellular linker domains. Schematics of two HIV-CARs, each composed of a gp120-specific scFv, a linker domain (double mutation and Δ-CH2), and a costimulatory domain (41BB). The horizontal grey bars represent the plasma membrane. In A, the two linker domains shown are constructed as follows: double mutation contains a human IgG4 hinge region that has been mutated at two sites (red stripes represent L235E and N297Q mutations) to prevent binding by Fc. In B, Δ-CH2 was created from an IgG4 hinge region that was shortened by deleting the CH-2 domain.

Figure 11A:
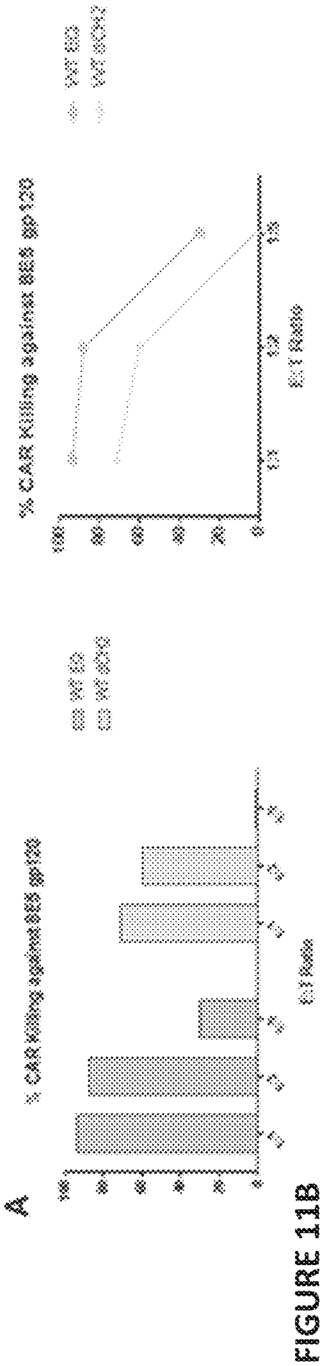
Figure 11B:
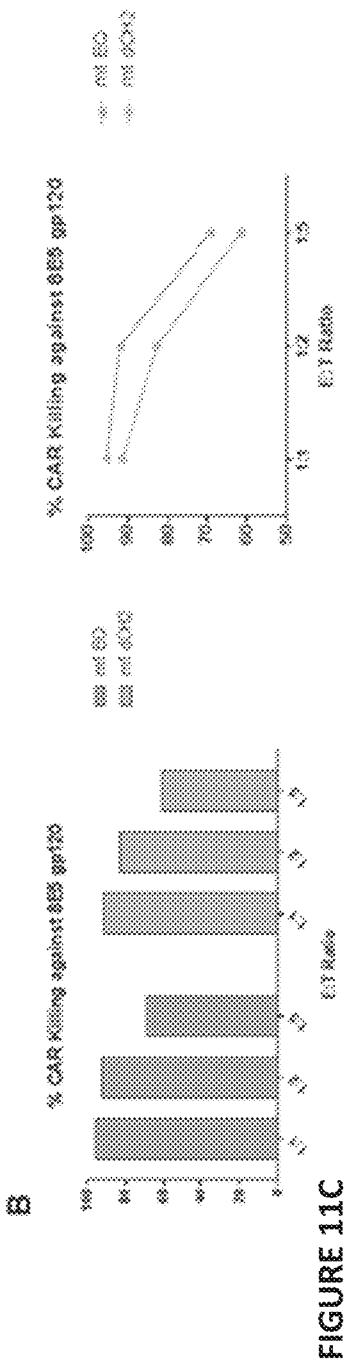
Figure 11C:
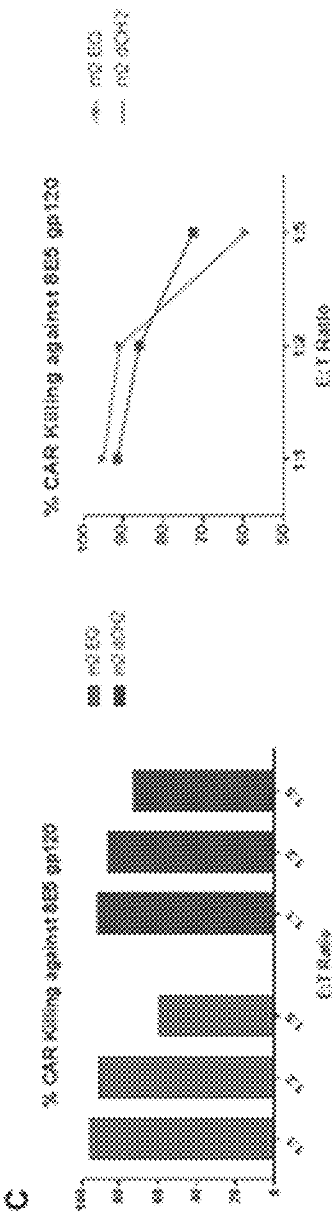

FIGS. 11A-11C depicts the results of an evaluation of the cytotoxicity of HIV-CAR T-cells against $gp120^{pos}$ 8E5-eGFP+ cells. HIV-CAR T-cells with different gp120-specific scFvs and either an EQ or dCH2 linker. The CAR constructs used are: A: WT, 45-46; B: M1 G54W; and C: M2 G54W, S28Y. CAR T-cells were co-cultured with $gp120^{pos}$ 8E5-eGFP+ cells at different E:T ratios and 96 hours later, cytotoxic activity was determined by measuring GFP+ cells remaining in the co-culture. Cytotoxicity was normalized relative to mock T-cell killing of $gp120^{pos}$ 8E5-eGFP+ cells.

Figure 12:
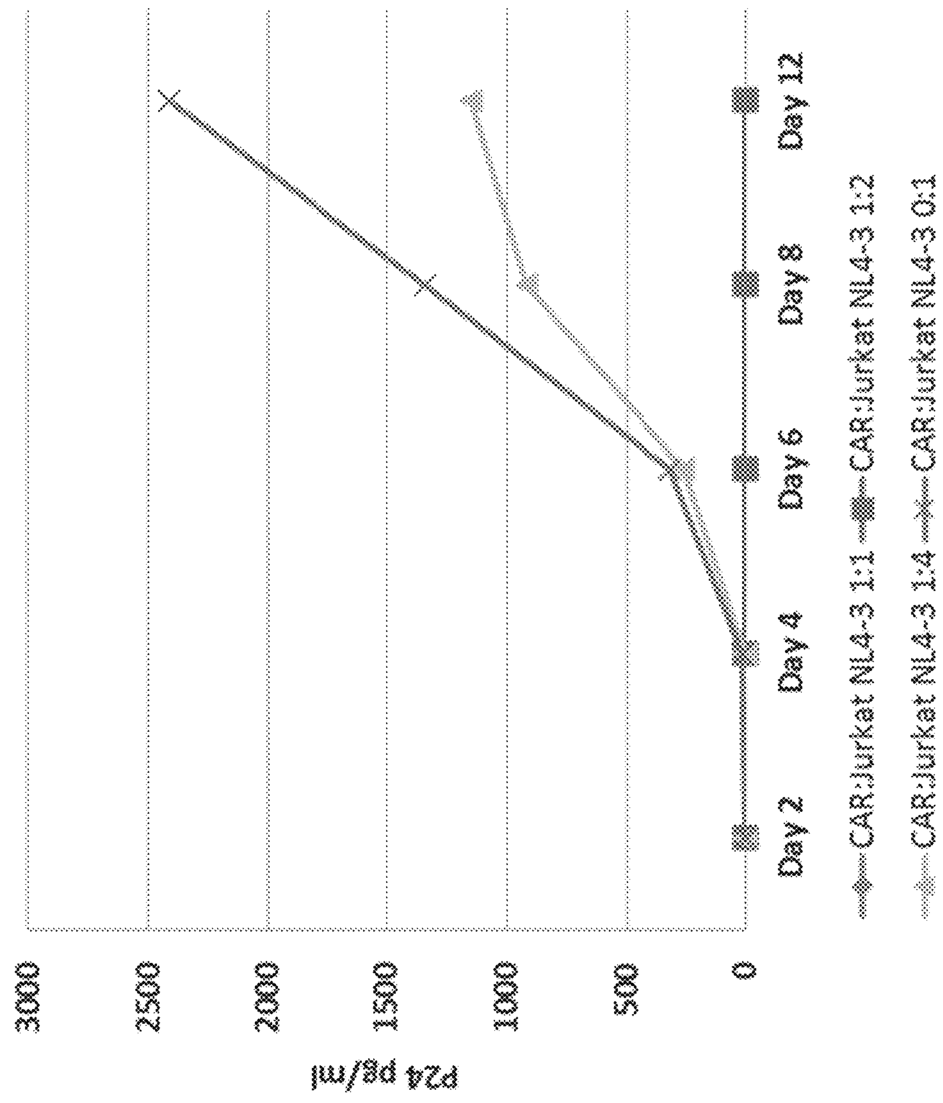

FIG. 12 depicts the results of an evaluation of HIV-CAR T cells in an acute HIV NL4-3 infection. Jurkat cells were infected with HIV-1 NL4-3 (MOI=0.01) for 4 hours before co-culture with HIV-CAR T cells expressing the scFv of 45-46 bNAb targeting the CD4-binding site of HIV gp120, at 1:1, 1:2, 1:4, and 0:1 (control) ratios of CAR T cells to target HIV NL4-3-infected Jurkat cells. The HIV killing activities were evaluated by detecting p24 in ELISA assays on day 2, 4, 6, 8 and 12.

Figure 13:
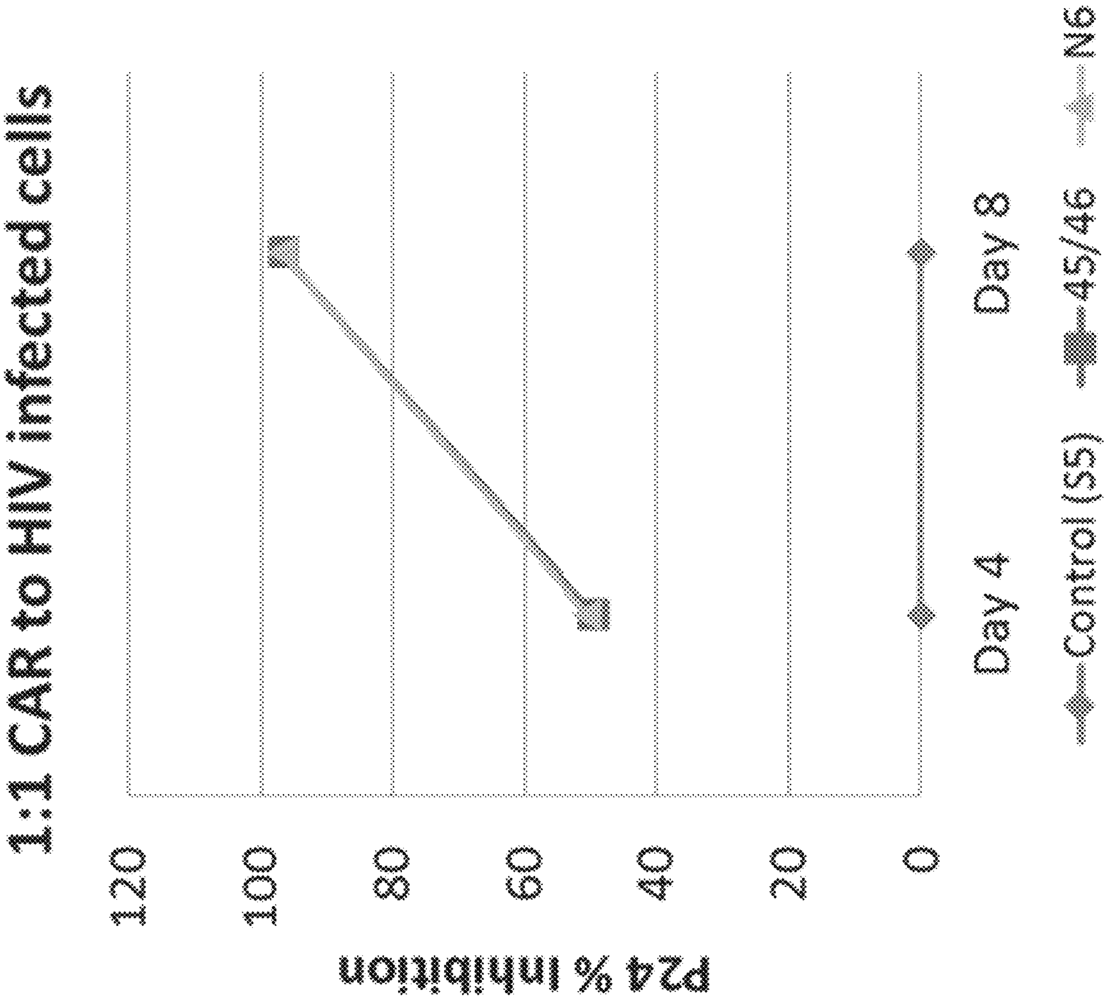

FIG. 13 depicts the result of an analysis of the antiviral activity of HIV-CAR T cells of chronically HIV-1 (NL4-3) infected Jurkat cells. 45-46 and N6-derived CAR T cells were able to kill chronically HIV-infected Jurkat cells at the 1:1 ratio and killing was normalized to that of non-CAR treated control infected Jurkat cells.

FIGS. 14A-14D depicts the results of HIV-CAR T cell killing of HIV infected cells. CD4+/CD8+ CAR T-cells were generated by transduction with a lentiviral vector containing an EGFR suicide/reporter gene and the broadly neutralizing 45-46 antibody targeted to the CD4 binding site in gp120. In A, various ratios of CAR T and J1.1. latently infected jurkat cells were co-cultured and the percent P24 inhibition was determined 10 days later. B shows a summary of the HIV-CAR T/J.1. PMA+ treated cell p24, % inhibition, and CAR vector expression as determined by EGFR expression. In C, various ratios of HIV-CAR T and Jurkat/NL4-3 infected cells were co-cultured and the neutralization of HIV-infected cells determined 10 days later. D shows a summary of the CAR T/Jurkat/NL4-3 treated cell p24, % inhibition, and CAR vector expression as determined by EGFR expression.

FIGS. 15A-15E depicts results from antiviral assay with CAR T [45-46 scFv] cells against five HIV-1 types. Killing of HIV-infected cells was measured at 10 days of co-culture. Each graph shows % of p24 inhibition (evaluated based on ELISA for p24 compared to the same cell treated with PBMC control) in presence of Jurkat cells infected with NL4-3 (T-tropic) (A); CEM cells infected with BaL (M-tropic) (B); 174X CEM cells infected with 89.6 (dual-tropic) (C), ACH-2, a latently HIV LAV infected CEM line (D); and J1.1, an HIV-1 LAV latently infected Jurkat cell line (E). HIV reactivation had been induced with PMA in latent ACH-2 and J1.1 cells.

FIG. 16A-16D depicts immunohistochemistry results showing clearance of gp120-expressing cells from culture. HIVgp120/GFP positive 293T cells (green) were mixed with HIVgp120/Mcherry 293T cells (red) and then co-cultured alone (left panels A and C) or with HIV-specific CAR T cells (right panels) B and D). In the absence of CAR T cells, the mixture of cells is unchanged but in the presence of the CAR T cells, the HIV gp120/GFP positive 293T cells are eliminated. Compare day 0 [top panel] with day 4 [bottom panel]. These micrographs (10× magnification) are from a time-lapse video [4 images/h] that illustrates the cytotoxic effect of the HIV CAR T cells.

FIG. 17A-17F contains schematic depiction (A), and FACS results (B-F), showing the development of CART cell swarms for targeted eradication of HIV. In A, two distinct methods are outlined for generating CD4+/CD8+ CAR T cell swarms. Approach (1) consists of co-transfecting two or greater vectors (n=2 are shown) into 293T producer cells, collecting the resultant supernatant for generating CAR T cells. Approach (2) consists of transfecting each CAR lentiviral vector separately and then pooling the resultant vectors together for direct addition to the impending CD4+/CD8+ CAR T cells. B shows negative FACS control for HT1080 cells. C shows single vector transduction with FACS for GFP. D shows single vector transduction with FACS for mCherry. E shows FACS of vectors generated by approach (1)—the single production swarm resulting from a co-transfection of both the GFP and mCherry expressing lentiviral vectors. F shows FACS of vector transduced cells using vectors generated by approach (2), dual production swarm.

Figure 18:
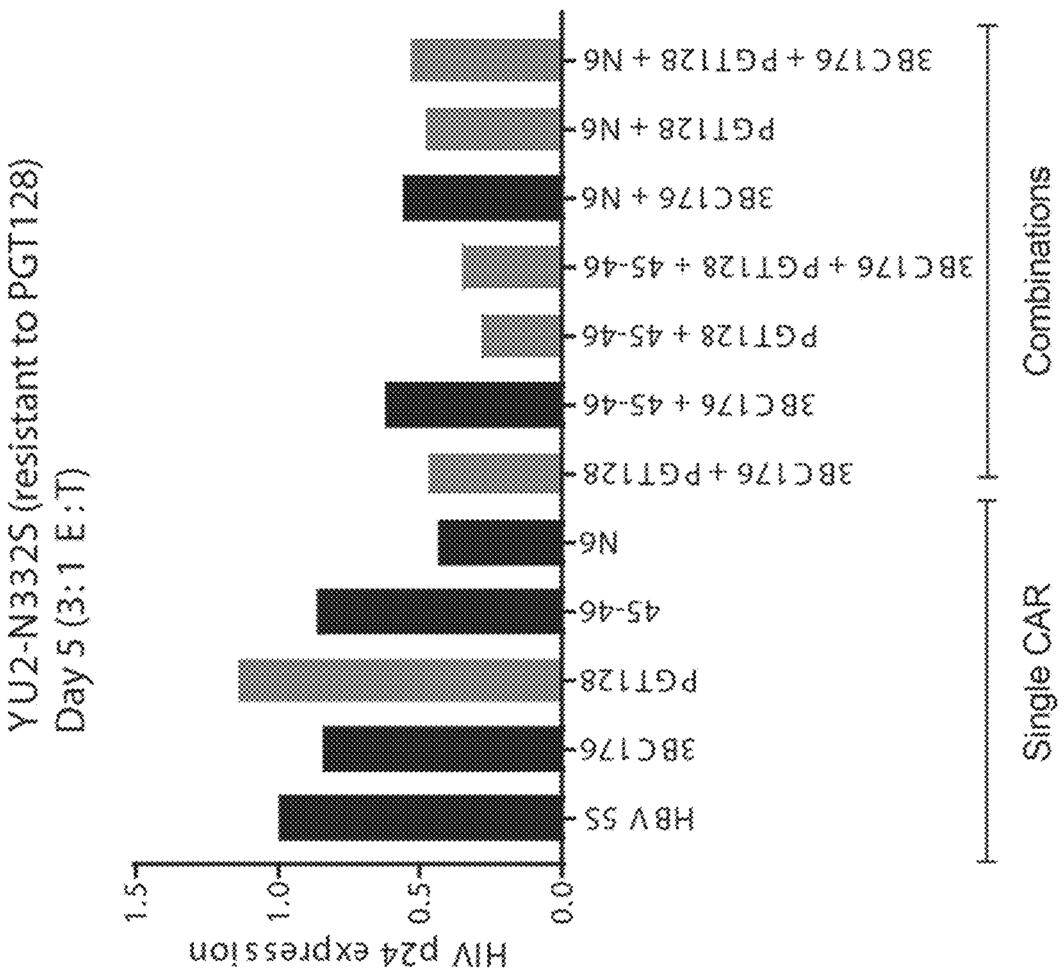

FIG. 18 is a bar graph showing the results of a study showing that combinations of two or three distinct HIV-CAR T cells are more effective than single HIV-CAR T cells against a resistant HIV strain YU2-N332S (resistant to PGT128).

Figure 19A:
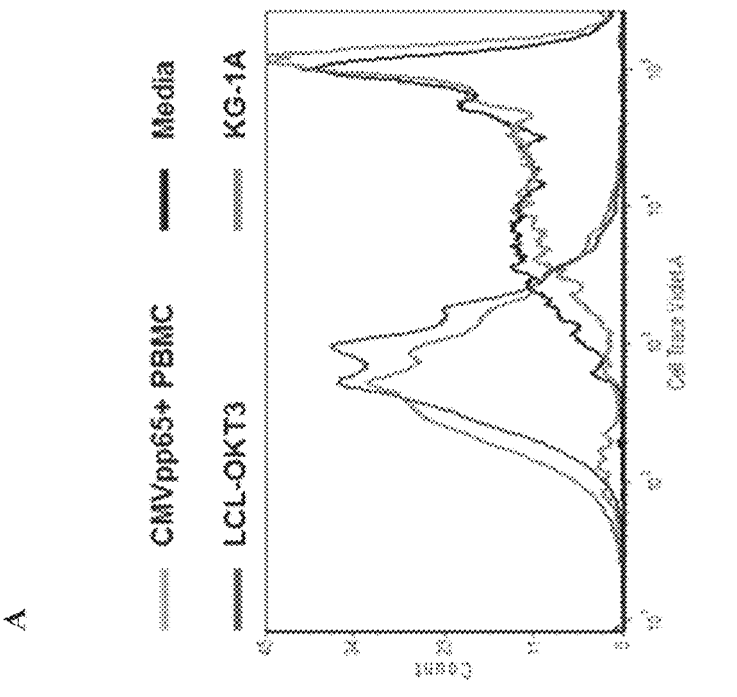
Figure 19B:
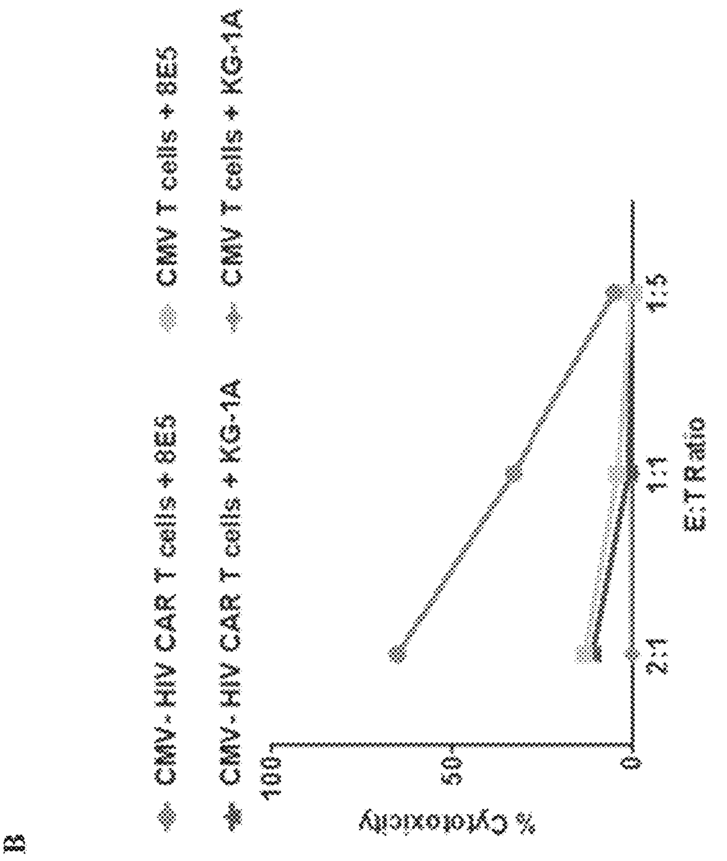

FIGS. 19A-19B depicts the results of a study of CMV and HIV-specific reactivity of CMV-HIV CAR T cells. (A). To demonstrate specific antigen stimulated proliferative capacity, CMV-HIV CAR T cells or CMV-T cells were stained with 5 uM of fluorescent CellTrace Violet dye. Stained T cells were then co-cultured with at a 1:1 E:T ratio. Eight days later, cells were harvested and stained for surface markers and acquired on a MACSQuant flow cytometer. Dilution of CellTrace Violet dye indicated cell proliferation only in presence of LCL-OKT3 and CMVpp65+ pulsed cells, and not in presence of negative controls. (B) CMV-HIV CAR T cells or CMV T cells were co-cultured with GFP+ lines: KG-1A (negative control) and 8E5 (gp120pos target line) at several E:T ratios (2:1, 1:1, 1:5). Percent of cytotoxicity was determined by measuring GFP+ cells remaining in the culture and normalized off of GFP+ cells remaining from autologous PBMCs cultured with respective target lines.

Figure 20A:
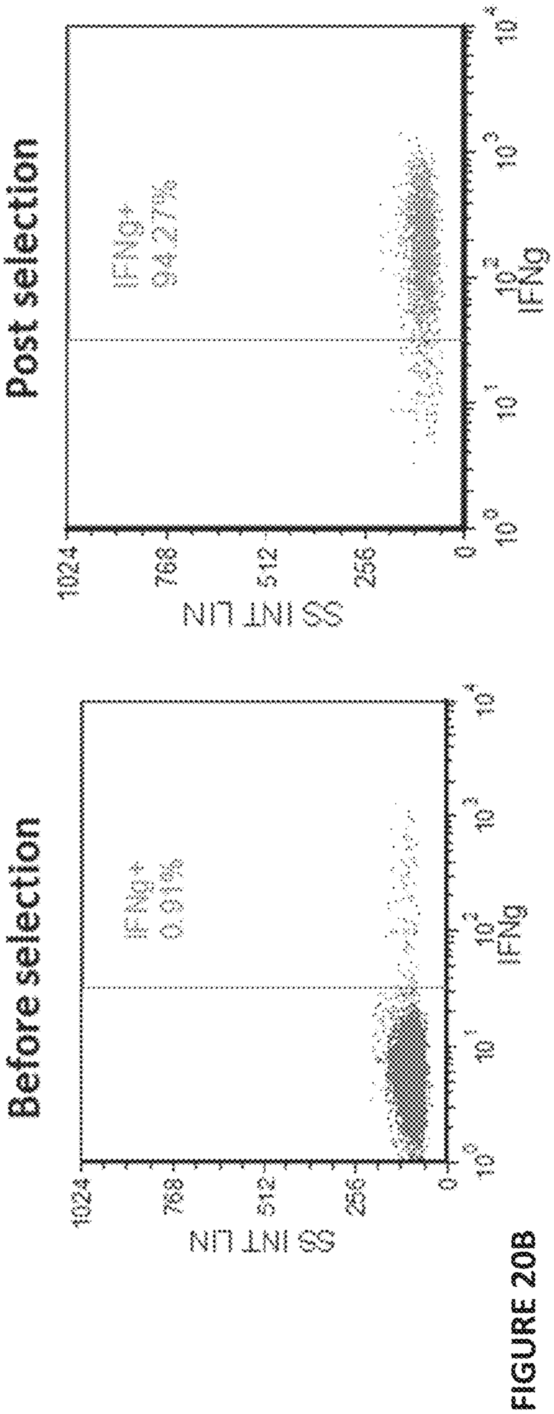
Figure 20B:
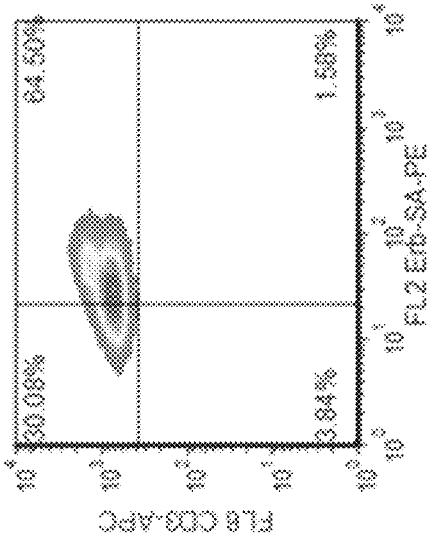

FIGS. 20A-20B depicts the results of studies characterizing CMV-HIV CAR T cells generated using PBMC from HIV infected donors. (A) Purity of CMV-reactive cells isolated by IFNγ+ selection on a CliniMACS Prodigy. (B) The following day, cells were transduced with a LV encoding HIV-directed CAR at a MOI of 3. The presence of CAR T cells was measured by staining with an antibody against EGFR (Erbitux).

Figure 21A:
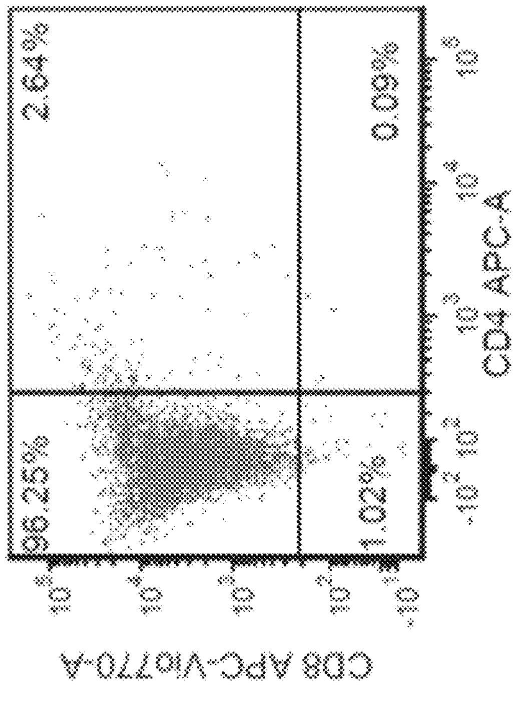
Figure 21B:
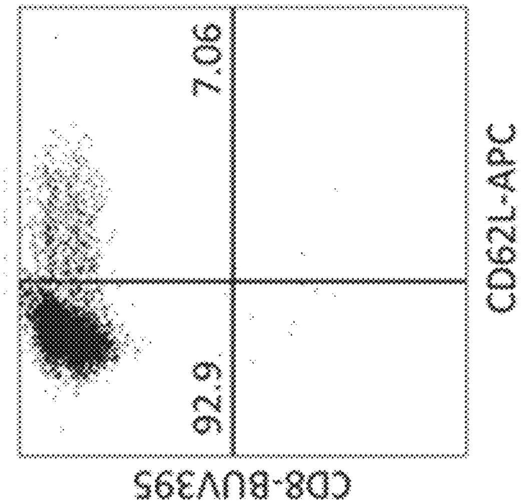
Figure 21C:
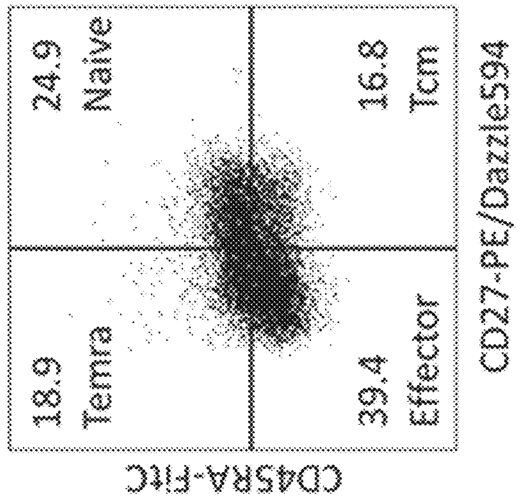

FIGS. 21A-21C depict the results of a phenotypic characterization of CMV-HIV CAR T cells from HIV-infected donor. (A) Percent of CD4+ and CD8+ T cells in HIV-CAR T cells. The cell product was gated on EGFR+ cells and analyzed for the central memory/stem marker CD62L (B) and early stage memory cell marker and co-stimulatory molecule CD27 (TCM and Naïve cells) as well as CD45RA (TEMRA) (C).

Figure 22:
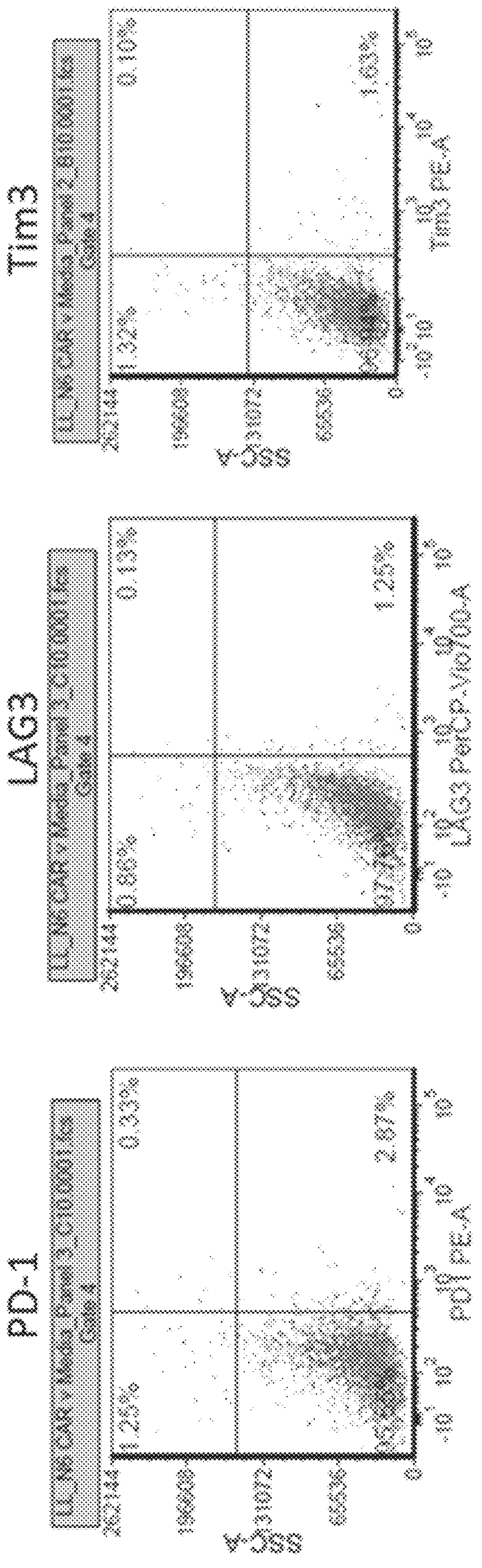

FIG. 22 depicts the results of an analysis of exhaustion markers in CMV-HIV CAR T cells prepared from an HIV-infected donor. CMV-HIV CAR T cells were derived from an HIV-infected subject on ART and propagated in the presence of IL-2 (50 U/mL) and IL15 (1 ng/mL) for 22 days in T cell medium (10% FBS in RPMI). Expression of exhaustion markers such as PD1, LAG3 and Tim3 was analyzed by flow cytometry. Percentages of positive cells are depicted.

Figure 23:
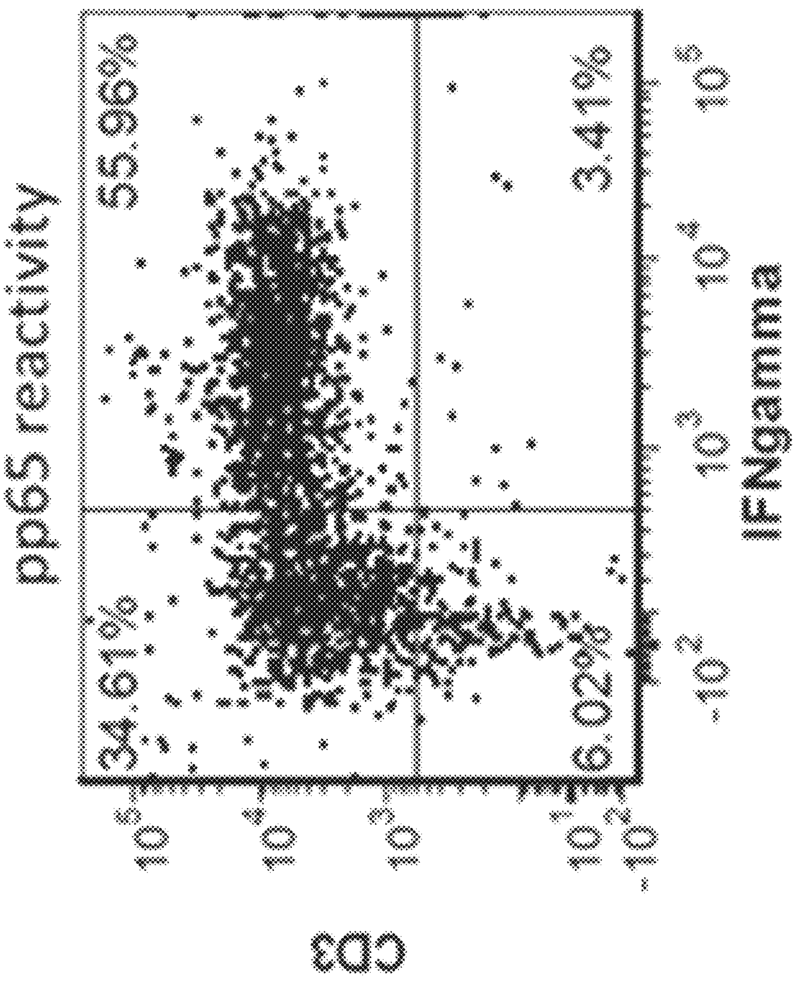

FIG. 23 depicts the results of a study of CMV reactivity of the CMV-HIV CAR T cells prepared from an HIV-infected donor. To determine if CMV-HIV CAR T cells could still respond to CMV, autologous PBMCs were loaded with CMVpp65 peptides for 2 hours to be used as antigen presenting cells (APC). CMV-HIV CAR T cells were then co-cultured with these APCs for 24 hours and stained for intracellular IFNγ to determine a CMV-specific response.

Figure 24A:
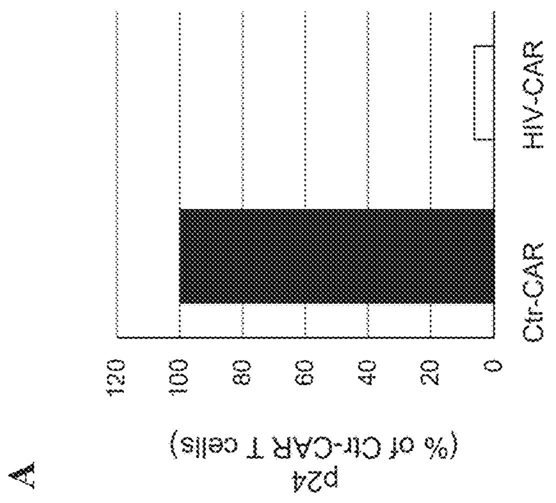
Figure 24B:
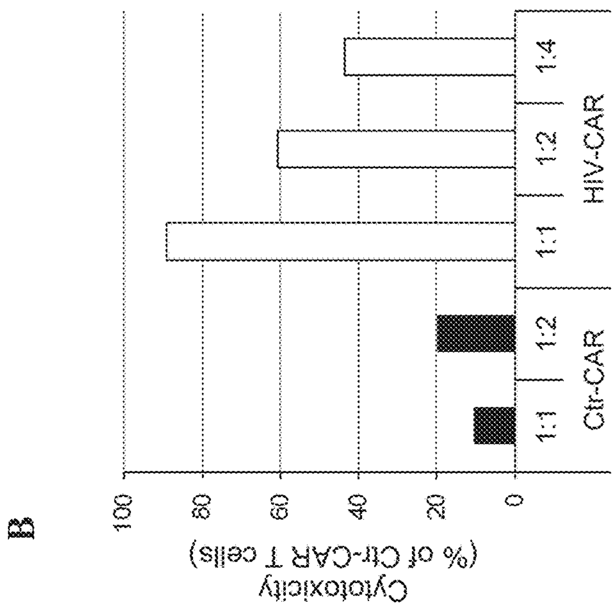
Figure 24C:
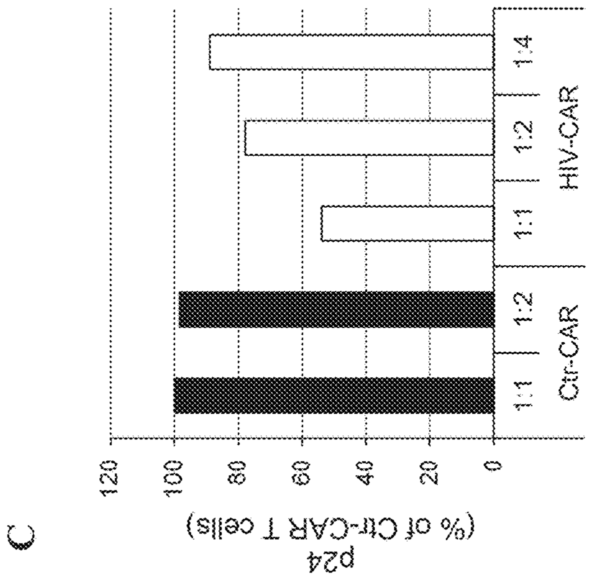

FIG. 24A-24C depicts the results of a study of CMV-HIV CAR T cells prepared from HIV-infected donors. CMV-HIV CAR T cells or CMV-CD19 CAR T cells (Ctr) were manufactured from an HIV-infected donor. (A) Levels of p24 were measured in the supernatant by ELISA on day 20 and normalized to the level in the control condition. (B) CAR T cells were co-cultured at different E:T ratios with HIV NL4-3 infected Jurkat-GFP+ cells. The cytotoxicity of the CAR T cells was evaluated on day 7 by measuring the percent of killed GFP+ cells. The level of p24 was measured in the supernatants by ELISA on day 20 (C).

Figure 25:
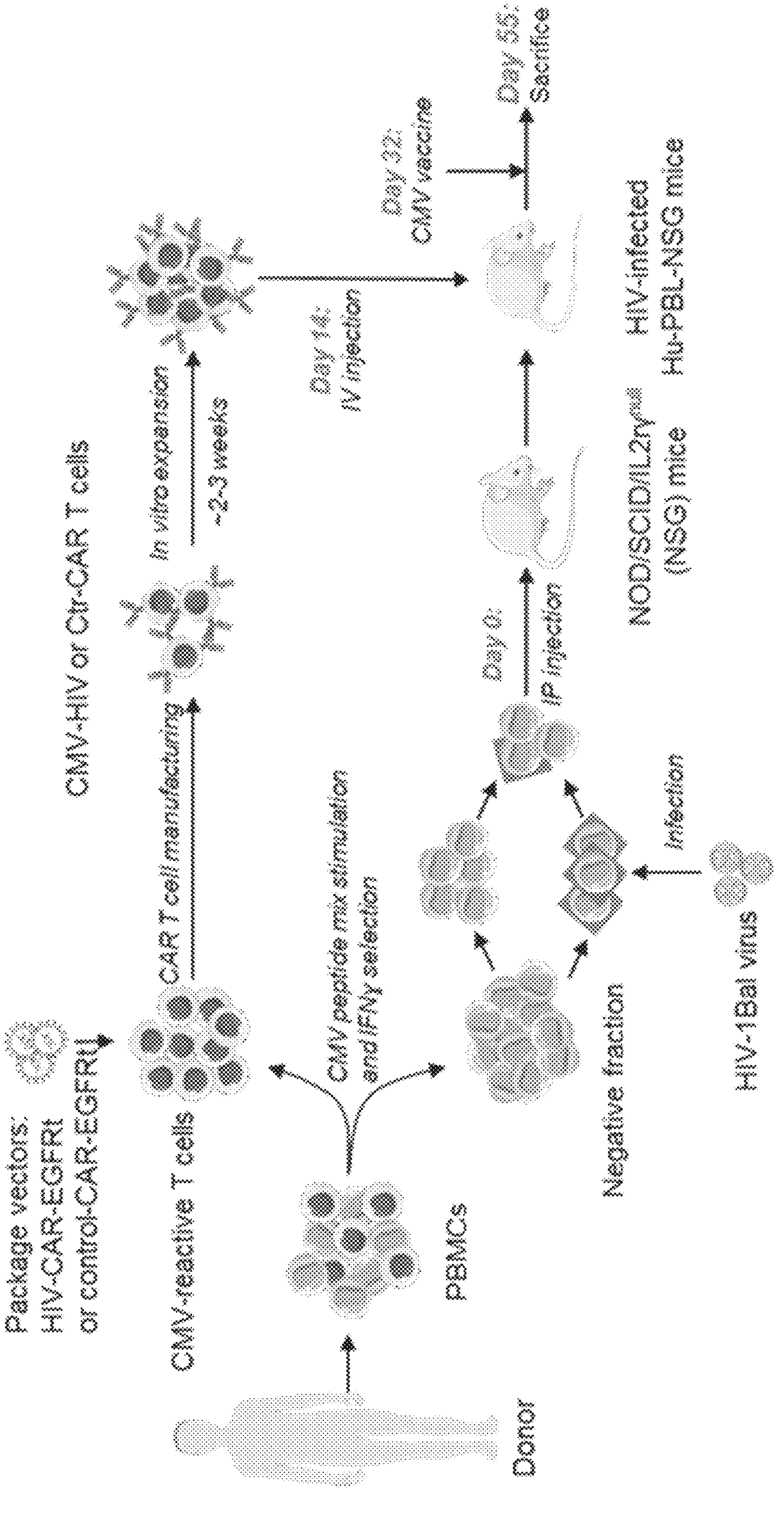

FIG. 25 is a schematic depiction of the generation of hu-PBL-NSG mouse model of HIV and CMV-HIV CART cells. PBMCs were collected from a donor and CMV-reactive T cells were then enriched as described to manufacture CMV-HIV(N6) CART cells. CS1 (also known as CD319) is a tumor associated antigen that is only expressed on multiple myeloma cells and was chosen to design the control CAR T cells. The CMV negative fraction of autologous PBMCs was cryopreserved and fractions were thawed prior to use. 2×106 CMV-negative PBMCs were pre-challenged with HIV-1Bal for two days prior to IP injection, and at the same time, 8×106 CMV-negative PBMCs (that had not been challenged with HIV) were injected. Mice that exhibited engraftment (defined as >5% huCD45+ cells in peripheral blood) and HIV infection (defined as >103 gc/mL of HIV in blood) were selected for immunotherapy on Day 14. Mice received a vaccination with CMV-peptide coated autologous CMV negative PBMCs on Day 32 and mice were sacrificed on Day 55.

Figure 26:
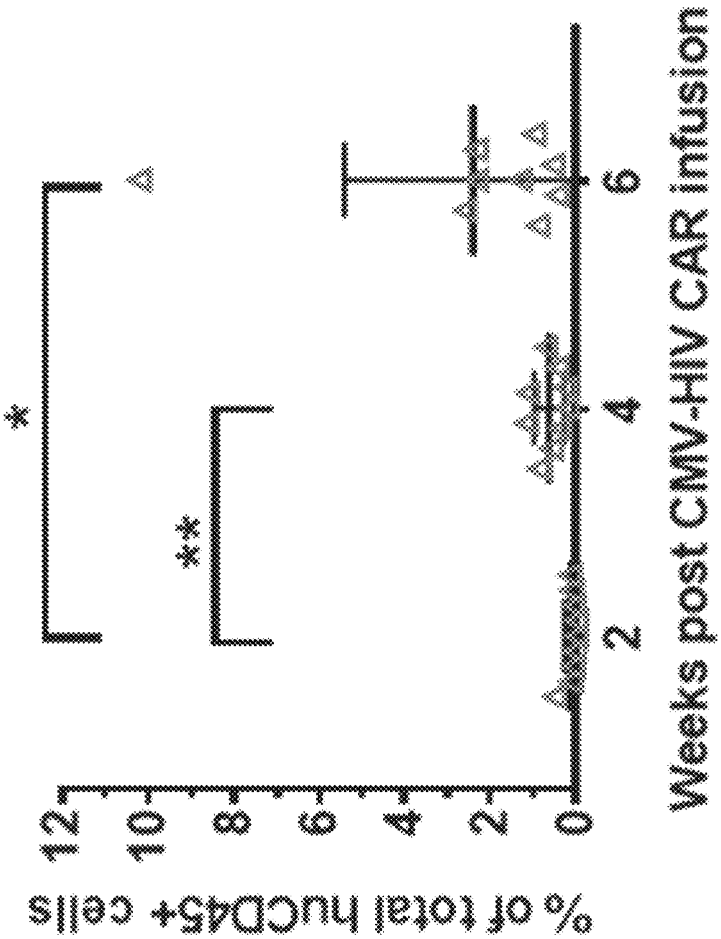

FIG. 26 depicts the results of a study of the expansion of CMV-HIV CAR T cells from HIV-infected subject in a hu-PBL-NSG mouse model of HIV. Blood (50-100 μL) was collected from retro orbital vein at two-week intervals after transplantation of human PBMCs and HIV-1 infection. Cells from blood were stained with antibodies against huCD45, huCD3, huCD4, and huCD8 and analyzed for cellular composition by FACS (not shown). Additionally, cells were stained by surface expression of huEGFR, which is expressed as a transgenic marker in the bicistronic lentiviral vector in CMV-HIV CAR T cells. Data for individual mice (n=9) are shown, with lines marking mean values and standard errors of means (SEM). Statistical analysis was performed by two-tailed, paired t-test (*, p<0.05; **, p<0.005).

FIGS. 27A-27D depicts the results of detection of CMV-HIV CAR T cells in the bone marrow and peripheral blood of hu-PBL-NSG mouse model of HIV. Flow cytometric analyses of EGFR+ CART cells from HIV-infected subject 6 weeks post CAR T cell infusion in mice. (A) Relative distribution of CAR T cells in tissues, in individual mice. (B) Frequency of CD4+ and CD8+ T cells within the CAR T cell fraction. (C, D) Frequency of cells expressing CD62L or CD27 within the CD4+ and CD8+ T cell population.

Figures 28A, 28B, 28C:
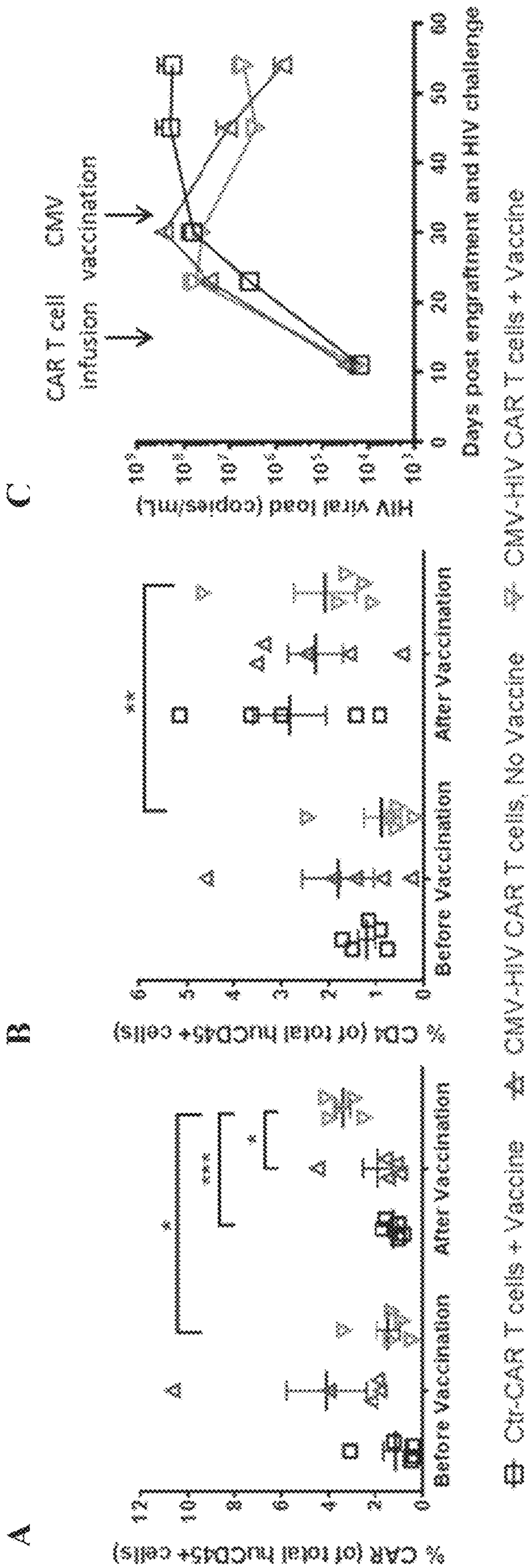

FIGS. 28A-28C depicts the results of a study showing that CMV-HIV CAR T cells expand in vivo upon CMV vaccination and support expansion of CD4+ T cells during HIV infection. Percentages of EGFR+ CAR T cells (A) or CD4+ T cells (B) were analyzed by FACS one day prior (Day 31) or six days after CMV vaccination (Day 38). Statistical analysis was performed by two-tailed, unpaired t-test when comparing different groups or a two-tailed, paired t-test when analyzing individual mice over time (*, p<0.05; , p<0.01; *, p<0.001). (C) Blood was collected to analyze levels of HIV RNA in serum over the 55-day experiment. Data points represent mean values (n=5) and above error bars represent standard error of mean (SEM).

Figure 29:
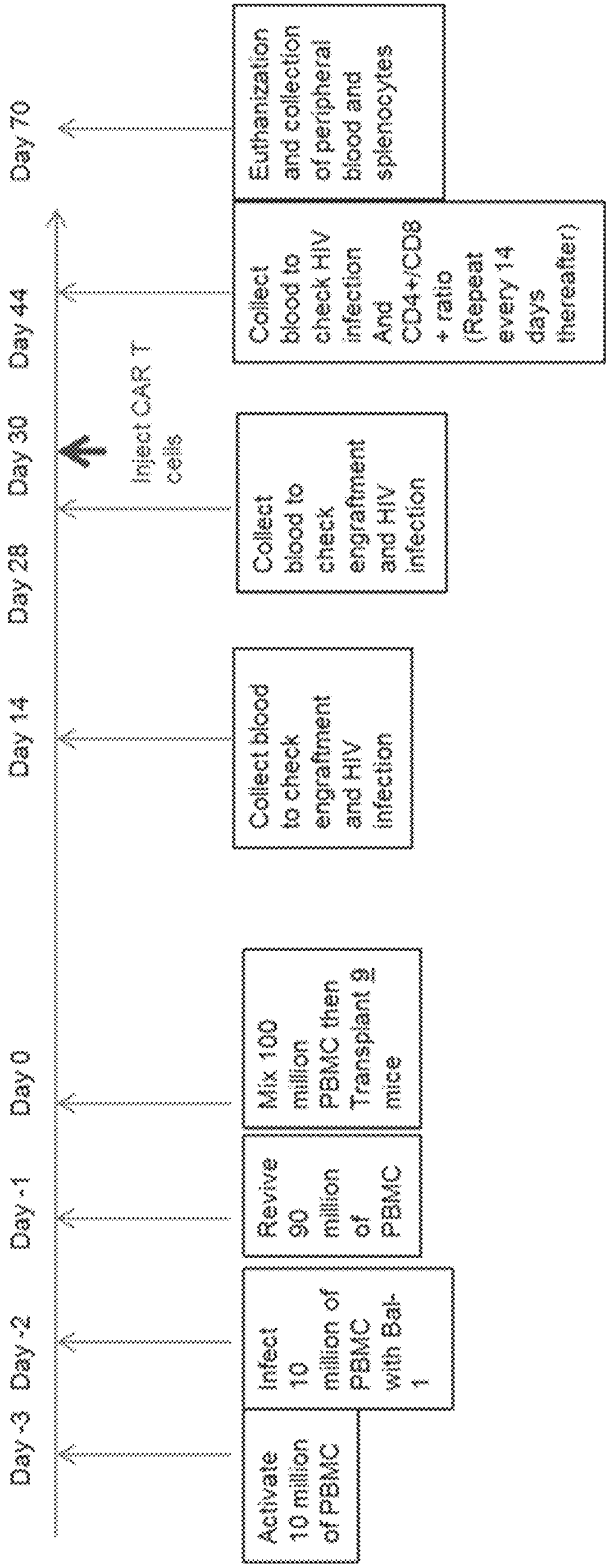

FIG. 29 is a schematic depiction of the generation of Hu-PBL-NSG mice and HIV-CAR T cell infusion study design.

Figure 30:
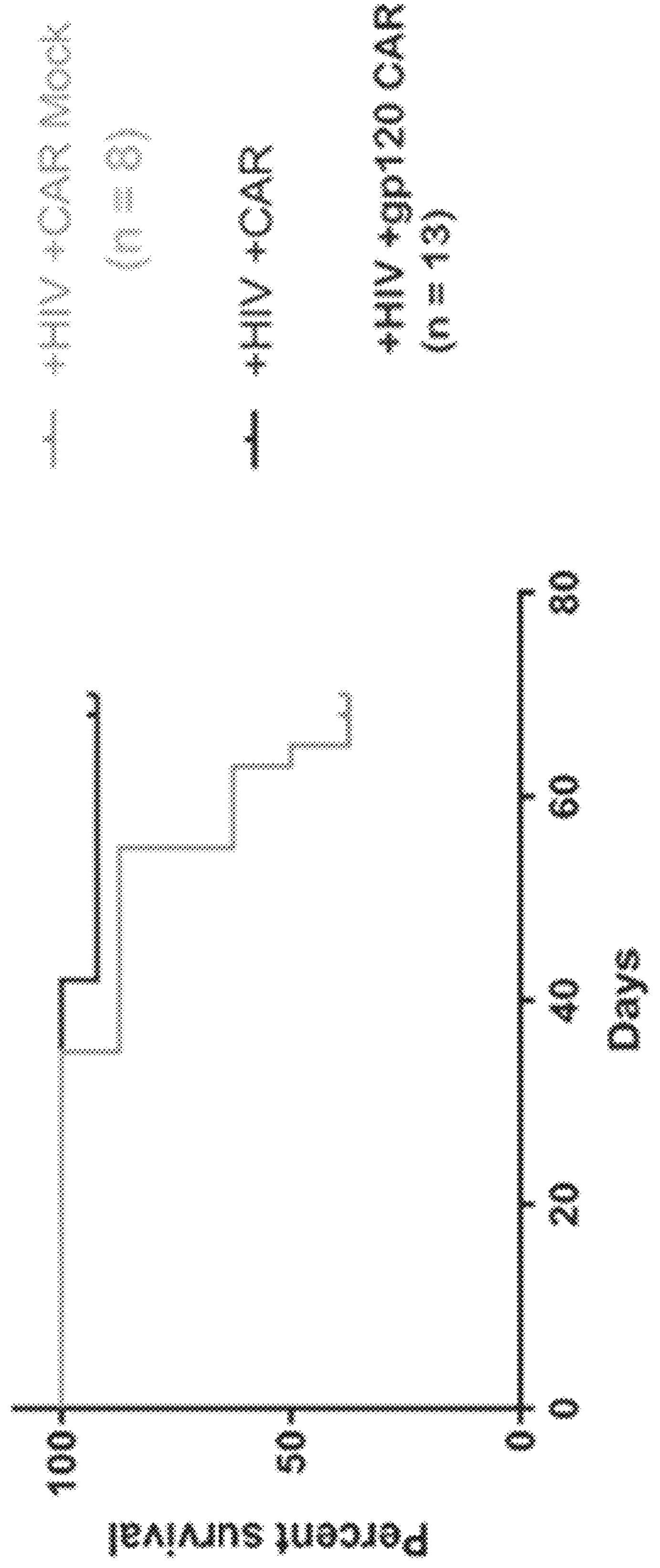

FIG. 30 is a graph showing that HIV-CAR T cells increase survival of humanized PBL-SCID mouse model under HIV-1 infection.

Figure 31:
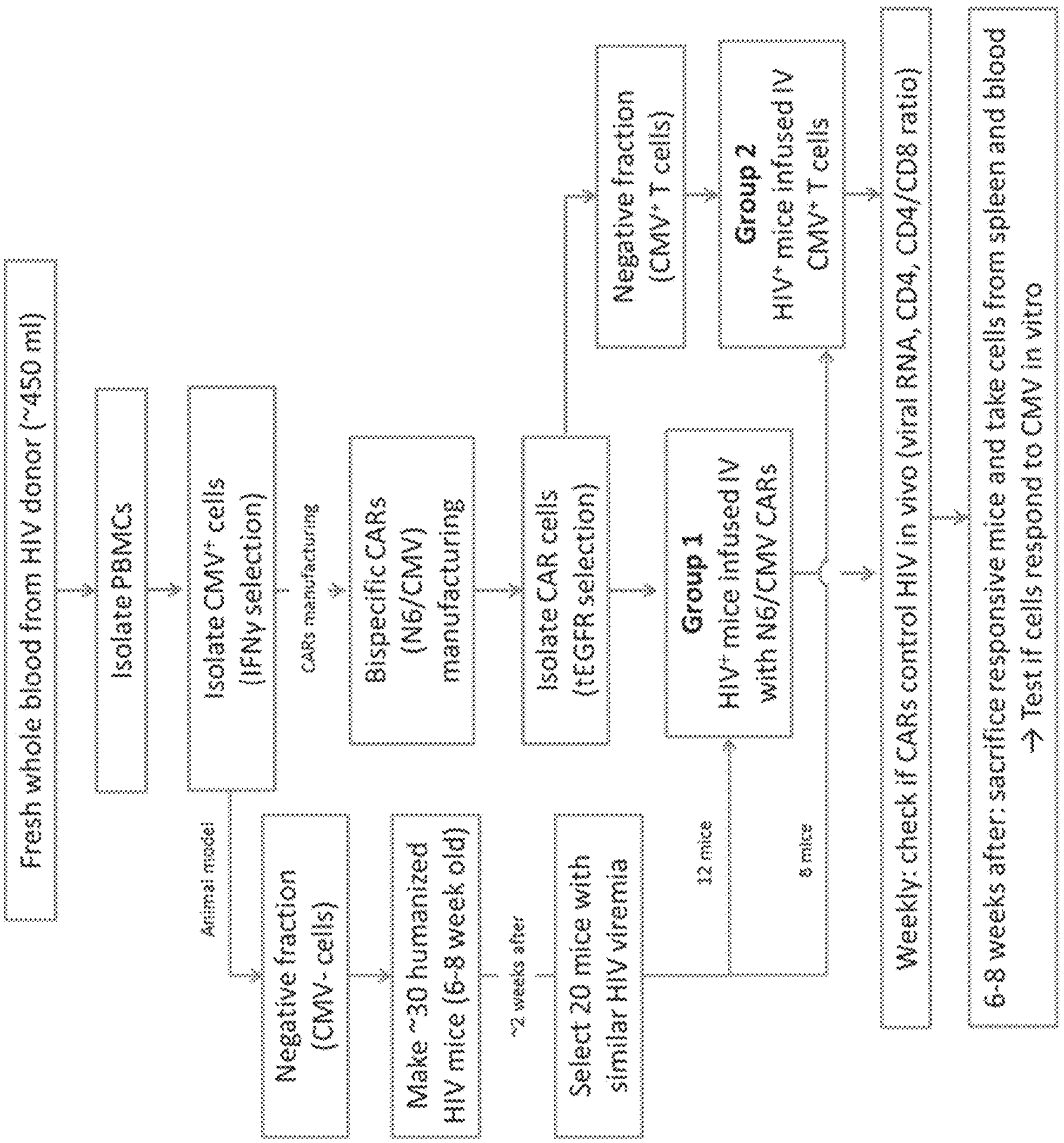

FIG. 31 is a schematic flow chart showing proof-of-concept study design.

FIGS. 32-43 contain textual graphs and tables showing the amino acid sequences of various HIV-CARs and the various domains of these CARs.

DETAILED DESCRIPTION

HIV-Targeted CAR

The HIV-targeted CARs described herein include a HIVgp120-targeting scFv (e.g., a scFv including a heavy chain and light chain pair from those in FIGS. 3A-3B or FIGS. 5A-5B).

Useful HIV-CAR consist of or comprises the amino acid sequence of any of SEQ ID NOs:29-40 (mature CAR lacking a signal sequence) or the HIV CAR consists of or comprises the amino acid sequence of any of SEQ ID NOs: 41-53 (immature CAR having a GMCSFRa signal sequence). The CAR and can be expressed in a form that includes a signal sequence, e.g., a human GM-CSF receptor alpha signal sequence (MLLLVTSLLLCELPHPAFLLIP; SEQ ID NO:26). The CAR can be expressed with additional sequences that are useful for monitoring expression, for example, a T2A skip sequence and a truncated EGFRt. Thus, the CAR can comprise or consist of the amino acid sequence of any of SEQ ID Nos: 29-40 or can comprise or consist of an amino acid sequence that is at least 95%, 96%, 97%, 98% or 99% identical to any of SEQ ID Nos: 29-40. The CAR can comprise or consist of the amino acid sequence of any of SEQ ID Nos: 29-40 with up to 1, 2, 3, 4 or 5 amino acid changes (preferably conservative amino acid changes).

Spacer Region

The CAR described herein can include a spacer located between the HIV targeting domain (i.e., a gp120-targeted ScFv or variant thereof) and the transmembrane domain. A variety of different spacers can be used. Some of them include at least portion of a human Fc region, for example a hinge portion of a human Fc region or a CH3 domain or variants thereof. Table 1 below provides various spacers that can be used in the CARs described herein.

TABLE 1

Examples of Spacers

| Name | Length | Sequence |
|---|---|---|
| a3 | 3 aa | AAA |
| linker | 10 aa | GGGSSGGGSG (SEQ ID NO: 2) |
| IgG4 hinge) (S→P (S228P) | 12 aa | ESKYGPPCPPCP (SEQ ID NO: 3) |
| IgG4 hinge | 12 aa | ESKYGPPCPSCP (SEQ ID NO: 4) |
| IgG4 hinge (S228P) + linker | 22 aa | ESKYGPPCPPCPGGGSSGGGSG (SEQ ID NO: 5) |
| CD28 hinge | 39 aa | IEVMYPPPYLDNEKSNGTIIHVKGKHL CPSPLFPGPSKP (SEQ ID NO: 6) |
| CD8 hinge-48 aa | 48 aa | AKPTTTPAPRPPTPAPTIASQPLSL RPEACRPAAGGAVHTRGLDFACD (SEQ ID NO:7) |
| CD8 hinge-45 aa | 45 aa | TTTPAPRPPTPAPTIASQPLSLRPE ACRPAAGGAVHTRGLDFACD (SEQ ID NO: 8) |
| IgG4(HL-CH3) (includes S228P in hinge) | 129 aa | ESKYGPPCPPCPGGGSSGGGSGGQPR EPQVYTLPPSQEEMTKNQVSLTCLVK GFYPSDIAVEWESNGQPENNYKTTPP VLDSDGSFFLYSRLTVDKSRWQEGNV FSCSVMHEALHNHYTQKSLSLSLGK (SEQ ID NO: 9) |
| IgG4(L235E, N297Q) | 229 aa | ESKYGPPCPSCPAPEFEGGPSVFLFPP KPKDTLMISRTPEVTCVVVDVSQEDPE VQFNWYVDGVEVHQAKTKPREEQFQ STYRVVSVLTVLHQDWLNGKEYKCK VSNKGLPSSIEKTISKAKGQPREPQVY TLPPSQEEMTKNQVSLTCLVKGFYPS DIAVEWESNGQPENNYKTTPPVLDSD GSFFLYSRLTVDKSRWQEGNVFSCSV MHEALHNHYTQKSLSLSLGK (SEQ ID NO: 10) |
| IgG4(S228P, L235E, N297Q) | 229 aa | ESKYGPPCPPCPAPEFEGGPSVFLFPP KPKDTLMISRTPEVTCVVVDVSQEDPE VQFNWYVDGVEVHQAKTKPREEQFQ STYRVVSVLTVLHQDWLNGKEYKCK VSNKGLPSSIEKTISKAKGQPREPQVY TLPPSQEEMTKNQVSLTCLVKGFYPS DIAVEWESNGQPENNYKTTPPVLDSD GSFFLYSRLTVDKSRWQEGNVFSCSV MHEALHNHYTQKSLSLSLGK (SEQ ID NO: 11) |

TABLE 1-continued

| Examples of Spacers | | |
|---|---|---|
| Name | Length | Sequence |
| IgG4(CH3) | 107 aa | GQPREPQVYTLPPSQEEMTKNQVSLT CLVKGFYP SDIAVEWESNGQPENNYK TTPPVLDSDGSFFLYSRLTVDKSRWQ EGNVFSCSVMHEALHNHYTQKSLSLS LGK (SEQ ID NO: 12) |

Some spacer regions include all or part of an immunoglobulin (e.g., IgG1, IgG2, IgG3, IgG4) hinge region, i.e., the sequence that falls between the CH1 and CH2 domains of an immunoglobulin, e.g., an IgG4 Fc hinge or a CD8 hinge. Some spacer regions include an immunoglobulin CH3 domain or both a CH3 domain and a CH2 domain. The immunoglobulin derived sequences can include one ore more amino acid modifications, for example, 1, 2, 3, 4 or 5 substitutions, e.g., substitutions that reduce off-target binding.

The hinge/linker region can also comprise a IgG4 hinge region having the sequence ESKYGPPCPSCP (SEQ ID NO:4) or ESKYGPPCPPCP (SEQ ID NO:3).

The hinge/linger region can also comprise the sequence ESKYGPPCPPCP (SEQ ID NO:3) followed by the linker sequence GGGSSGGGSG (SEQ ID NO:2) followed by IgG4 CH3 sequence GQPREPQVYTLPPSQEEMTKNQVSLTCLVKGFYPSDIAVEWESNGQPENNYK TTPPVLDSDGSFFLYSRLTVDKSRWQEGNVFSCSVMHEALHNHYTQKSLSLS LGK (SEQ ID NO:12). Thus, the entire linker/spacer region can comprise the sequence: ESKYGPPCPPCPGGGSSGGGSGGQPREPQVYTLPPSQEEMTKNQVSLTCLV KGFYPSDIAVEWESNGQPENNYKTTPPVLDSDGSFFLYSRLTVDKSRWQEGNV FSCSVMHEALHNHYTQKSLSLSLGK (SEQ ID NO:9). In some cases, the spacer has 1, 2, 3, 4, or 5 single amino acid changes (e.g., conservative changes) compared to SEQ ID NO:9. In some cases, the IgG4 Fc hinge/linker region that is mutated at two positions (L235E; N297Q) in a manner that reduces binding by Fc receptors (FcRs).

Transmembrane Domain

A variety of transmembrane domains can be used in the. Table 2 includes examples of suitable transmembrane domains. Where a spacer region is present, the transmembrane domain is located carboxy terminal to the spacer region.

TABLE 2

| Examples of Transmembrane Domains | | | |
|---|---|---|---|
| Name | Accession | Length | Sequence |
| CD3z | J04132.1 | 21 aa | LCYLLDGILFIYGVILTALFL (SEQ ID NO: 13) |
| CD28 | NM_006139 | 27 aa | FWVLVVVGGVLACYSLLVTVA FIIFWV (SEQ ID NO: 14) |
| CD28(M) | NM_006139 | 28 aa | MFWVLVVVGGVLACYSLLVTV AFIIFWV (SEQ ID NO: 15) |
| CD4 | M35160 | 22 aa | MALIVLGGVAGLLLFIGLG IFF (SEQ ID NO: 16) |

TABLE 2-continued

| Examples of Transmembrane Domains | | | |
|---|---|---|---|
| Name | Accession | Length | Sequence |
| CD8tm | NM_001768 | 21 aa | IYIWAPLAGTCGVLLLSLVIT (SEQ ID NO: 17) |
| CD8tm2 | NM_001768 | 23 aa | IYIWAPLAGTCGVLLLSLVI TLY (SEQ ID NO: 18) |
| CD8tm3 | NM_001768 | 24 aa | IYIWAPLAGTCGVLLLSLVI TLYC (SEQ ID NO: 19) |
| 41BB | NM_001561 | 27 aa | IISFFLALTSTALLFLLFFLT LRFSVV (SEQ ID NO: 20) |

Costimulatory Domain

The costimulatory domain can be any domain that is suitable for use with a CD3ζ signaling domain. In some cases, the costimulatory domain is a CD28 costimulatory domain that includes a sequence that is at least 90%, at least 95%, at least 98% identical to or identical to:

(SEQ ID NO: 23
RSKRSRGGHSDYMNMTPRRPGPTRKHYQPYAPPRDFAAYRS;

LL to GG amino acid change double underlined). In some cases, the CD28 co-signaling domain has 1, 2, 3, 4 of 5 amino acid changes (preferably conservative and preferably not in the underlined GG sequence) compared to SEQ ID NO:23. In some cases the co-signaling domain is a 4-1BB co-signaling domain that includes a sequence that is at least 90%, at least 95%, at least 98% identical to or identical to:

(SEQ ID NO: 24)
KRGRKKLLYIFKQPFMRPVQTTQEEDGCSCRFPEEEEGGCEL.

In some cases, the 4-1BB co-signaling domain has 1, 2, 3, 4 of 5 amino acid changes (preferably conservative) compared to SEQ ID NO:24.

The costimulatory domain(s) are located between the transmembrane domain and the CD3ζ signaling domain. Table 3 includes examples of suitable costimulatory domains together with the sequence of the CD3ζ signaling domain.

TABLE 3

| CD3ζ Domain and Examples of Costimulatory Domains | | | |
|---|---|---|---|
| Name | Accession | Length | Sequence |
| CDζ | J04132.1 | 113 aa | RVKFSRSADAPAYQQGQNQL YNELNLGRREEYDVLDKRRG RDPEMGGKPRRKNPQEGLYN ELQKDKMAEAYSEIGMKGER RRGKGHDGLYQGLSTATKDT YDALHMQALPPR (SEQ ID NO: 21) |
| CD28 | NM_006139 | 42 aa | RSKRSRLLHSDYMNMTPRRP GPTRKHYQPYAPPRDFAAYR S (SEQ ID NO: 22) |

TABLE 3-continued

CD3ζ Domain and Examples of Costimulatory Domains

| Name | Accession | Length | Sequence |
|---|---|---|---|
| CD28gg* | NM_006139 | 42 aa | RSKRSRGGHSDYMNMTPRRPGPTRKHYQPYAPPRDFAAYRS (SEQ ID NO: 23) |
| 41BB | NM_001561 | 42 aa | KRGRKKLLYIFKQPFMRPVQTTQEEDGCSCRFPEEEEGGCEL (SEQ ID NO: 24) |
| OX40 | | 42 aa | ALYLLRRDQRLPPDAHKPPGGGSFRTPIQEEQADAHSTLAKI (SEQ ID NO: 25) |

In various embodiments: the costimulatory domain is selected from the group consisting of: a costimulatory domain depicted in Table 3 or a variant thereof having 1-5 (e.g., 1 or 2) amino acid modifications, a CD28 costimulatory domain or a variant thereof having 1-5 (e.g., 1 or 2) amino acid modifications, a 4-1BB costimulatory domain or a variant thereof having 1-5 (e.g., 1 or 2) amino acid modifications and an OX40 costimulatory domain or a variant thereof having 1-5 (e.g., 1 or 2) amino acid modifications. In certain embodiments, a 4-1BB costimulatory domain or a variant thereof having 1-5 (e.g., 1 or 2) amino acid modifications in present. In some embodiments there are two costimulatory domains, for example a CD28 co-stimulatory domain or a variant thereof having 1-5 (e.g., 1 or 2) amino acid modifications (e.g., substitutions) and a 4-1BB co-stimulatory domain or a variant thereof having 1-5 (e.g., 1 or 2) amino acid modifications (e.g., substitutions). In various embodiments the 1-5 (e.g., 1 or 2) amino acid modification are substitutions. The costimulatory domain is amino terminal to the CD3ζ signaling domain and in some cases a short linker consisting of 2-10, e.g., 3 amino acids (e.g., GGG) is positioned between the costimulatory domain and the CD3ζ signaling domain.

CD3ζ Signaling Domain

The CD3ζ Signaling domain can be any domain that is suitable for use with a CD3ζ signaling domain. In some cases, the CD3ζ signaling domain includes a sequence that is at least 90%, at least 95%, at least 98% identical to or identical to: RVKFSRSADAPAYQQGQNQLYNELNLGRREEY-DVLDKRRGRDPEMGGKPR RKNPQEGLYNELQKDK-MAEAYSEIGMKGERRRGKGHDGLYQGLSTATKDT YDALHMQALPPR (SEQ ID NO:21). In some cases, the CD3ζ signaling has 1, 2, 3, 4 of 5 amino acid changes (preferably conservative) compared to SEQ ID NO:21.

Truncated EGFR

The CD3ζ signaling domain can be followed by a ribosomal skip sequence (e.g., LEGGGEGRGSLLTCGD-VEENPGPR; SEQ ID NO:27) and a truncated EGFR having a sequence that is at least 90%, at least 95%, at least 98% identical to or identical to: LVTSLLLCELPHPAFLLIPRKVCNGIGIGEFKDSLSI-NATNIKHFKNCTSISGDLH ILPVAFRGDSFTHTPPLD PQELDILKTVKEITGFLLIQAWPENRTDLHAFENLEII RGRTKQHGQFSLAVVSLNITSLGLRSLKEISDGDVIIS-GNKNLCYANTINWKK LFGTSGQKTKIISNRGENSCK-ATGQVCHALCSPEGCWGPEPRDCVSCRNVSR GRE CVDKCNLLEGEPREFVENSECIQCHPECLPQAM-NITCTGRGPDNCIQCAH YIDGPHCVKTCPAGVM-GENNTLVWKYADAGHVCHLCHPNCTYGCTGPGLE GCPTNGPKIPSIATGMVGALLLLLVVALGIGLFM (SEQ ID NO:28). In some cases, the truncated EGFR has 1, 2, 3, 4 of 5 amino acid changes (preferably conservative) compared to SEQ ID NO:28.

HIV-Targeted CAR

FIGS. 32-43 have the sequence of various HIV-targeted CAR. In each case the full amino acid sequence includes a GMSCFRa signal sequence and an EGFRt sequence that are not present in the mature CAR as expressed on T cells. The mature CAR sequences (lacking GMSCFRa and EGFRt) in FIGS. 32-43 are SEQ ID NOS: 29-40, respectively. An individual infected by HIV can be administered a population of human T cells transduced by a vector comprising an expression cassette encoding at least one (e.g, 1, 2, 3, 4, 5 or 6) HIV chimeric antigen receptor described herein (e.g., a CAR that comprises or consists of the amino acid sequence of any of SEQ ID Nos: 29-40 or an amino acid sequence that is at least 95%, 96%, 97%, 98% or 99% identical to any of SEQ ID Nos: 29-40 or the amino acid sequence of any of SEQ ID Nos: 29-40 with up to 1, 2, 3, 4 or 5 amino acid changes (preferably conservative amino acid changes). In various embodiments: the population of human T cells comprise CD4+ and/or CD8+ cells.

An amino acid modification refers to an amino acid substitution, insertion, and/or deletion in a protein or peptide sequence. An "amino acid substitution" or "substitution" refers to replacement of an amino acid at a particular position in a parent peptide or protein sequence with another amino acid. A substitution can be made to change an amino acid in the resulting protein in a non-conservative manner (i.e., by changing the codon from an amino acid belonging to a grouping of amino acids having a particular size or characteristic to an amino acid belonging to another grouping) or in a conservative manner (i.e., by changing the codon from an amino acid belonging to a grouping of amino acids having a particular size or characteristic to an amino acid belonging to the same grouping). Such a conservative change generally leads to less change in the structure and function of the resulting protein. The following are examples of various groupings of amino acids: 1) Amino acids with nonpolar R groups: Alanine, Valine, Leucine, Isoleucine, Proline, Phenylalanine, Tryptophan, Methionine; 2) Amino acids with uncharged polar R groups: Glycine, Serine, Threonine, Cysteine, Tyrosine, Asparagine, Glutamine; 3) Amino acids with charged polar R groups (negatively charged at pH 6.0): Aspartic acid, Glutamic acid; 4) Basic amino acids (positively charged at pH 6.0): Lysine, Arginine, Histidine (at pH 6.0). Another grouping may be those amino acids with phenyl groups: Phenylalanine, Tryptophan, and Tyrosine.

The CAR includes a sequence that is at least 90%, at least 95%, at least 98% identical to or identical to the mature amino acid sequence depicted in FIGS. 32-43 (SEQ ID Nos: 29-40), either including or excluding the GMCSFRa signal sequence and either including or excluding the T2A ribosomal skip sequence and the truncated EGFRt). Additional HIV-targeted CAR can be generated by replacing the scFv of any of these CARs with one from FIGS. 3A-3B.

In some cases, the HIV-CAR can be produced using a vector in which the CAR open reading frame is followed by a T2A ribosome skip sequence and a truncated EGFR (EGFRt), which lacks the cytoplasmic signaling tail. In this arrangement, co-expression of EGFRt provides an inert, non-immunogenic surface marker that allows for accurate measurement of gene modified cells, and enables positive selection of gene-modified cells, as well as efficient cell tracking of the therapeutic T cells in vivo following adoptive transfer. Efficiently controlling proliferation to avoid cytokine storm and off-target toxicity is an important hurdle for the success of T cell immunotherapy. The EGFRt incorporated in the HIV-CAR lentiviral vector can act as suicide gene to ablate the CAR-T cells in cases of treatment-related toxicity.

The CAR described herein can be produced by any means known in the art, though preferably it is produced using recombinant DNA techniques. Nucleic acids encoding the several regions of the chimeric receptor can be prepared and assembled into a complete coding sequence by standard techniques of molecular cloning known in the art (genomic library screening, overlapping PCR, primer-assisted ligation, site-directed mutagenesis, etc.) as is convenient. The resulting coding region is preferably inserted into an expression vector and used to transform a suitable expression host cell line, preferably a T lymphocyte cell line, and most preferably an autologous T lymphocyte cell line.

Various T cell subsets isolated from the subject can be transduced with a vector for CAR expression. Central memory T cells are one useful T cell subset. Central memory T cell can be isolated from peripheral blood mononuclear cells (PBMC) by selecting for CD45RO+/CD62L+ cells, using, for example, the CliniMACS® device to immunomagnetically select cells expressing the desired receptors. The cells enriched for central memory T cells can be activated with anti-CD3/CD28, transduced with, for example, a lentiviral vector that directs the expression of an HIV-CAR as well as a non-immunogenic surface marker for in vivo detection, ablation, and potential ex vivo selection. The activated/genetically modified HIV central memory T cells can be expanded in vitro with IL-2/IL-15 and then cryopreserved.

Construction and Structure of epHIV7 Used for Expression of HIV-Specific CAR

The pHIV7 plasmid is a parent plasmid from which the clinical vectors expressing a HIV-CAR can be derived. The epHIV7 vector used for expression of the CAR was produced from pHIV7 vector (Wang et al. 2011 *Blood* 118: 1255). Importantly, this vector uses the human EF1 promoter to drive expression of the CAR. Both the 5' and 3' sequences of the vector were derived from pv653RSN as previously derived from the HXBc2 provirus. The polypurine tract DNA flap sequences (cPPT) were derived from HIV-1 strain pNL4-3 from the NIH AIDS Reagent Repository.

Construction of pHIV7 was carried out as follows. Briefly, pv653RSN, containing 653 bp from gag-pol plus 5' and 3' long-terminal repeats (LTRs) with an intervening SL3-neomycin phosphotransferase gene (Neo), was subcloned into pBluescript, as follows: In Step 1, the sequences from 5' LTR to rev-responsive element (RRE) made p5'HIV-1 51, and then the 5' LTR was modified by removing sequences upstream of the TATA box, and ligated first to a CMV enhancer and then to the SV40 origin of replication (p5'HIV-2). In Step 2, after cloning the 3' LTR into pBluescript to make p3'HIV-1, a 400-bp deletion in the 3' LTR enhancer/promoter was made to remove cis-regulatory elements in HIV U3 and form p3'HIV-2. In Step 3, fragments isolated from the p5'HIV-3 and p3'HIV-2 were ligated to make pHIV-3. In Step 4, the p3'HIV-2 was further modified by removing extra upstream HIV sequences to generate p3'HIV-3 and a 600-bp BamHI-SalI fragment containing WPRE was added to p3'HIV-3 to make the p3'HIV-4. In Step 5, the pHIV-3 RRE was reduced in size by PCR and ligated to a 5' fragment from pHIV-3 (not shown) and to the p3'HIV-4, to make pHIV-6. In Step 6, a 190-bp BglII-BamHI fragment containing the cPPT DNA flap sequence from HIV-1 pNL4-3 (55) was amplified from pNL4-3 and placed between the RRE and the WPRE sequences in pHIV6 to make pHIV-7. This parent plasmid pHIV7-GFP (GFP, green fluorescent protein) was used to package the parent vector using a four-plasmid system.

A packaging signal, psi ψ, is required for efficient packaging of viral genome into the vector. The RRE and WPRE enhance the RNA transcript transport and expression of the transgene. The flap sequence, in combination with WPRE, has been demonstrated to enhance the transduction efficiency of lentiviral vector in mammalian cells.

The helper functions, required for production of the viral vector, are divided into three separate plasmids to reduce the probability of generation of replication competent lentivirus via recombination: 1) pCgp encodes the gag/pol protein required for viral vector assembly; 2) pCMV-Rev2 encodes the Rev protein, which acts on the RRE sequence to assist in the transportation of the viral genome for efficient packaging; and 3) pCMV-G encodes the glycoprotein of the vesiculo-stomatitis virus (VSV), which is required for infectivity of the viral vector.

There is minimal DNA sequence homology between the pHIV7 encoded vector genome and the helper plasmids. The regions of homology include a packaging signal region of approximately 600 nucleotides, located in the gag/pol sequence of the pCgp helper plasmid; a CMV promoter sequence in all three helper plasmids; and a RRE sequence in the helper plasmid pCgp. It is highly improbable that replication competent recombinant virus could be generated due to the homology in these regions, as it would require multiple recombination events. Additionally, any resulting recombinants would be missing the functional LTR and tat sequences required for lentiviral replication.

The CMV promoter was replaced by the EF1α-HTLV promoter (EF1p), and the new plasmid was named epHIV7. The EF1p has 563 bp and was introduced into epHIV7 using NruI and NheI, after the CMV promoter was excised.

The lentiviral genome, excluding gag/pol and rev that are necessary for the pathogenicity of the wild-type virus and are required for productive infection of target cells, has been removed from this system. In addition, epHIV7 vector construct does not contain an intact 3'LTR promoter, so the resulting expressed and reverse transcribed DNA proviral genome in targeted cells will have inactive LTRs. As a result of this design, no HIV-I derived sequences will be transcribed from the provirus and only the therapeutic sequences will be expressed from their respective promoters. The removal of the LTR promoter activity in the SIN vector is expected to significantly reduce the possibility of unintentional activation of host genes.

CMV-HIV CAR T Cells

T cells specific for CMV and HIV gp120 can be generated using a rapid and efficient method for generating and selecting CMV-specific T cells. The method, which employs IFNγ capture of CMV-specific T cells, consistently and efficiently enriched CMV-specific T cells while preserving the broad spectrum of CMV repertoires. Moreover, the cells remained amenable to gene modification after a brief CMVpp65 stimulation, avoiding the need for CD3/CD28 bead activation prior to transduction. The bulk IFNγ-captured T cells can be engineered with a CAR lentivirus.

Efficient in vivo activation of virus-specific T cells through the TCR demands that viral antigens are processed and presented in a human leukocyte antigen (HLA)-dependent manner. This can be achieved by administering CMV Triplex Vaccine to the subject subsequent to administration of the CMV-CAR T cells.

Triplex Vaccine

CMV Triplex Vaccine is a recombinant MVA that expresses three CMV antigens, i.e., at least a portion or Immediate-Early Gene-1 (IE1), at least a portion of Immediate-Early Gene-2 (IE2) and at least a portion of pp65. The IE1 antigen and the IE2 antigen can be expressed a fusion protein Expression of the CMV antigens can be under the control of a modified H5 (mH5) promoter. A CMV Triplex Vaccine is fully described in U.S. Pat. No. 8,580,276 and in Wang et al. (*Vaccine* 28:1547, 2010)

The CMV Triplex Vaccine can express CMV pp65 and an CMV IE fusion protein (IEfusion). The IEfusion can include an antigenic portion of IE1 (e.g., Exon 4) and an antigenic portion of 1E2 (e.g., Exon 5), wherein the antigenic portions elicit an immune response when expressed by a vaccine.

As explained in U.S. Pat. No. 8,580,276, the CMV Triplex Vaccine includes three of the best recognized antigens in the CD8 subset: pp65, IE1, and IE2. There is no region of homology greater than 5 amino acids between the major exons of both proteins. Individually, both antigens are recognized broadly by almost 70% of the general population (Sylwester et al. 2005). The divergent sequence of both IE1/e4 and IE2/e5 used here predicts an entirely different subset of HLA binding peptides using publicly available Class I and II motif algorithms (Peters and Sette 2007). Human subjects that were evaluated for recognition of both IE1 and IE2 antigens were found in many instances to recognize one or the other but not both. Among the research subjects analyzed, 24% recognized IE2 with or without pp65 to the exclusion of IE1. This result strongly suggests that the recognition elements for both antigens are unique, and by including both of them in the vaccine, the breadth of individuals with disparate HLA types that will recognize and develop an immune response to the vaccine is extended. The fusion of major exons from both antigens achieves the dual goal of reducing the number of separate inserts and eliminating the need for a third insert promoter. The advantages of this approach include placement of all vaccine antigens in one vector, and diminishing the dose of virus needed to attain sufficient immunity simultaneously against all of the included antigens.

EXAMPLES

Example 1: HIV-CAR Design

Chimeric antigen receptor (CAR) T cells have been used for control of HIV-1 infection. A schematic drawing depicting a CAR T cell is shown in FIG. 2. A general rationale for the use of CAR T cells for control of HIV-1 infection recognizes that the natural cellular immune response to HIV-1 that limits control of infection is defective. Strategies that require native T-cell receptor-based immunity have failed, most likely due to HIV-1 immune escape mechanisms. The use of ART controls HIV-1 infection and has greatly improved the life of HIV-1 infected persons, although this limits the HIV-1 antigen exposure to the immune system further impacting an effective immune response to the virus. Several broadly neutralizing antibodies (bNAb) against HIV epitopes have been characterized and could be used to construct HIV-targeting CARs [1]. Thus, as described below, we first screened a library of bNAb single chain variable fragments (scFv) for ability to kill HIV gp120-expressing cells and then rescreened candidate CAR genetic constructs for optimization of linkers and costimulatory molecules. With this completed, we then developed a method for production of CMV-specific anti-HIV CAR T cells. Thus, in preclinical studies, we created and tested the following cell products:

- CAR T cells specific for several bNAb binding sites in the HIV-1 gp120 protein
- CAR T cells optimized for linkers and scFv
- Bi-specific CMV-HIV CAR T cells starting from:
  - PBMCs collected from CMV-seropositive HIV-seronegative donors; and
  - PBMCs collected from CMV-seropositive HIV-seropositive donors.

The overall design for these studies is that a bispecific T-cell response, expanded by a CMV antigen exposure, could be sufficient to markedly reduce the HIV cellular reservoir, as HIV-1 reactivates during a period of analytic treatment interruption (ATI), leading eventually to eradication of HIV from its reservoir.

Example 2: CAR T Cells Specific for Several bNAb Binding the HIV-1 gp120 Protein To design the CMV-HIV CART cells, the gp120 protein targets of the several bNAbs for which there is genetic sequence information were analyzed. FIGS. 3A-3B shows these targets and the bNAbs. Such bNAbs target epitopes on the HIV-gp120 virus spike, the neutralization spectrum is broadest for those which bind to the CD4 binding site, the membrane proximal region, and the V3 glycan regions [1-3]. The respective scFv sequences of several of these were cloned into lentivirus (LV) CAR constructs, as depicted in the schematic drawing FIG. 4. These LVs were used to make the first round of candidate HIV-CAR T cells for screening of cytotoxic function vs gp120-expressing CEM cells or 293T cells and for antiviral function vs acute/chronically infected cell lines. Additional CAR constructs using other targets or antibodies can be similarly used. FIGS. 5A-5B shows some sequences.

Example 3 Selection of HIV-Specific CAR T Cells

Using a previously published method [5] and the lentiviral vector depicted in FIG. 4, studies were performed with a mix of normal donor CD4+ and CD8+ T cells generated to express CARs directed specifically at several binding sites on the gp120 HIV envelope. To prepare the CAR T cells, healthy blood donors were used as well as HIV-infected donors; in addition, several HIV strains and cellular materials were used as targets, as described below.

Cellular and Viral Materials Used

| HIV-1 Strains [source: NIH AIDS repository] |
| --- |
| NL4-3—CXCR4- or X4-tropic HIV-1 strain |
| BaL—CCR5- or R5-tropic HIV-1 strain |
| 89.6—dual tropic HIV-1, molecular clone derived from peripheral blood [6] |
| LAV—one of the original HIV-1 strains isolated from patient BRU (lymphoadenopathy-associated virus) |

The cell lines used include 8E5 cells, Jurkat cells, ACH-2 cells, 293 T cells, and LCL-OKT3 cells.

To create a target cell line that expresses the envelope protein HIV-1 gp120, 8E5 cells were used, obtained from ATCC. 8E5 was derived from the T-cell leukemia cell line CCRF-CEM, and has been infected with HIV. 8E5 is a single clone found to have defective provirus, and these cells cannot generate replicative virus but can make most HIV viral proteins. The 8E5 cells were stained with a gp120 recognizing antibody and ~30% expressed gp120 on the cell surface when evaluated by FACS (FIG. 6; left panel). We transduced these cells with a lentivirus encoding eGFP and the fluorescent firefly luciferase (ffLuc) at an MOI of 10. As shown in FIG. 6, right panel, sorted transduced cells cultured for 14 days showed a significant yield of double positive, GFP+ gp120+ cells, ~86%. Upon further culture, these cells maintained this dual expression and were used as targets in subsequent CAR T cell functional assays To create a cell line for in vitro acute HIV infection modeling, Jurkat cells were infected with HIV NL4-3 (MOI=0.01) for 4 hours before co-culture with the CAR T cells. Culture supernatant was collected at days 2, 4, 6, 8, and 12 and evaluated for p24 levels.

To create a model for chronic HIV infection, Jurkat cells were infected with strain NL4-3 HIV at a MOI of 0.1 and then maintained in culture with RPMI media and 10% FBS for more than 4 weeks. This cell line continuously expressed p24 in the supernatant.

Jurkat J1.1 is a cell line latently infected with HIV LAV, in which HIV can be induced with PMA.

ACH-2 is a T cell clone originating from a CEM cell line that was latently infected with HIV-1 LAV; HIV can be induced from ACH-2 using PMA.

Using the same method as shown in FIG. 6 for 8E5 cells, 293 T cells were transduced to express gp120 and either GFP and mCherry.

LCL-OKT3 is a cell line engineered to express a membrane bound OKT3 single chain antibody (OKT3scFv) as described previously [7]. These cells were used as controls.

Example 4: Screening of CAR Constructs

To select the CAR T cell with the highest HIVgp120-specific cytotoxic function, we co-cultured various HIV-CAR T cells at different ratios with 8E5-GFP cells expressing the HIV envelope protein gp120. The CAR T cells targeted the CD4 binding site in gp120 (N6 and 45-46 sites), the V1/2 glycan site (PDGM1400), V3 glycan site (PGT121 and PGT128), or the CD4/V3 sites (3BC176) (FIGS. 3A-3B). A dose dependent effect is observed with most tested CARs (FIGS. 7A-7C), and the CAR constructs targeting the CD4 and CD4/V3 binding sites—45-46, N6, PGT121, and 3BC176 demonstrated the strongest inhibitory effect, shown as fold reduction in GFP in this assay and therefore these underwent further evaluation using virus inhibition assays.

In the first series of antiviral screening assays, CAR constructs targeting the CD4-binding site, the CD4/V3 binding site, and the V3 glycan binding site were evaluated in an in vitro model of chronic HIV-1 infection with HIV (NL4-3) infected Jurkat cells (FIG. 8). The strongest inhibitory effect was observed with CAR constructs targeting the CD4 binding site, N6 and 45-46, and the V3 glycan site, PGT128. The CD4/V3 binding bNAb (3BC176) was eliminated.

Three characteristics of the CARs made from different bNAbs that were used to select the final product. The first of these is the percent of HIV-1 isolates that are neutralized by the parent antibody. The second is the ability of the CARs to both control HIV-1 infection in vitro and kill the gp120-expressing target cells. The third is the ability to make high titer LV for manufacturing of the product. Based on these elements, N6 and 45-46, both targeting the CD4 binding site, were selected for further evaluation.

Example 5: Optimization of scFv and Linkers for the HIV-CAR Construct

To specifically target and destroy HIV-infected cells, the HIV-CAR constructs require the following: 1) optimization of the scFv as the extracellular antigen recognition domain targeting HIV-1; 2) optimization of spacer or hinge sequences that are used to link the ligand-binding domain to transmembrane and intracellular-signaling domains of the CAR; and 3) best choice of co-stimulatory domain; in this case, the 4-1BB co-stimulatory domain was used, as it has been used successfully in CMV-CD19 CART cell studies in animals [5].

To optimize the HIV-CARs, the main focus was on: a) using the recently made available sequences of bNAb to optimize the scFv, and b) comparing the activity of CAR constructs with two linker sequences we had developed for the CD19 CART cell projects [8].

CD4-binding site-specific bNAb were used, such as NIH45-46G54W M1 and NIH45-46M2, which were shown to exhibit superior potency and breadth (sequence and specificity shown in Table 4, as derived from the literature [2]; [9]). In addition, the CD4-binding site antibody N6 was evaluated, which had been identified [10]. NIH45-46M2 neutralized 96% of HIV-1 strains in a cross-clade panel and viruses isolated from an HIV-infected individual that are resistant to all other known bNAbs [11]. N6 was found to neutralize 98% of HIV-1 isolates, including 16 of 20 that were resistant to other members of its class. The sequences for these bNAbs are shown in Table 1.

Table 4 scFvs of HIV CARs (Adapted from Diskin et al, 2013, [9]) (SEQ ID NOS 93-100, respectively)

TABLE 1 scFvs of HIV CARs (adapted from Diskin et al, 2013, [9])

| Antibody | Env Specificity | | Sequence |
|---|---|---|---|
| NIH45-46WT | CD4 Binding Site on gp120 | VL | EIVLTQSPATLSLSPGETAIISCRTSQSGSLAWYQQRPGQAPRLVIY SGSTRAAGIPDRFSGRWGADYNLSISNLESGDFGVYYCQQYEF FGQGTKVQVDIK |
| | | VH | QVRLSQSGGQMKKPGESMRLSCRASGYEFLNCPINWIRLAPGR RPEWMGWLKPRGGAVNYARKFQGRVTMTRDVYSDTAFLELRS LTSDDTAVYFCTRGKYCTARDYYNWDFEHWGRGAPVTVSS |

TABLE 1-continued scFvs of HIV CARs
(adapted from Diskin et al, 2013, [9])

| Anti-body | Env Specificity | | Sequence |
|---|---|---|---|
| NIH45-46 G54W | CD4 Binding Site on gp120 | VL | EIVLTQSPATLSLSPGETAIISCRTSQSGSLAWYQQRPGQAPRLVIY SGSTRAAGIPDRFSGSRWGADYNLSISNLESGDFGVYYCQQYEF FGQGTKVQVDIK |
| | | VH | QVRLSQSGGQMKKPGESMRLSCRASGYEFLNCPINWIRLAPGR RPEWMGWLKPRWGAVNYARKFQGRVTMTRDVYSDTAFLELR SLTSDDTAVYFCTRGKYCTARDYYNWDFEHWGRGAPVTVSS |
| NIG45-46 M2 | CD4 Binding Site on gp120 | VL | EIVLTQSPATLSLSPGETAIISCRTSQYGSLAWYQQRPGQAPRLVIY SGSTRAAGIPDRFSGSRWGADYNLSISNLESGDFGVYYCQQYEF FGQGTKVQVDIK |
| | | VH | QVRLSQSGGQMKKPGESMRLSCRASGYEFLNCPINWIRLAPGR RPEWMGWLKPRWGAVNYARKFQGRVTMTRDVYSDTAFLELR SLTSDDTAVYFCTRGKYCTARDYYNWEFEHWGRGAPVTVSS |
| N6 | CD4 Binding Site on gp120 | VL | YIHVTQSPSSLSVSIGDRVTINCQTSQGVGSDLHWYQHKPGRAP KLLIHHTSSVEDGVPSRFSGSGFHTSFNLTISDLQADDIATYYCQN LQFFFGRGSRLHIK |
| | | VH | RAHLVQSGTTAMKKPGASVRVSCQTSGYTFTAHILFWFRQAPGR GLEWVGWIKPQYGAVNFGGGFRDRVTLTRDVYREIAYMDIRGL KPDDTAVYYCARDRSYGDSSWALDAWGQGTTVVVSA |

HIV-CAR T cells expressing various scFvs (from WT 45-46, NIH45-46G54W M1 and NIH45-46S28Y M2, as well as N6 bNAb) were generated from three healthy donors (HD459, HD460, and HD441). The cells were co-cultured with gp120$^{pos}$ 8E5-eGFP+ cells at different E:T ratios and 96 hours later, cytotoxicity was evaluated by measuring the % of GFP+ T cells remaining in the co-culture (FIG. 9A).

To track T-cell proliferation, HIV-CAR T cells with different scFvs were stained with 2 μM Cell Trace Violet and co-cultured with varying concentrations of 8E5-gp120 (E:T ratios: 2:1, 1:1, and 0.5:1). After 96 hours in culture, cells were harvested, stained with antibodies specific for T-cell markers and analyzed by flow cytometry (FIG. 9B). The wild-type N6 and 45-46 antibody-based CAR T cells performed slightly better than 45-46 mutant variants, and thus were selected for further testing and development.

To evaluate whether FcR-mediated interactions play a role in the efficacy of adoptively transferred CAR T cells, two types of CARs were generated: 1) HIV-specific CARs that have been mutated at two sites within the CH2 region (L235E and/or N297Q) of its IgG4 Fc spacer, named EQ mutant (schematic shown in FIG. 10A); and 2) a CAR that has a CH2 deletion in its IgG4 Fc spacer, named ΔCH2 (schematic shown in FIG. 10B).

Thus, two linkers of different length were tested to analyze HIV-CAR T cell functionality. The cytotoxicity of HIV-CAR T cells against a gp120-expressing target cells was evaluated, with either an IgG4 (EQ) linker or a shortened IgG4H (ΔCH2) linker [8]. HIV-CAR T cells were co-cultured with the gp120$^{pos}$ 8E5-eGFP+ cells at different E:T ratios. The wild-type and optimized 45-46 CAR constructs were evaluated concomitantly, along with N6. At 96h post co-culture, cells were stained with antibodies specific for T-cell markers, and cellular toxicity was measured as % GFP change in culture (FIGS. 11A-11C). The CAR construct that contained the EQ linker and WT 45-46 performed better against gp120-expressing target cells.

Based on all linker optimization experimental data, the EQ linker was found to provide improved anti HIV-1 activity for the CAR construct. The scFv for N6 and WT 45-46 had comparable activities, better than the activities of CAR constructs with NIH45-46G54W M1 and NIH45-46S28Y M2. Thus, the final selection was that of EQ linker and N6 or 45-46 scFv to be evaluated as part of CAR constructs in further preclinical development. Subsequent experiments used the HIV CARs that targeted the CD4-binding site.

Example 6: Antiviral and Cytotoxic Testing of Optimized CAR T Cells

For evaluation of viral inhibition in an acute HIV infection, a model of acute HIV infection in Jurkat cells was developed and used to confirm an antiviral effect of CART cells targeting the CD4-binding site of HIV gp120. These HIV-CAR T cells targeting the CD4 binding site and carrying the optimized EQ linker inhibited p24 production in the HIV NL4-3 infected Jurkat cells (FIG. 12), demonstrating their antiviral activity in the acute infection setting in vitro.

Additional experiments compared the antiviral activity of CAR T cell targeting the CAR binding site of HIV gp120 but derived from bNAbs 45-46 vs N6. CAR T cells were challenged in the setting of chronic infection in Jurkat cells (FIG. 13). Their antiviral activity was found to be equivalent.

In one experiment, HIV-CAR T cells were generated by transduction with a lentiviral vector containing an EGFR suicide/reporter gene and the broadly neutralizing 45-46 antibody targeted to the CD4 binding site in gp120. In FIG. 14A, various ratios of CAR+ T and J1.1. latently infected jurkat cell were co-cultured and the neutralization of HIV infected cells determined 10 days later. FIG. 14B shows a summary of the CAR+ T/J.1. PMA+ treated cell p24, % inhibition, and CAR vector expression as determined by EGFR expression. In FIG. 15C, various ratios of CAR+ T and Jurkat/NL4-3 infected cells were co-cultured and the neutralization of HIV infected cells determined 10 days later. FIG. 15D shows a summary of the CAR+ T/Jurkat/NL4-3 treated cell p24, % inhibition, and CAR vector expression as determined by EGFR expression.

To evaluate the antiviral activity of these CD4-binding site specific CAR T cells against 5 different HIV-1 strains, the CAR T cells were co-cultured with HIV-infected cells or controls at various ratios, and the inhibition of HIV-infected cells was measured 10 days later (FIGS. 15A-15E). The HIV-CAR T cells were able to inhibit Jurkat cells infected with NL4-3 (T-tropic), CEM cells infected with BaL (M-tropic), 174X CEM cells infected with 89.6 (dual-tropic), ACH-2, a latently HIV LAV infected CEM line, and J1.1, an HIV-1 LAV latently infected Jurkat cell line. Thus, the HIV CAR T cells can inhibit T-tropic, M-tropic, and dual-tropic HIV strains and inhibit latently infected cells that are stimulated in vitro to reactivate HIV infection.

Figures 16A, 16B, 16C, 16D:
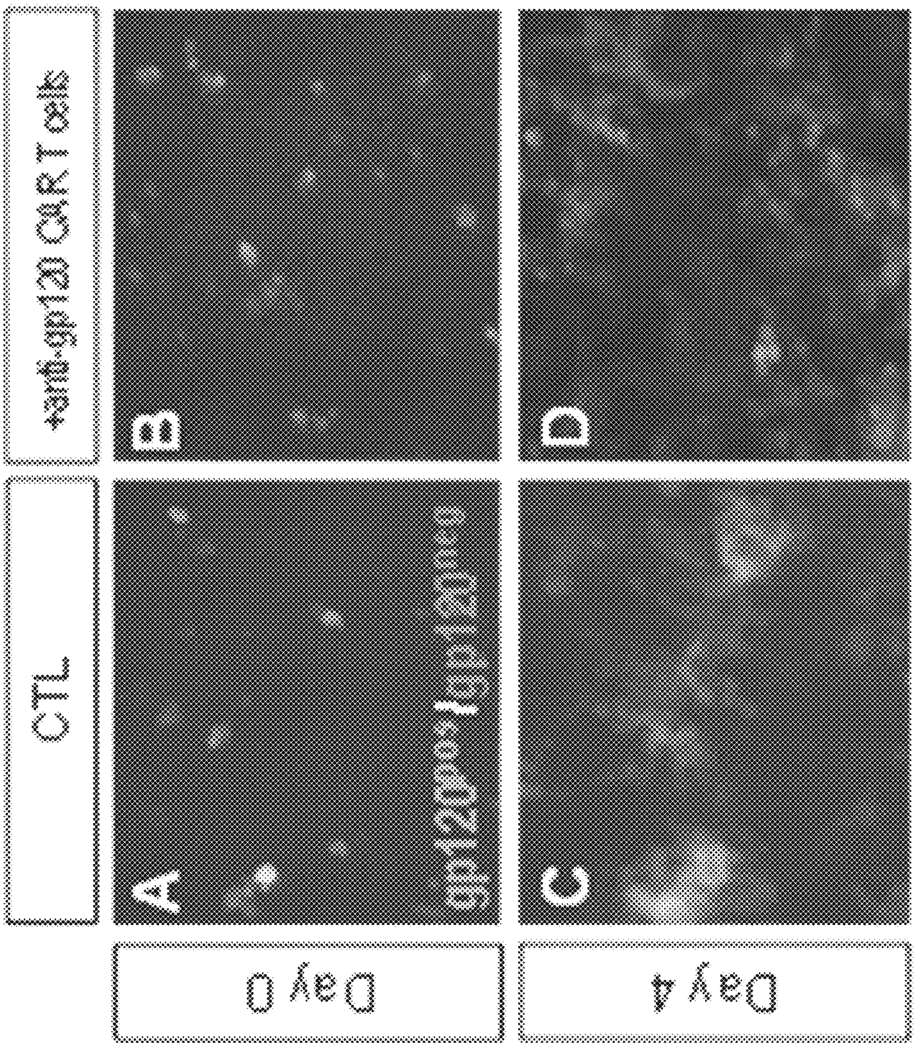
Figure 17A:
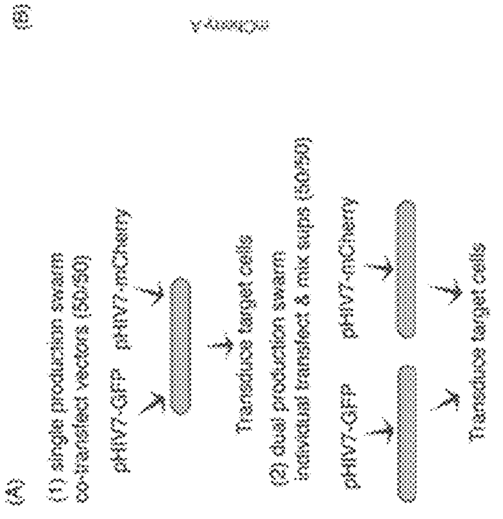
Figure 17B:
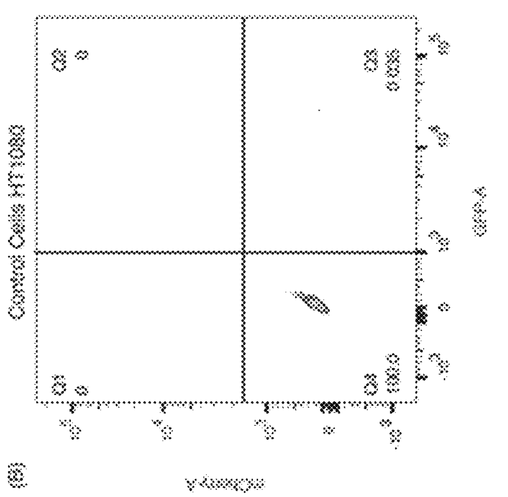
Figure 17C:
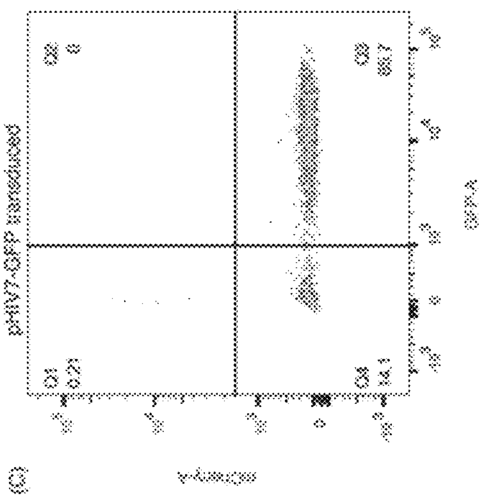
Figure 17D:
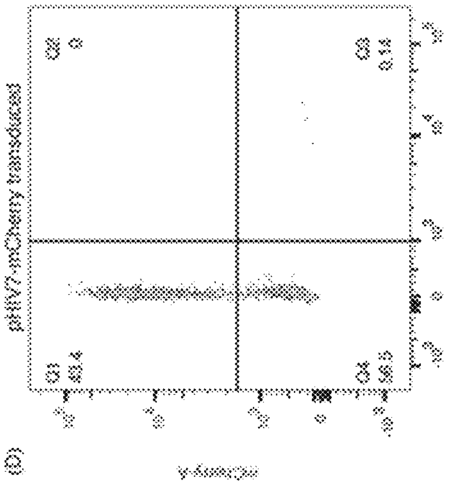
Figure 17E:
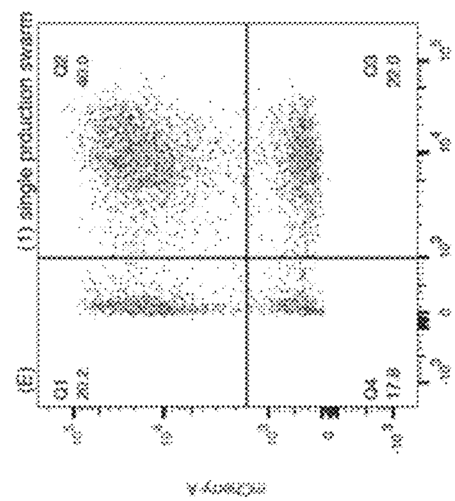
Figure 17F:
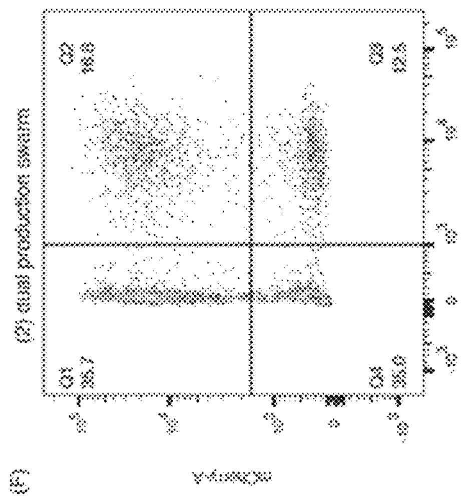

The specificity of HIV-CAR T cell effect in a mixed culture of 293T cells expressing gp120+ [green] and gp120− [red] cells was evaluated (FIGS. 16A-16D). These HIV-specific CAR T cells can eliminate 293T cells that express gp120 in vitro. The gp120+ cells were completely eliminated in 4 days whereas in the absence of CAR T cells, the green and red signals from these gp120+ and gp120− cells remained unchanged (FIG. 16B and FIG. 16D). The effect was specific for gp120, as CD19-specific CAR T cells did not affect gp120-expressing 293T cells.

Example 7: Development of CAR Cell Swarms for Targeted Eradication of HIV

CAR cell swarms were generated as shown in FIGS. 17A-17F.

Example 8: Combinations of HIV-CAR are More Effective That Single HIV-CAR

FIG. 18 shows that combinations of two or three distinct HIV-CAR T cells are more cytotoxic than single HIV-CAR T cella against a resistant HIV strain YU2-N332S (resistant to PGT128).

Example 9: Selection of a Broadly Neutralizing Antibody for Creating a CMV-HIV CAR T Cell After the identification of 45-46 and N6 as preferred anti-HIV bNAb, cytotoxicity and antigen-driven proliferation of various 45-46 and N6-based CAR T cells were assessed. For 45-46, two mutant variants, (G54W and G54W/S28Y, were tested in addition to a CAR based on wild-type 45-46. All of the CAR were identical outside of the scFv region (CD8 TM, 4-1BB co-stimulatory domain and CD3 zeta). As shown in FIGS. 9A and 9B, 45-46 and N6-based CAR T cells have similar cytotoxicity against gp120$^{pos}$ 8E5-eGFP+ and proliferation in the presence of gp120-positive cells. the titer of the N6 CAR vector was always higher than that of the 45-46 CAR vector during the lentivirus production, and was selected for further development.

Example 10: CMV-HIV CAR T Cells Target Specifically gp120-Positive Cells In Vitro The large-scale selection of CMV-reactive T cells for production of CMV-HIV CART cells was based on previously published methods [71]. Briefly, PBMCs from a healthy donor were collected and processed in the CliniMACS Prodigy® system by stimulation of PBMCs with a GMP-grade PepTivator® overlapping CMV pp65 peptide pool, followed by enrichment for CMV-responsive IFNγ+ T cells by using the IFNγ Catchmatrix reagent [Miltenyi Biotec Inc.]. The CART cells where expanded for about 3 weeks in vitro and cryopreserved. We confirmed that the CMV-HIV CAR T cells are specifically reactive to CMV and HIV antigens using a proliferation and cytotoxicity assay. CMV-HIV CAR T cells were thawed and selected for EGFR via magnetic selection to generate an EGFR depleted fraction (i.e., CMV-T cells) and an EGFR-enriched fraction (i.e., CMV-HIV CAR T cells). Proliferation assay by dye dilution shows that the CMV-HIV CAR T cells proliferate when co-cultured with CMVpp65+ pulsed autologous PBMCs and LCL-OKT3 (a line engineered to express CD3 receptors and activate T cells), but not when exposed to KG-1A (gp120neg cell line) or media (FIG. 19A). To assess the specific cytotoxicity of the cell product, CMV-HIV CAR T cells or CMV-T cells were co-cultured with KG-1A GFP+ or gp120pos 8E5-eGFP+ cell lines. GFP signal was measured 4 days following co-culture by flow cytometry. CMV-HIV CAR T cells only killed gp120pos cells but not gp120neg cells, while CMV-T cells had little to no toxicity against gp120pos or gp120neg cells (FIG. 19B)

Example 11: Generation and Characterization of CMV-HIV CAR

CMV-reactive cells from HIV donors on ART were isolated in the CliniMACS Prodigy® as described before. About 94% of the selected cells were CMV-specific T cells (FIG. 20A). These cells were then transduced with a self-inactivating lentiviral vector encoding either anti-HIV CAR (N6 scFv) or anti-CD19 CAR as control, resulting in ~65% of CMV-reactive T cells expressing N6-CAR (FIG. 20B) and ~52% of control CMV-reactive T cells expressing CD19-CAR (data not shown). The CAR T cells were expanded for ~3 weeks in vitro before functional analysis.

As shown in FIG. 21A, the majority (>96%) of autologous CMV-HIV CAR T cells are CD8+ T cells in the final product from HIV-infected donor. To test whether these CMV-HIV CAR T cells would be stable or terminally differentiate after in vitro expansion, we selected and analyzed EGFR+ cells for the memory/stem marker CD62L (1). About 7% of CMV-HIV CAR T cells express the central memory/stem marker CD62L (FIG. 21B). Since CD62L (a homing molecule) is dynamic, the cells were also assessed for the early stage memory cell marker and co-stimulatory molecule CD27 (TCM and Naïve cells) as well as CD45RA (effector memory T cells, TEMRA). As shown in FIG. 21C, the CMV-reactive CAR T cells contain a diversity of CD8 T cell subpopulations (2). About 42% of the CMV-HIV CAR T cells express the marker CD27 and thus have progenitor/stem properties and/or proliferative capacity (3). Overall, the majority of CMV-HIV CAR T cells have a phenotype conducive to activation and proliferation upon stimulation. We next evaluated these cells for exhaustion markers, since it is known that CAR T cell function is lost as cell exhaustion pathways are activated (4) and that T cells from HIV-infected subjects often express exhaustion markers due to the exposure to HIV (5, 6).

Expression of exhaustion markers (PD-1, LAG3 and Tim3) was analyzed by flow cytometry. After in vitro expansion for 22 days, the CMV-HIV CAR T cells expressed low levels of exhaustion markers (FIG. 22). This observation is consistent with results reported by Gomez-Mora et al. who analyzed cellular immune response of CMV-seropositive HIV-infected individuals with different CD4+ T-cell recovery upon treatment with virologically-suppressive ART (78).

To determine whether CMV-HIV CAR T cells maintain their reactivity to CMV antigens, CMV-HIV CAR T cells were co-cultured with autologous PBMCs pre-stimulated with CMVpp65 peptides followed by antigen recall assay using IFNγ expression. Flow cytometry analyses show that ~56% of the CD3+ T cells were positive for IFNγ (FIG. 23), indicating a reactivity of the cells to CMV immunogenic epitopes. This results support previous report that T cell activity directed against CMV is preserved in HIV subjects (14).

The cytotoxic function of the CMV-HIV CART cells was assessed in two in vitro models of HIV: 1) endogenous reactivation of HIV; and 2) Jurkat-GFP+ cells infected with the HIV strain NL4-3 HIV (FIGS. 24A-24C).

In vitro stimulation of CD4+ T cells isolated from HIV donors has been shown to reactivate latent reservoir in culture (79). In the present study, p24 levels were measured by ELISA in the supernatant of CMV-HIV or CMV-CD19 CAR T cells (Ctr-CAR) after 20 days in culture (FIG. 24A). The results demonstrate HIV reactivation in the CMV-CD19 CART cell cultures, but not in the CMV-HIV CAR T cell culture medium. Since the source of HIV in these cultures is from the HIV-infected donor, who was aviremic at the time of blood donation, this result shows that the therapeutic product can suppress the HIV reactivation. This study is evidence that autologous CMV-HIV CAR T cells have the potential to suppress HIV reactivation from the HIV reservoir.

In the second study, CMV-HIV or CMV-CD19 CAR T cells (Ctr-CAR) were co-cultured with HIV-infected Jurkat-GFP+ cells. Cytotoxicity was assessed by measuring the percent of GFP+ cells killed after 7 days in culture (FIG. 24B) and the levels of p24 on day 20 (FIG. 24C). These data show a dose-dependent cytotoxic effect and control of HIV replication of the CMV-HIV—but not the CMV-CD19 CAR T cells.

Taken together, the studies in this example demonstrate that 1) can be manufactured in a fully closed semi-automatic system, 2) is predominantly a CD8+ T cell product, 3) remains reactive to CMV stimulation, and 4) is highly potent at controlling HIV reservoir reactivation from the HIV donor in vitro. These data support our therapeutic strategy to combine CMV vaccination with a CAR T cell product to maintain adequate HIV-CAR T cell numbers in HIV-infected individuals during periods of low HIV viremia. We then evaluated our strategy in an animal model of HIV.

Example 12: Effect of CMV-HIV CAR T Cells on HIV Infection in an Animal Model of HIV CMV-HIV [N6 scFv] CAR T cells were assessed in an HIV mouse model. These studies assessed CAR T cells expansion and distribution as well as their effect on HIV infection, with or without CMV vaccine.

FIG. 25 is a schematic description of the modified HIV-infected Hu-PBL-NSG mouse model. This model is established by engraftment of HIV-challenged donor peripheral blood leukocytes (PBL) in 6-8 week old NSG mouse, an immunodeficient NOD/SCID strain that is devoid of functional murine B, T lymphocytes and NK cells.

We first explored whether the CMV-HIV CAR T cells from an HIV donor could expand in hu-PBL-NSG mice without vaccination. Briefly, NSG mice were transplanted at Day 0 with PBMCs from an HIV-infected donor on ART. In parallel, CMV-HIV CAR T cells were manufactured from the same HIV-infected donor, as previously described and enriched using EGFR+ selection. Infusing 50,000 CMV-HIV CAR T cells per mouse, CAR T cell expression was followed for 6 weeks. As can be seen in FIG. 26, there was a significant expansion of CMV-HIV CAR T cells in the peripheral blood of HIV-infected mice at 4 and 6 weeks post-CAR T cell infusion, but we did not observe concurrent changes in huCD45, huCD3, huCD4, or huCD8 cells over those same time points (data not shown). This indicates a selective expansion of the CAR T cell, which may be driven by exposure to cell surface-gp120 antigen. This observation is consistent with the putative mechanism for expansion of HIV-CAR T-cells, but it also suggests that expansion in the absence of CMV vaccine may require high levels of viral replication.

Figures 27A, 27B, 27C, 27D:
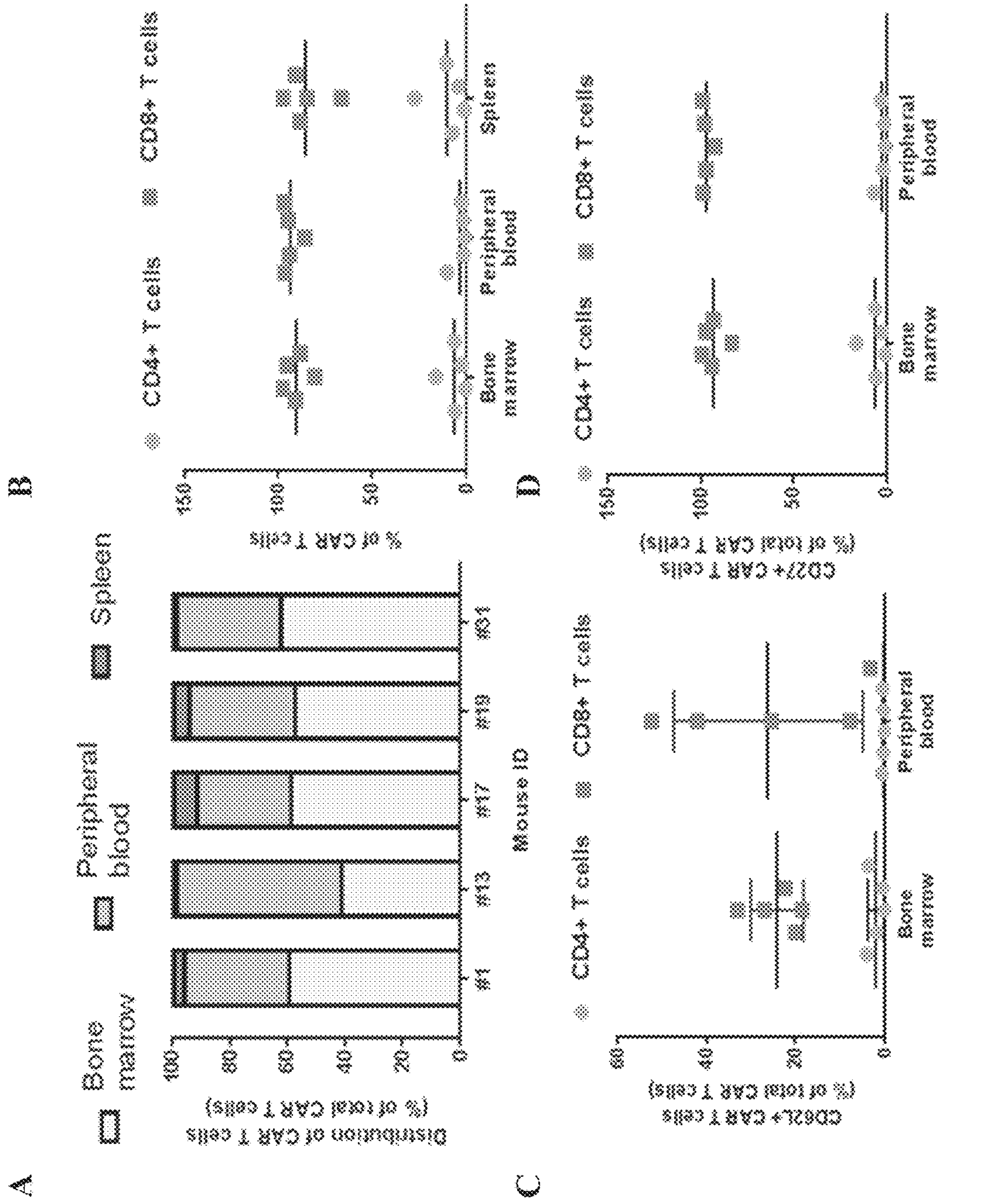

Mice were sacrificed six weeks (Day 55) after CAR T cells infusion and hind quarters (bone marrow), and spleens were removed and processed for flow cytometry analyses to determine CAR T cells' memory state. We found that the CAR T cells were more frequent in the peripheral blood and in the bone marrow, but rare in the spleen (FIG. 27A). As anticipated, the CAR T cells were mostly CD8+ T cells (FIG. 27B). Importantly, CAR T cells still express the early memory cell markers CD62L and CD27 at sacrifice (FIG. 27C and FIG. 27D). These cells were particularly abundant in the bone marrow where central memory T cells are known to reside, and have been shown to improve CAR T cell therapeutic efficiency in the cancer field (80). Thus, these results demonstrate the feasibility of creating CAR T cells from an HIV/AIDS individual that are capable of establishing persistent T cell memory and expansion in vivo.

In a separate experiment using PBMCs from a healthy donor, we analyzed whether the CMV vaccine can enhance expansion of CMV-HIV CAR T cells and what effects this might have on viral replication and protection of uninfected CD4+ T cells. To do so, $1\times10^6$ CMV-HIV CAR cells (n=10) or CMV-CS1 CAR T cells (Ctr-CAR T cells, n=10) were infused at Day 14 in the hu-PBL-NSG mouse model. In each cohort, five mice received a vaccination with CMV-peptide coated autologous CMV negative PBMCs on Day 32 and mice were sacrificed on Day 55. Body weight and temperature were measured weekly as a means to monitor toxicity of the therapy. Notably, no differences in body weight or temperature were observed between the experimental cohorts.

Mice that receive a CMV vaccine exhibited a statistically significant increase of CMV-HIV CART cell number two weeks post-vaccination (Day 38 [$p<0.05$]), consistent with the hypothesis that the vaccine stimulates expansion of CMV-HIV CAR T cells in vivo (FIG. 28A). This increase was also statistically significant relative to the control mice that were CMV-vaccinated ($p<0.001$). Of note, only the CMV-HIV CARs responded significantly to the vaccine, suggesting some contribution from HIV-CAR working with the CMV signals. Importantly, we observed a statistically significant increase in % huCD4 T cells only in the mice that received CMV-HIV CAR T cells with CMV vaccine (FIG. 28B), indicating that protection of CD4+ T cells occurs even in the absence ART. Finally, we observed a decrease in plasma HIV RNA in mice that received the CMV-HIV CAR T cells (with or without CMV vaccine) compared to those that received the Ctr-CAR T cells with CMV vaccine (74-fold or 18-fold reductions, respectively, at 14 days after CMV vaccination, FIG. 28C).

In a systematic study of this model, seven to eight weeks old NSG mice were transplanted with $10\times10^6$ PBMC ($10^6$ PBMC infected with HIV-1Bal+$9\times10^6$ uninfected PBMC) by intraperitoneal injection under isoflurane gas anesthesia to establish humanization and HIV infection. Mice that exhibited engraftment (>10% hCD45+ human cells in peripheral blood) and HIV infection (>$10^4$ viral copies per ml of blood) were treated with an IV infusion of $10^6$ anti-gp120 CAR T cells (45/46 anti-HIV construct) or a mock lentiviral vector at 4 weeks post transplantation. Mice were monitored for a total of 10 weeks for signs of declining health (hunch and ruffled hair coat, lethargy, dehydration, weight loss) and terminal disease. Mice that were moribund were euthanized and date of death was recorded. Statistical analysis was performed by log rank test, which yielded P=0.012. The Kaplan-Meier survival curve shown in FIG. 30 demonstrates the significantly improved survival (p=0.012) of the mice infected with HIV and which received the gp120+ CAR T cells.

In this study, the anti-HIV effect, 1-2 log reduction in p24 levels, was disproportional to the survival data.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

REFERENCES

1. V. Golubovskaya, L. Wu, Different Subsets of T Cells, Memory, Effector Functions, and CAR-T Immunotherapy. *Cancers* 8, (Mar. 15, 2016).
2. A. Larbi, T. Fulop, From “truly naive” to “exhausted senescent” T cells: when markers predict functionality. *Cytometry A* 85, 25 (January 2014).
3. L. Gattinoni, C. A. Klebanoff, N. P. Restifo, Paths to sternness: building the ultimate antitumour T cell. *Nat Rev Cancer* 12, 671 (October 2012).
4. H. E. Ghoneim, A. E. Zamora, P. G. Thomas, B. A. Youngblood, Cell-Intrinsic Barriers of T Cell-Based Immunotherapy. *Trends Mol Med* 22, 1000 (December 2016).
5. C. L. Day et al., PD-1 expression on HIV-specific T cells is associated with T-cell exhaustion and disease progression. *Nature* 443, 350 (Sep. 21, 2006).
6. L. Trautmann et al., Upregulation of PD-1 expression on HIV-specific CD8+ T cells leads to reversible immune dysfunction. *Nat. Med.* 12, 1198 (October 2006).

What is claimed is:

1. A nucleic acid molecule encoding a chimeric antigen receptor (CAR) comprising the amino acid sequence of SEQ ID NO:39 or the amino acid sequence of amino acids 1-649 of SEQ ID NO: 39.

2. A vector comprising the nucleic acid molecule of claim 1.

3. A population of T cells comprising a nucleic acid molecule encoding a chimeric antigen receptor (CAR) comprising the amino acid sequence selected from: SEQ ID NO:39 and the amino acids 1-649 of SEQ ID NO:39.

4. The population of T cells of claim 3, wherein the T cells express a T cell receptor that binds a cytomegalovirus antigen.

5. A chimeric antigen receptor (CAR) comprising the amino acid sequence selected from: SEQ ID NO:39 and the amino acids 1-649 of SEQ ID NO:39.

6. A population of T cells comprising a chimeric antigen receptor (CAR) comprising the amino acid sequence selected from: SEQ ID NO:39 and the amino acids 1-649 of SEQ ID NO: 39.

7. The population of T cells of claim 6, wherein the T cells express a T cell receptor specific for a cytomegalovirus antigen.

* * * * *